Oct. 24, 1944.    I. MOLNAR    2,361,313
TELEPHONE SYSTEM
Filed April 1, 1943    37 Sheets-Sheet 1

INVENTOR.
IMRE MOLNAR
BY
ATTORNEY

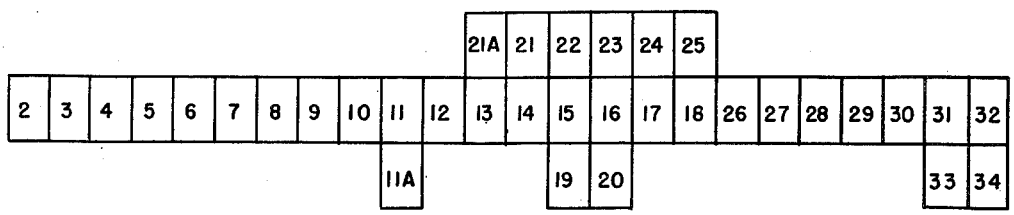
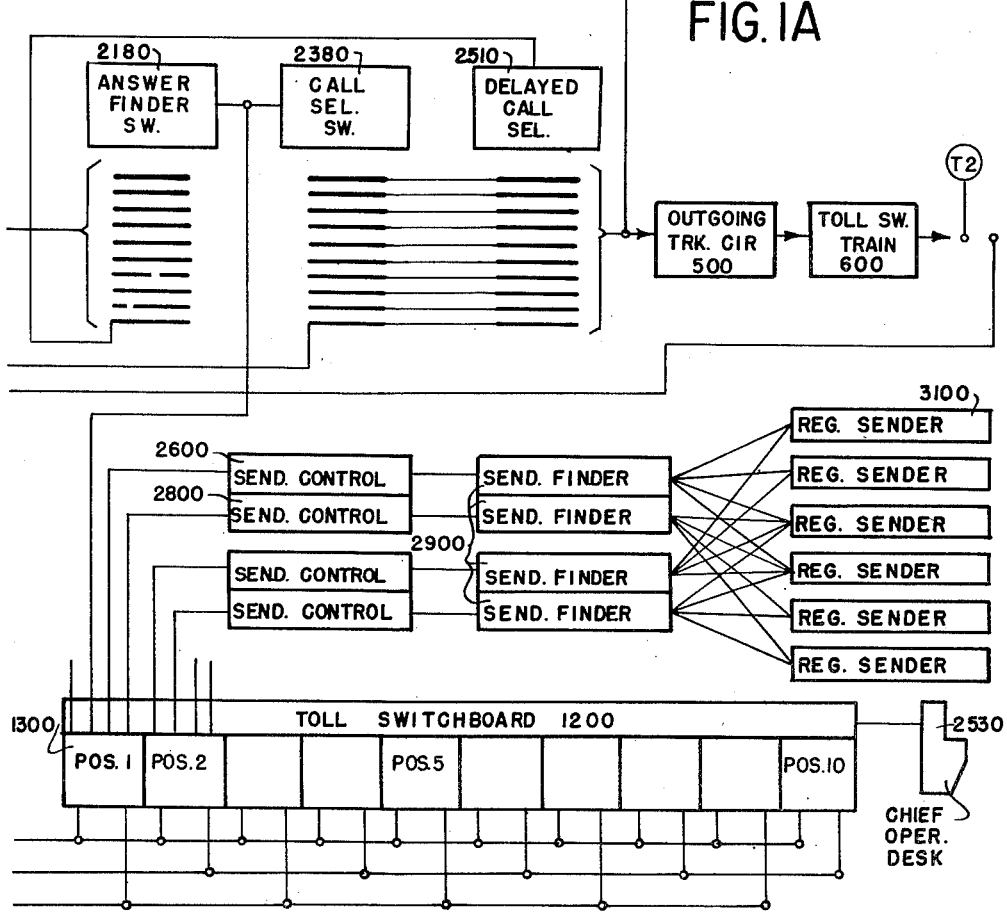

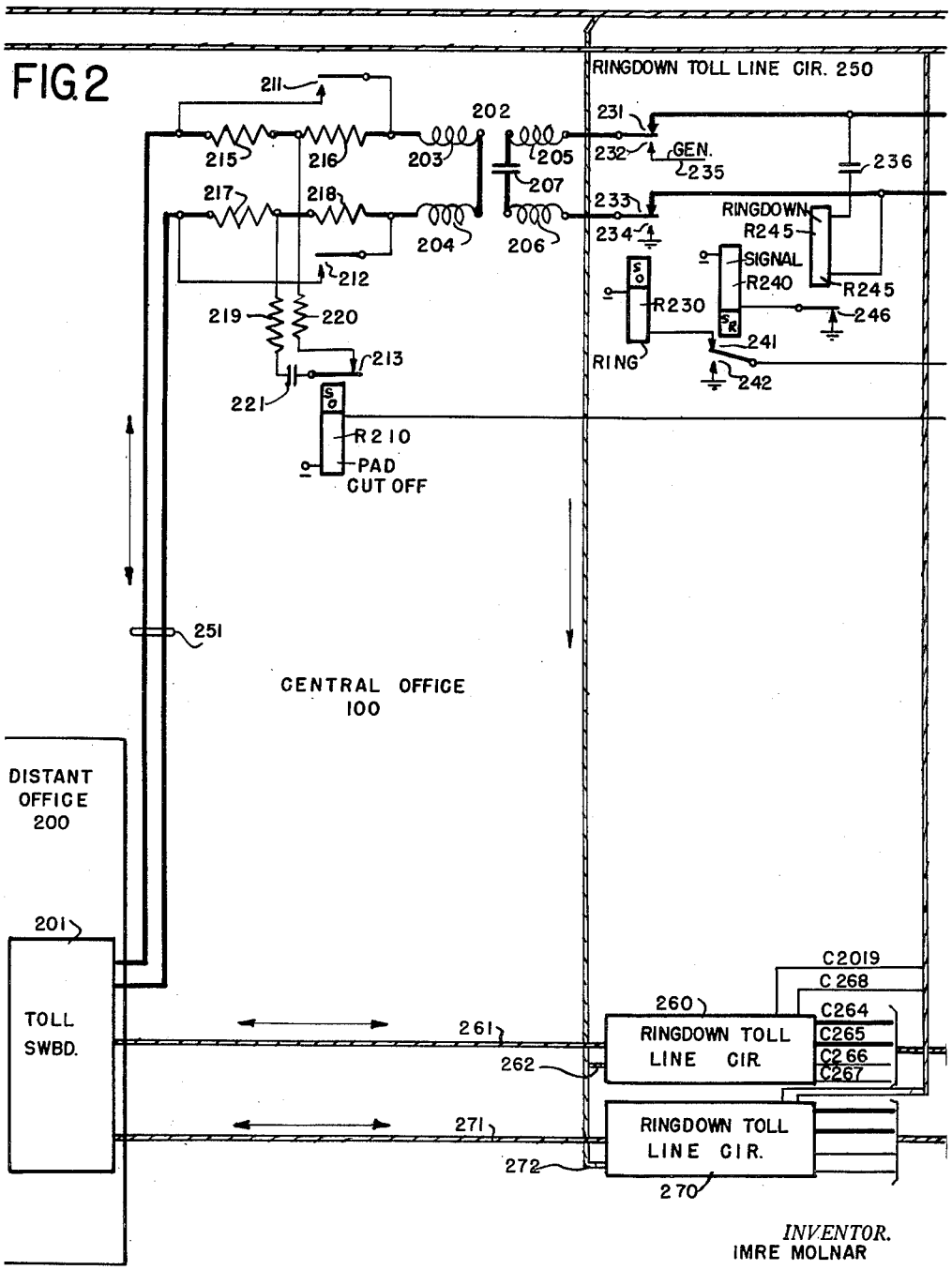

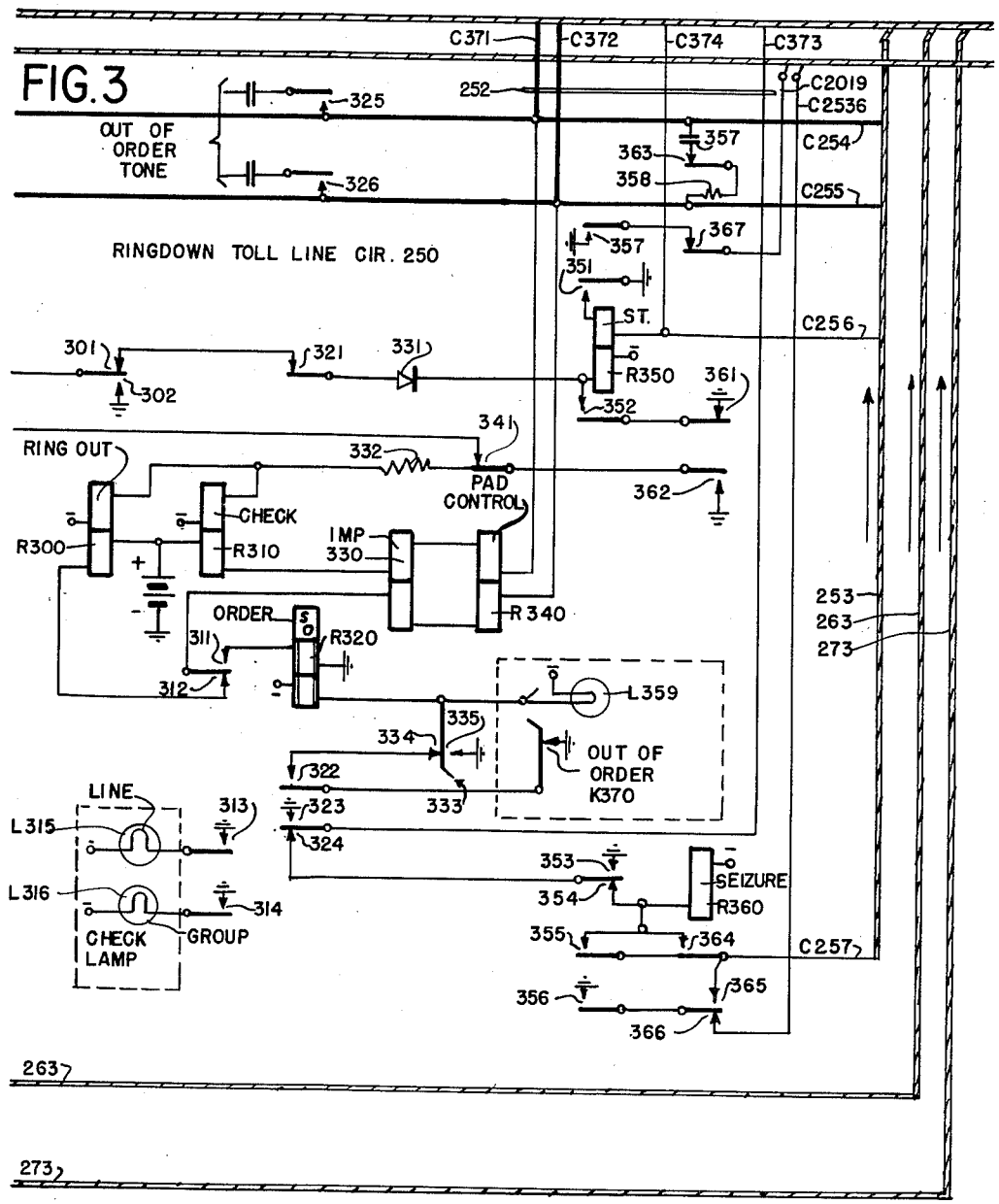

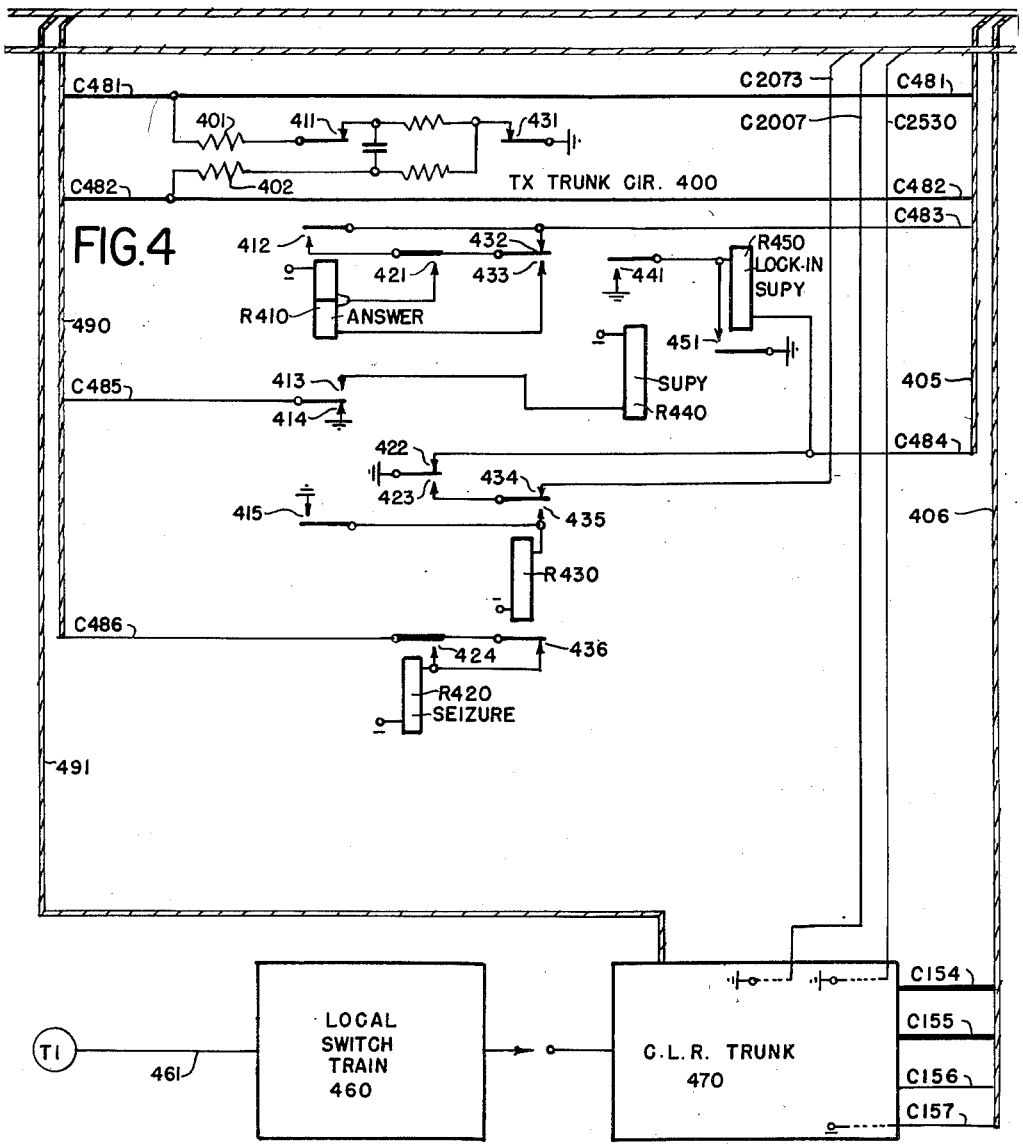

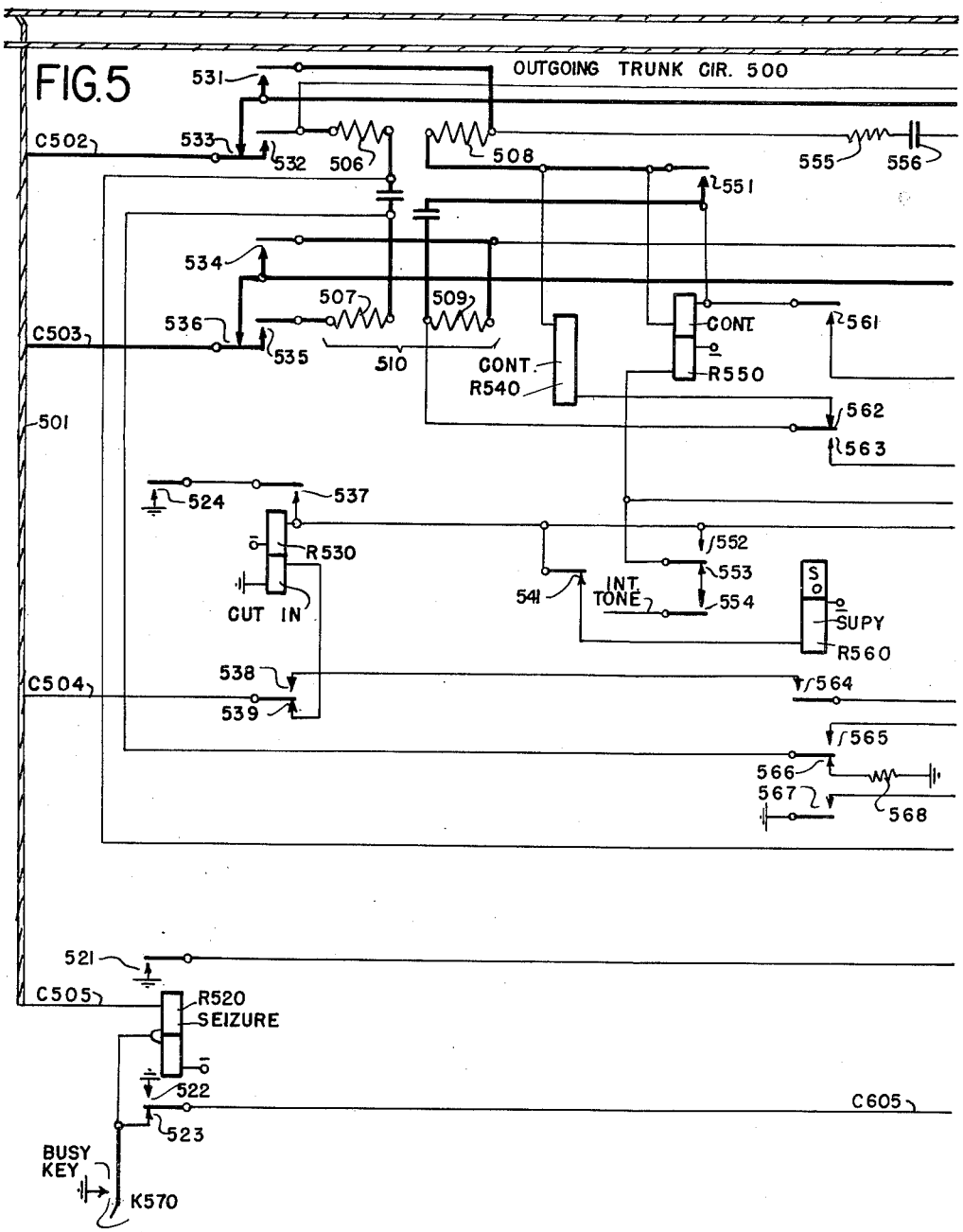

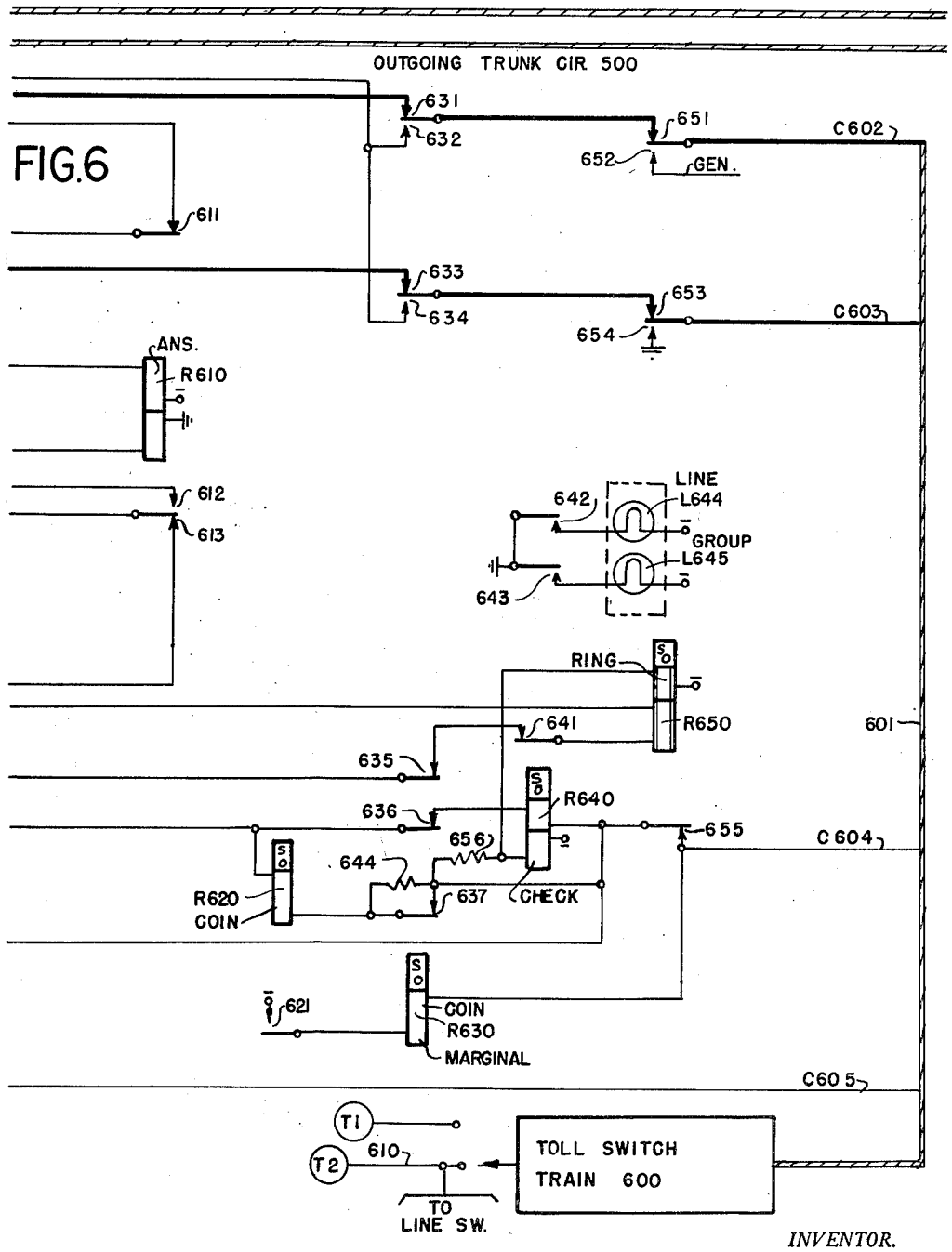

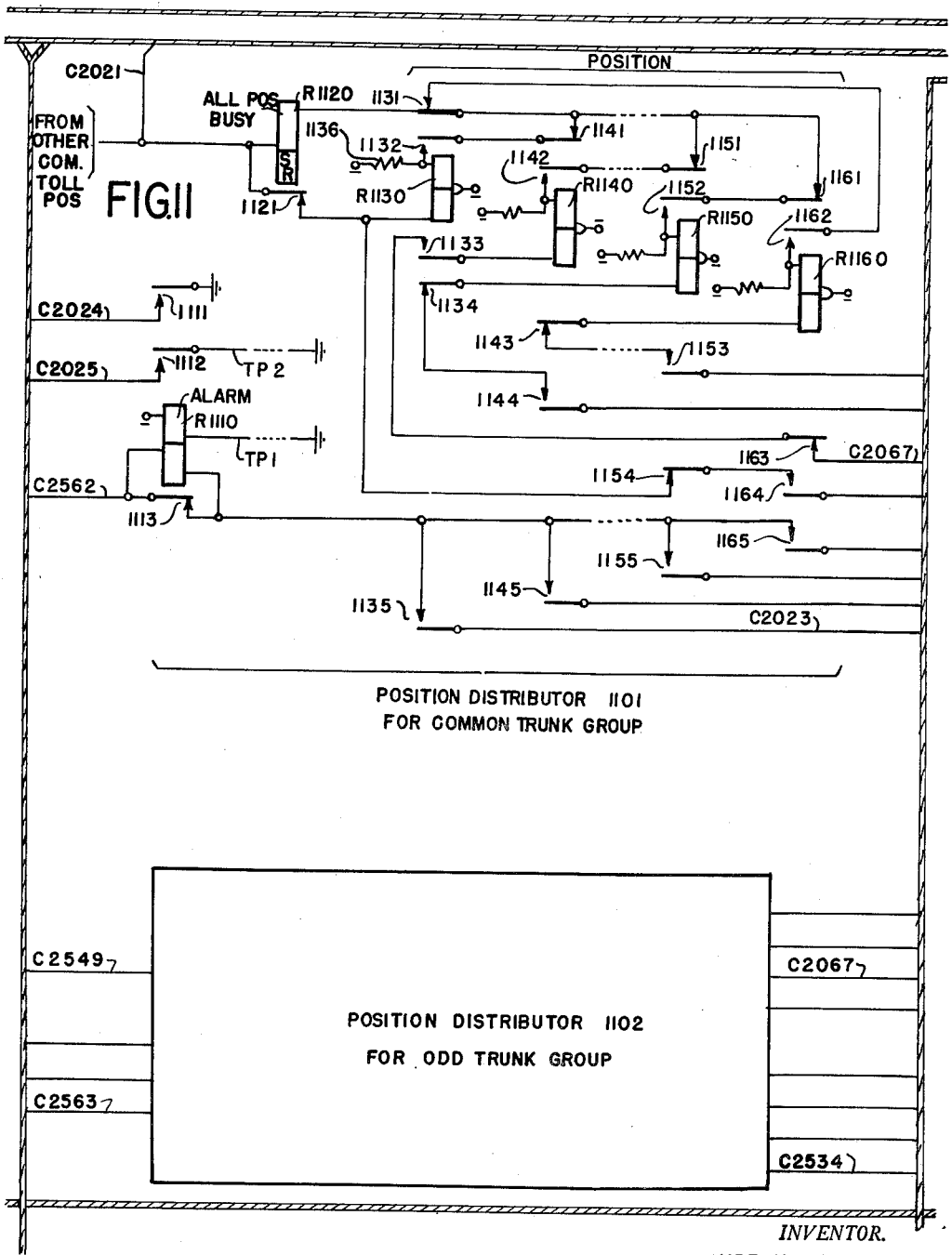

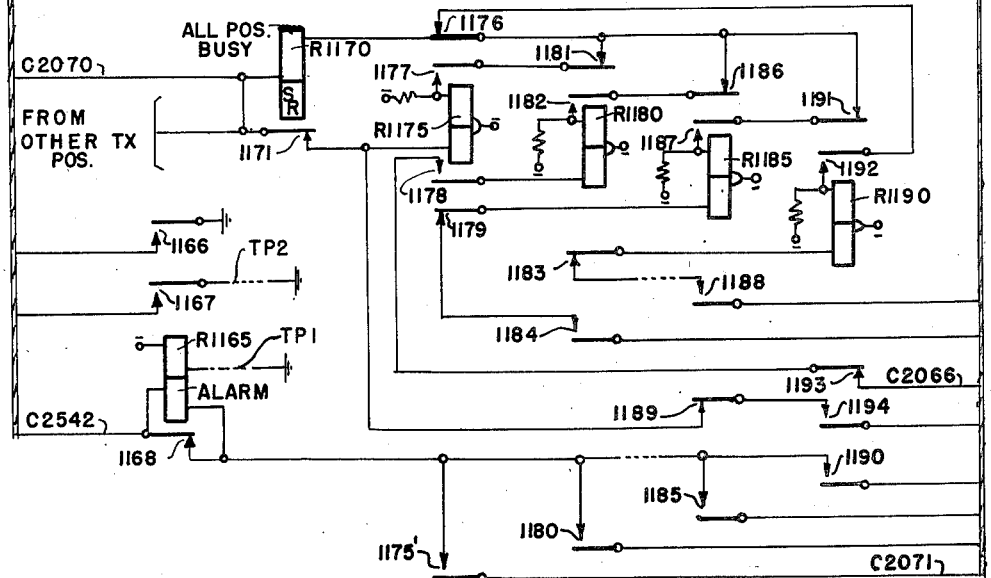

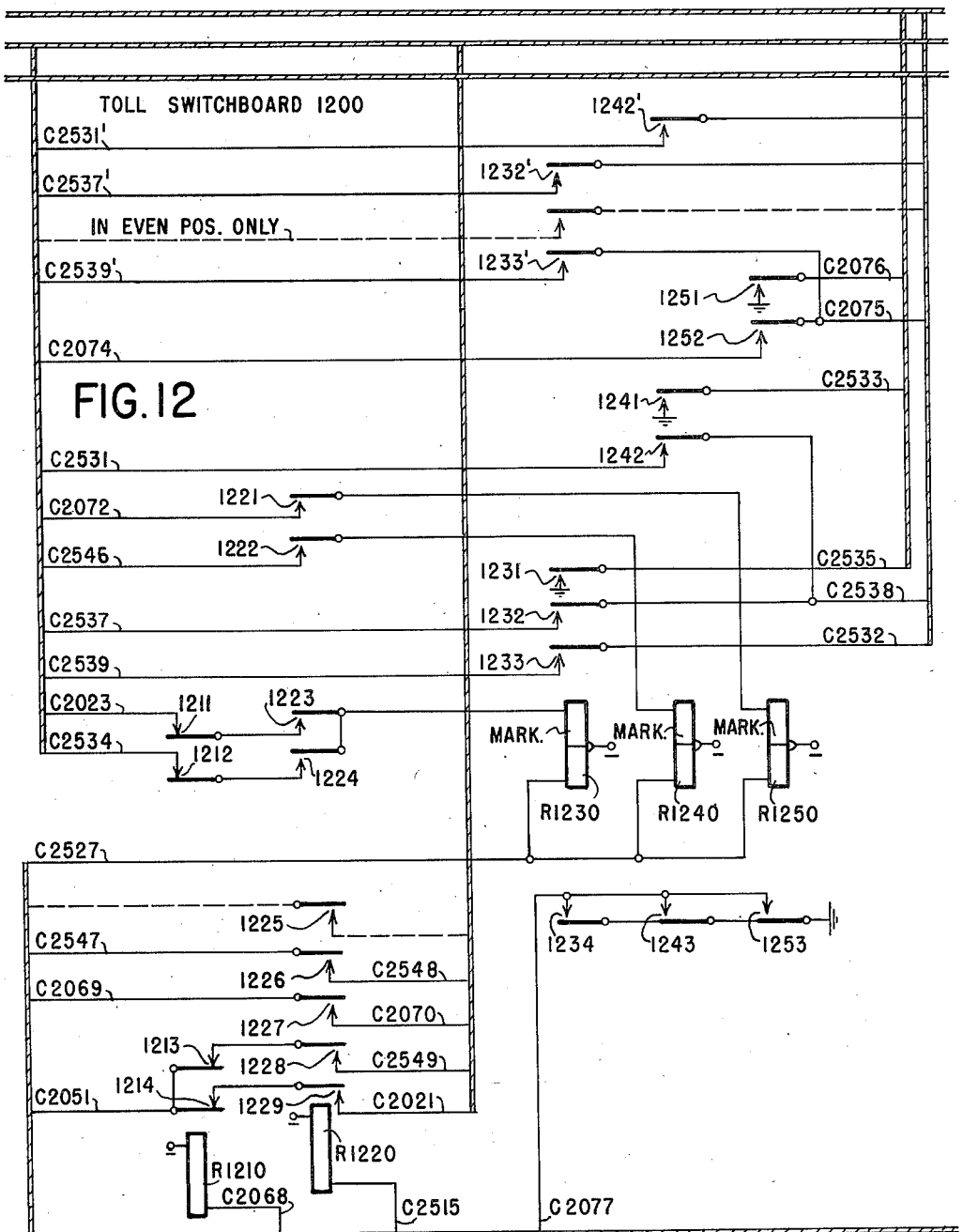

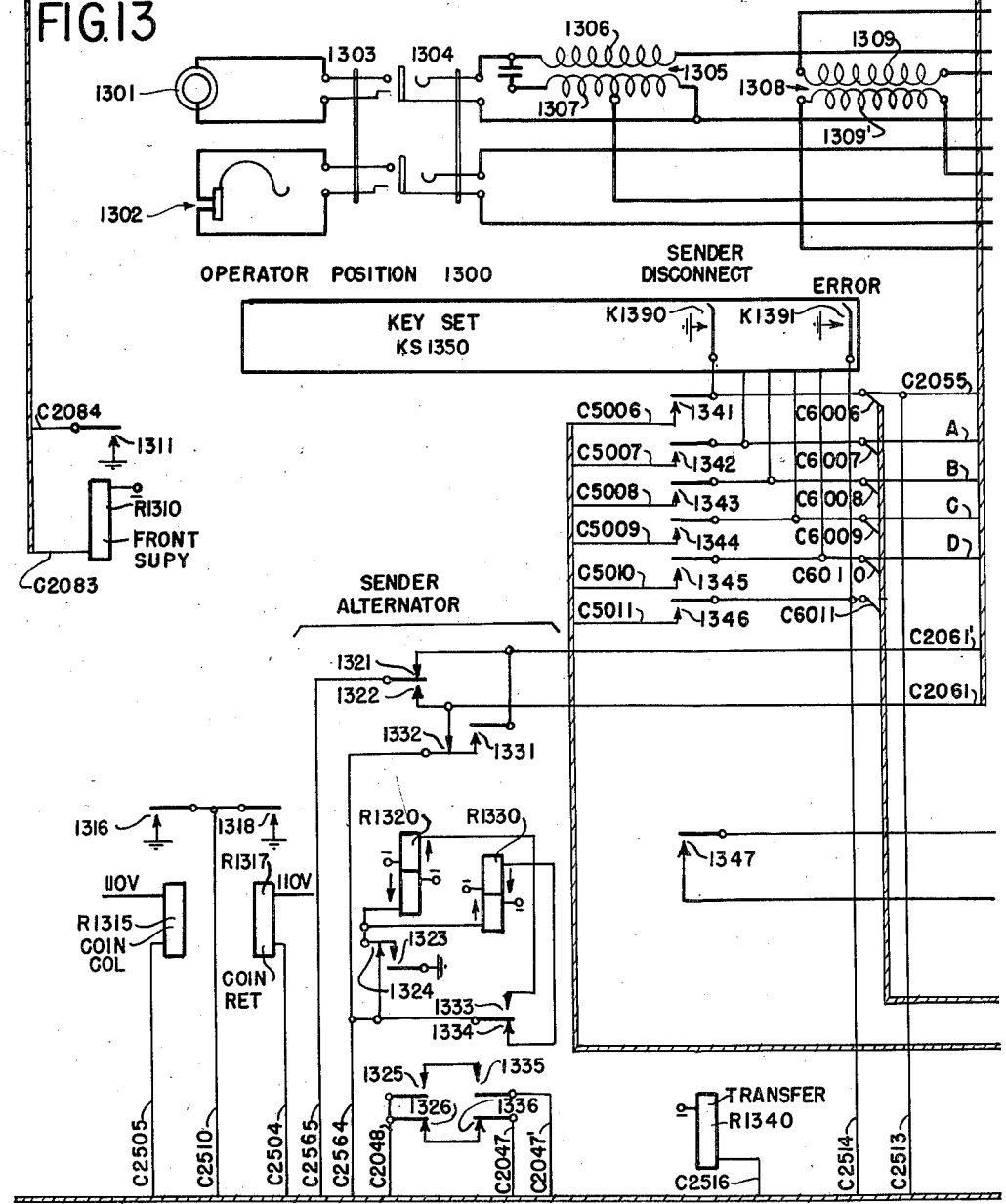

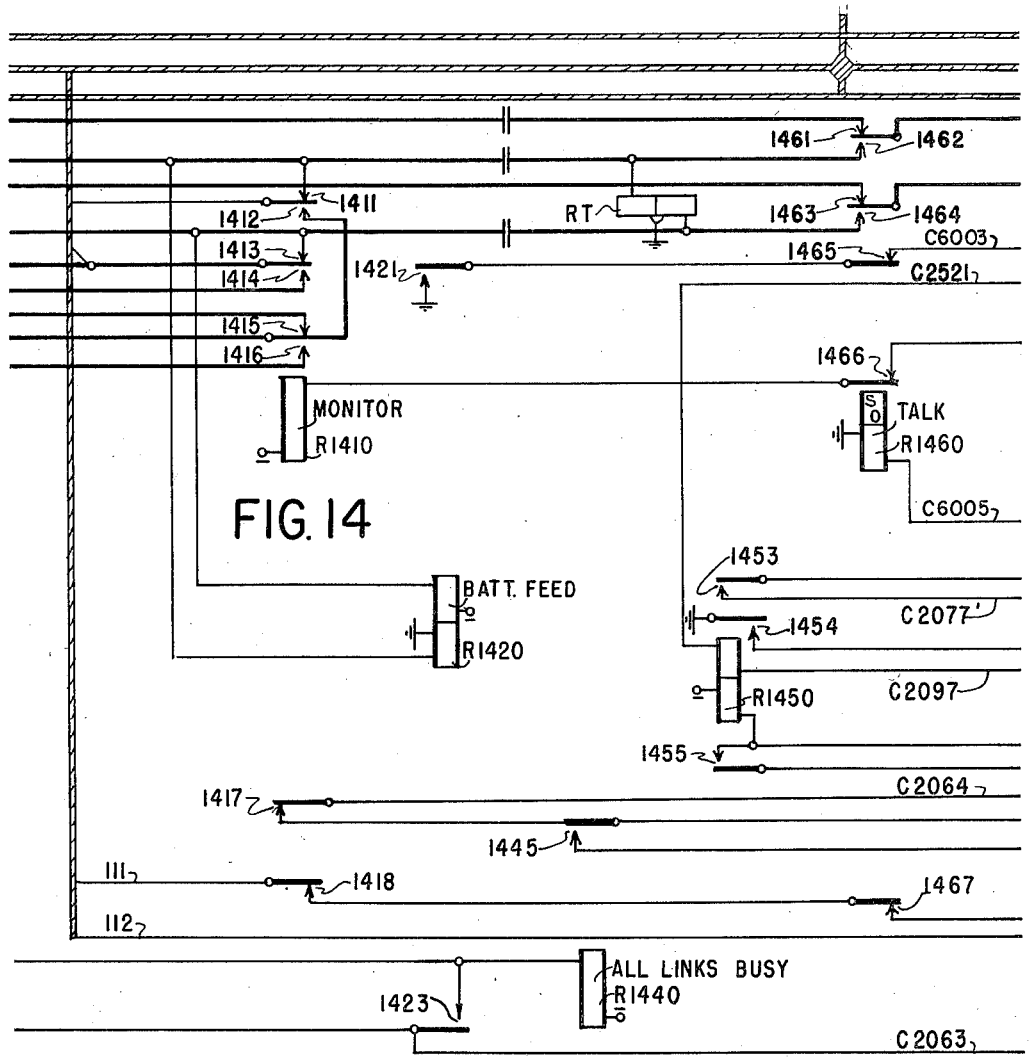

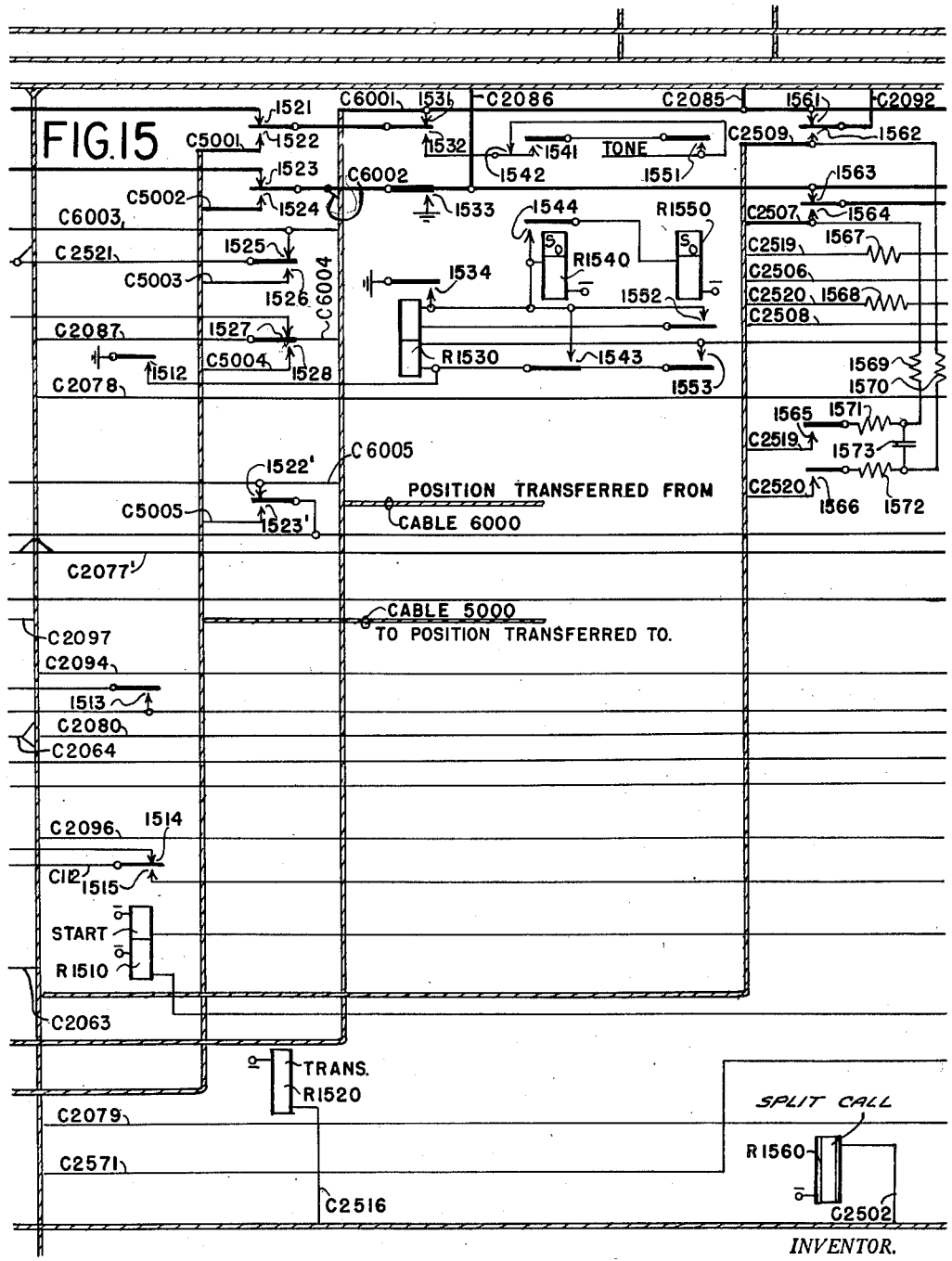

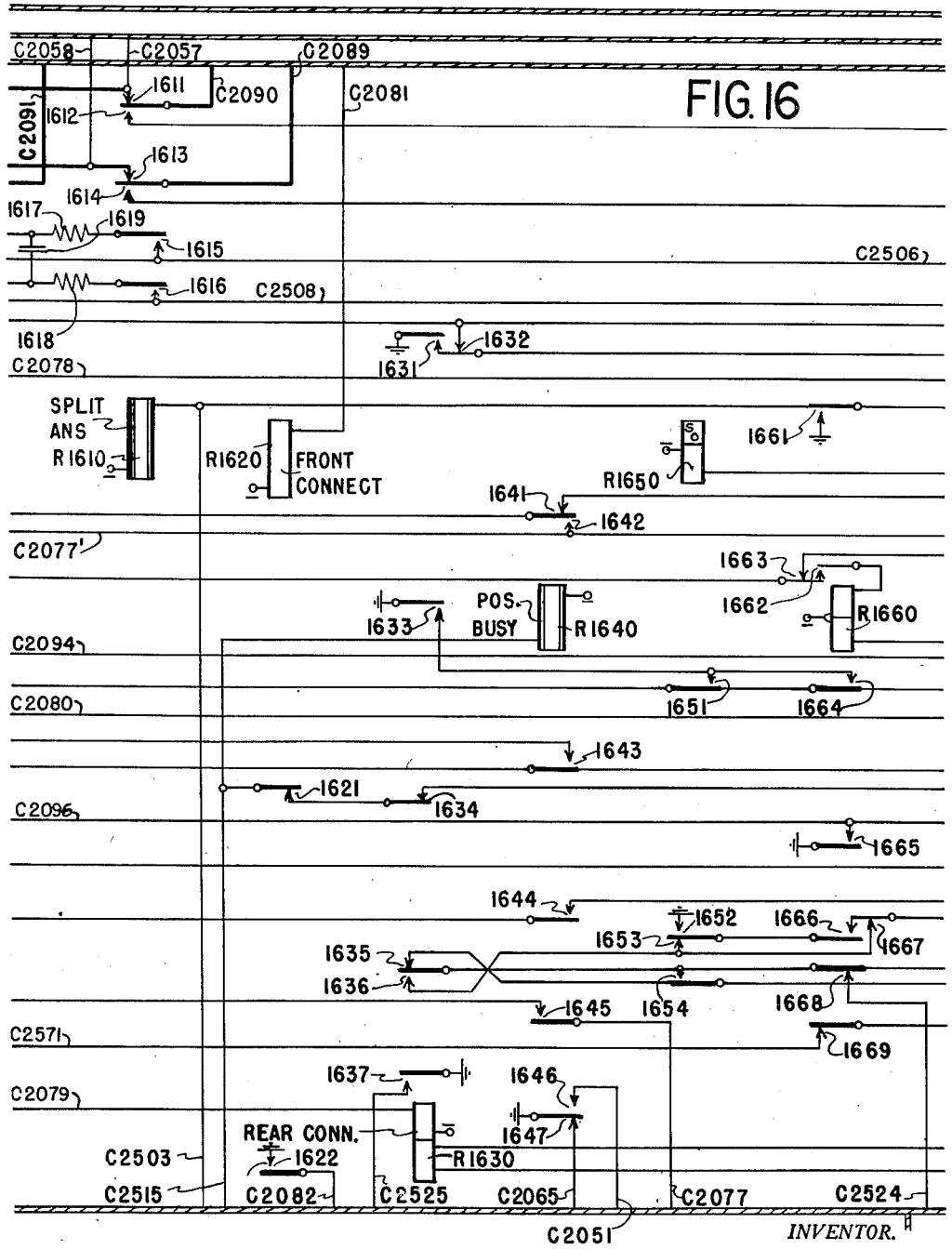

Oct. 24, 1944.  I. MOLNAR  2,361,313
TELEPHONE SYSTEM
Filed April 1, 1943  37 Sheets-Sheet 22
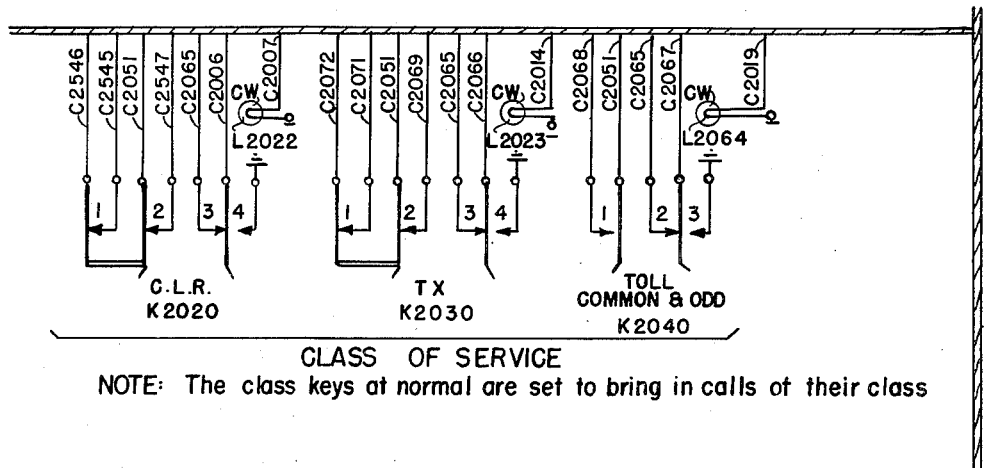
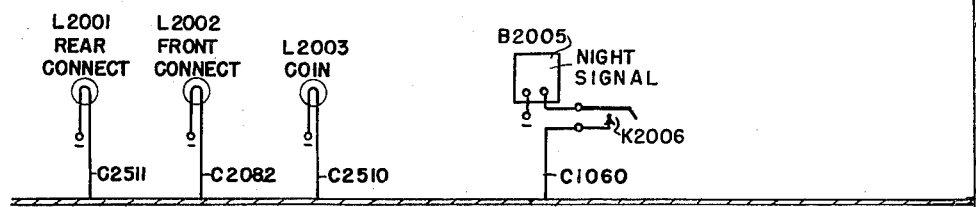
FIG. 20
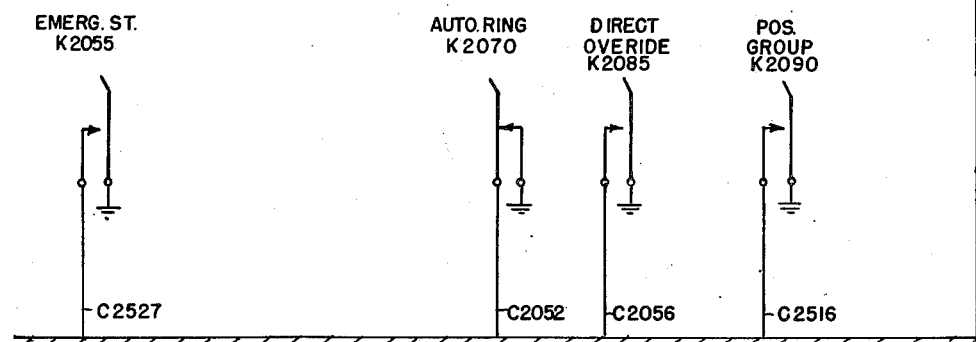
INVENTOR.
IMRE MOLNAR
BY
ATTORNEY

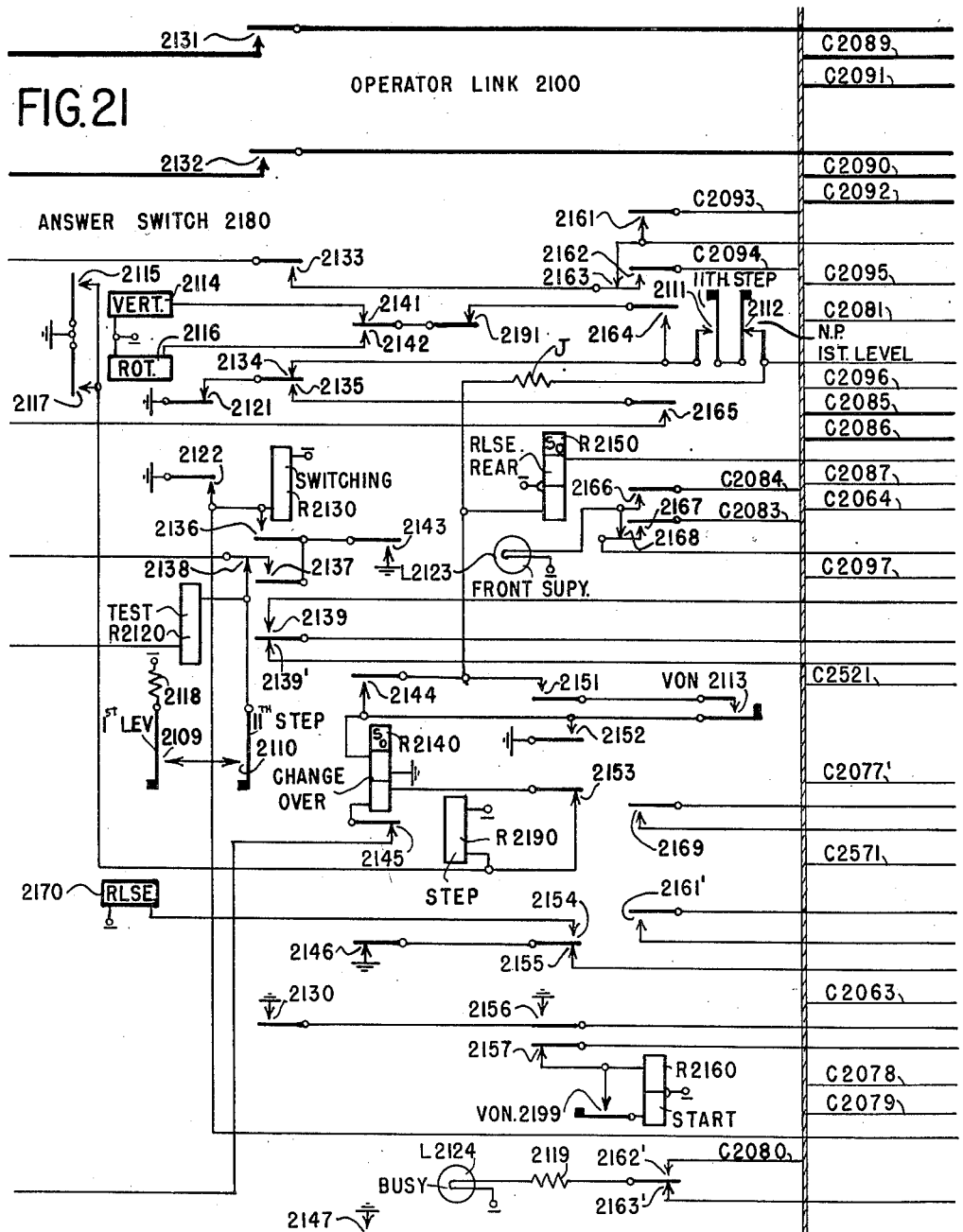

Oct. 24, 1944.　　　　I. MOLNAR　　　　2,361,313
TELEPHONE SYSTEM
Filed April 1, 1943　　　37 Sheets-Sheet 24

INVENTOR.
IMRE MOLNAR
BY
ATTORNEY

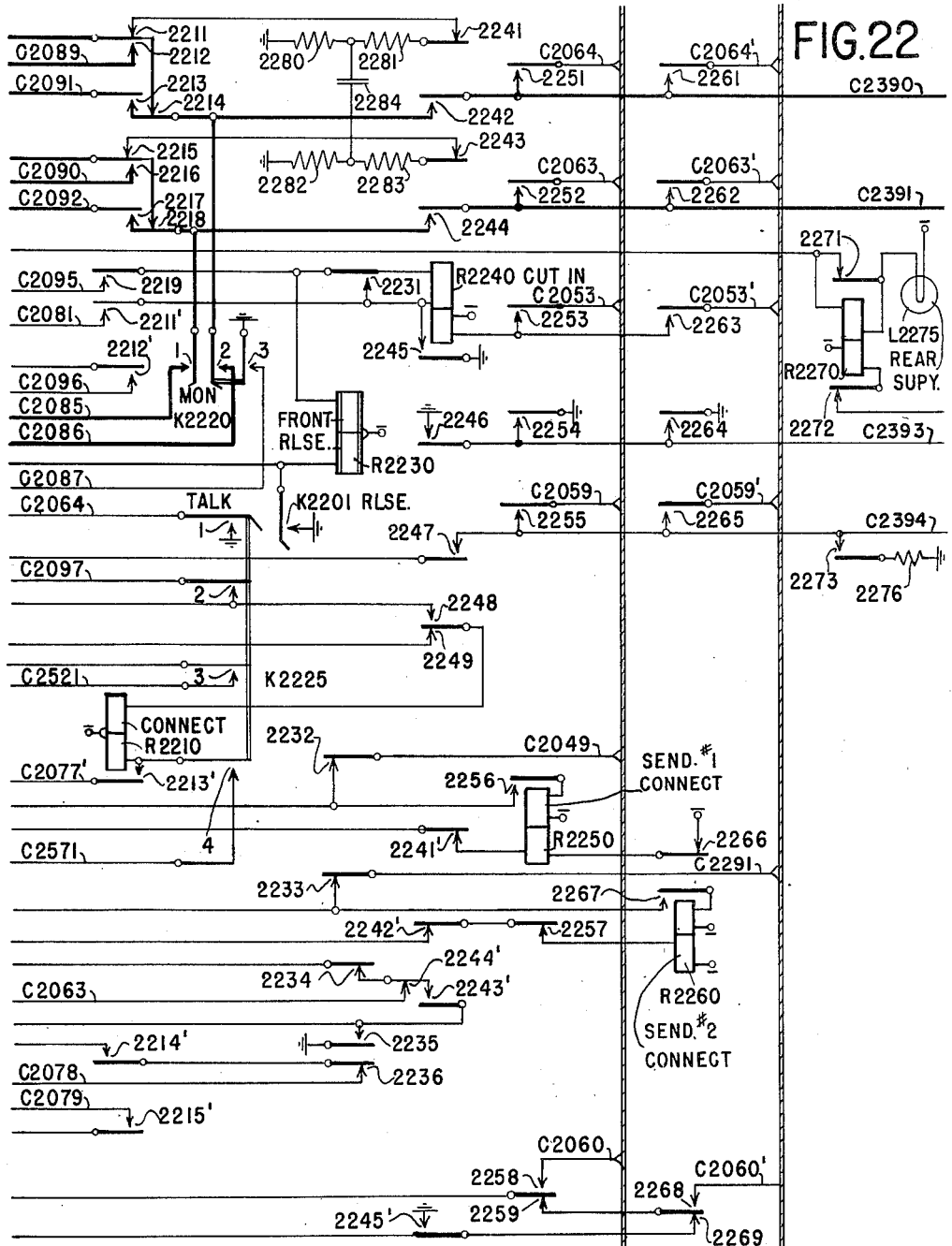

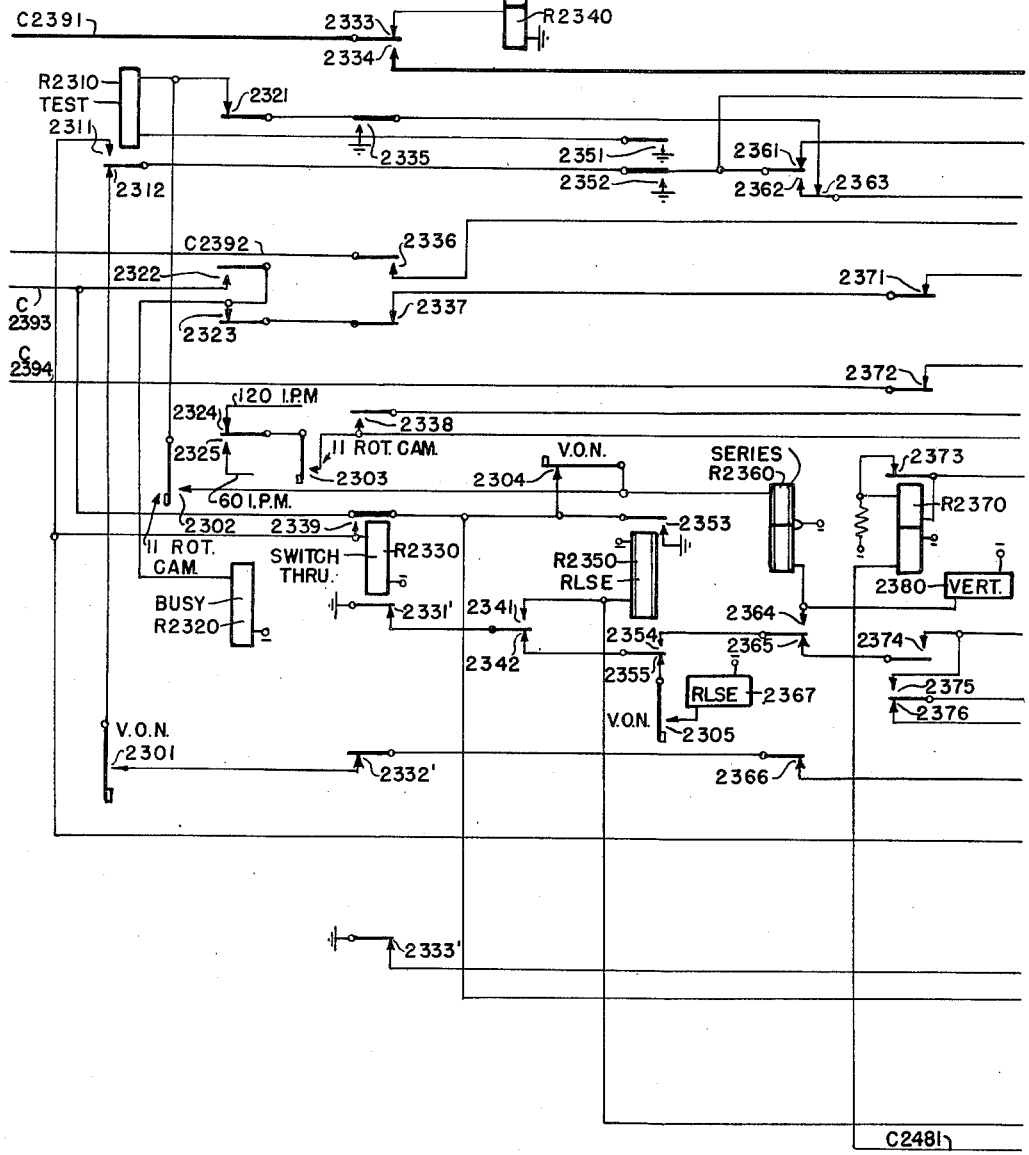

Oct. 24, 1944.  I. MOLNAR  2,361,313
TELEPHONE SYSTEM
Filed April 1, 1943  37 Sheets-Sheet 27

CALL SWITCH 2380

INVENTOR.
IMRE MOLNAR
BY
ATTORNEY

Oct. 24, 1944.   I. MOLNAR   2,361,313
TELEPHONE SYSTEM
Filed April 1, 1943   37 Sheets-Sheet 36

*INVENTOR.*
IMRE MOLNAR.

BY

ATTORNEY

FIG. 34

Patented Oct. 24, 1944

2,361,313

UNITED STATES PATENT OFFICE 2,361,313

TELEPHONE SYSTEM

Imre Molnar, Chicago, Ill., assignor to Automatic Electric Laboratories, Inc., a corporation of Delaware Application April 1, 1943, Serial No. 481,412

67 Claims. (Cl. 179—27)

The present invention relates to telephone systems in general and, more particularly, to improvements in automatic switching apparatus provided in conjunction with toll switchboards to enable toll operators to establish and supervise connections more efficiently.

In handling toll switching at a centralized toll switchboard, incoming calls from the distant exchanges are first routed by way of the toll lines to the toll or inward operator positions at the switchboard and completed therefrom directly to the local subscriber substation in the central office, or transferred therefrom to the point-to-point or TX operator positions to be completed later. Through calls between distant exchanges and including the central office as a tandem switching point are handled at the inward operator positions in much the same manner as incoming calls. Outgoing calls originating either at local subscriber substations in the central office or at CAX exchanges in the central office area are first routed by way of CLR trunks to CLR (combined line and recording) operator positions at the switchboard, and then completed directly by way of the toll lines to distant exchanges, or when immediate completion of the connection is impossible, a toll ticket, containing the necessary information for completing the connection to both the calling and called subscribers, is passed to the point-to-point or TX operator positions to be completed later. In originating a call from the TX operator positions of the switchboard, the operator thereat sets up the connection to the calling and called subscriber substations.

The present invention is in the nature of an improvement over the system disclosed in the Thomas F. Crocker Patent No. 2,167,710 issued August 1, 1939.

It is an object of the present invention to provide, in a telephone system of the character described, a toll switchboard in which each of the positions constituting the switchboard, is a universal position which is capable of being selectively conditioned to handle any one or more classes of service.

One feature of the invention is to provide a position distributor for each class of service to be handled by the switchboard in order to distribute calls of each class to the positions conditioned to receive the particular class of service handled by the associated distributor.

Another feature of the invention is to provide a position distributor for each class of service so that calls in different classes of service may be simultaneously distributed to the different positions of the switchboard which have been selectively conditioned to receive calls of the class of service being distributed. For example, certain of the operator positions may be selectively conditioned to handle toll calls, certain other positions may be selectively conditioned to handle CLR calls, and the remaining positions may be selectively conditioned to handle TX calls. Since the toll calls constitute the bulk of the traffic handled at a switchboard, the toll trunk lines, instead of comprising a single group, are divided into three smaller groups, and each is provided with a separate position distributor. One of the three groups of toll trunks constitutes a common group and calls in this group are distributed by its associated position distributor to all positions of the switchboard selectively conditioned to receive toll calls. Another or the three groups of toll trunks constitute an odd group and calls in this group are distributed by its associated position distributor to the odd numbered operator positions of the switchboard selectively conditioned to receive toll calls. The last of the three groups of toll trunks constitute an even group and calls in this group are distributed by its associated position distributor to the even numbered operator positions of the switchboard selectively conditioned to receive toll calls. It should be understood that calls in the common group of toll trunks will be distributed to the odd and even operator positions selectively conditioned to receive toll calls.

It is another feature of the present invention to provide, in a telephone system of the character described, novel circuits and apparatus whereby the inward operator may extend an incoming toll call received at her position to a TX operator position for completion.

A further feature of the invention is to provide, in a telephone system of the character described, circuits and apparatus whereby supervision received over a toll line connection, which connection has been extended by the inward operator to a TX operator, is only received at the TX operator position and is also locked in until the TX operator responds.

Another feature of the invention is to provide, in a telephone system of the character described, circuits and apparatus whereby the TX operator, after receiving an incoming toll connection from an inward operator position, may directly connect with the incoming toll line independently of the switching apparatus utilized by the inward operator in receiving and extending the connection to the TX operator position.

Another feature of the present invention is to provide, in a telephone system of the character described, an improved arrangement for controlling the toll line pad equipment provided in the toll line circuits in order to control the gain or loss in the transmission level over the toll line in accordance with the character of the terminating line in the connection.

Another feature of the present invention is to provide an improved arrangement for controlling a toll line circuit to mark the same defective, to ascertain the specific identity thereof, or to signal a distant operator.

A still further feature of the invention is to provide, in a telephone system of the character described, a new and improved combination marking and testing circuit for controlling the answering switches of the position link circuits to find and connect with a calling trunk line, which circuit includes the calling trunk line for marking the particular contact in a level and a common start and level distributor for marking all the contacts in the banks to designate the class of service of the calling trunk, and for marking the particular bank level in which the calling trunk is located.

It is another feature of the present invention to provide, in a telephone system of the character described and including a plurality of operator positions and a plurality of groups of trunk lines, a position distributor for each of the trunk groups, and a common start and level distributor for all of the trunk groups connected and arranged so that the plurality of groups of trunk lines constituting the toll groups and the plurality of groups of trunk lines constituting the CLR and TX groups are routed independently of each other to the operator positions selectively conditioned to receive the class of service designated by the different groups of trunk lines in a predetermined order to be answered.

Another feature of the present invention is to provide, in a telephone system of the character described including a plurality of operator positions, an improved arrangement for connecting the operator headset and associated equipment including the keyset at a staffed position of the switchboard to an unstaffed position of the switchboard in order to handle connections to be completed through the unstaffed position.

Another feature of the present invention is to provide, in a telephone system of the character described, a pair of sender control circuits for each operator position of the switchboard and a common group of register senders for all of the positions of the switchboard together with an alternator at each operator position for selectively controlling the connection of a sender control circuit to the operator position for use, and a circuit arrangement for associating an idle one of the common register senders with the selected sender control circuit.

According to another feature of the invention, provisions are made for automatically associating a sender control circuit and an idle register sender either directly to the call switch of a link circuit at an operator position or to the answer switch of a link circuit at an operator position through the operator's position equipment, and also under certain conditions, permitting the overlapping connection of two sender control circuits and associated register senders to the same operator link circuit.

In accordance with another feature of the invention, each link circuit at an operator position is provided with a novel sender control connecting means so that one of a plurality of sender control circuits at an operator position is automatically connected to the call switch of the link as soon as the answer switch of the same link has connected with a calling trunk.

According to another feature of the invention, provisions are made for utilizing the eleventh contacts in the banks accessible to the answer switches of each of the operator link circuits for answering trunk calls, or for signifying an overflow condition.

DESCRIPTION OF THE DRAWINGS

The invention, both as to its organization and method of operation, together with further objects and features thereof, will best be understood by reference to the specification taken in connection with the accompanying drawings, in which Figs. 1 and 1A illustrate the trunking plan and general arrangement of a telephone system embodying the invention; Figs. 2 to 34, inclusive, when assembled in the manner illustrated in Fig. 35, illustrate the details of a system arranged according to the trunking plan of Figs. 1 and 1A and having incorporated therein the features of the invention briefly referred to above.

Figure 1:
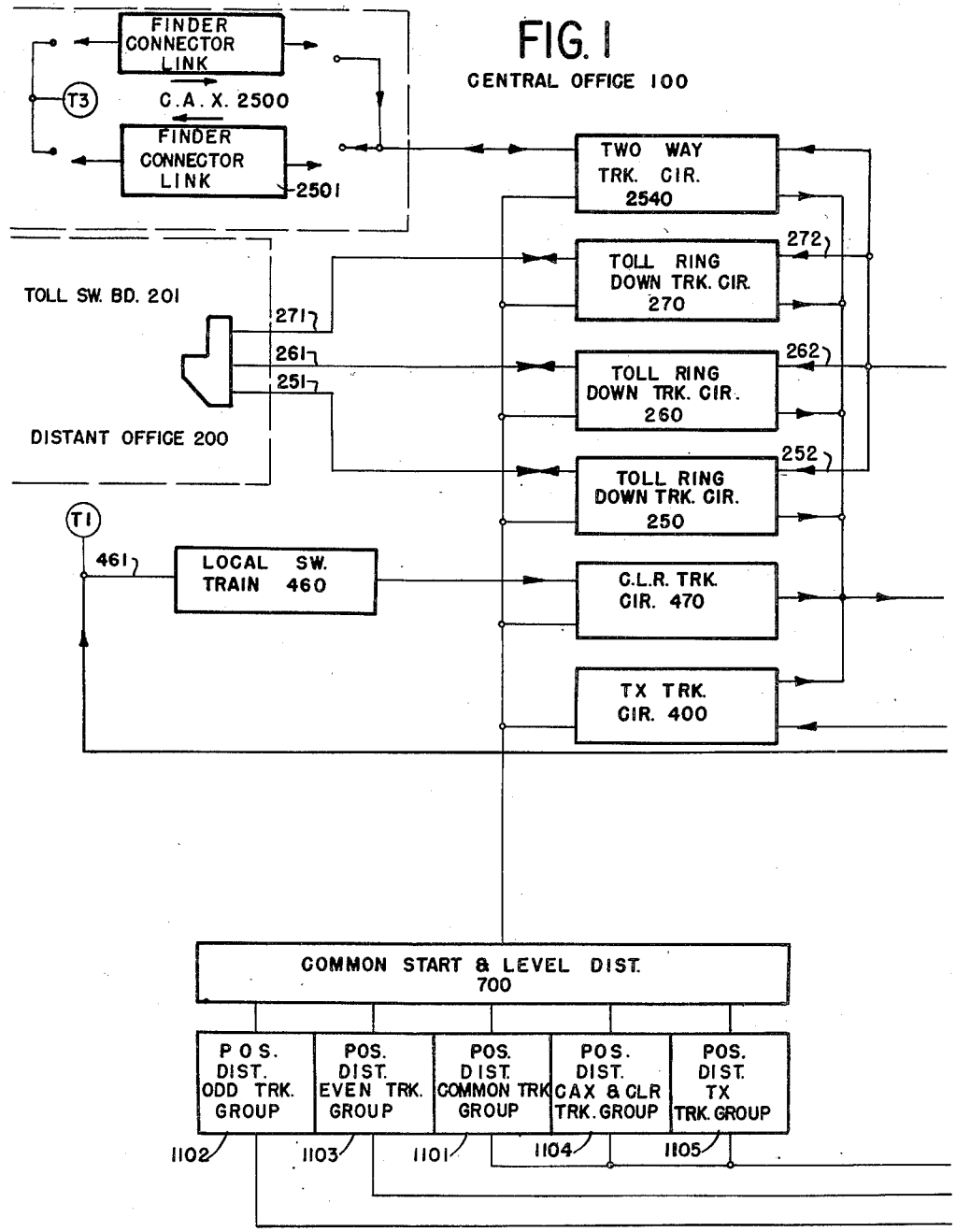

Referring now more particularly to Figs. 1 and 1A of the drawings, the telephone system illustrated therein comprises a central office 100, a distant office 200, and a CAX 2500 situated in the same area as a central office 100. The central office 100 serves a plurality of local subscriber substations, such as T1 and T2, and also serves the local subscriber substations located in the CAX 2500. The distant office 200 also serves a plurality of local subscriber substations and is trunk connected with the central office 100 by means of toll trunks which are utilized exclusively for handling two-way toll traffic between the two offices. Thus, the distant office 200 is shown connected to the central office 100 by means of trunk lines 251, 261 and 271, which trunk lines terminate in toll ring-down trunk circuits 250, 260 and 270, respectively, in the central office 100. It should also be understood that other distant offices may be terminated in central office 100 in a similar manner.

The automatic switching equipment provided in the central office 100 is of the well known Strowger type and includes a toll switch train 600 and a local switch train 460, both switch trains being of the character described in the above-mentioned Crocker patent, whereby toll calls may be extended to the local subscriber substations by the operators at the switchboard 1200, and toll calls originated at the local subscriber substations may be extended to the switchboard 1200 for completion. More particularly, toll calls received at the switchboard 1200 for local subscriber substations are extended by way of the call switch 2380, outgoing trunk circuit 500 and the toll switch train 600, and the toll calls originated at local subscriber substations are extended by way of the local switch train 460 to the CLR trunk circuits, such as 470, and answer switch 2180 to the switchboard 1200.

Toll calls destined to be extended to subscriber substations located in the CAX 2500 are extended from the switchboard 1200 to the finder connector links in the CAX 2500 by way of call switch 2380 and the two-way trunk circuits, such as 2540. The toll calls originated at the subscriber substations in the CAX 2500 are extended by way of the finder connector links and the two-way trunk circuits via answer switch 2180 to the switchboard 1200.

The toll switchboard 1200 employed in the central office is illustrated with ten positions, although any number of positions may be provided. It is contemplated that each position of the switchboard constitutes a universal position, and facilities are provided so that each position may be selectively controlled by means of keys individual to each position to handle either toll, CLR, or TX calls, or any combination of these services. If several odd numbered positions and several even numbered positions are selectively controlled to handle toll calls, the position distributor 1101 will distribute toll calls to both the odd and even numbered positions, selectively controlled to handle toll calls, in a predetermined order in accordance with the idle condition of the positions at the time the call is to be distributed. The position distributor 1102 is arranged to distribute toll calls to only the odd numbered positions, selectively controlled to handle toll calls, and the position distributor 1103 will distribute toll calls to only the even numbered positions, selectively controlled to handle toll calls. Other positions of the switchboard 1200 may be selectively controlled to handle CLR calls, and the position distributor 1104 will distribute both CAX and CLR calls to such positions. A similar arrangement is effective with regard to TX calls, in which case the position distributor 1105 will distribute TX calls to the positions of the switchboard selectively controlled to handle this class of service.

Each position of the switchboard 1200 is also provided with a plurality of link circuits, and each link comprises an answer switch, such as 2180, and a call switch, such as 2380.

The answer switches are provided to find and connect with calling trunk lines and, under certain conditions, may be directively operated to find and connect with idle delayed call selectors, such as 2510. The call switches are provided to connect with outgoing trunk circuits, such as 500, to extend toll calls to the local subscriber substations. Also, the call switches are utilized to extend connections to the CAX 2500 by way of two-way trunk circuits, such as 2540. Furthermore, the call switches are utilized to extend connections to the distant office 200 by way of toll ring-down trunk circuits, such as 250, 260 and 270. In addition, the call switches are also utilized to extend calls received at either the inward or CLR positions of the switchboard to the TX positions by way of TX trunk circuits, such as 400.

It should be noted that a straight multiple circuit is provided between the bank contacts of the delayed call selectors, such as 2510, and the call switches, such as 2380, so that a connection originated at an operator position and extended through an answer switch and a subsequent delayed call selector may be completed over the same trunk lines that are available to the call switches.

A common start and level distributor 700 is provided at the central office 100 to ascertain the class of service of calling trunk lines and to control the particular position distributor provided for distributing calls of that class of service to the positions of the switchboard 1200 that had been selectively controlled to handle the class of service of the calling trunk line. The common start and level distributor also marks the particular level in which the calling trunk line appears in the banks accessible to the answer switches, and all of the individual contacts in the banks of the answer switches terminating trunk lines included in the group of trunk lines comprising trunks of the same class of service as the calling trunk line.

For the purpose of enabling operators at the various positions of the switchboard to set up calls rapidly, each position is provided with a pair of sender control circuits, such as 2600 and 2800. The control circuits may be connected directly to the call switches, or may be switched by way of the operator's position equipment to the answer switches. Also, a common group of register senders, such as 3100, are provided for retransmitting impulses in accordance with digits registered therein. When a sender control circuit is seized for use, an idle one of the register senders is automatically associated with the seized sender control circuit by means of a sender finder, such as 2900. A keyset is also provided at each operator position so that numerical digits, required to extend a connection, may be registered in the register sender in the manner to be pointed out hereinafter. The keyset has been only schematically shown, it being noted that the keyset is of the exact form disclosed in Fig. 16 of the above-mentioned Crocker patent.

Figure 26:
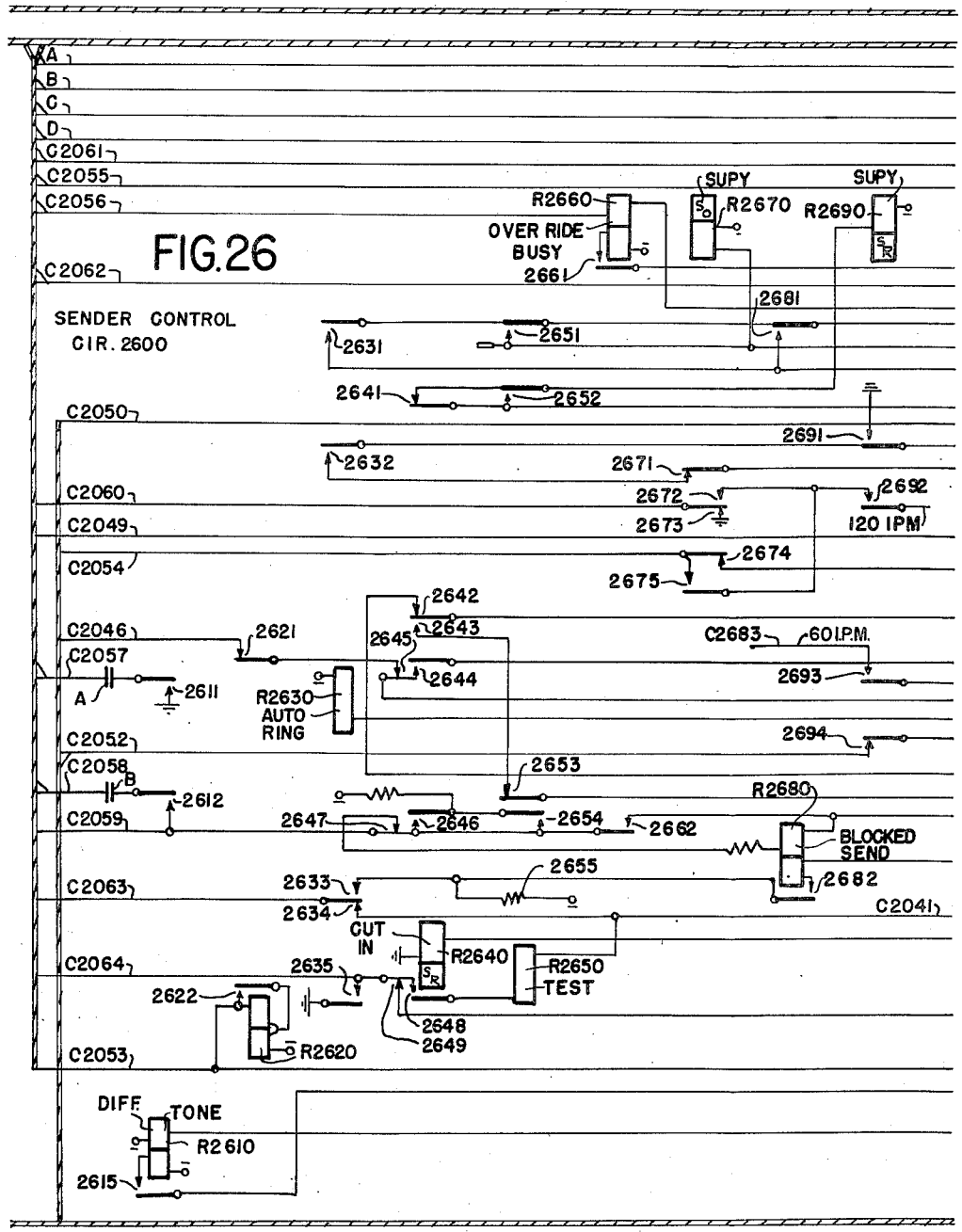
Figure 27:
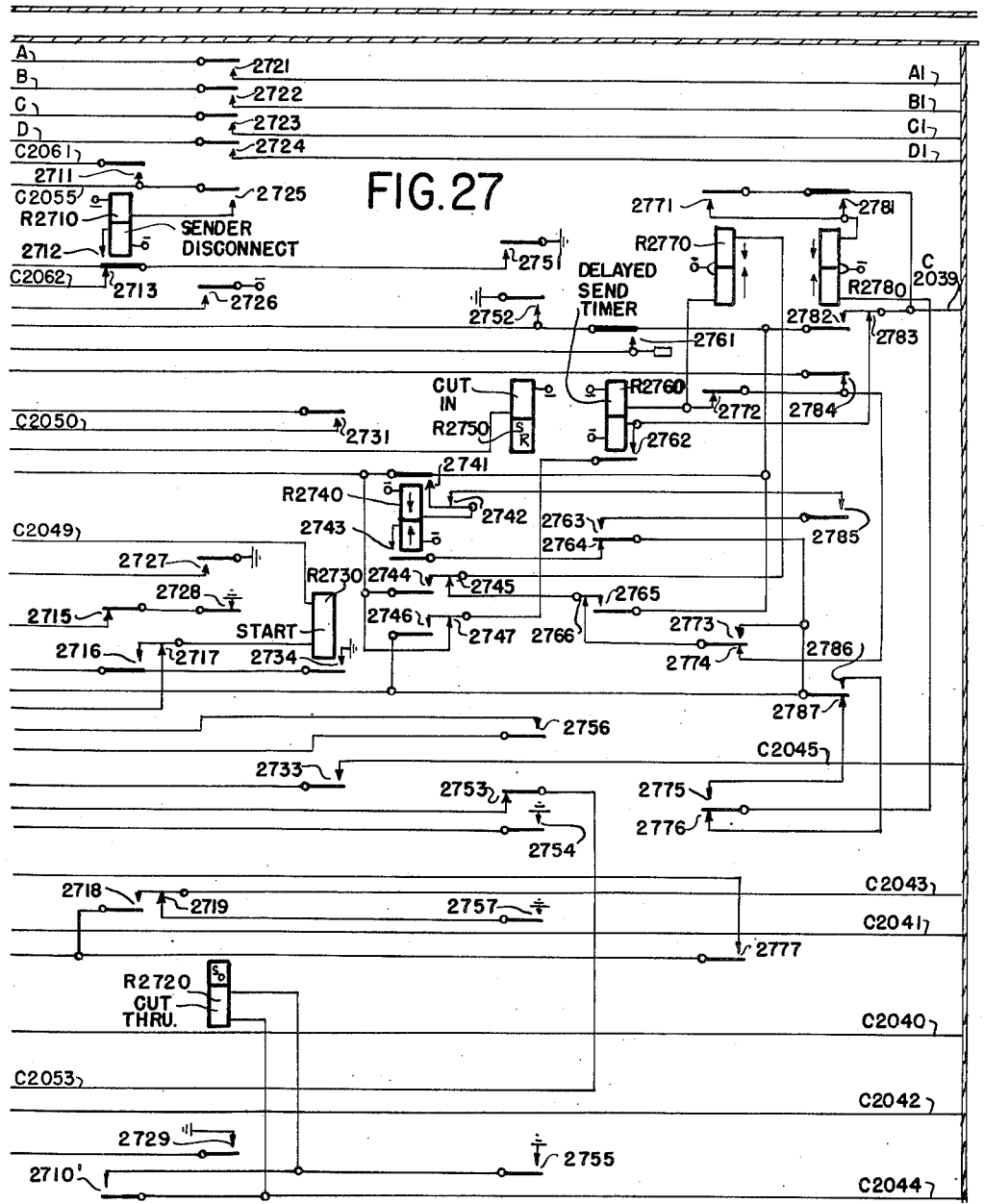
Figure 28:
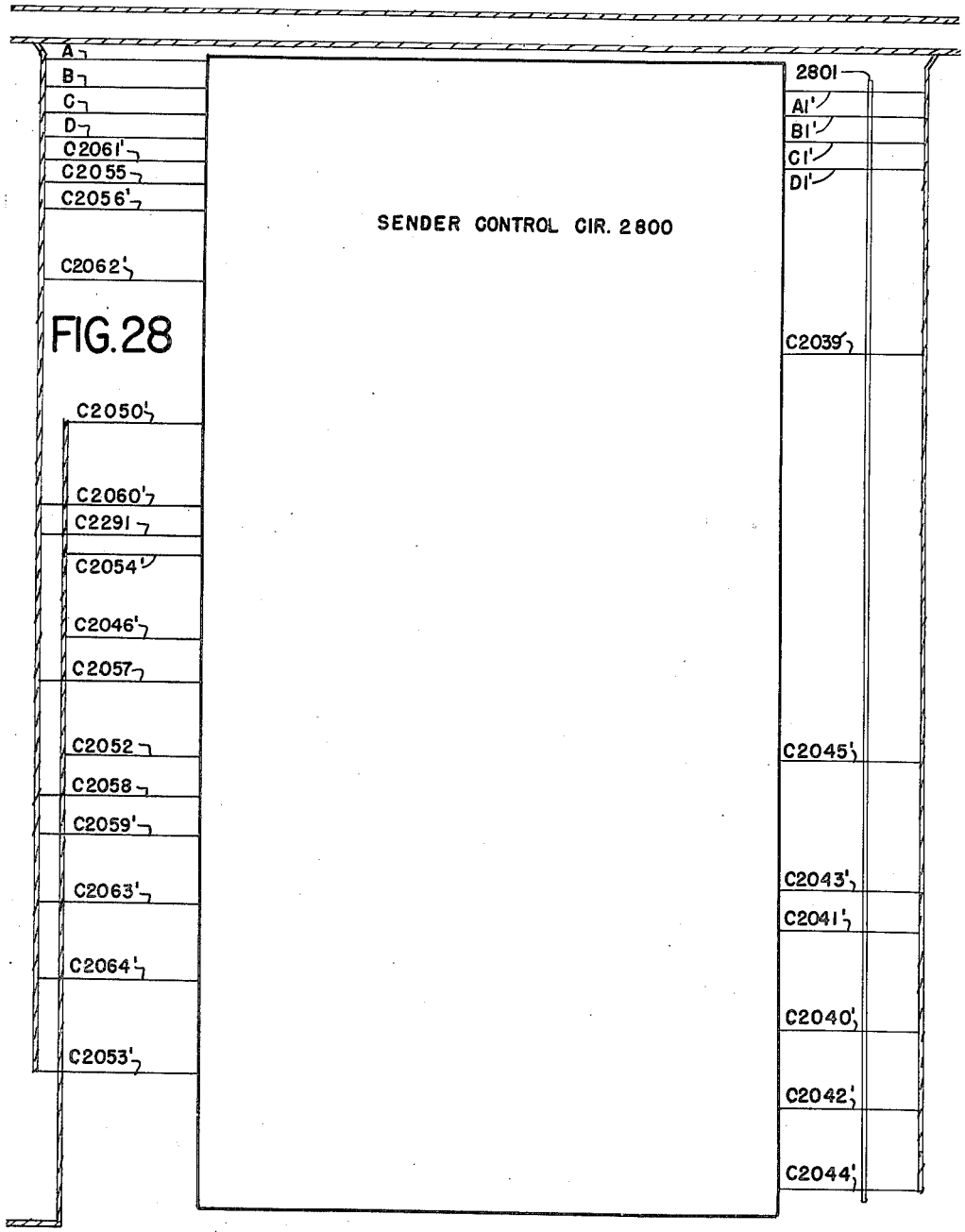
Figure 29:
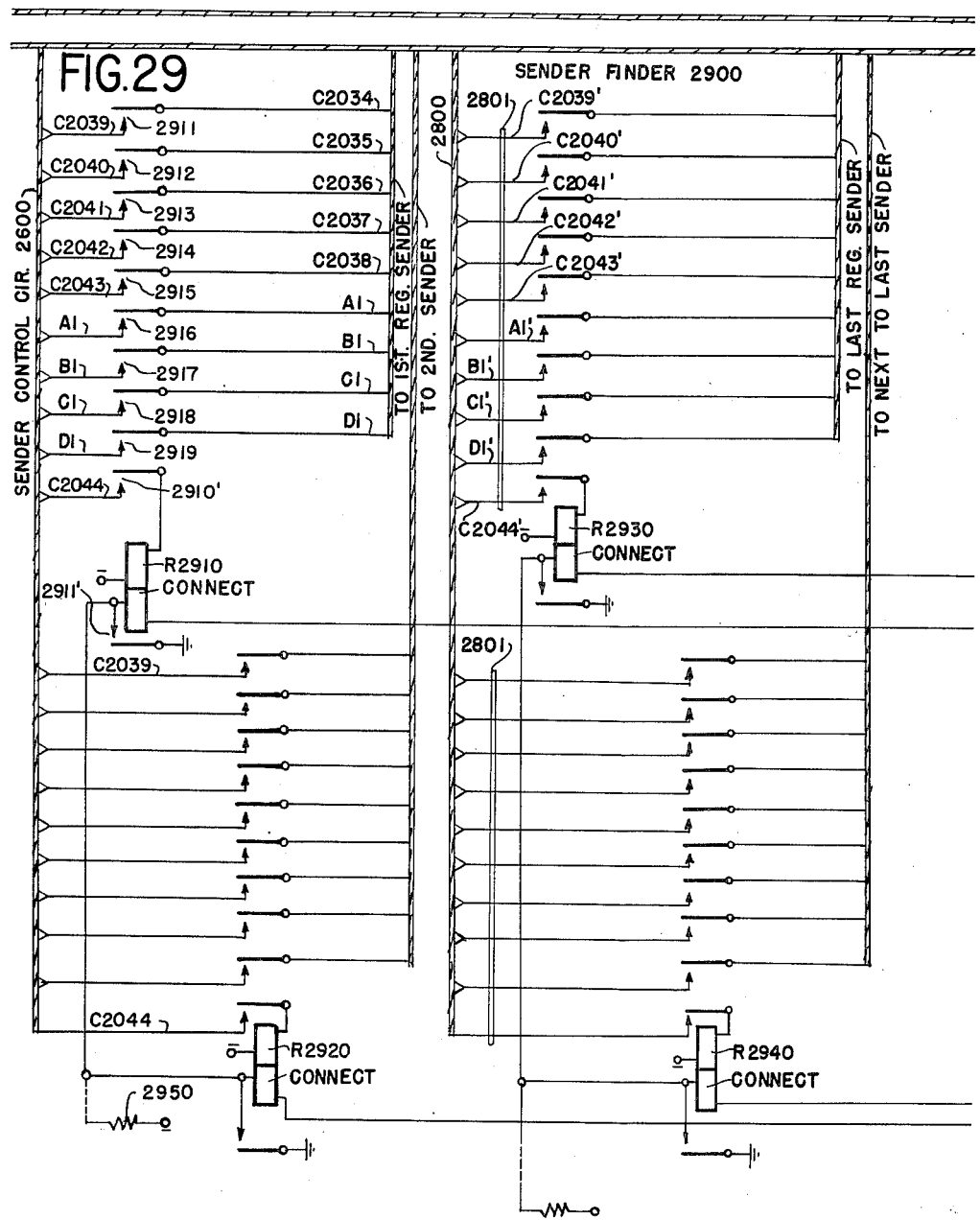
Figure 30:
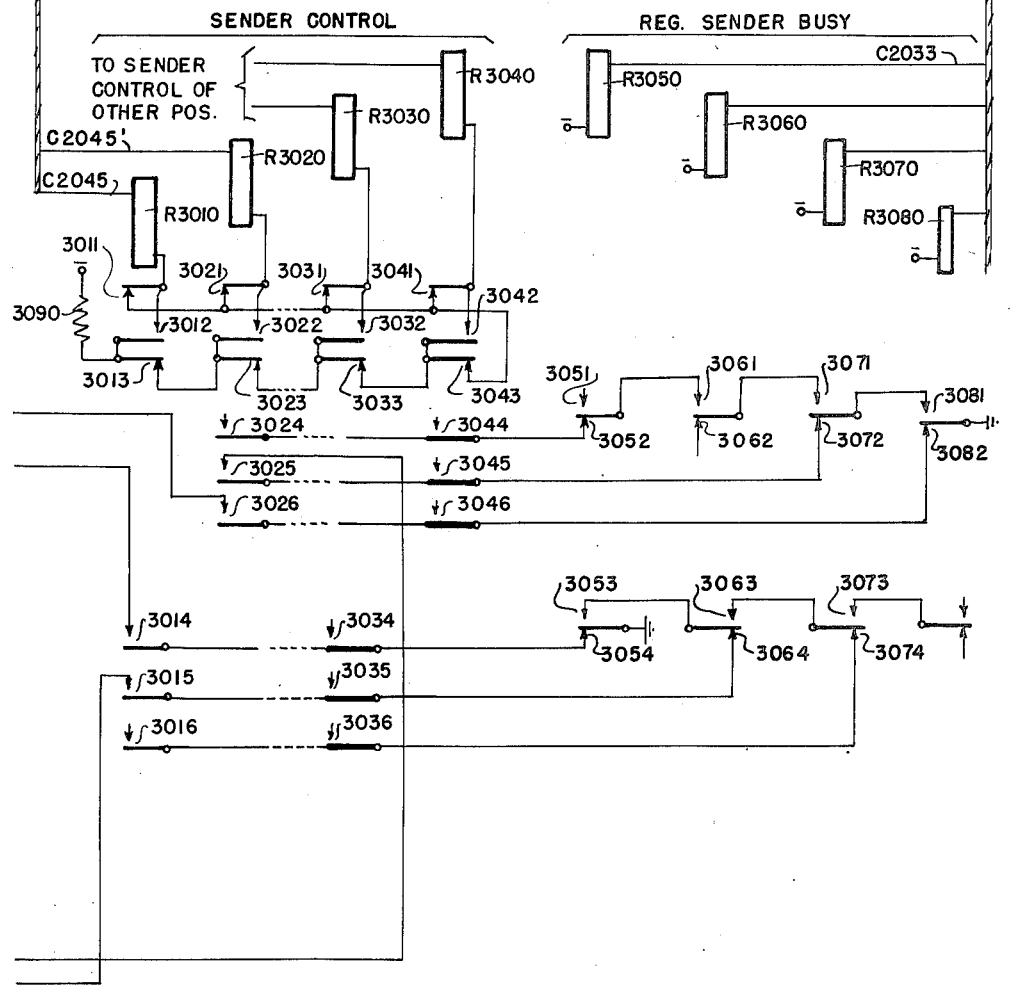
Figure 31:
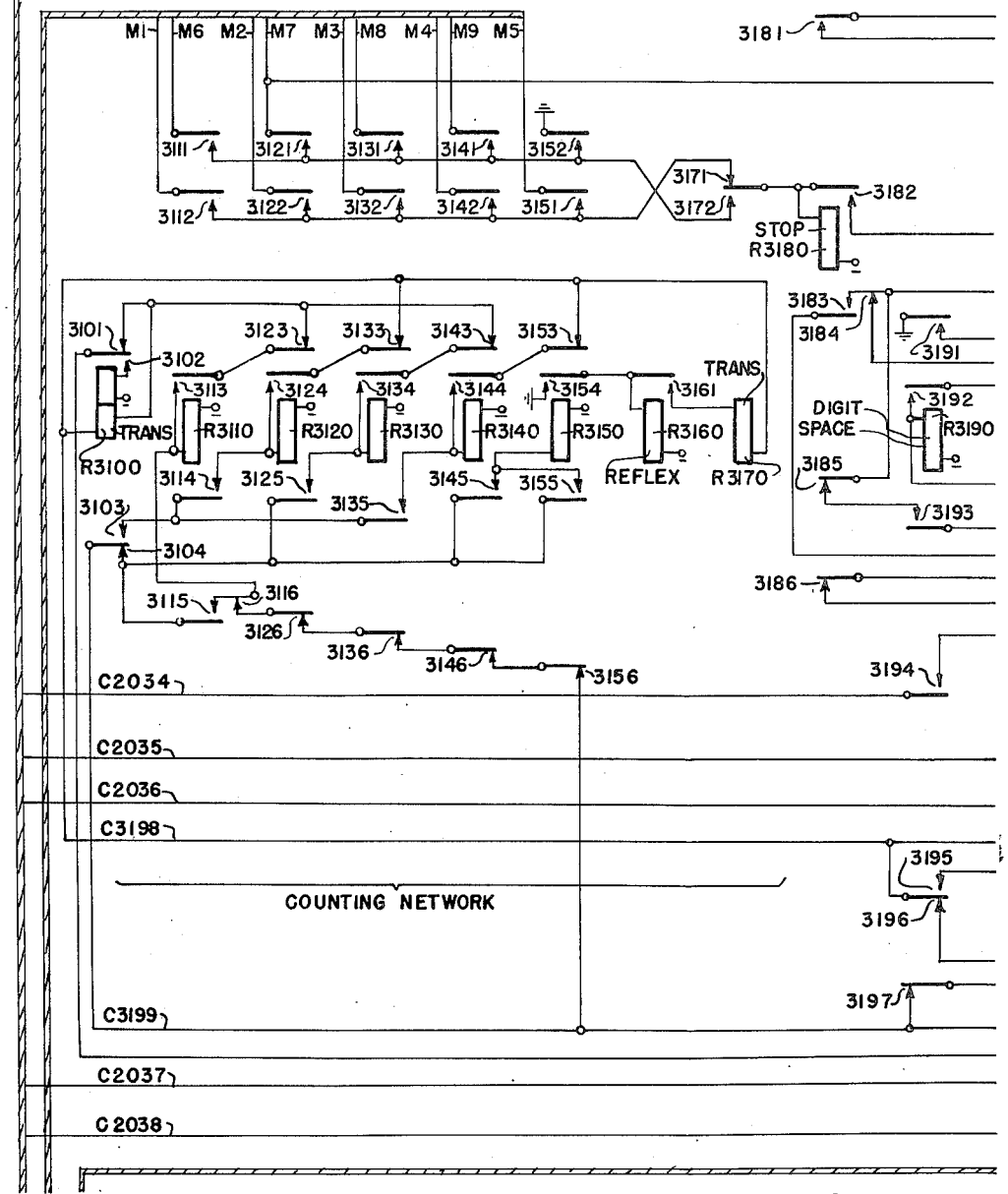
Figure 32:
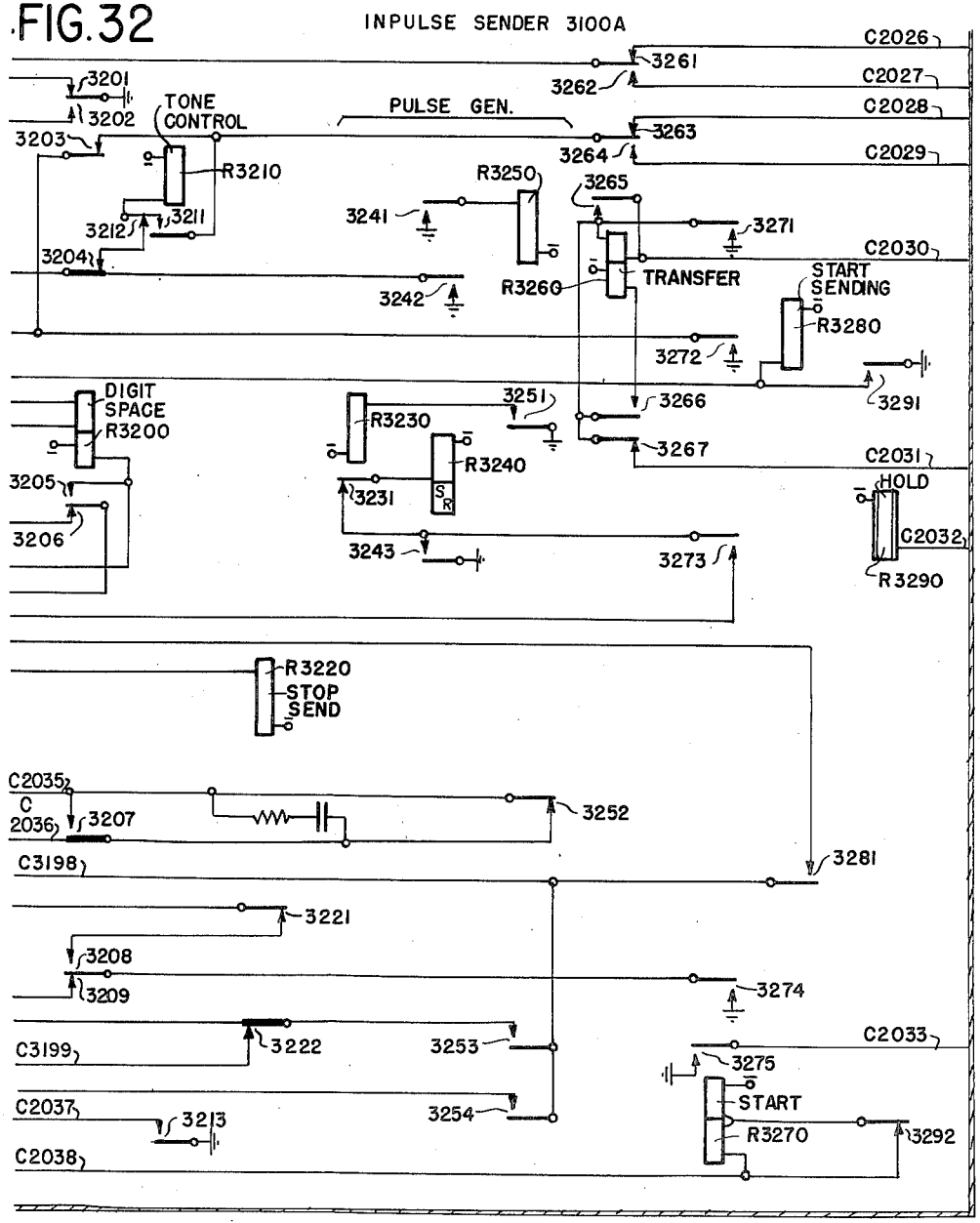
Figure 33:
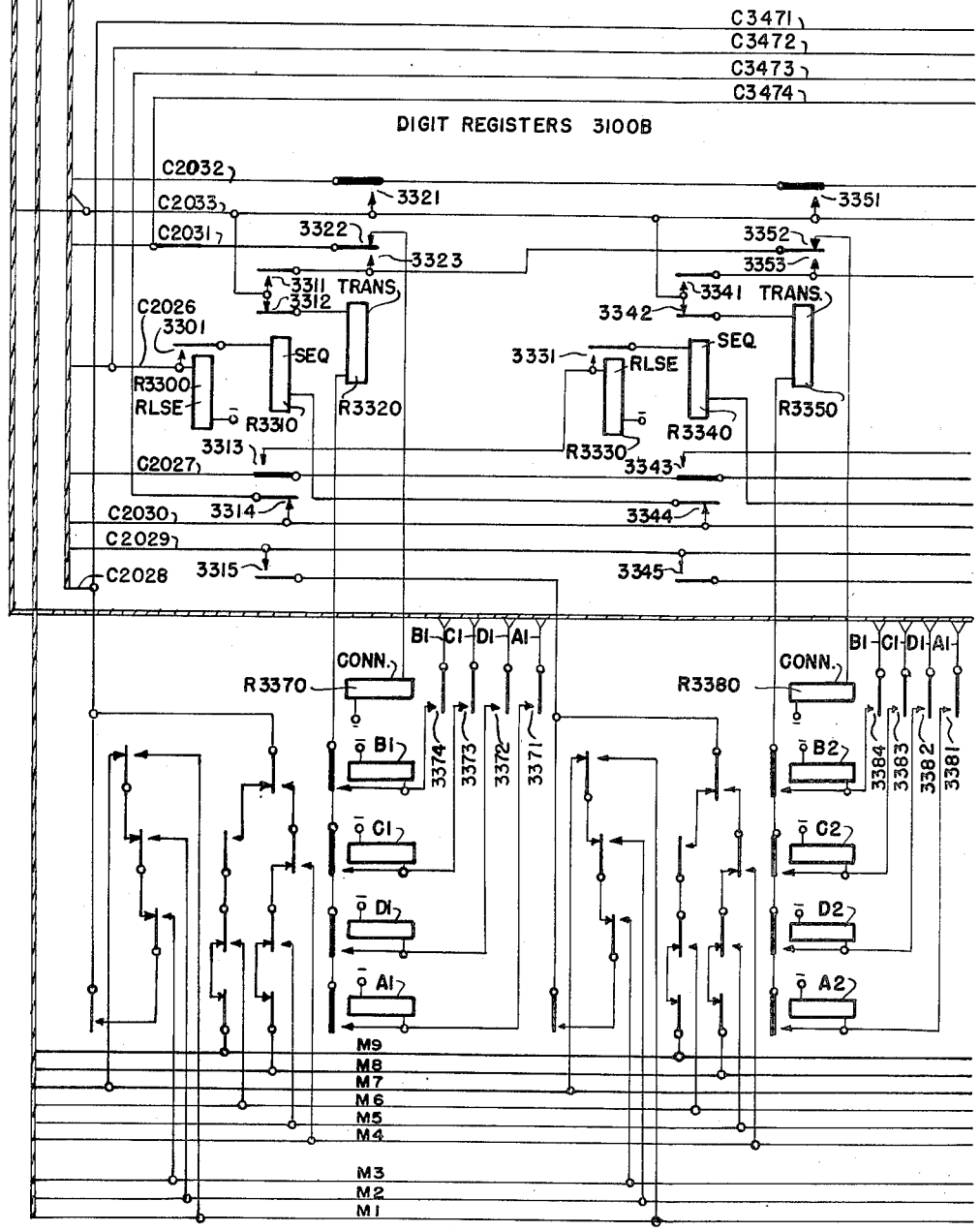

The trunking arrangement as disclosed in Figs. 1 and 1A having been described, further attention is directed to the circuit drawings shown in Figs. 2 to 34, inclusive:

Figs. 2 and 3 show the ring-down toll line circuit 250 interposed between the distant office 200 and the bank terminals of the answer switch 2180 and multiples thereof. This trunk circuit also serves as a terminus for the trunk 252 from the bank contacts of the call switch 2380 and the delayed call selector 2510 and multiples thereof in the banks of other such switches. The common start conductor C2536 extends to the common start and level distributor (Figs. 7 to 10, inclusive) in order to control the common start and level distributor to mark the level in which the answer switches may find the calling toll line circuit and also to mark the various contacts in the banks of the answer switches terminating ring-down toll line circuits of the same class as ring-down toll line circuit 250. All incoming calls over the ring-down toll line circuit 250 are answered by inward toll operators. Ring-down toll line circuits 260 and 270 are exactly the same as the ring-down toll line circuit 250 and have, therefore, only been represented schematically;

Fig. 4 shows the TX trunk circuit 400 interposed between the banks of the call switches and the banks of the answer switches and multiples thereof in the banks of other answer switches. The TX trunk circuit 400 is provided to enable an inward toll operator or a CLR operator to transfer a call, which has been received but for some reason or other cannot be immediately completed, to a TX operator position. There is also schematically shown a local switch train 460 and a CLR trunk 470, both of which are similar to the corresponding circuits disclosed in the above-mentioned Crocker patent;

Figs. 5 and 6 show the outgoing trunk circuit 500 interposed between the banks of the call switches and the toll switch train 600 and is utilized for the purpose of extending calls by way of the toll switch train 600 to local subscribers in the central office 100;

Figs. 7 to 10, inclusive, show the common start and level distributor 700, which is provided with class of service relays for the purpose of marking the bank contacts of the answer switches according to the class of service of a calling trunk line. Each class of service or group start relay may be controlled by all trunk lines of a particular class terminating in the same level in the banks of the answer switches. Group lock-out relays, which are under control of the group start relays, are provided to lock out additional calls which may be received for the same and certain other classes of service when one call is locked in. However, in this connection it is to be noted that although one of the group start relays of a particular class is operated to signify the level in which the calling trunk appears in the banks of the answer switches, additional calls from trunk lines of the same class appearing in the same level will not be locked out;

Figs. 11 and 11A show five position distributor circuits, one for each class of service. Position distributor 1101 is arranged to distribute toll calls from a common group of trunks to the various positions of the switchboard selectively controlled to handle toll calls from that group. Position distributor 1102 is arranged to distribute toll calls to the odd numbered positions in the switchboard selectively controlled to handle toll calls in the odd group. Position distributor 1103 is arranged to distribute toll calls to the even positions of the switchboard selectively controlled to handle toll calls in the even group. Position distributor 1104 is arranged to distribute calls to the positions of the switchboard selectively controlled to handle CLR calls. Position distributor 1105 is arranged to distribute calls to the positions of the switchboard selectively controlled to handle TX calls;

Figs. 12 to 20, inclusive, taken together, show the operator's position equipment including the relays and apparatus, common to all the link circuits at an operator's position, and which link circuits are operatively connected to said position equipment by the operation of talk keys individual to the link circuits;

Figs. 21A and 21 to 25, inclusive, taken together, show one of the link circuits comprising the answer switch 2180 and the call switch 2380 associated with an operator position. The answer switch 2180 is of the vertical and rotary Strowger type, having wipers which are moved first in a vertical direction and then in a rotary direction to find the bank contacts terminating a calling trunk line. The call switch 2380 is also of the vertical and rotary Strowger type, having wipers which are moved first in a vertical direction and then in a rotary direction to extend calls over desired trunk lines. Each link circuit is provided with a talk key, such as K2225, which may be actuated by an operator to connect her position equipment with a link circuit when she is ready to handle calls. A monitoring key, such as K2220, is provided for each link circuit to enable the operator to monitor a connection without disturbing the conversation between two connected subscribers. Furthermore, each link circuit is provided with a release key, such as K2201, which may be actuated by the operator to release both the answer switch and the call switch of a link involved in a connection;

Figs. 26 and 27 show a sender control circuit, such as 2600, which may be automatically associated with the call switch of a selected link or, in the case of a dial rear connection, with the answer switch of a selected link through the operator's position equipment. Seizure of a sender control circuit causes the sender finder 2900 to connect an idle register sender to the sender control circuit so that the operator may control the extension of a connection by way of either the call switch or the answer switch of a selected link;

Fig. 28 shows a schematic representation of the sender control circuit 2800, and it is to be understood that the detail circuits thereof are exactly the same as the sender control circuit shown in Figs. 26 and 27;

Figs. 29 and 30 show the sender finder 2900, provided to connect a seized sender control circuit to an idle register sender;

Figs. 31 and 32 show the register sender 3100 and include the impulse counting network, the spaced digit relays, and the impulse generating relays for controlling retransmission of impulses indicative of the digits registered in the various registers;

Figure 34:
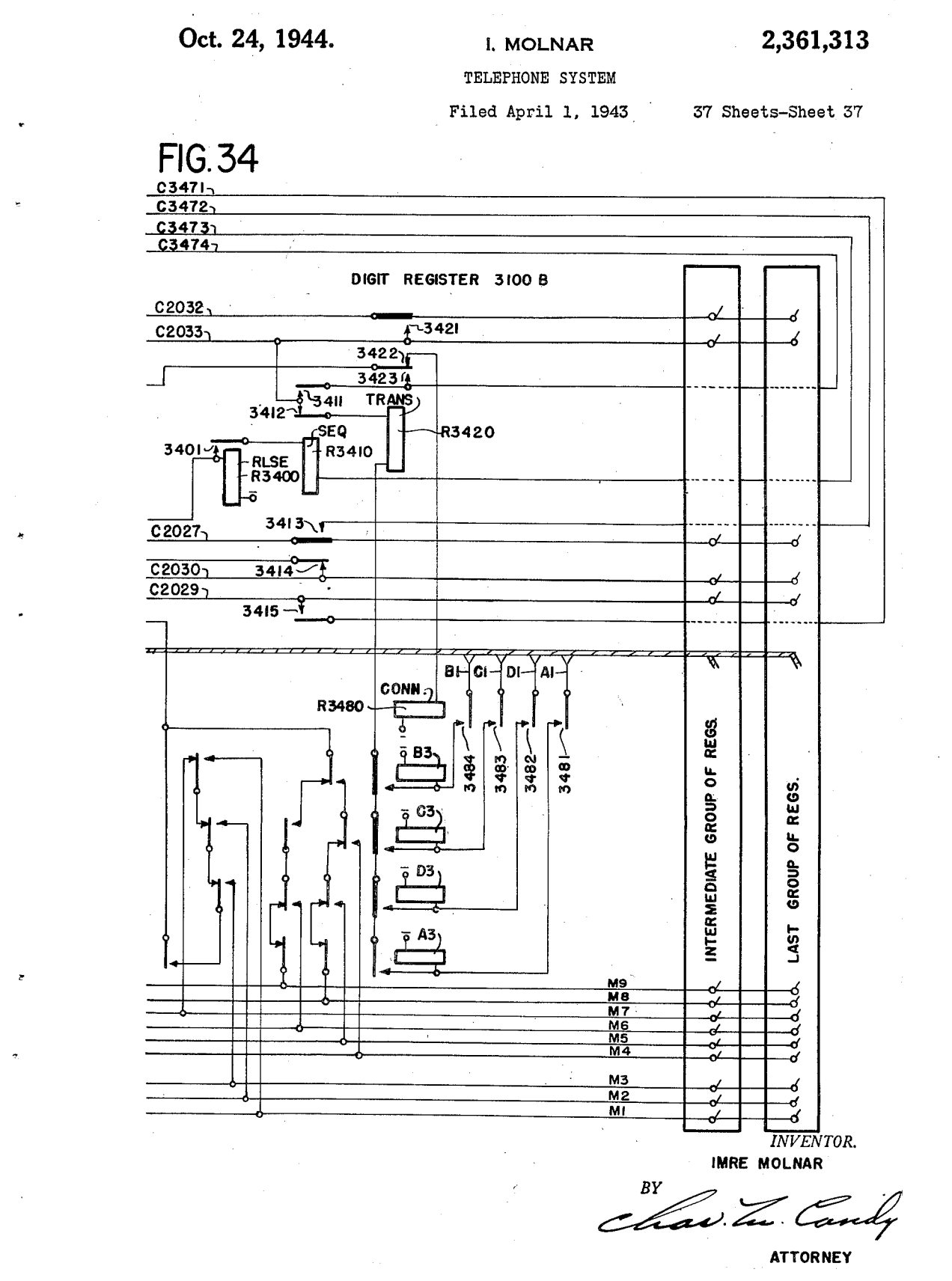

Figs. 33 and 34 show the register controlling relays, together with three sets of registers, for registering three digits transmitted in accordance with the actuation of the operator's keyset. Since the remaining groups of registers are identical to those shown in Figs. 33 and 34, they have been schematically represented by the rectangles;

Fig. 35, drawn on the same sheet with Fig. 1A, is a layout drawing showing how the various sheets of drawings should be arranged to be best understood.

The disclosure having been described generally, a detailed description of the operation of the system will now be given.

PREPARING AN OPERATOR'S POSITION TO RECEIVE CALLS

As has been previously mentioned, each operator's position is arranged to be able to handle several classes of service, such as CLR calls, TX or delayed calls, and toll calls. By referring to Fig. 20 in the drawings it will be noted that key K2020 is provided for CLR calls, and when this key is in normal position, as shown in the drawings, the position will be arranged to accept CLR calls. However, if the key is in an operated position, the position is arranged to reject CLR calls. The TX key K2030, in its normal position conditions the operator's position to receive TX calls, but, in its operated position conditions the position to reject TX calls. The toll key K2040, in its normal position conditions the operator's position to receive toll calls, and in its operated position conditions the board to reject toll calls.

Assuming now that it is desired to condition the operator position 1300 to answer toll calls, the CLR key K2020 and the TX key K2030 are both operated, thereby preventing these two classes of service from being received by the operator at position 1300; but, because the toll key K2040 is in its normal position, the operator position 1300 is conditioned to receive toll calls.

The operator at position 1300 now inserts the head-set plug 1303 into the position circuit jack 1304. In response to this operation, the receiver 1302 is bridged across the lower right hand winding 1307 of the repeating coil 1305, and the transmitter 1301 is bridged across the upper winding 1306 of the repeating coil 1305 in series with the exchange battery and the winding of the battery feed relay R1420. Relay R1420 energizes and at contact 1423 completes an energizing circuit for the all-links busy relay R1440. The energizing circuit for this relay may be traced from ground by way of contacts 2146, 2155, 2234, 2244', conductor C2063, contact 1423, winding of relay R1440, to battery.

Since this operator is not engaged in putting through or attending a call, she is instructed to operate a talk key of an idle operator link in readiness for the arrival of a call. Assuming that the operator at position 1300 now operates her talk key K2225 of operator link 2100. The operation of the talk key K2225 completes an energizing circuit for position busy relay R1640 and relay R1220. The circuit for energizing the position busy relay R1640 may be traced as follows: ground at contact 1 of key K2225, conductor C2064, contacts 1417, 1445, 1854, 1634, 1621, one branch of the circuit now including the winding of relay R1640, to battery, and the other branch of the circuit including conductor C2515, the winding of relay R1220, to battery.

Also, at contact 3 of the operated talk key K2225, a circuit is completed for energizing the upper winding of the connect relay R2210, as follows: ground, contacts 1421, 1465, 1525, conductor C2521, contact 3 of the operated talk key K2225, contacts 2139', 2249, upper winding of the connect relay R2210, to battery. Relay R2210 energizes over this circuit, and at contact 2213' completes a locking circuit for holding the relay energized when the energizing circuit for the upper winding is open. This circuit may be traced as follows: ground, winding of the talk relay R1460, contacts 1522', 1642, conductor C2071', contact 2213', lower winding of the connect relay R2210, to battery. Talk relay R1460 energizes in series with the lower winding of the connect relay R2210, and, at contact 1465, opens the initial energizing circuit for the upper winding of the connect relay R2210. Furthermore, responsive to the completion of the locking circuit for the lower winding of the connect relay R2210 in series with the talk relay R1460 and ground, ground potential is applied by way of contact 4 of the talk key K2225, conductor C2571, contact 1669, winding of relay R1710, to battery. Relay R1710 energizes over this circuit in series with the talk relay R1460 and in multiple with the lower winding of the connect relay R2210, to prepare the operator position circuit relays for subsequent operation, as will be described hereinafter.

Responsive to the energization of the talk relay R1460, contacts 1461 and 1463 thereof open the monitoring circuit including the repeat coil 1308, and, at contacts 1462 and 1464, connects the operator's transmitter and receiver to the talking conductors of the answering switch over a circuit which will be traced hereinafter. At contact 1466, relay R1460 disconnects the monitoring relay R1410 from the associated answer switch 2180, and, at contact 1467, opens a loop circuit including conductors 111 and 112 extending to the chief operator's position 2530 to extinguish the lamp at the chief operator's position to indicate to her that the operator at position 1300 has operated a talk key and is in readiness to receive calls.

At contact 1643 position busy relay R1640 completes a multiple ground circuit for holding the position busy relay R1640 and relay R1220 energized independent of contact 1445 on the all-links busy relay R1440. Consequently, these relays will remain energized, although their initial energizing circuit may be subsequently opened by the restoration of the all-links busy relay R1440. At contact 1647, ground is removed from conductor C2065 to render operator position 1300 idle as far as the position distributor circuit is concerned. At contact 1646, ground is extended to the position distributor circuit over the following circuit: conductor C2051, one branch including contacts 1213, 1228, and conductor C2549, while the other branch includes contacts 1214 and 1229, and conductor C2021. These conductors extend to the position distributors of Fig. 11 and condition the distributors to allot calls of the class of service determined by the non-operated condition of the toll key K2040 to the operator position 1300. The operator position 1300 is now conditioned to receive toll calls allotted thereto by way of the operator position distributors.

DISTRIBUTING LINKS TO THE FIRST OPERATOR POSITION

As indicated above, the position busy relay R1640 causes the position distributor 1101 to distribute the next toll call received to the link circuit which was selected by the operation of the talk key K2225. Consequently, the operator at position 1300 will be required to handle this call when it is routed to her position. Referring now to Fig. 11, the operation of the position distributor 1101 will now be described. It will be remembered that at the time the position busy relay R1640 was energized, a circuit was completed from ground, contact 1646, conductor C2051, contacts 1214, 1229, conductor C2021, contact 1121, lower winding of relay R1130, to battery. Relay R1130 energizes, and at contact 1132 completes a locking circuit for its upper winding from the grounded conductor C2021, winding of the all-position busy relay R1120, contacts 1141, 1132, the upper winding of relay R1130, to battery. At contacts 1133, relay R1130 prepares a circuit for the relay R1140; at contact 1134, it opens a point in the circuit for the lower winding of relay R1150; and at contact 1135, it prepares a start circuit for the toll marking relay R1230 at operator position 1300.

In order to describe the cyclic operation of the position distributor 1101, it will be assumed that a call has been received and has been answered by the operator at operator position 1300. As a result thereof, ground potential is applied to conductor C2067 and completes an energizing circuit for the lower winding of the second position relay R1140 to prepare the second operator position to receive the next call. Relay R1140, in energizing over its circuit including its lower winding, completes a locking circuit including its upper winding in series with the all-position busy relay R1120 and the grounded conductor C2021. It will be noted that at contact 1141, the locking circuit for the first position relay R1130 is opened, causing that relay to restore to normal. At contact 1145, relay R1140 prepares the start circuit for the link circuit selected by the operator at the second operator position by energizing a relay at her position similar to toll marking relay R1230 of the operator position 1300. After the second operator position has received a call, ground potential is applied by way of contacts 1144, 1134, lower winding of the third position relay R1150. Relay R1150 energizes and prepares the start circuit for the third position in the same manner as has been previously described in connection with relays R1130 and R1140. It will be understood from the foregoing that each operator position is consecutively distributed a call in the order in which the position relays R1130, R1140, R1150, and R1160 are operated. In the event that all of the positions to which the position distributor 1101 distributes calls are busy, the position busy relay R1120 and conductor C2021 is not grounded due to the fact that at each busy operator position the relay corresponding to relay R1220 of operator position 1300 will not be energized, thereby preventing ground potential from being applied to conductor C2021. If this is the case, all of the position relays R1130—R1160 will be deenergized and no circuits will be completed for extending calls to their corresponding operator positions, inasmuch as contacts 1135, 1145, 1155, and 1165 are open.

The operation of the position distributors 1102, 1103, 1104, and 1105 is exactly the same as has been described above in connection with the operation of position distributor 1101. It should be noted, however, that each of these distributors is provided to handle a separate class of call; that is, position distributor 1101 is designed and arranged to distribute calls to the operator position which are designated as common toll calls; position distributor 1102 distributes calls designated as odd toll calls; position distributor 1103 distributes calls designated as even toll calls; position distributor 1104 distributes calls designated as CLR calls; and distributor 1105 distributes calls designated as TX calls.

CALL FROM DISTANT OFFICE 200 TO LOCAL SUBSCRIBER T2 IN CENTRAL OFFICE 100

The operations involved in completing a call received at the distant office 200 to a desired subscriber's line in the central office will now be explained. For this purpose it will be assumed that a subscriber in the distant office 200 is attempting to establish a connection with the subscriber at substation T2. The operator at the toll switchboard 201 in the distant office receives the information from the calling subscriber that the connection is desired. It will be assumed that the toll operator at toll switch-board 201 establishes a connection with toll line 251, which toll line terminates in the ring-down toll line circuit 250, shown in Figs. 2 and 3.

When the toll line 251 is seized at the distant exchange, and ringing current is projected thereover, the shaded pole, alternating current, ring-down relay R245 is actuated and thereby opens the energizing circuit for the slow-to-release signal relay R240. Relay R240 restores and closes an energizing circuit for the lower winding of start relay R350, from ground at contact 242, contact 301, contact 321, rectifier 331, lower winding of relay R350, to battery. Start relay R350 completes a locking circuit for its lower winding from ground at contact 361. This locking circuit for the start relay R350 is provided so that the relay will remain operated after the ringing has ceased and the normally operated signal relay R240 has been permitted to operate again. As a further result of the operation of start relay R350, at contact 353 it places a ground potential on the C conductor C373 of cable 252 to busy the toll line in the banks of the selector having access to it. That is, the C conductor C373 of cable 252 is marked busy to prevent the call switch 2380 of Fig. 24 from seizing the ring-down toll line circuit 250. At contact 354, relay R350 removes the idle indicating battery potential from the winding of the seizure relay R360 from the C conductor C373 of cable 252, referred to above.

At contact 355, start relay R350 connects battery potential by way of the winding of the seizure relay R360 to the C conductor C257, extending to the banks of the answer switch 2180 to mark the toll line circuit 250 as a calling line, and, at contact 356, applies ground potential to the start conductor C2536 to the common start and level distributor switch 700. At contact 357, start relay R350 applies ground potential by way of contact 367 and conductor C2019 to the call-waiting lamp L2064, to battery. The lamp is illuminated over this circuit and indicates to the operator that a call is about to be received, and also indicates to her the class of service of the call.

It will be noted that after the ringing current has been disconnected from the toll line 251, relay R245 restores and again completes the energizing circuit for relay R240. Furthermore, it will be noted that at contact 241, ring relay R230 is connected in the circuit including the rectifier 331 and the ground at contact 361. The rectifier 331 prevents the ring relay R230 from operating at this time.

OPERATION OF THE COMMON START AND LEVEL DISTRIBUTOR 700

In considering the operation of the common start and level distributor 700, it will be understood that calls of different classes may be routed to the operator switch-board 1200 over a number of different routes. Furthermore, it will be understood that the different operator positions of the switch-board 1200 may be conditioned to answer only certain classes of calls; for example, position one may be conditioned to answer toll calls, and position two may be conditioned to answer CLR calls, and position three may be conditioned to answer only TX calls. Provisions are also made for combining the various classes of calls at the different operator positions, depending upon the non-operated condition of the particular class of service key at the associated position.

The common start and level distributor switch 700 is arranged to clear out the calls awaiting to be answered at the switch-board 1200 in the particular order determined by the level termination of the trunk circuits in the banks of the various answer switches. This circuit is also arranged so that CLR and inward toll calls may be simultaneously answered at adjacent operator positions in the switch-board. For example, the operator at position one has conditioned her switch-board to answer only inward toll calls, and the operator at position two has conditioned her position to answer only CLR trunk calls.

Continuing again with the description of the extension of the call received on the ring-down toll line circuit 250. It will be remembered that conductor C2536 was grounded responsive to the operation of start relay R350. This ground potential is extended by way of contact 707, winding of group start relay R760, to battery. Group start relay R760 energizes over this circuit, and at contact 761 locks itself to the ground conductor C2536. At contact 763 it completes an energizing circuit for the group lockout relay R700. And at contact 762, it applies a ground potential to terminal 18. Group lockout relay R700, upon operating, at contact 707 opens the initial energizing circuit for relay R760, and, at contacts 702-706 inclusive, opens the initial starting circuit for the group start relays R730, R740, and other similar group start relays, to prevent such relays from energizing over their associated start conductors at a time when a call has already been received, as is indicated by the operation of the group lock out relay R700. It may be well to mention at this time that relays R730, R740, and R760 are start relays which are controlled over start conductors of toll line circuits similar to toll line circuit 250. In other words, it is possible to group the toll line circuits into odd, even, and common groups; and, in the event that the operator at position one should condition her switch-board to answer toll calls, it can be arranged that the toll lines included in the odd group and the toll lines included in the common group may be answered at her position, whereas, if the operator at position two has conditioned her switch-board to answer toll calls, the calls received in the even group and the common group may be answered at her position.

As a result of the ground potential being applied to terminal 18, the common class of service relay R820 is energized.

The function of the class of service relays R820, R830, R840, R850, and R860 is of no particular importance when the operator switch-boards are conditioned for day-time service, except to give an indication to the operator of the type of call that has been received and is to be extended to her position. The circuit for giving this indication is as follows: ground, contact 825, conductor C2019, call-waiting lamp 2064, to battery. Attention is called to the fact that this lamp is now illuminated from two separate distinct sources: (1) from ground at the start relay R350 of the seized toll line circuit, and (2) from ground at the class of service relay R820 of the common start and level distributor circuit. This arrangement has been provided so that, in the event the common start and level distributor 700 fails to initiate the operation of the answer switch to bring the call into the operator's position, she has an independent signal at her position to indicate that a call is waiting, and can take proper steps to cause her answer switch to be operated and connect with the seized toll line circuit 250.

In addition to the operation of the class of service relay R820 at the time terminal 18 was grounded, a circuit is also completed by way of contact 812, conductor C2562, contact 1113, contact 1135, of the previously operated position relay R1130, to conductor C2023 of the position indicated by the operated condition of relay R1130.

Referring now to Fig. 12, it will be noted that the grounded conductor C2023 is extended by way of contacts 1211 and 1223 of the operated relay R1220, to the upper winding of the toll marking relay R1230.

Relays R1230, R1240, and R1250 are designed to mark both the level and the group of contacts in the levels in which the particular class of service appears. More specifically, if the incoming call to be answered is a toll call, relay R1230 operates and marks the level and the group of contacts in the levels in which the finder must search to find the particular calling trunk of the class of trunks designated toll. If relay R1240 is operated, it marks the level and the group of contacts in the levels in which the finder will search to find a calling trunk of the CLR class of trunks. And, similarly, the TX marking relay R1250 performs the like function to mark the level and the group of contacts in the level in which the finder will search to find a calling trunk of the TX class.

Referring again to the operation of marking relay R1230 responsive to the grounded condition of conductor C2023, at contact 1231, ground potential is applied to conductor C2535 to mark the group of contacts in the levels of the bank accessible to the answer switch 2180, and in which bank the trunk conductors of the toll line circuit 250 are terminated. At contact 1232, relay R1230 completes a circuit which may be traced as follows: grounded conductor C2536 (Fig. 7), contact 761 of the energized common start and level distributor relay R760, conductor C2537, contact 1232 of the energized marking relay R1230, level marking conductor C2538, to the fourth level marking contacts associated with the vertical bank of the answer switch 2180. It may be well to mention at this time that the placing of the ground potential on the level marking conductor C2538 in the vertical bank of the answer switch 2180 will be utilized hereinafter to determine the level in which the answer switch will search to look for and seize the calling toll line circuit 250. Furthermore, marking relay R1230, at contact 1234, completes an energizing circuit for the start relay R1510 in the operator position 1300, from ground, contact 1234, position start conductor C2077, contact 1645 of the energized position busy relay R1640, lower winding of start relay R1510, to battery.

When start relay R1510 energized, it completed an energizing circuit at contact 1513 for the lower winding of relay R1450 from ground at contact 1712, contact 1513, lower winding of relay R1450, to battery. At contact 1455, relay R1450 completes a locking circuit for its lower winding from ground at contact 1712 independent of the contact 1513; and, at contact 1453, it connects the winding of the talk relay R1460 to the conductor C2077' by way of contacts 1522' and 1453, so that subsequent deenergization of the position busy relay R1640 and the consequent opening of the circuit at contact 1642 will not disconnect the talk relay R1460 from conductor C2077'. At contact 1512, start relay R1510 completes a circuit for the lower winding of the tone relay R1530, in series with the upper winding of start relay R2160, as follows: ground, contact 1512, lower winding of tone relay R1530, contacts 1632, 1851, conductor C2078, contacts 2236, 2214', 2157, upper winding of start relay R2160, to battery. Due to the high resistance of the upper winding of the start relay R2160, tone relay R1530 will not energize at the present time. However, the start relay R2160 does energize to condition the answer switch 2180 to operate in a vertical direction in search of the level marked by the grounding of conductor C2538.

At contact 2162', start relay R2160 completes a flashing circuit for the busy lamp L2124 over the following circuit: interrupted ground on the conductor designated 60IPM (Fig. 17), contact 1755, conductor C2080, contact 2162', resistance 2119, busy lamp L2124, to battery. The busy lamp flashes sixty times per minute to notify the operator at position 1300 of the particular answer switch upon which a call is about to be received. At contact 2164, start relay R2160 completes the following circuit for the vertical magnet: ground, contacts 2121, 2134, 2164, 2191, 2141, winding of the vertical magnet 2114, to battery. As a result of the application of ground potential to the last mentioned circuit, the vertical magnet 2114 operates and starts the vertical movement of the answer switch in search of the level in which the calling toll line is located. When the vertical magnet 2114 operates, it closes contacts 2115 for the stepping relay R2190, which relay, upon operating, opens the initial energizing circuit for the vertical magnet 2114 at contact 2191. Responsive to the opening of its initial energizing circuit, vertical magnet 2114 falls back and opens the circuit for the stepping relay R2190 at contact 2115. Stepping relay R2190 deenergizes and again closes the energizing circuit for the vertical magnet 2114 at contact 2151.

The above cycle of operation is repeated until the vertical wiper 2108 comes into engagement with the vertical bank contact previously grounded over conductor C2538. Since the vertical wiper 2108 and the switch wipers 2102–2107 inclusive are on the same shaft, the vertical stepping, under control of the vertical magnet 2114, raises the wiper 2108 and the wipers 2102–2107 inclusive to the level of the bank contacts in which the calling toll line is located.

When the wipers of the answer switch 2180 reach the level containing the calling toll line, vertical wiper 2108 encounters the grounded conductor C2538 on the associated vertical test contact. Since stepping relay R2190 is reoperated following the operation of the vertical magnet 2114 which brought wipers to the marked level, it is now locked in its energized position over a circuit including the grounded conductor C2538 of the calling level engaged by the vertical wiper 2108, lower winding of the change-over relay R2140, contact 2153, winding of the stepping relay R2190, to battery. Change over relay R2140 operates in series with the stepping relay R2190 over the above traced circuit. Relay R2140 is somewhat slow to operate, and, in addition, is designed so that its contact 2144 operates first and completes a locking circuit for its upper winding as follows: from ground, upper winding of relay R2140, contact 2144, lower winding of rear release relay R2150, to battery. This locking circuit is completed before contact 2145 opens its initial energizing circuit, including the lower winding of relay R2140. Furthermore, it will be well to mention at this time that the rear release relay R2150 is marginal and will not operate in series with the high resistance upper winding of relay R2140. At contact 2146, change over relay R2140 opens a point in the circuit for release magnet 2170; at contact 2143, it prepares a locking circuit for the switching relay R2130; at contact 2142, it transfers the operating circuit from the vertical magnet 2114 to the rotary magnet 2116; and, at contact 2146, it opens the circuit for the previously energized all-lines busy relay R1440.

Referring again to the above described operation of relay R2140, it is to be noted that at contact 2145, the energizing circuit for the stepping relay R2190 is open. It is to be noted that when relay R2190 falls back and closes contact 2191, an operating circuit is now completed for the rotary magnet 2116. The rotary magnet operates to advance the wipers 2102–2107 inclusive in a rotary direction over the selected level in the bank of the answer switch 2180. The operation of the rotary magnet 2116 is accomplished by the operation of the stepping relay R2190 in the same manner as was described in connection with the operation of the vertical magnet 2114. It may be well to mention that the vertical wiper 2108 is rotated out of engagement with the bank of the vertical contacts upon the first rotary step of the switch.

The rotary movement of the wipers in the answer switch 2180 continues until the marked contacts in the banks of the answer switch are encountered by wipers 2106 and 2107. It will be recalled that conductor C2535 has a ground potential applied thereto and conductor C257 has battery potential applied thereto as marking potentials. More particularly, battery potential is applied to conductor C257 through the winding of the seizure relay R360 in the calling toll line circuit 250 by way of contact 355 and conductor C267 to the seventh contact in the fourth level of the bank contacts accessible to wiper 2106. Furthermore, ground potential is applied to the corresponding contact in the banks of the answer switch accessible to wiper 2107 from contact 1231 of the energized relay R1230. Therefore, when these wipers engage the seventh contact in the fourth level of the banks associated with the answer switch, the following circuit is completed for energizing test relay R2120: ground potential, wiper 2107, winding of test relay R2120, contact 2138, to battery potential applied to wiper 2106.

Upon operating, test relay R2120, at contact 2121, immediately opens the circuit of the rotary magnet 2116 in order to terminate the rotary movement thereof, with the wipers 2102–2107 inclusive in engagement with the bank contacts terminating the conductors of the ring-down toll line circuit 250. At contact 2122, relay R2120 completes an obvious energizing circuit for the switching relay R2130.

Referring again to the energizing circuit for the test relay R2120, it will be recalled that battery potential was supplied through the winding of the seizure relay R360 in the ring-down toll line circuit 250. Relay R360 energizes in series with the test relay R2120 and completes a locking circuit by way of contact 364 in series with the test relay R2120. Further operation in the toll line circuit 250, responsive to the energization of the seizure relay R360, will be described hereinafter.

Referring again to the operation of the start relay R2160 in the answer switch 2180, it will be recalled that the initial energizing circuit included the upper winding thereof in series with the lower winding of tone relay R1530. The resistance of the upper winding of relay R2160 prevented the tone relay R1530 from energizing in this circuit. However, at the time the answer switch 2180 stepped the switch wipers 2102 to 2108 inclusive in a vertical direction, the vertical off-normal contacts 2199 closed and included the lower winding of the start relay R2160 in the circuit of the lower winding of the tone relay R1530. When this occurred, the resistance included in the circuit of the lower winding of tone relay R1530 was reduced sufficiently to enable the tone relay R1530 to energize. At contact 1533, relay R1530 grounds one of the talking conductors including the operator's receiver, and, at contact 1532, it connected a high frequency "tone" by way of contacts 1542 and 1532 to the other talking conductor including the operator's receiver, thereby giving the operator a call tone signal. At contact 1534, relay R1530 completes an obvious energizing circuit for relay R1540, which relay, at contact 1542, interrupts the call tone signal transmitted to the operator's headset. At contact 1543, relay R1540 completes a locking circuit for itself from ground at contact 1512, and, at contact 1544, relay R1540 completes an energizing circuit for the relay R1550.

At contact 1551, relay R1550 again applies "tone" to the talking conductor including the operator's headset, by way of contacts 1541 and 1532. At contact 1553, it shunts the lower winding of the relay R1530, and, at contact 1552, it shunts the upper winding of relay R1530. Relay R1530 now restores and, at contact 1532, again removes the "tone" from the operator's headset, but relays R1540 and R1550 remain locked up under control of the start relay R1510 at contact 1512. Consequently, two short applications of the high frequency call "tone" (commonly referred to as a zip-zip tone) have been transmitted to the connected operator to indicate that the answer switch 2180 has started its operation in search of the calling toll line.

At the time the answer switch 2180 advanced its wipers and connected with the calling toll line circuit 250, it will be recalled that test relay R2120 energized and, at contact 2122, completed an energizing circuit for the switching relay R2130. Simultaneously, with the completion of the energizing circuit for relay R2130, the following circuit for relay R1630 was completed: ground, contacts 2122, 2215', conductor C2079, upper winding of relay R1630, to battery. Relay R1630, upon energizing, at contact 1631 connects ground potential by way of contact 1851 and conductor C2078 to maintain the start relay R2160 energized. At contact 1634, relay R1630 opens the previously traced energizing circuit for relays R1640 and R1220, which relays now restore.

Referring again to the operation of the switching relay R2130, at contact 2136 it completes a locking circuit for itself from ground at contact 2143. This same ground potential is extended by way of contact 2215' and conductor C2079 to maintain the rear connect relay R1630 energized after relay R2120 restores. At contact 2137, relay R2130 extends ground potential from contact 2143 to wiper 2106, thereby grounding conductor C257 extending to the ring-down toll line circuit 250, the purpose of which will be described hereinafter. At contact 2138, relay R2130 opens the energizing circuit for the test relay R2120, which relay now restores. At contact 2139', relay R2130 opens the initial energizing circuit for the upper winding of the connect relay R2210, and at contact 2139 it prepares a circuit for energizing the upper winding of the disconnect relay R1450, as will be described hereinafter. At contact 2134, relay R2130 opens another point in the previously traced energizing circuit for the vertical and rotary magnets 2114 and 2116 respectively, and at contacts 2131 and 2132, it extends the talking conductors including the wipers 2102 and 2103, by way of contacts 2212 and 2216, conductors 2089 and 2090, contacts 1613 and 1611, contact 1531, contacts 1521 and 1523, contacts 1462 and 1464, to the talking conductors including the operator's transmitter and receiver 1301 and 1302 respectively. Since the circuit of the ring-down toll line circuit 250 has not been completed as yet, it will be assumed that the operator is unable to converse with the distant toll operator at toll switchboard 201 for the time being.

When relay R2120 restored, ground at contact 2121 is extended by way of contacts 2135 and 2565 to the wiper 2105 to light a group identity lamp, indicating to the operator the particular group of trunks in which the calling trunk is located.

As has been pointed out herein before, when the answer switch 2180 finds the calling ringdown toll line circuit 250, conductor C257 is grounded. This ground is extended by way of conductor C257, contact 355, and the winding of relay R360, to battery. Relay R360 energizes, and at contact 364 completes a locking circuit for itself, from the grounded conductor C257. At contact 363, relay R360 removes the line terminating network consisting of condenser 357 and resistance 358 from across the talking conductors C254 and C255. The line terminating network, comprising condenser 357 and resistance 358, is connected across the line to prevent the toll line from singing during the period that the answer switch is searching for the calling line. Since the answer switch is now connected with the calling toll line circuit 250, and the talking conductors C254 and C255 are now extended to the operator's headset, the line terminating network is removed to take the shunt off the line. At contact 366, relay R360 removes ground from the start conductor C2536 to permit the common start and level distributor relay R760 to restore. At contact 367, relay R360 removes the ground potential from conductor C2019, thereby extinguishing the call-waiting lamp L2064 associated with the non-operated toll key K2040, indicating to the operator that the call received over the ring-down toll line circuit 250 may be answered. At contact 361, relay R360 opens the locking circuit for the start relay R350, which relay now restores to normal. At contact 362, a circuit is completed from ground by way of contact 341 and the pad cut-off relay R210 to battery. However, due to the fact that relay R210 is slow-to-operate, the energizing circuit therefor is opened at contact 341 due to the energization of relay R340 at the time the wipers 2102 and 2103 of the answer switch connected with the talking conductors C254 and C255 over a circuit which will now be described. Referring to Fig. 14, it will be noted that ground potential is applied through the left-hand winding of the retard coil RT and extended by way of contacts 1462, 1521, 1531, 1611, conductor C2090, contacts 2216, 2132, wiper 2103, conductor C255, lower winding of pad control relay R340, lower winding of the impedance 330, contact 312, lower winding of the ring-out relay R300, to positive booster battery in which the negative pole is grounded. The other side of the talking circuit is grounded through the right-hand winding of the retard coil RT by way of contacts 1464, 1523, 1613, conductor C2089, contacts 2212, 2131, wiper 2102, conductor C254, upper winding of the pad control relay R340, upper winding of the impedance 330, lower winding of the check relay R310, to positive booster battery in which the negative pole is grounded. The windings of relay R340 are such that when the above traced circuit is completed, the current flow through the relay is cumulative, that is, aiding each other, thereby causing the relay to energize and open its contact 341. Attention is called to the fact that the ground at contact 362 is extended by way of resistance 332 to the upper windings of check relay R310 and ring-out relay R300, to battery. Due to the resistance 332, the energizing current in the upper windings of these relays is insufficient to operate the contacts thereof. The above traced circuit, including the lower windings of relays R300 and R310 to the positive booster battery, is completed through the lower windings in such a direction that the flux generated in the lower windings is in opposition to the flux generated in the upper windings and is sufficient to overcome the effect of the flux generated in the upper windings, and biases the relays in the opposite direction, but not sufficiently to cause the relays to operate their associated contacts.

From the above explanation it should be understood that when the talking conductors C254 and C255 are both grounded, the pad control relay R340 will energize, but relays R300 and R310, although energized in an opposite direction from the direction in which the flux is created in the upper winding and with sufficient strength to overcome the effect of the flux generated in the upper winding, do not have sufficient flux generated in the opposite direction in the lower windings to cause the relays to operate their associated contacts. Due to the fact that the energizing circuit for the slow-to-operate pad cut-off relay is opened at contact 341, this relay is not energized sufficiently to cause the relay to operate its contact and shunt out the pad. Consequently, the pad is left in the toll line and introduces a definite loss when the toll line is connected to the operator at position 1300. If the toll line is connected to another toll line, the pad is cut out of the toll line to increase the transmission level thereover.

Responsive to the deenergization of the start relay R350, the ground potential applied to conductor C373 at contact 353 is substituted at contact 354 and contact 364 by the ground potential applied to conductor C257, in order to maintain the busy condition in the banks of the call switches, such as call switch 2380.

The operator at position 1300 is now in a position to converse with the operator at distant tollboard 201 over the ring-down toll line circuit 250, and receives the information as to the destination of the call being extended. However, it is necessary to discuss certain operations that take place to busy the operator's position and to connect an idle sender thereto, so that the operator may key up the necessary digits to extend the call to the desired destination.

As has been pointed out above, rear connect relay R1630 energized when the answer switch 2180 found the calling toll line. When this occurred at contact 1637, the following circuit was completed: ground, contact 1637, conductor C2525, contact 8 of release key K1950 in its normal position, conductor C2526, contact 1846, conductor C2511, rear connect lamp L2001, to battery. A branch of this circuit also extends by way of contact 1856, conductor C2048, for initiating the operation of the sender control circuit of Figs. 26 and 27, as will be subsequently described. The lighting of the lamp L2001 is an indication to the operator that a call is waiting to be answered on the rear end of the link comprising the answer switch 2180 and the call switch 2380.

It will be recalled that at the time relay R1630 energized it opened the energizing circuit for position busy relay R1640 and relay R1220, both relays restoring to normal. The restoration of position busy relay R1640 at contacts 1644 and 1645 opens the energizing circuit for both the upper and lower windings of start relay R1510, which relay restores and at contact 1512 opens the locking circuit for the tone relays R1540 and R1550, which relays also restore. The restoration of relay R1220 disconnects conductors C2021, C2549, C2070 and C2548 of the position distributors 1101, 1102, 1105 and 1104 respectively. Referring particularly to the position distributor 1101, it will be noted that the removal of ground potential from conductor C2021, responsive to the deenergization of relay R1220, opens the circuit for the all-position busy relay R1120. However, attention is called to the fact that conductor C2021 may have been grounded due to the fact that an operator at a second position has prepared her position to receive calls and therefore a relay similar to relay R1220 is energized and the ground potential thereupon will remain upon conductor C2021 and maintain the all-position busy relay R1120 energized.

Upon the release of position busy relay R1640 at contact 1647 the following circuit is completed: ground, contact 1647, conductor C2065, contact two of the non-operated key K2040, conductor C2067, contacts 1163 and 1133, lower winding of relay R1140, to battery. Relay R1140 energizes over this circuit, and if the operator at the second position has not operated her toll key, similar to key K2040, and is in a position to receive calls, conductor C2021 will be grounded and relay R1140 will lock up to the grounded conductor C2021 over a circuit including relay R1120, contact 1151, contact 1142, upper winding of relay R1140, to battery. Furthermore, at contact 1141, relay R1140 opens the locking circuit for relay R1130 and at contact 1145 it prepares a circuit whereby a subsequent call, when received, will cause the call to be distributed to the second operator. The restoration of relay R1130 opens the initial energizing circuit for relay R1140 at contact 1133, and at contact 1135 opens the circuit of the start conductor C2023 to prevent any calls from being distributed to the operator at position 1300.

SEIZING THE SENDER CONTROL CIRCUIT

The manner in which automatic selection of an idle sender control circuit is accomplished will now be considered. The operator at position 1300 has two sender control circuits for her exclusive use—sender control circuit 2600 (Figs. 26 and 27) and sender control circuit 2800 (Fig. 28). The particular sender control circuit to be used is determined by the sender alternator, comprising relays R1320 and R1330. For the purpose of the present description it will be assumed that the sender alternator is in a normal position; therefore, at the time the rear connect relay R1630 energized and closed its contact 1637, conductor C2525 was grounded. Furthermore, the grounding of conductor C2525 caused the rear connect lamp L2001 to be illuminated. In addition, conductor C2526 was grounded and, as a result, a circuit was completed by way of contact 1856, conductor C2048, contacts 1326 and 1336, conductor C2047, contact 4 of the non-operated sender control key K1980, conductor C2046, contacts 2621, 2645, 2717, winding of start relay R2730, conductor C2049, contacts 2232, 2169, 2241', winding of sender number 1 connect relay R2250, contact 2266, to battery. Relay R2730 in the sender control circuit 2600 energizes in series with the sender number 1 connect relay R2250. Relay R2250, at contacts 2251 to 2255 inclusive, connects the sender control conductors to the call switch 2380. Relay R2250, at contact 2254, completes an energizing circuit for the upper winding of relay R2360 from ground by way of the vertical off-normal contacts 2304, and at contact 2257 it disconnects the sender number 2 connect relay R2260.

Start relay R2730, upon energizing, at contact 2733 completes a circuit for grounding the start conductor C2045 of the sender finder 2900, as follows: ground, contacts 2728, 2715, 2642, 2733, conductor C2045. The ground potential applied to conductor C2045 closes a circuit for energizing the sender control relay in the sender finder 2900 corresponding to the particular sender control circuit which has been seized by the sender number 1 connect relay R2250. It should be understood that if the sender number 2 connect relay R2260 had been energized, sender control circuit 2800 would have been seized and a conductor similar to conductor C2045 would have been grounded to cause the energization of another sender control relay in the sender finder 2900. Inasmuch as sender control circuit 2600 has been seized by the operation of the sender number 1 connect relay R2250, the grounding of conductor C2045 completes an energizing circuit for the sender control relay R3010.

At contact 2734, relay R2730 also prepares a locking circuit for itself and, at contact 2731, completes an energizing circuit for the supervisory relay R2690. The circuit for energizing the supervisory relay R2690 may be traced as follows: ground, contact 1 of the sender control key K1980, conductor C2050, contacts 2731, 2641, winding of supervisory relay R2690, to battery.

At contact 2694, supervisory relay R2690 opens a point in the circuit of the automatic ring relay R2630, and at contact 2691, it completes an obvious energizing circuit for the cut-in relay R2750.

Responsive to the energization of the cut-in relay R2750, conductor C2043 is grounded by way of contacts 2757 and 2719, and at contact 2755, a circuit is prepared for the cut-through relay R2720 in series with conductor C2044. The sender control circuit 2600 is now in condition to be connected to an idle register sender, such as register sender 3100, by way of the sender finder 2900.

At the outset it is important to note that each operator's postion is provided with a pair of sender control circuits, such as sender control circuits 2600 and 2800. Furthermore, each exchange is provided with a plurality of register senders, such as register sender 3100. Any sender is available to the pair of sender control circuits at each operator's position. Furthermore, each register sender 3100 provided in an exchange is equipped with a register sender busy relay, four of such relays being shown in Fig. 30.

When the register sender busy relays R3050, R3060, R3070 and R3080 are at normal, the chain circuit through the contacts of these relays is so arranged that the first register sender available for use is the one that is preselected. For example, if the first register sender available is the register sender 3100, register sender busy relay R3050 will be deenergized and the ground potential through contact 3054 thereof will operate a connect relay, such as connect relay R2910, when the particular sender control relay, such as sender control relay R3010, energizes. However, if the first register sender is busy, then relay R3050 will be energized and the ground potential at contact 3053 will be extended by way of contact 3064 on the deenergized busy relay R3060 of the second register sender to operate the connect relay, such as connect relay R2920. It should be understood from the above discussion that the conductors connected to the contacts of the connect relay R2910 are multiple to all corresponding contacts of similar connect relays, such as connect relay R2920, so that the sender control circuit 2600 may be connected to any register sender by operating the particular connect relay individual to each register sender. Furthermore, the conductors 2801, individual to the second sender control circuit 2800, are multiple through corresponding contacts of individual connect relays, such as connect relays R2930 and R2940.

In order to give the second sender control circuit, such as sender control circuit 2800, first choice of idle register sender circuits, such as 3100, a reverse chain circuit is provided on the register sender busy relays which enables the last idle register sender in the group to be the first choice register sender for the sender control circuit 2800. If the last register sender is busy, the register sender busy relay R3080 will be energized and the next to the last register sender will be selected because the ground from contact 3081, contact 3072, contact 3025 of the operated sender control relay R3020 will energize the connect relay R2940 to connect the multiple conductors 2801 of the sender control circuit 2800 through to the next to the last register sender.

More specifically, it will be recalled that conductor C2045 was grounded at the time relay R2730 of the sender control circuit 2600 operated; therefore, sender control relay R3010 energized over a circuit including the grounded conductor C2045, contacts 3011, 3043,, 3033, 3023, 3013, resistance 3090, to battery. Contact 3012 closes first to lock the relay R3010 tothe grounded conductor C2045 independent of the contacts on the remaining sender control relays. In addition, at contact 3011, it opens its initial energizing circuit, and at contact 3013, it disconnects battery from the windings of the remaining sender control relays. As a result of the latter operation, all the sender control relays are prevented from operating until such time as an idle register sender has been connected to the sender control circuit 2600. Since the remaining sender control relays cannot operate, the reverse chain circuit under control of the register sender busy relays cannot be completed to operate connect relays, such as R2930 and R2940.

Assuming that the register sender 3100 is the first choice register sender and is at the present time idle, its corresponding register sender busy relay R3050 is deenergized. Consequently, ground potential at contact 3054 completes a circuit by way of contact 3014 of the locked-up sender control relay R3010 and energizes the lower winding of the connect relay R2910 through resistance 2950, to battery. Upon energizing, connect relay R2910 locks up over a circuit including its upper winding, as follows: ground, contact 2755, winding of cut-through relay R2720, conductor C2044, contact 2910', upper winding of connect relay R2910, to battery. At contact 2911', relay R2910 shunts out all other connect relays, such as R2920, to prevent the multiple conductors of the sender control circuit 2600 from being connected to another register sender. At contacts 2911 to 2919 inclusive, connect relay R2910 connects the control conductors of the sender control circuit 2600 through to the register sender 3100.

Cut-through relay R2720 energizes in series with the upper winding of the connect relay R2910, and at contact 2728 removes the ground from conductor C2045 to permit the sender control relay R3010 to restore to normal. In the meantime, the register sender busy relay R3050, individual to the seized register sender 3100, will have been operated to transfer the chain circuit from contact 3054 to contact 3053, so, in the event, another sender control circuit at another operator's position will be in a position to seize and connect with the second idle register sender.

Cut-through relay R2720, upon operating, also, at contacts 2721, 2722, 2723, and 2724, connects the four digit leads A, B, C, D extending from the key set KS1350 at the operator position 1300 to the four digit leads A1, B1, C1, D1, which extend by way of contacts 2916, 2917, 2918, and 2919 of the energized connect relay R2910 to the contacts of the digit register connect relays, such as relays R3370, R3330, and R3480 in the digit register 3100B. At contact 2729, relay R2720 completes a circuit for the upper winding of tone connect relay R2610, and at contact 2725, it connects the upper winding of the disconnect relay R2710 to the conductor C2055 extending to the key K1390 in the operator's key set KS1350, which key is operated only when the operator has completed keying up all of the digits she intends to key up, and causes the register sender to be dismissed when all of the register digits have been transmitted. At contact 2726, relay R2720 prepares an energizing circuit for the upper winding of the override busy relay R2660, which relay is controllable over conductor C2056 from the direct override busy key K2085 at the operator's position. At contact 2727, relay R2720 grounds the conductor C2054 by way of contact 2674, to illuminate the sender control #1 lamp L1990 to indicate to the operator the particular sender control circuit being used and also that a register sender has been connected thereto and is in readiness to receive the digits of the called number.

Before describing the detailed operations of the register sender 3100, attention is called to the following circuit for energizing the line relay R2340 in the call switch 2380: ground, lower winding of relay R2340, contacts 2333, 2252, conductor C2063, contact 2634, conductor C2041, contact 2913, conductor C2036, contact 3252, conductor C2035, contact 2912, conductor C2040, contact 2649, conductor C2064, contacts 2251, 2331, upper winding of relay R2340, to battery. It will be noted that when the register sender 3100 is connected through the sender control circuit 2600, the line relay R2340 energizes over this circuit and at contact 2341, completes an obvious energizing circuit for the release relay R2350, which also energizes. The call switch 2380 is now prepared for further operations under control of impulses transmitted from the register sender 3100.

OPERATION OF THE REGISTER SENDER 3100

Referring now to the register sender 3100, it will be noted that the start relay R3270 operated when the conductor C2038 was grounded by the sender control circuit 2600. Upon operating, the start relay R3270 closes its contact 3271 to complete a circuit for energizing the connect relay R3370 of the first digit register 3100B, this circuit extending from ground by way of the contacts 3271, 3267, conductor C2031, contact 3322 and the winding of relay R3370 to battery. In closing its contact 3271, the relay R3270 also connects the holding conductor C2030 to ground and prepares the operating circuit for the transfer relay R3260. At its contact 3272, the relay R3270 connects the marking conductor C2028 to ground and prepares operating and locking circuits for the two digit space relays R3190 and R3200. At its contact 3273, the relay R3270 prepares the operating circuit for the pulse generating relay R3240. At its contact 3274, the relay R3270 prepares the operating and locking circuits for the eight relays of the counting relay network shown to the left of Fig. 31. At its contact 3275, the relay R3270 connects the release conductor C2033 to ground. The grounding of release conductor C2033 prepares an energizing circuit for the transfer relay R3320, and it completes the energizing circuit for the register sender busy relay R3050 to busy the register sender 3100 to the sender finder 2900.

From the above explanation it will be understood that after the start relay R3270 of the impulse sender 3100A is operated, the conductors C2033, C2031, C2030 and C2028 are connected to ground in the sender, thereby to prepare the circuits described below over which the key digits of the directory number designating the destination of the call are successively registered in the several digit registers 3100B. Moreover, the connect relay R3370 of the first digit register is energized over the above-traced circuit in response to the operation of the start relay R3270. In operating, this connect relay closes its contacts 3371, 3372, 3373 and 3374 to prepare the operating circuits for the four code relays A1, B1, C1 and D1. Following the operation of this connect relay, all of the equipment necessary to extend the call has been seized and the register sender required to route the call to its destination is conditiond to respond to operation of the operator's key set KS1350.

REGISTERING THE DIGITS OF THE CALLED NUMBER

In order to register a digit in one of the digit registers 3100B, the operator handling the call at operator position 1300 actuates one of the digit keys of the key set KS1350. When any one of the ten digit keys is operated in this key set, one or two of the four digit leads A, B, C and D will be connected to ground to operate one or two of the code relays in the particular digit register which has been connected to receive the digit. The one or two of the code leads connected to ground in the key set KS1350 depends upon the numerical value of the digit to be registered. It is noted, moreover, that, as the digit keys of the key set KS1350 are successively operated, the digits designated thereby are successively registered in different ones of the digit registers, a transfer operation being effected at the end of each digit registration in one register to set up the next succeeding register to receive the next digit. Thus, after a first digit has been registered in the digit register comprising the four code relays A1, B1, C1 and D1, the transfer relay R3320 of this register operates to connect the second register comprising the four code relays A2, B2, C2 and D2 to receive the next digit for registration. With the connect relay of any one of the registers operated, the code relays in that register which correspond to the numerical value of the digit will be operated when the digit key of the key set KS1350 is actuated to connect the corresponding code leads to ground. With the code relays of any register operated, the marking lead corresponding to the numerical value of the registered digit is connected to ground. For example, if the code relays A1 and D1 of the first register are operated, the third marking lead M3 is connected to ground over a path which includes the outer make contacts of the relay D1, the outer make contacts of the relay A1, the common marking lead C2028, and the contacts 3263, 3203 and 3272. On the other hand, if the code relays B1 and D1 of the first register are operated, the fifth marking lead M5 is connected to the common marking lead C2028 over a path which includes the middle make contacts of the relay B1, the inner break contacts of the relay C1 and the second inner make contacts of the relay D1. More generally considered, the following table shows the code and marking leads which are connected to ground and the code relays which are operated for each digit.

| Digit key operated | Code leads marked | Marking leads grounded | Code relays operated | | |
|---|---|---|---|---|---|
| | | | First digit | Second digit | Third digit |
| 1 | A1, B1 | M1 | A1, B1 | A2, B2 | A3, B3 |
| 2 | A1, C1 | M2 | A1, C1 | A2, C2 | A3, C3 |
| 3 | A1, D1 | M3 | A1, D1 | A2, D2 | A3, D3 |
| 4 | B1, C1 | M4 | B1, C1 | B2, C2 | B3, C3 |
| 5 | B1, D1 | M5 | B1, D1 | B2, D2 | B3, D3 |
| 6 | C1, D1 | M6 | C1, D1 | C2, D2 | C3, D3 |
| 7 | A1 | M7 | A1* | A2 | A3 |
| 8 | B1 | M8 | B1 | B2 | B3 |
| 9 | C1 | M9 | C1 | C2 | C3 |
| 0 | D1 | None | D1 | D2 | D3 |

To consider the manner in which the different digit registers are set up to receive the successively keyed digits of the directory number designating the destination of the call, it may be assumed that the digit key 4 is first operated in the key set KS1350, whereby the code leads B1 and C1 are connected to ground to energize the code relays B1 and C1 through the contacts 3374 and 3373 of the connect relay R3370. In operating, the code relay B1 locks to the grounded lead C2033 over a path which includes its inner preliminary make contact, the winding of transfer relay R3320 and the contact 3312. The code relay C1, in operating, locks to the grounded lead C2033 over a similar path. When these locking circuits are completed the winding of the transfer relay R3320 is short-circuited over a path which includes the grounded code leads B1 and C1, the contacts 3374 and 3373, the locking make contacts of the code relays B1 and C1, the winding of transfer relay R3320, the contact 3312, and the grounded release lead C2033. In operating, the two code relays B1 and C1 also function to connect the grounded common marking lead C2028 to the fourth marking lead M4. When the digit key 4 of the key set KS1350 is released by the operator, the two code leads B1 and C1 are disconnected from ground, permitting the transfer relay R3320 to be energized in series with the parallel connected windings of the two code relays B1 and C1. These two code relays remain operated when energized in series with the transfer relay R3320. In operating, the relay R3320 opens its contact 3322 to deenergize the connect relay R3370 of the first register, and closes its contact 3323 to complete a circuit including the grounded lead C2031 and the contact 3352 for energizing the connect relay R3380 of the second register. At its contact 3321, the relay R3320 completes the prepared operating circuit for the slow-acting hold relay R3290, this circuit extending from the grounded release lead C2033 by way of the contact 3321, the hold lead C2032, and the winding of hold relay R3290, to battery. The connect relay R3370 of the first register, upon restoring, opens its contacts 3371 to 3374, inclusive, thereby to prevent the code relays A1, B1, C1 and D1 of the first register from responding to further operation of the digit keys in the key set KS1350. The connect relay R3380 of the second register, upon operating, closes its contacts 3381 to 3384, inclusive, whereby the four code relays A2, B2, C2 and D2 of the second register may be selectively energized over the four code leads A1, B1, C1 and D1.

It will be understood that, with the connect relay R3380 of the second register operated, the second digit is registered in this register, and that, when the digit key of the key set KS1350 is released to end the registration, the operated code relay or relays of the second register are locked energized in series with the transfer relay R3350. With one or two of the code relays A2, B2, C2 and D2 operated, a marking path is prepared for impressing ground potential upon one of the marking leads M1 to M9, inclusive, which corresponds to the numerical value of the digit registered. The transfer relay R3350 operates when energized in series with one or two of the four associated code relays. In operating, this relay opens its contacts 3352 to deenergize the connect relay R3380, and closes its contacts 3353 to energize the connect relay R3480 of the third register in the circuit which includes the contacts 3422 and the grounded lead C2031 or the contact 3311 and the grounded lead C2033. At its contact 3351, the relay R3350 shunts the corresponding contact 3321 of the first transfer relay R3320 to provide a multiple circuit for energizing the hold relay R3290.

The connect relay R3380, upon restoring, opens its contacts 3381 to 3384, inclusive, to disconnect the four associated code relays from the four code leads A1, B1, C1 and D1. The connect relay R3480, upon operating, closes its contacts 3481 to 3484, inclusive, to prepare the operating circuits for the four code relays A3, B3, C3 and D3, whereby the third digit may be registered in the third register. With the connect relay R3480 operated, the third digit of the directory number designating the destination of the call is registered in the third register. In this case, one or two of the four code relays A3, B3, C3 and D3 are operated in response to the operation of the third actuated digit key in the key set KS1350. In operating, the code relay or relays lock to the grounded release conductor C2033 through the winding of the transfer relay R3420 and the contact 3412 and, in so doing, short-circuit the winding of the indicated transfer relay. Also, when one or two of the code relays in the third register are operated, a marking path is prepared over which one of the marking leads M1 to M9, inclusive, may be connected to the grounded marking conductor C2029. When the digit key is released in the key set KS1350 the path short-circuiting the winding of the transfer relay R3420 is broken, permitting this relay to be energized in series with the associated operated code relay or relays. In operating, the transfer relay R3420 opens its contact 3422 to deenergize the connect relay R3480, and closes its contact 3423 to energize the connect relay of the fourth register. At its contact 3421, the relay R3420 shunts the contacts 3351 and 3321, thereby to provide a multiple circuit for maintaining the hold relay R3290 energized.

The manner in which the fourth, fifth and succeeding digits as keyed up in the key set KS1350 are registered in the fourth, fifth and succeeding registers will be clearly apparent from the preceding explanation. In the illustrated arrangement, nine digit registers are provided so that the registering equipment may hold as many as nine digits at any one time. Provisions are made, however, whereby the tenth and following digits may be registered in the first and following registers in the event the desired destination of the call requires the registration of more than nine digits. In this regard it is pointed out that the impulse sender operates to start transmitting the impulses of the first digit immediately this digit is registered in the first register, and normally the transmission of the first digit by the impulse sender 3100A will be completed before the ninth digit is registered in the ninth register. Incident to the transmission of the first digit as registered in the first register, this register is released in the manner pointed out below. Also incident to the transmission of the first digit the transfer relay R3260 operates to disconnect the conductor C2031 from ground and thus prevent the reoperation of the connect relay R3370 when the transfer relay R3320 restores. After the conductor C2031 is disconnected from ground the connect relays of the registers are energized through the contacts 3311, 3341, etc., of the sequence relays over the grounded release conductor C2033. In operating, the transfer relay R3260 also disconnects the common marking conductor C2028 from ground to prevent any of the nine marking leads from being prematurely connected to ground through the marking contacts of the code relays in the first register in the event a tenth digit is registered therein. Thereafter and when the transfer relay of the ninth register is operated incident to the registrtaion of the ninth digit in this register, a circuit including the contact 3322 and the conductor C3474 is completed for energizing the connect relay R3370. This circuit is extended from the coanductor C3474 to the grounded release conductor C2033 through the upper make contacts of the sequence relay in the register last cleared of the digit registered therein, and the lower make contacts of the transfer relays in succeeding registers. Thus, if the sequence relay R3410 of the third register was last operated at the time the transfer relay of the ninth register operates, the operating circuit for the first connect relay R3370 is extended to the grounded release conductor C2033 through the contact 3411 and the make contacts of the transfer relays in each of the fourth to ninth registers. A circuit including the conductor C3471 is also provided through the make contacts of the sequence relay in the ninth register for connecting one of the marking leads M1 to M9, inclusive, to ground through the marking contacts of the code relays A1, B1, C1 and D1 of the first register. An additional circuit including the conductor C3472 is provided for reenergizing the release relay R3300 under the control of the sequence relay in the ninth register.

With the connect relay R3370 reenergized, the tenth digit may be registered in the first register in an obvious manner, and after this registration is completed the transfer relay R3320 is operated to extend the grounded conductor C3474 through the contacts 3323 and 3352 to the winding of the connect relay R3380 in the second register, whereby this connect relay is energized to condition the second register to receive the eleventh digit. From the above explanation it will be understood that an indefinite number of digits may be stored in the nine digit registers which are provided. This statement is, of course, based on the assumption that all of the nine registers are not occupied with register digits at the same time.

OPERATION OF THE IMPULSE SENDER

As indicated above, the hold relay R3290 is energized in response to the operation of the transfer relay R3320 immediately after a digit has been registered in the first register, and remains energized so long as any one of the registers has a digit registered therein. In operating, the relay R3290 closes its contact 3291 to complete an obvious circuit for energizing the start sending relay R3280. At its contact 3292, relay R3290 opens the path normally short-circuiting the lower winding of the start relay R3270, whereby the high resistance of the lower winding is included in series with the circuit of the upper winding of relay R3270.

The start sending relay R3280, upon operating, closes its contact 3281 to complete the operating circuit for the pulse generating relay R3240, this circuit extending from ground by way of contacts 3274, 3209, 3196, conductor C3198, contacts 3281, 3186, 3273, 3231, and the winding of relay R3240, to battery. In operating, the relay R3240 locks to ground through the contacts 3231 and 3243, and closes its contact 3241 to complete an obvious circuit for energizing the pulse generating relay R3250. At its contact 3242, the relay R3240 prepares a locking circuit for the stop relay R3180 and completes a circuit for energizing the tone control relay R3210 by way of contacts 3204 and 3212. Tone relay R3210 operates and locks to ground by way of contacts 3211, 3203 and 3272 and interrupts its initial energizing circuit at contact 3212. At contact 3213 tone control relay R3210 applies ground to the lower winding of the previously energized tone control relay R2610 by way of contact 2914, conductor C2037 and contact 2615. Relay R2610 is a differentially wound relay and is designed so that the circuit through its upper winding alone will cause the relay to operate all of its contacts; but when the circuit of the lower winding is completed while the circuit of the upper winding is maintained, the relay will restore and open all of its contacts except contact 2615. Since relay R3210 is only maintained energized while the counting network of Fig. 31 are functioning to transmgit switch setting impulses and is deenergized during the inter-digit spacing interval, as will be clearly pointed out hereinafter, relay R2610 is forced to open its contacts only during the period of time that switch setting impulses are being transmitted. It should be understood that in an operated condition, relay R2610, at contacts 2611 and 2612, prepares a circuit whereby dial tone from a called automatic exchange can be transmitted to the operator to indicate that further digits must be keyed into the register sender to complete the connection to a desired subscriber.

The second pulse generating relay R3250, upon operating, closes its contact 3251 to complete an obvious circuit for energizing the third pulse generating relay R3230, and at contact 3252 opens the previously traced circuit for line relay R2340 in the call switch 2380. The relay R3230 now operates and opens its contact 3231 to deenergize the first pulse generating relay R3240, whereby the three relays R3240, R3250 and R3230 are caused to release in an obvious manner. The relay R3230, upon restoring, closes its contact 3231 to recomplete the operating circuit for the relay R3240, and, relay R3250, upon restoring, again completes the energizing circuit of the line relay R2340 in the call switch 2380. Thus a second cycle of operation of the three pulse generating relays is initiated.

The operating cycles of the three pulse generating relays are counted through operation of the counting relay network shown to the left of Fig. 31. Thus, when the relay R3250 first operates, a circuit is completed for energizing the first counting relay R3110, this circuit extending from ground by way of the contacts 3274, 3209, 3196, 3253, 3222, conductor C3199, the contacts 3156, 3146, 3136, 3126, 3116 and the winding of relay R3110, to battery. In operating, the relay R3250 also functions to complete a path including the grounded conductor C3198 and the contacts 3254 and 3101, lower winding of transfer relay R3100, and grounded conductor C3198, for short-circuiting the lower winding of the transfer relay R3100.

When energized in the above-traced circuit, the relay R3110 locks to grounded conductor C3199 over a path including the contacts 3115 and 3104 and prepares a locking circuit for itself including contacts 3113, 3123, the lower winding of relay R3100, conductor C3198 and the contacts 3196, 3209 and 3274, which circuit is effective when ground is removed from conductor C3199 at contact 3253 when the pulse generating relay R3250 restores. At its contacts 3111 and 3112, respectively, the relay R3110 prepares two alternating circuits which respectively include the marking leads M1 and M6, over which the stop relay R3180 may be energized in the manner pointed out below. At its contact 3114, the relay R3110 prepares the operating circuit for the second counting relay R3120. At its contact 3116, the relay R3110 opens a point in its initial energizing circuit as traced above.

As the first cycle of operation of the three pulse generating relays R3230, R3240 and R3250 progresses, the relay R3250 restores and opens its contact 3253 to interrupt the locking circuit for the relay R3110 as traced above. At its contact 3254, the relay R3250 also opens the path short-circuiting the lower winding of the transfer relay R3100. In response to the latter operation, the lower winding of the transfer relay R3100 is energized in series with the winding of the first counting relay R3110 over the above traced circuit including the grounded conductor C3198. The current traversing this circuit is sufficient to maintain the relay R3110 in its operated position and to cause the operation of the transfer relay R3100. In operating, the relay R3100 closes its contact 3102 to prepare an alternative locking circuit for itself. At its contact 3103, the relay R3100 further prepares the operating circuit for the second counting relay R3120. At its contact 3104, the relay R3100 opens one of the above-traced, but now incomplete, locking circuits for the first counting relay R3110.

When the relay R3250 operates during the second cycle of operation of the above three pulse generating relays, the operating circuit for the second counting relay R3120 is completed, this circuit extending from ground by way of the contacts 3274, 3209, 3196, conductor C3198, contacts 3253, 3222, conductor C3199, contacts 3103, 3114 and the winding of relay R3120, to battery. In operating the second time, the relay R3250 also completes the prepared locking circuit for the transfer relay R3100, this circuit extending from ground by way of the contacts 3274, 3209, 3196, conductor C3198, contacts 3254, 3102 and the upper winding of relay R3100 to battery. The relay R3120, upon operating, locked to the grounded conductor C3198 over a path including the contacts 3124 and 3133. At its contact 3125, the relay R3120 prepares the operating circuit for the third counting relay R3130. At its contact 3126, the relay R3120 opens another point in the above-traced operating circuit for the relay R3110. At its contact 3123, the relay R3120 opens the established locking circuit for the relay R3110, causing the latter relay to restore. At its contacts 3121 and 3122, the relay R3120 prepares two alternative circuits which respectively include the marking leads M2 and M7 over which the stop relay R3180 may be energized. The relay R3110, upon restoring, opens its contacts 3113 further to interrupt its own locking circuit and the circuit for energizing the lower winding of the transfer relay R3100. At its contact 3114, the relay R3110 interrupts the initial operating circuit for the relay R3120. At its contact 3116, the relay R3110 reprepares its own operating circuit. At its contacts 3111 and 3112, the relay R3110 opens the prepared circuits including the marking leads M1 and M6 over which the stop relay R3180 may be energized. When the relay R3250 restores during the second operating cycle of the pulse generating relays, the above-traced locking circuit for the transfer relay R3100 is opened at the contact 3254. The relay R3100 accordingly restores and closes its contact 3104 further to prepare the operating circuit for the third counting relay R3130. At its contact 3103, the relay R3100 opens another point in the operating circuit for the second counting relay R3120. At its contact 3102, the relay R3100 opens another point in its own locking circuit. At its contact 3101, the relay R3100 reprepares the path for short-circuiting its lower winding.

When the relay R3250 operates during the third operating cycle of the pulse generating relays, the third counting relay R3130 is energized over an operating circuit which may now be traced as extending from the grounded conductor C3199 by way of the contacts 3104, 3125 and the winding of relay R3130 to battery. In operating the third time, the relay R3250 also closes its contact 3254 to short-circuit the lower winding of the transfer relay R3100.

The relay R3130, in operating, locks to the grounded conductor C3198 over a path which includes the contacts 3134 and 3143, and the lower winding of the transfer relay R3100. At its contact 3135, the relay R3130 prepares the operating circuit for the fourth counting relay R3140. At its contact 3136, the relay R3130 opens another point in the operating circuit for the first counting relay R3110. At its contacts 3131 and 3132, the relay R3130 prepares circuits which respectively include the marking leads M3 and M8 over which the stop relay R3180 may be energized. At its contact 3133, the relay R3130 interrupts the locking circuit for the relay R3120, causing the latter relay to restore. In releasing, the relay R3120 opens its contact 3124 further to interrupt its own locking circuit, closes its contact 3123 to reprepare the locking circuit for the first counting relay R3110, and closes its contact 3126 to reprepare the operating circuit for the relay R3110. At its contacts 3121 and 3122, the relay R3120 opens the prepared circuits including the marking leads M2 and M7 over which the stop relay R3180 may be energized.

When the relay R3250 restores during the third operating cycle of the pulse generating relays, the path short-circuiting the lower winding of the transfer relay R3100 is interrupted at the contact 3254. Incident to this operation, the lower winding of the relay R3100 is energized in series with the third counting relay R3130 from grounded conductor C3198. In operating, the relay R3100 again closes its contact 3102 to reprepare its own locking circuit, and closes its contact 3103 further to prepare the operating circuit for the fourth counting relay R3140. When the relay R3250 operates during the fourth cycle of the three pulse generating relays, it recloses its contact 3254 to again complete the locking circuit for the upper winding of transfer relay R3100, and closes its contact 3253 to complete the prepared operating circuit for the fourth counting relay R3140. The latter circuit may now be traced as extending from the grounded conductor C3199 by way of the contacts 3103, 3135 and the winding of relay R3140 to battery. In operating, the relay R3140 locks to the grounded conductor C3198 through the contacts 3144 and 3153, and closes its contact 3145 to prepare the operating circuit for the fifth counting relay R3150. At its contact 3146, the relay R3140 opens another point in the incomplete operating circuit for the first counting relay R3110. At its contacts 3141 and 3142, the relay R3140 prepares two alternative circuits which respectively include the marking leads M4 and M9 over which the stop relay R3180 may be energized. At its contact 3143, the relay R3140 interrupts the circuit over which the relay R3130 is energized in series with the lower winding of the relay R3100. When this circuit is broken, the relay R3130 restores. In releasing, the relay R3130 opens its contact 3135 to interrupt the operating circuit for the relay R3140, closes its contact 3136 further to prepare the operating circuit for the relay R3110, and closes its contact 3133 to reprepare the locking circuit for the relay R3120. At its contact 3134, the relay A3130 opens another point in its own locking circuit, and at its contacts 3131 and 3132, it opens the prepared circuits which respectively include the marking leads M3 and M8 over which the stop relay R3180 may be energized.

When the relay R3250 restores during the fourth operating cycle of the three pulse generating relays, the locking circuit for the transfer relay R3100 is opened at the contact 3254. The transfer relay now restores and closes its contact 3104 further to prepare the operating circuit for the fifth counting relay R3150.

When the relay R3250 operates during the fifth operating cycle of the three pulse generating relays, the contact 3253 is reclosed to complete the prepared operating circuit for the fifth counting relay R3150, this circuit extending from the grounded conductor C3199 by way of the contacts 3104, 3145, and the winding of relay R3150 to battery. In operating, the relay R3150 locks to the grounded conductor C3199 over a path which includes the contacts 3155 and 3104. At its contact 3154, the relay R3150 completes an obvious circuit for energizing the reflex relay R3160. At its contact 3156, the relay R3150 opens another point in the operating circuit for the relay R3110. At its contact 3151, the relay R3150 prepares a circuit including the marking lead M5 over which the stop relay R3180 may be energized. At its contact 3152, the relay R3150 prepares an alternative circuit for energizing the stop relay. At its contact 3153, the relay R3150 interrupts the above-traced locking circuit for the fourth counting relay R3140. The latter relay now restores and opens its contact 3145, and, at its contact 3144, it opens another point in its own locking circuit. At its contact 3143, the relay R3140 reprepares the locking circuit for the relay R3130. At its contact 3146, the relay R3140 reprepares the operating circuit for the relay R3110. At its contacts 3141 and 3142, the relay R3140 opens the two prepared circuits including the marking leads M4 and M9 over which the stop relay R3180 may be energized.

The reflex relay R3160, upon operating, closes its contact 3161 to complete an obvious path for short-circuiting the winding of the transfer relay R3170. Shortly following the operation of the relay R3160 and during the continued operation of the three pulse generating relays, the relay R3250 restores and opens its contact 3253 to interrupt the locking circuit for the fifth counting relay R3150. In releasing, the relay R3150 opens its contacts 3151 and 3152 to interrupt the prepared operating circuits for the stop relay R3180, and closes its contact 3153 to reprepare the locking circuit for the fourth counting relay R3140. At its contact 3155, the relay R3150 opens another point in its own locking circuit. At its contact 3156, the relay R3150 reprepares the operating circuit for the first counting relay R3110. At its contact 3154, the relay R3150 opens the path short-circuiting the winding of the transfer relay R3170, permitting this winding to be energized in series with the winding of the relay R3160 over a circuit which includes the grounded conductor C3198 and the contact 3161. Current traversing this circuit is sufficient to maintain the reflex relay R3160 operated and to cause the operation of the transfer relay R3170. In operating, the transfer relay R3170 closes its contact 3172 to prepare the five circuits which respectively includes the sixth to ninth marking leads M6 to M9, inclusive, and the contact 3152, over which the stop relay R3180 may be energized. At its contact 3171, the relay R3170 opens a point in the common portion of the five circuits which respectively include the first to fifth marking leads M1 to M5, inclusive, over which the stop relay R3180 may be energized. Following the operation of the transfer relay R3170 and during the continued operation of the three pulse generating relays, the transfer relay R3100 coacts with the five counting relays to count the sixth to tenth impulses of a ten impulse train transmitted by the cyclic operation of the pulse generating relays R3240, R3250 and R3230. The manner in which these relays respond to the operation of the pulse generating relay R3250 during the sixth to tenth operating cycles of the three pulse generating relays is exactly the same as described above with reference to the counting of the first to fifth impulses.

When the fifth counting relay R3150 operates the second time to count the tenth cycle of operation of the three pulse generating relays, it closes its contact 3152 to complete a circuit through the contact 3172 for energizing the stop relay R3180. In operating, the relay R3180 locks to ground over a path including the contacts 3182 and 3242. At its contact 3181, the relay R3180 completes a path including the additional contacts 3201 and 31 for impressing ground potential upon the conductor C2026, thereby to energize the release relay R3300 of the first digit register. At its contact 3183, the relay R3180 completes the prepared operating circuit for the digit space relay R3190, this circuit extending from ground by way of the contacts 3272, 3183, 3206 and the winding of relay R3190 to battery. At its contact 3184, the relay R3180 opens a point in an incomplete locking circuit for the two digit space relays R3190 and R3200. At its contact 3185, the relay R3180 opens a point in the operating circuit for the relay R3200. At its contact 3186, the relay R3180 interrupts the previously traced operating circuit for the pulse generating relay R3240.

The relay R3190, upon operating, closes its contact 3191 to complete an obvious multiple circuit for maintaining the start sending relay R3280 energized. At its contact 3192, the relay R3190 prepares the locking circuit for itself and the relay R3200. At its contact 3194, the relay R3190 prepares the operating circuit for the stop send relay R3220. At its contact 3197, the relay R3190 opens a multiple point in the common portion of the previously traced operating circuit for the five counting relays. At its contact 3193, the relay R3190 prepares the operating circuit for the relay R3200. At its contact 3196, the relay R3190 disconnects the locking conductor C3198 from ground. At its contact 3195, the relay R3190 prepares an alternative path for impressing ground potential upon this locking conductor.

When the locking conductor C3198 is disconnected from ground, the locking circuit for the relays R3160 and R3170 is opened, causing the two relays R3160 and R3170 to restore. Thus the relays of the counting network are all released.

During the final portion of the tenth operating cycle of the three pulse generating relays, the relay R3240 restores and opens its contact 3242 to interrupt the locking circuit for the stop relay R3180. The relay R3180 now restores and opens its contact 3181 to disconnect the conductor C2026 from ground and thus interrupt the operating circuit for the release relay R3300 of the first digit register. At its contact 3182, the relay R3180 opens another point in its own locking circuit. At its contact 3186, the relay R3180 reprepares the operating circuit for the pulse generating relay R3240. At its contact 3185, the relay R3180 completes the prepared operating circuit for the digit space relay R3200, this circuit extending from ground by way of the contacts 3272, 3185, 3193, and the lower winding of relay R3200 to battery. At its contact 3184, the relay R3180 completes a circuit for energizing the upper winding of the relay R3200 in series with the relay R3190, this circuit extending from ground by way of the contacts 3272 and 3184, the upper winding of relay R3200, the contact 3192, and the winding of relay R3190 to battery. After the last-mentioned circuit is completed, the relay R3180 opens its contact 3183 to interrupt the initial operating circuit for the relay R3190.

The relay R3200, upon operating, opens its contact 3206 further to interrupt another point in the initial operating circuit for the relay R3190, and closes its contact 3205 to prepare a locking circuit for itself. At its contact 3201, the relay R3200 opens another point in the above-traced path for impressing ground potential upon the conductor C2026. At its contact 3202, the relay R3200 prepares a circuit including the marking lead M7 for energizing the stop relay R3180 during the operation of the counting relays and the pulse generating relays to measure an interdigit spacing interval between the first and second digits. At its contact 3203, the relay R3200 removes ground from the common marking conductor C2028 and the locking circuit for the tone control relay R3210, which relay restores and, at contact 3213, removes ground from the tone control conductor C2037. At its contact 3207, the relay R3200 shunts the pulsing contact 3252 of the pulse generating relay R3250, thereby to prevent current pulses from being transmitted over the impulsing conductors C2035 and C2036 during the interdigit spacing interval. At its contact 3209, the relay R3200 opens another point in the initially traced path for impressing ground potential upon the pulsing and locking conductors C3198 and C3199. At its contact 3208, the relay R3200 connects the conductor C3198 to ground over an alternative path which includes the contacts 3195, 3221, 3208 and 3274, and prepares an alternative path for connecting the pulsing conductor C3199 to ground through the contact 3253 of the impulse generating relay R3250. At its contact 3204, the relay R3200 interrupts the initial energizing circuit for the tone relay R3210, thereby preventing the relay R3210 from reoperating when the contact 3242 of pulse generating relay R3240 is closed.

The removal of the marking ground from conductor C2028 removes the marking ground from the marking leads M1 to M9 respectively as determined by the energized condition of the code digit relays A1, B1, C1 and D1 of the first digit register.

Following the operation of the relay R3200, the three pulse generating relays, operating in conjunction with the relays of the counting network, function to measure the inter-digit spacing interval. In this regard it will be noted that the impulse sender has at this time completed its operation to produce ten impulses which are repeated by the relay R3250 over the pulsing conductors C2035 and C2036 to the line relay R2340 of the call switch 2380. More specifically, during each cycle of operation of the pulse generating relays, the relay R3250 is operated for an interval, and during this interval the previously traced circuit of line relay R2340 including the conductors C2035 and C2036 is opened at the contact 3252. Accordingly, a train of ten impulses is transmitted to the line relay R2340 of the call switch 2380 during the operation of the impulse sender 3100A to transmit the digit "0" as registered in the first digit register.

From the foregoing explanation of the operation of the register sender 3100 to transmit the digit "0" it should be understood that the code relays A1, B1, C1 and D1 would not be operated to mark any of the marking leads M1 to M9, inclusive, and that the reoperation of counting relay R3150 causes the operation of the stop relay R3180 as explained. However, with the code relays B1 and C1 energized to mark the marking lead M4, indicating that the digit 4 was registered, the first operation of counting relay R3140, at the end of the fourth impulse transmitted over the conductors C2035 and C2036, completes a circuit for operating the stop relay R3180. In the latter case the inter-digit spacing interval starts immediately after the stop relay R3180 energizes. From the foregoing it will be understood that the stop relay R3180 will be energized as soon as one of the counting relays completes a circuit therefor over one of the marking leads M1 to M9, inclusive, under control of the operated condition of one or two of the digit code relays, to initiate the inter-digit spacing interval.

As pointed out in the above explanation, the conductor C2026 is connected to ground during the interval when the stop relay R3180 is energized, i. e., that interval immediately following the transmission of the ten impulses comprising the first digit. It will also be recalled that when the relay R3200 operates, the marking lead C2028 is disconnected from ground in the impulse sender 3100A, thereby to prevent marking ground potential from being impressed upon any one of the nine marking leads M1 to M9, inclusive, over a path including this lead and the marking contacts controlled by the code relays of the first register. When the conductor C2026 is connected to ground, the relay R3300 is energized in an obvious circuit, and closes its contacts 3301 to short-circuit the winding of the sequence relay R3310 over a path which includes the contacts 3344, the conductor C2030 and the upper winding of the transfer relay R3260 and the contact 3271 to ground. Thereafter and when the stop relay R3180 releases, the path short-circuiting the sequence relay R3310 is opened at the contacts 3181, permitting this relay and the upper winding of the transfer relay R3260 to be energized in series with the relay R3300 in a circuit which extends from ground by way of the contacts 3271, the upper winding of R3260, conductor C2030, contact 3344, the winding of R3310, contact 3301, and the winding of R3300 to battery. When energized in this circuit, the relay R3310 closes its contacts 3315 to prepare a path from the marking lead C2029 through the marking contacts of the code relays in the second register for impressing ground potential upon the one of the marking leads M1 to M9, inclusive, which corresponds to the setting of the code relays in this register. At its contact 3313, the relay R3310 prepares the operating circuit for the release relay R3330. At its contacts 3314, the relay opens a point in the locking circuit for the sequence and release relays provided in the ninth and last register, causing these relays to restore if operated. At its contacts 3312, the relay R3310 deenergizes the transfer relay R3320 and the operated one or ones of the four code relays A1, B1, C1 and D1 in the first register. At its contacts 3311, the relay R3310 prepares one of the previously mentioned multiple circuits over which the connect relays of the various registers may be energized.

The transfer relay R3320, in releasing, opens its contact 3321 to interrupt one of the multiple circuits for energizing the hold relay R3290. At its contact 3323, the relay R3320 opens the initially traced circuit for energizing the connect relay of the second and succeeding registers. At its contact 3322, the relay R3320 reprepares the operating circuit for the connect relay R3370. The operated one or ones of the code relays A1, B1, C1 and D1, in restoring, function to open the established marking path through the marking contacts of these four relays and also further to interrupt their respective locking circuits. From the above explanation it will be understood that the release and sequence relays R3300 and R3310 of the first register are operated immediately following the transmission of the first digit by the impulse sender 3100A. These relays remain operated until they are released under the control of the sequence relay in the second register or until the hold lead C2030 is disconnected from ground in the impulse sender 3100A.

As indicated above, the upper winding of the transfer relay R3260 is energized in series with the two relays R3300 and R3310 incident to the operation of the stop relay R3180 to disconnect the conductor C2026 from ground. When thus energized, the relay R3260 closes its preliminary make contacts 3266 to complete a locking circuit for itself which includes its lower winding and the contacts 3271. After this locking circuit is completed, the relay R3260 closes its contacts 3265 to short-circuit its upper winding and thus increase the current flow through the series connected relays R3300 and R3310. At its contacts 3267, the relay R3260 disconnects the conductor C2031 from ground, thereby to interrupt the circuit initially provided for energizing the connect relays of the various registers. At its contact 3261, the relay R3260 opens another point in the path for impressing ground potential upon the conductor C2026. At its contact 3262, the relay R3260 prepares a path for impressing ground potential upon the conductor C2027. At its contact 3263, the relay R3260 opens another point in the previously traced path for impressing ground potential upon the marking conductor C2028. At its contact 3264, the relay R3260 prepares a path for impressing ground potential upon the marking conductor C2029. Thus following the operation of the transfer relay R3260, the control of the marking paths through the marking contacts of the code relays in the second and succeeding registers is transferred from the marking conductor C2028 to the marking conductor C2029, and control of the sequence and release relays in the different registers is transferred from the conductor C2026 to the conductor C2027.

As indicated above, the relay R3200, upon operating, reprepares the operating circuit for the relays of the counting network and recloses the circuit over which the pulse generating relay R3240 may be energized. Accordingly, operation of the three pulse generating relays and the relays of the counting network is again initiated. After seven operating cycles of the three pulse generating relays R3230, R3240 and R3250 are counted through operation of the counting relay network, the relays R3170 and R3120 are energized in the manner previously explained. The relay R3120, upon operating, completes the prepared circuit for energizing the stop relay R3180, this circuit extending from ground by way of the contact 3202, the seventh marking lead M7, the contacts 3121 and 3172, and the winding of R3180 to battery. In operating, the relay R3180 locks to ground through the contacts 3182 and 3242, and closes its contacts 3183 to complete an alternative locking circuit for the relay R3200, this circuit extending from ground by way of the contacts 3272, 3183 and 3205 and the lower winding of R3200 to battery. At its contacts 3181, the relay further prepares the above-mentioned path for impressing ground potential upon the transfer conductor C2027. At its contacts 3184 and 3185, the relay R3180 opens the initially completed operating and locking circuits for the two relays R3190 and R3200. The relay R3190 now restores and opens its contacts 3191 to interrupt the multiple circuit for maintaining the start sending relay R3280 energized. At its contacts 3192, the relay R3190 opens another point in the locking circuit for itself and the relay R3200. At its contacts 3193, the relay R3190 opens another point in the operating circuit for the relay R3200. At its contacts 3194, the relay R3190 opens the prepared operating circuit for the stop relay R3220. At its contacts 3197, the relay R3190 reprepares a multiple point in the common portion of the operating circuit for the five counting relays of the counting network. At its contacts 3195, the relay R3190 disconnects the locking conductor C3198 from ground, thereby to deenergize the operated relays R3120, R3160 and R3170 of the counting network. At its contacts 3196, the relay R3190 reprepares the initially completed path for connecting the conductor C3198 to ground. When the three relays R3120, R3160 and R3170 restore, the operating circuits for the stop relay R3180 is opened and the counting network is conditioned to count the impulses of the second digit as registered in the second digit register shown in Fig. 33 of the drawings.

Shortly after the counting relay network is released, and when the seventh operating cycle of the three pulse generating relays is completed, the relay R3240 restores to interrupt the locking circuit for the stop relay R3180. In releasing, the relay R3180 opens its contacts 3183 to deenergize the relay R3200. At its contacts 3181, the relay R3180 opens the prepared path for impressing ground potential upon the transfer conductor C2027. At its contacts 3184 and 3185, the relay R3180 reprepares the previously traced operating and locking circuits for the relays R3190 and R3200. At its contacts 3186, the relay R3180 reprepares the operating circuit for the pulse generating relay R3240.

The relay R3200, in releasing, closes its contacts 3206 further to prepare the operating circuit for the relay R3190, and opens its contacts 3205 further to interrupt its own locking circuit. At its contacts 3207, the relay R3200 opens the path shunting the pulsing springs 3252 of the pulse generating relay R3250, thereby to condition the impulse sender to transmit the impulse or impulses of the second digit over the pulsing leads C2035 and C2036 to the call switch 2380 or a succeeding switch. At its contacts 3209, the relay R3200 completes the initially traced path for impressing ground potential upon the locking conductor C3198 and reprepares the initially traced operating circuits for the five counting relays of the counting network. At its contacts 3201, the relay R3200 further prepares the path for connecting the transfer conductor C2027 to ground. At its contacts 3202, the relay R3200 disconnects the seventh marking lead M7 from ground. At its contacts 3203, the relay R3200 connects the marking conductor C2029 to ground, thereby to complete a path through the contacts 3315 and the marking contacts of the code relays in the second register, for impressing ground potential upon the one of the digit marking leads M1 to M9, inclusive, which corresponds to the setting of the indicated code relays. At its contacts 3204, the relay R3200 again completes the operating circuit for the tone control relay R3210.

From the foregoing explanation it will be understood that when the relay R3200 restores at the end of the inter-digit spacing interval, operation of the impulse sender 3100A to transmit the impulses of the second digit as registered in the second digit register is immediately started, and that a marking path is completed through the marking contacts of the code relays in this register for stopping the counting network of the impulse sender after the number of impulses corresponding to the setting of the second register have been transmitted by the sender. Further to consider the manner in which the counting relays of the impulse sender are controlled, it may be assumed that the digit "4" is registered in the second digit register, such that the code relays B2 and C2 are operated therein. With these two code relays operated a path is completed for impressing ground potential upon the fourth marking lead M4, which includes the contacts 3272, 3203, and 3264, the common marking conductor C2029, the contacts 3315, and the next to inner make contacts of the two relays B2 and C2. With the marking lead M4 connected to ground, the stop relay R3180 of the impulse sender is energized in a circuit which includes this lead and the contacts 3142 and 3171 when the fourth counting relay R3140 operates. The stop relay R3180, upon reoperating, again completes the operating circuit for the digit space relay R3190. In closing its contacts 3181, the relay R3180 also connects the transfer conductor C2027 to ground, thereby to complete a circuit through the contacts 3313 for energizing the release relay R3330 of the second register. From this point on the manner in which the relays of the impulse sender 3100A operate to measure a spacing interval between the second and third digits is exactly the same as described above.

In this regard it will be recalled that the two relays R3190 and R3200 remain operated throughout the spacing interval and restore at the end of this interval. It will also be recalled that the stop relay R3180 is deenergized during the initial portion of the spacing interval and restores to disconnect the transfer conductor C2027 from ground. Incident to the operation of the relay R3200, the contacts 3203 are opened to disconnect the marking conductor C2029 from ground and thus remove ground potential from the fourth marking lead M4. Thus the established marking path through the marking contacts of the four code relays in the second register is broken. Also, incident to the operation of the relay R3200, the circuit for holding the relay R3210 is opened at the contacts 3203 to disconnect this relay from ground. In releasing, the tone relay R3210 disconnects the conductor C2037 at the contacts 3213.

When the release relay R3330 is energized, it locks to the grounded conductor C2030 through its contact 3331, the winding of sequence relay R3340, and the contact 3414, and in so doing short-circuits the winding of the sequence relay R3340. When shortly thereafter the stop relay R3180 restores to disconnect the transfer conductor C2027 from ground, the path short-circuiting the winding of the sequence relay R3340 is opened, permitting this relay to be energized in series with the release relay R3330. When thus energized the relay R3340 operates to deenergize the transfer relay R3350 and the two code relays B2 and C2 of the second register. At its contacts 3343, the relay R3340 prepares the operating circuit for the release relay R3400 of the third register. At its contacts 3341, the relay R3340 prepares the above-described alternative operating circuits for the connect relays of the third and succeeding registers. At its contacts 3345, the relay R3340 prepares a path from the marking conductor C2029 through the marking contacts of the code relays in the third register for impressing ground potential upon the one of the marking leads M1 to M9, inclusive, which corresponds to the setting of the third register. At its contacts 3344, the relay R3340 opens the circuit of the series connected release and sequence relays R3300 and R3310 of the first register and these relays restore. At the end of the inter-digit spacing interval, the two relays R3190 and R3200 are deenergized and restore in the manner previously explained. Incident to the release of the relay R3200, operation of the three pulse generating relays and of the relays in the counting network is again initiated. Also incident to the release of the relay R3200, the contacts 3203 are closed to reconnect the marking conductor C2029 to ground, whereby ground potential may be impressed upon one of the nine marking leads MI to M9, inclusive, through the marking contacts of the code relays in the third register. From this point on the manner in which the remaining digits registered in the digit registers 3100B are transmitted by the impulse sender 3100A is exactly the same as described above, it being pointed out in this regard that the release and sequence relays of the digit registers are successively operated at the end of the successive digits for the purpose of rendering the counting network of the impulse sender successively controllable by the code relays of the different registers.

*Delay between digits*

As the call is extended from the link 2100 through the call switch 2380 and succeeding switches of a toll or local train, a switching stage may be reached at which a delay between digits is required which is greater than the normal inter-digit spacing interval. For example, if the call is to be extended over a toll train through a level hunting selector in a distant toll office, a time interval exceeding the normal spacing between the digits is necessary to permit the level hunting selector to complete its required function. Again, if the call is routed to a switching stage at which a line finder must operate to seize a trunk circuit occupied with the call, a time interval exceeding the normal inter-digit spacing interval may be required in order to permit the finder to find and seize the trunk circuit. In a case of this character, a signal is transmitted back through the switch train to the sender control circuit 2600, which results in the conductor C2034 being connected to ground. This signal will be received and ground potential applied to the conductor C2034 during the spacing interval between digits, i. e., at a time when the digit spacing relays R3190 and R3200 are operated. When ground is applied to the conductor C2034, the stop send relay R3220 is energized in a circuit which includes this lead and the contacts 3194. In operating, the relay R3220 opens its contacts 3222 and 3221 to disconnect the two conductors C3199 and C3198 from ground, and to interrupt the operating circuit for the pulse generating relay R3240. Accordingly, when the ensuing cycle of operation of the three pulse generating relays is completed, these relays remain in their respective restored positions. When ground potential is removed from the two conductors C3198 and C3199, the operated relays of the counting network are released. Thus the impulse sender 3100A is locked up to prevent the transmission of additional impulses until such time as the stop send relay R3220 is released.

A predetermined interval after the delay or stop-send signal transmitted to the sender control circuit 2600 is terminated, the relays of this circuit function to disconnect the conductor C2034 from ground, thereby to deenergize the stop-send relay R3220. This relay, in restoring, recloses its contacts 3221 and 3222, thereby to reinitiate the operation of the three pulse generating relays and the relays of the impulse counting network. In this regard it is noted that the operation of the indicated relays to measure a complete spacing interval is started anew when the stop send relay R3220 restores. In other words, seven cycles of operation of the three pulse generating relays must be completed before the impulse sender is conditioned to transmit the impulses of the next digit over the two pulsing conductors C2035 and C2036.

RELEASING THE SENDER CONTROL CIRCUIT, THE IMPULSE SENDER AND THE DIGIT REGISTERS

It will be recalled that as each digit registered in the digit registers 3100B was transmitted by the register sender 3100, the transfer relays were in turn restored to normal. As each transfer relay restored to normal, it removed the ground potential applied to conductor C2033 from the hold conductor C2032, and, accordingly, when the last digit register transfer relay restored to normal, ground potential was no longer applied to the hold conductor C2032. As a result thereof, the hold relay R3290 restored to normal. At contact 3292, relay R3290 again places the shunt around the lower winding of the start relay R3270 to again increase the current flow over conductor C2038. Furthermore, at contact 3291, relay R3290 opens the energizing circuit of the start sending relay R3280. When the start sending relay R3280 restores to normal, at contact 3281 it opens the initial energizing circuit for the pulse generating relay R3240. Under these circumstances it will be understood that in the event that it is necessary for the operator at position 1300 to key up further digits in the register sender, further operation of the digit registers may be accomplished. In other words, although the digit registers have cleared out all of the digits registered therein and have caused the release of relays R3290 and R3280, the operator may key further digits into the digit registers.

After the operator attending position 1300 has manipulated the keys of the key set KS1350 to set up all the digits necessary to extend a connection to its destination, she may actuate the sender disconnect key K1390. As a result of the operation of key K1390, ground potential is applied to conductor C2513 for a purpose which will be described hereinafter, and ground potential is applied to conductor C2055 to the sender control circuit 2600 and contact 2725 to energize the upper winding of sender disconnect relay R2710. In operating, relay R2710 locks to ground through its preliminary make contact 2712 and contact 2751. At contact 2711, relay R2710 extends the ground received over conductor C2055 to conductor C2061 in order to control the sender alternator comprising relays R1320 and R1330, as will be described hereinafter; at contact 2715, relay R2710 opens another point in the circuit for grounding conductor C2045; at contact 2716, it connects ground by way of contact 2734 to the winding of start relay R2730 to maintain the latter relay energized even though the initial energizing circuit therefor is disconnected at contact 2717; at contact 2718, relay R2710 connects the grounded winding of the cut-in relay R2640 to conductor C2043, while, at the same time at contact 2719, it disconnects the direct ground from conductor C2043; at contact 2710', relay R2710 places a shunt around the circuit of cut-through relay R2720, causing the latter relay to deenergize.

Cut-through relay R2720, upon deenergizing, at contact 2729 opens the energizing circuit of relay R2610, whereupon the latter relay restores and at contacts 2611 and 2612 disconnects the circuit over which dial tone is transmitted to the operator when a connection is established to an automatic exchange. At contact 2727, relay R2720 removes ground from conductor C2054 to extinguish the sender control #1 lamp L1990 at the operator's position to indicate to her that the sender disconnect key K1390 has been operated and that therefore no more digits may be registered in the register sender 3100; at contact 2726, relay R2720 disconnects battery potential from the upper winding of the override busy relay R2660; and, at contact 2725 it opens the initial energizing circuit for the upper winding of sender disconnect relay R2710. At contacts 2721, 2722, 2723 and 2724, relay R2720 disconnects the code leads A, B, C and D extending to the operator's keyset KS1350 from the code leads A1, B1, C1 and D1 extending by way of the sender finder 2900 to the register sender 3100.

As has been pointed out previously, the complete transmission of all the registered digits in the digit register 3100B causes the high resistance winding of the start relay R3270 in the register sender 3100 to be shunted out of the circuit including the conductor C2038. The increased flow of current over conductor C2043 in the sender control circuit 2600 causes the cut-in relay R2640 to energize. It should be understood, however, that relay R2640 will not energize in the event that the high resistance lower winding of start relay R3270 has not been shunted out of the circuit. Therefore, relay R2640 only operates after the digit registers 3100B have cleared out. At contact 2648, relay R2640 connects the winding of the test relay R2650 across the conductors C2063 and C2064, and simultaneously therewith, at contact 2649 it disconnects the conductor C2040 from conductor C2064. Since all of the impulses indicative of the digits registered in the digit registers 3100B have been transmitted, the disconnection of conductor C2040 cannot interfere with impulse transmission. At contact 2643, relay R2640 prepares a circuit for the cut-in conductor C2053, and, at contact 2642, opens another point in the circuit of conductor C2045. At contact 2644, relay R2640 prepares an additional holding circuit for the start relay R2730, which circuit is only effective after the restoration of sender disconnect relay R2710, and, at contact 2645, it opens another point in the circuit including conductor C2046. At contact 2646, relay R2640 connects battery through a resistance to conductor C2059, and, at contact 2647, it disconnects the upper winding of the blocked send relay R2680. At contact 2641, relay R2640 opens the circuit of supervisory relay R2690.

It may be well to point out at this time that the bridging of relay R2650 across the conductors 2063 and 2064 prevents the release of supervisory relay R2690, and the subsequent operation of the cut-in relay R2240 in the operator link 2100, if the trunk over which the connection is extended is not dry; that is, relay R2650 will operate from battery on the trunk conductors, and at contact 2652 completes a multiple circuit for the supervisory relay R2690 to prevent its deenergization at the time contact 2641 is open.

Assuming that the trunk over which a connection is completed is not cut dry at the time cut-in relay R2640 energized, relay R2650 operates, and at contact 2653, opens a point in the circuit of the cut-in conductor C2053; at contact 2654, it prepares an operating circuit for the upper winding of blocked send relay R2680; and, at contact 2652, it closes a circuit for supervisory relay R2690 to maintain this relay energized until the trunk is cut dry. It will be noted that one of the springs of contact 2651 is a weighted spring and, therefore, when the relay R2650 energizes, the weighted spring will vibrate for a period of time before the contact 2651 will remain closed. After the vibration period has elapsed and contact 2651 closes, supervisory relay R2670 will operate from ground at contact 2752, contact 2651, winding of supervisory relay R2670, to battery. Under ordinary circumstances, the relay R2650 will not remain operated long enough to permit the vibrating contact 2651 to come to rest and close the above described circuit for relay R2670. However, in the event that the relay R2650 should remain operated for an unusually long period causing the operation of supervisory relay R2670, a 120IPM interrupter circuit is completed by way of contacts 2692, 2672, conductor C2060, contact 2258 of the operated sender #1 connect relay R2250, contact 2163', link busy lamp L2124, to battery. In addition to the above circuit for flashing the link busy lamp L2124, another circuit is completed by way of contact 2692 and contact 2675 of the energized supervisory relay R2670, conductor C2054, extending to the sender control #1 lamp L1990, causing this lamp to flash 120IPM. If the operator at position 1300 has not restored the link talk key K2225, relay R2160 will still be energized, and, accordingly, the above traced circuit for flashing the busy lamp L2124 cannot be completed. However, the circuit for flashing the sender control #1 lamp L1990 will be extended as described, causing the sender control lamp to flash. Since the operator notes the flashing condition of the sender control lamp, she knows that there is a blocked condition in the sender control circuit preventing the completion of the attempted connection, and she also knows from the operated condition of the talk key K2225 the particular link circuit that she is operating upon. In the latter case, there is no necessity of flashing the busy lamp L2124 of the link circuit because the operator is aware of the particular link being used. However, if the operator had restored the talk key K2225, relay R2160 would also have been deenergized to complete the above described circuit for the busy lamp L2124. Under these conditions, both the busy lamp L2124 and the sender control #1 lamp L1990 will flash, the former to indicate to the operator the particular link involved, and the latter to indicate the particular sender control circuit upon which a blocked condition has been encountered.

Assuming now that the test relay R2650 failed to encounter a trunk which was not dry or has restored to normal because the particular trunk has become dry before the supervisory relay R2670 operated. In this event, the restoration of relay R2650 prepares a circuit for the cut-in conductor C2053 at contact 2653. At contact 2654, it opens a point in the incomplete operating circuit for relay R2680, and, at the same time, removes battery through the resistance from conductor C2059 over a multiple path. At contact 2652, it opens the circuit of supervisory relay R2690, and since the vibrating contact 2651 has not come to rest, relay R2670 will not energize.

Upon restoring, supervisory relay R2690, at contact 2693, opens a point in the circuit of the 60IPM conductor C2683; at contact 2692 it opens a point in the circuit of the 120IPM conductor; at contact 2691 it opens the circuit of the cut-in relay R2750; and at contact 2694 it completes a circuit for the automatic ring relay R2630 from conductor C2052. The circuit operations which take place as a result of the operation of the automatic ring relay R2630 will be described hereinafter.

As a result of the opening of the circuit of relay R2750, the relay slowly restores to normal, and when it completely restores it prepares another point in the circuit of the cut-in conductor C2053 at contact 2753. At contact 2756 it opens the previously mentioned circuit for the automatic ring relay R2630; at contact 2754 it removes ground from the operating circuit of relay R2680; at contact 2751, it opens the locking circuit of sender disconnect relay R2710; and at contact 2755, it removes ground potential from the winding of the cut-through relay R2720 and also from conductor C2044. The removal of ground from conductor C2044 opens the locking circuit for connect relay R2910 of the sender finder 2900, which relay restores to normal and severs all the connections extending from sender control circuit 2600 to the register sender 3100.

The restoration of the connect relay R2910 at contact 2911' removes the shunting ground from the remaining connect relays in the group, so that the sender finder 2900 may be operated again to connect the sender control circuit 2600 to another register sender such as register sender 3100. Also, as a result of the deenergization of connect relay R2910, the circuit for maintaining the start relay R3270 in the register sender 3100 is opened, and the relay restores to normal. At contact 3275, relay R3270 removes ground from conductor C2033, whereupon the operated first register sender busy relay R3050 is restored to normal, indicating to the sender finder 2900 that the register sender 3100 may again be seized by another sender control circuit.

When the locking circuit for sender disconnect relay R2710 is opened at contact 2751 responsive to the deenergization of the cut-in relay R2750, at contact 2715 it completes a circuit for grounding the cut-in conductor C2053 from ground, contacts 2728, 2715, 2643, 2653, 2753, conductor C2053; at contact 2710' relay R2710 opens the short circuit of relay R2720; at contact 2718 it opens the circuit of the cut-in relay R2640; it opens a multiple circuit for maintaining start relay R2730 energized, at contact 2716, and simultaneously therewith completes a start holding circuit for relay R2730 from ground, contacts 2734, 2644, 2717, and the winding of relay R2730; at contact 2712 relay R2710 opens the locking circuit for its lower winding; and, at contact 2711 it disconnects conductor C2055 from conductor C2061.

The ground potential applied to conductor C2053 causes the operator link circuit 2100 to connect the front and rear ends thereof together. In addition, relay R2620 of the sender control circuit 2600 is energized from the grounded conductor C2053 over a circuit including both of its windings in series. At contact 2622, relay R2620 short-circuits its upper winding in order to make the relay slow-to-release; and, at contact 2621, it opens another point in the circuit of conductor C2046.

Cut-in relay R2640, which is a slow-to-release relay, now restores, and at contact 2643, removes ground from the cut-in conductor C2053, thereby opening the initial energizing circuit of relay R2620. At contact 2644, relay R2640 opens the circuit start relay R2730, and, at contact 2641, it prepares a circuit for supervisory relay R2690. At contact 2646, relay R2640 removes battery through the resistance from the conductor C2059; at contact 2648 it disconnects the test relay R2650 from conductors C2063 and C2064; and, at contact 2649, it connects conductors C2063 and C2064 through to conductors C2041 and C2040, respectively. Start relay R2730, upon deenergizing, opens the circuit of conductor C2050 at contact 2731; it removes its holding ground at contact 2734; and, at contact 2733, it disconnects conductor C2045.

Upon the restoration of relay R2620, contact 2621 is again closed to condition the sender control circuit to be again used in another connection. It should be understood, however, that since the operator position 1300 is provided with two sender control circuits 2600 and 2800, they are used alternately under control of the sender alternator comprising relays R1320 and R1330, as will be explained hereinafter. Therefore, the sender control circuit 2600, although being restored to normal and available for use, is not seized for the first connection to be set up by the operator at position 1300, because the sender alternator will function to cause the sender control circuit 2800 to be used for the next successive call.

COMPLETION OF THE CONNECTION THROUGH THE LINK 2100

As indicated above, after the operator receives the desired information as to the destination of the call from the toll operator at the distant toll switchboard 201, she sets up the number of the called line on the keyset KS1350 and operates the sender disconnect key K1390 in order to condition the sender control circuit 2600 to be dismissed after all of the digits registered in the digit registers 3100B have been transmitted by the register sender 3100. Furthermore, since the call being described is one which is to be established to a local subscriber in the central office 100 and the supervision and ticketing of the call is under control of the toll operator at the distant toll switchboard 201, the operator at position 1300 may disconnect from the call by restoring the talk key K2225, individual to the operator link 2100.

Assuming that the operator at position 1300, after keying up the digits on the keyset KS1350, restores the talk key K2225 to normal. As a result of the restoration of key K2225, the circuit for relay R1710 is opened at contact four of the talk key K2225. Relay R1710 restores to normal, and at contact 1712 removes the locking ground for the lower winding of the disconnect relay R1450. Relay R1450 restores to normal, and at contact 1453 opens the series circuit including talk relay R1460 and the lower winding of connect relay R2210. Relays R2210 and R1460 restore to normal; the latter relay, at contact 1467, completes the circuit over conductors 111 and 112 to indicate to the chief operator at position 2530 that the operator at position 1300 has restored her talk key K2225, and that the operator is now idle and available for additional calls.

When the connect relay R2210 restores to normal, at contacts 2212 and 2216 it disconnects the talking conductors of the answer switch 2180 from conductors C2089 and C2090, respectively, from the operator's position circuit; and, at contacts 2211 and 2215, it terminates the talking conductors of the answer switch 2180 in the line terminating and pad control network comprising resistances 2280 to 2283, inclusive, and the bridging condenser 2284. At contacts 2214 and 2218, relay R2210 prepares a circuit for extending the talking conductors to the answer switch 2180 through to the contacts 2242 and 2244 of the non-operated cut-in relay R2240. At contacts 2219 and 2211', relay R2210 disconnects conductors C2095 and C2081 extending to Figs. 19 and 16, respectively, which operation has no function at the present time. At contact 2212', relay R2210 opens a point in the circuit including conductor C2096; and, at contact 2213', it disconnects conductor C2077' from its lower winding. At contact 2214', relay R2210 opens the circuit of start relay R2160, thereby causing the latter relay to restore to normal. At contact 2215', relay R2210 removes ground from conductor C2079, causing the restoration of relay R1630 in the operator's position circuit.

It will be recalled that the toll line pad in the ring down toll line circuit 250 has been maintained connected to the talking conductors of the toll line 251, due to the application of ground potential to the talking conductors C254 and C255, to maintain the pad control relay R340 operated from the retard coil RT (Fig. 14) of the operator's position equipment. When the connect relay R2210 is deenergized as a result of the restoration of the talk key K2225, the ground potential applied to the talking conductors C254 and C255 is removed from the retard coil in the operator's position equipment and is now connected to conductors C254 and C255 by way of contacts 2211 and 2215 of the deenergized connect relay R2210, contacts 2241 and 2243 of the deenergized cut-in relay R2240, resistances 2281 and 2283, 2280 and 2282, to ground. Therefore, the pad control relay R340 in the ring down toll line circuit 250 is maintained energized from the answer switch 2180 after the operator at position 1300 disconnects her position equipment from the link circuit 2100.

As a result of the restoration of start relay R2160, contact 2162' is opened to remove the flashing condition from busy lamp L2124, and at contact 2163' prepares a circuit for busy lamp L2124 so that it may be controlled from the sender control circuit 2600. At contact 2162, relay R2160 disconnects the circuit including wiper 2104 and contact 2133 from the conductor C2094, and, at contact 2163, extends this circuit to the rear supervisory lamp L2275 by way of the winding and contact on relay R2270. At contact 2165, relay R2160 opens the circuit of the identity lamp; at contacts 2169 and 2161', it opens the initial energizing circuits of the sender #1 and sender #2 connect relays R2250 and R2260, respectively; at contacts 2166 and 2167, relay R2160 disconnects the front supervisory lamp L2123 from under control of the operator's position equipment; and, at contact 2168, it connects the front supervisory lamp L2123 directly to contact 2247 of the cut-in relay R2240. Under these conditions, the only relays remaining operating in the answer switch 2180 are relays R2130 and R2140.

The restoration of the rear connect relay R1630 conditions the operator's position equipment for use in another call as soon as she operates a talk key, similar to key K2225, associated with another idle operator's link circuit.

OPERATION OF THE CALL SWITCH 2380

The setting up of the connection responsive to the transmission of the impulses of the digits registered in the digit registers 3100B by the sender 3100 will now be described.

Figure 24:
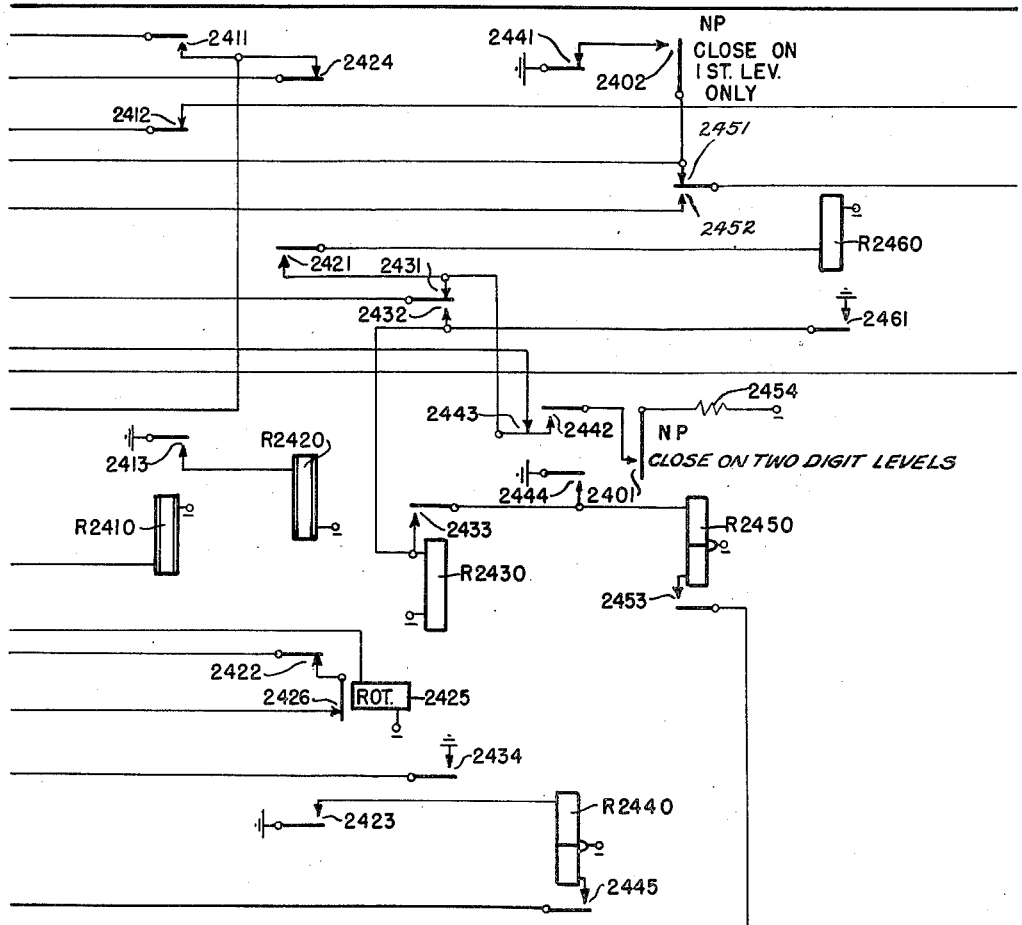
Figure 25:
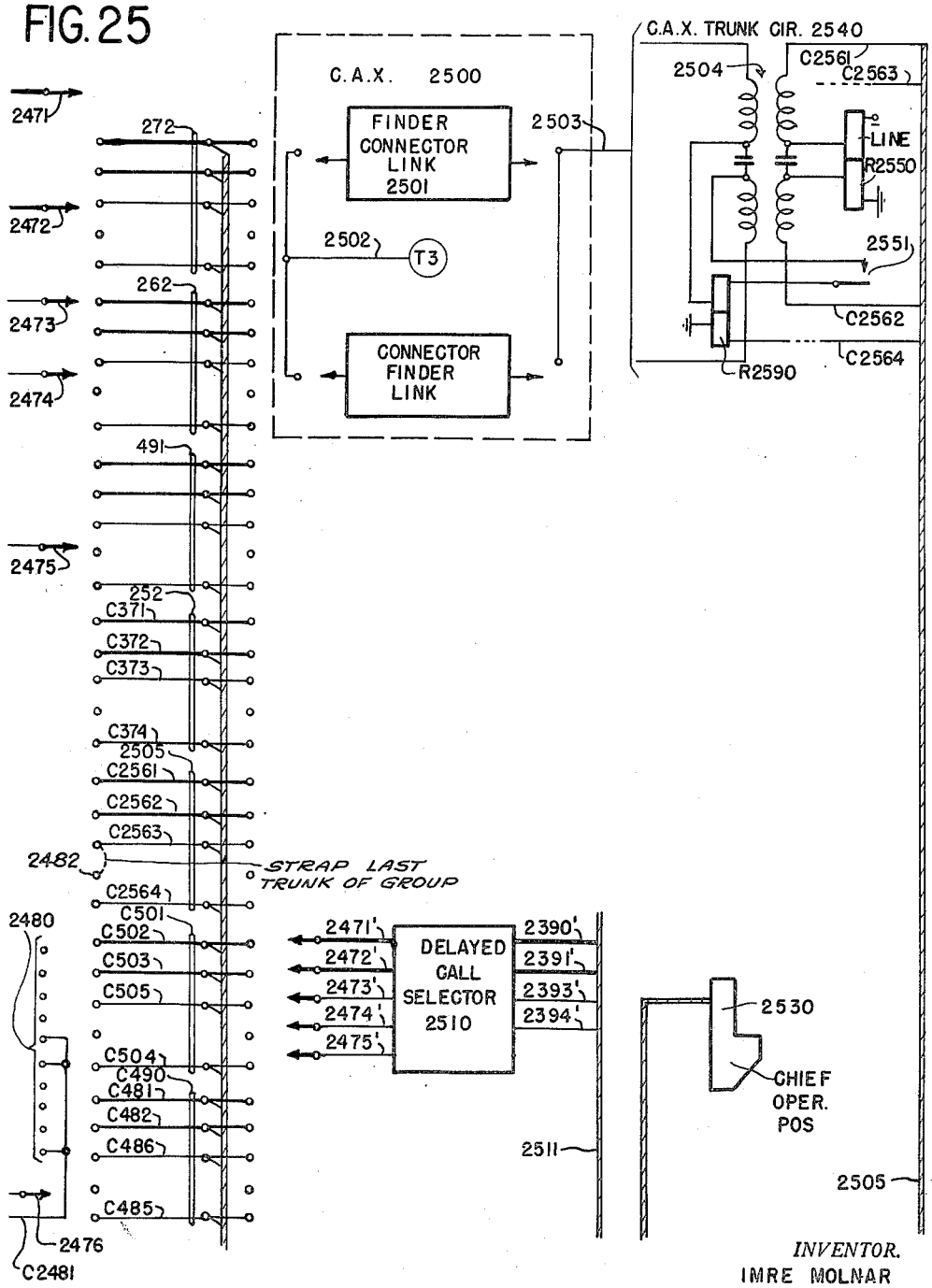

Referring now to the call switch 2380, Figs. 23 and 24, it will be recalled that series relay R2360 operated responsive to the application of ground potential to conductor C2393 at contact 2254 of the operated sender #1 connect relay R2250. In operating, series relay R2360 prepares a circuit for its lower winding and the vertical magnet 2380 in multiple at contact 2364. It opens a point in the circuit for relay R2410 and the rotary magnet 2425 at contact 2365.

It will also be recalled that the circuit for the line relay R2340 was completed over a circuit including a contact 3252 on one of the pulse generating relays of the impulse sender 3100A, Fig. 32. Line relay R2340, upon operating, at contact 2341 completes a circuit for the slow-to-release relay R2350 from ground at contact 2331'. Release relay R2350 operates over this circuit and, at contact 2353, extends ground by way of the vertical off-normal contact 2304 to maintain the series relay R2360 energized. At contact 2354 it prepares the pulsing circuit for the lower winding of the series relay R2360 in multiple with the vertical magnet 2380; and, at contact 2355, it opens a point in the circuit of the release magnet 2367. At contact 2352, it prepares a circuit for energizing the rotary magnet 2425, and to extend ground forward to the wiper 2473 by way of contacts 2362 and 2412. At contact 2351, relay R2350 prepares a circuit for relay R2310. The call switch 2380 is now in a position to respond to impulses delivered by the contact 3252 of the pulse generating relay R3250 in the impulse sender 3100A.

The response of the automatic switches to the impulse trains transmitted by the register sender will now be considered. Returning now to the point at which the first series of impulses were transmitted to the line relay R2340 by the above mentioned pulse generating relay. Line relay R2340 is momentarily interrupted each time the pulse generating relay R3250 opens its contact 3252, causing the line relay to momentarily restore. Assuming that the first register in the digit registers have recorded therein the digit 4, four interruptions of the pulse generating relay R3250 will cause the line relay R2340 to momentarily restore and energize four times. When the line relay R2340 falls back, a circuit is completed from ground at contact 2331', contacts 2342, 2354, 2364, winding of the vertical magnet 2380, to battery, and a branch of the circuit extending through the lower winding of the series relay R2360, to battery. The vertical magnet 2380 operates over this circuit and causes the wipers 2471 to 2476, inclusive, to be raised one step and come to rest opposite the first level of the associated bank contacts. When the line relay R2340 reenergizes, the previously mentioned circuit for the slow-to-release relay R2350 is completed at contact 2341, and, at contact 2342, the above mentioned circuit for the series relay R2360 and the vertical magnet 2380 is opened. The above cycle of operation is completed four times if the digit 4 had been registered in the digit registers 3100B, and the wipers 2471 to 2476, inclusive, will come to rest opposite the fourth level of its associated bank contacts. It should be understood from the foregoing description that if the circuit of the line relay had been momentarily interrupted from one to ten times by the impulsing contact 3252 of the pulse generating relay R3250, the vertical magnet 2380 would raise the wipers 2471 to 2476, inclusive, of the call switch 2380 step by step until they come to rest opposite the level of the bank contacts corresponding to the number of impulses received by the line relay. Vertical off-normal contacts 2301, 2304 and 2305 operate as soon as the wipers of the switch are raised one step from their normal resting position. Vertical off-normal contact 2301 prepares a circuit for the rotary magnet 2425, and vertical off-normal contact 2305 prepares a circuit for the release magnet 2367. The vertical off-normal contact 2304 opens the initial circuit of the upper winding of the series relay R2360 so as to enable relay R2360 to restore upon the termination of the series of impulses being delivered to the vertical magnet 2380, the circuit of the lower winding of the relay being sufficient to maintain the relay operated throughout this series of impulses. When the series relay R2360 restores to normal upon the terminal of the series of impulses constituting the first digit, it opens the circuit for its lower winding and the vertical magnet 2380 at contact 2364. It extends the circuit of the test relay R2310 from ground at contact 2351, winding of the test relay R2310, contacts 2321, 2363 and 2412, to the test wiper 2473, while at contact 2366, it completes a self interrupting circuit for the rotary magnet 2425 over a circuit completed from ground at contact 2352, contact 2312, vertical off-normal contact 2301, contacts 2332', 2366, 2426, 2422, 2376, winding of the rotary magnet 2425, to battery. The rotary magnet 2425 operates in a buzzer-like manner due to its self-interrupting circuit including contact 2426 to rotate the wipers 2471 to 2475, inclusive, over the terminals in the selected level of the associated bank contact in search of an idle outgoing trunk circuit, such as outgoing trunk circuit 500, Figs. 5 and 6.

When an idle outgoing trunk circuit is reached, which outgoing trunk circuit may be assumed to be the outgoing trunk circuit 500 of Figs. 5 and 6, negative battery potential is encountered by wiper 2473 by way of the windings of the seizure relay R520 in the outgoing trunk circuit. When this battery potential is encountered, a circuit is completed for the test relay R2310 as follows: ground, contact 2351, winding of the test relay R2310, contacts 2321, 2363, 2412, test wiper 2473, conductor C505 in cable 501, which conductor is connected to a bank contact engaged by test wiper 2473, both windings of the seizure relay R520, to battery. Relay R2310 energizes over this circuit and, at contact 2312, opens the circuit of the rotary magnet 2425 to terminate the rotary movement of the switch 2380 and, at contact 2311, completes an energizing circuit for the switch-through relay R2330 from ground at contact 2352.

Switch-through relay R2330, upon energizing, at contacts 2331 and 2333, disconnects the line relay R2340 from the talking conductors C2390 and C2391 over which impulses have been transmitted to the line relay R2340; and, at contacts 2332 and 2334, relay R2330 extends the talking conductors C2390 and C2391 by way of wipers 2471 and 2472, conductors C502 and C503 of the cable 501 through to the outgoing trunk circuit 500. At contact 2339, relay R2330 locks up to the grounded conductor C2393. At contact 2335, relay R2330 extends ground over the test wiper 2473 to maintain the seizure relay R520 in the outgoing trunk circuit 500 energized, at the same time placing a shunt around the winding of the test relay R2310 causing the latter relay to restore. At contact 2336, relay R2330 connects the conductor C2392 through to the wiper 2474, which operation has no effect at this time. At contact 2338, relay R2330 extends the conductor C2394 through to the wiper 2475 by way of contacts 2372, 2431, 2443 and 2338. At contact 2331', relay R2330 removes the energizing circuit of relay R2350, and, at contact 2332', opens a point in the self-interrupting circuit of the rotary magnet 2425. Line relay R2340, release relay R2350 and test relay R2310 restore to normal.

The outgoing trunk circuits accessible to the call switch 2380 are in relatively small groups. When a group of outgoing trunk lines assigned to a particular level accessible to the call switch 2380 are sufficient in number to utilize the entire level, one-digit numbers are required to raise the wipers of the switch to the selected level, and the switch automatically rotates to find an idle outgoing trunk line in the selected level. However, in the case of CAX trunk calls and trunk calls to a distant office, it may be advisable to assign more than two trunk groups to a single level, in which case, two-digit numbers are assigned to each trunk group in which two or more groups of trunks may appear in a single level of bank contacts. When two digits are required to operate the call switch 2380 to select a particular group of trunks in a single level, the first digit will raise the wipers of the switch to the particular level, and the second digit will directively operate the wipers of the switch to the first trunk in the selected group, and the wipers will then automatically rotate over the trunk lines in the selected group to find the first idle one therein. Since the trunk group in which the call being described requires an entire level of the call switch 2380, only a single digit is required to select an idle trunk in the group and the switch operates in the manner described above.

The operation of the switch 2380 when controlled by two digits will now be described. In response to the first series of impulses, the line relay R2340 will control the vertical magnet 2380 in the manner described hereinbefore, to raise the wipers 2471 to 2475, inclusive, to a level of its bank contacts in which two groups of trunks are provided. It should also be understood that the vertical wiper 2476 is also stepped in a vertical direction in the same manner that the wipers 2471 to 2475 are operated. Assuming that the fifth level is the level in which two digits are required to be transmitted to the call switch 2380 in order to select a particular group of trunks in a level in which more than one group is provided. Therefore, when the vertical wiper 2476 comes to rest on the fifth contact of the vertical bank 2480, the wiper is connected to conductor C2481. It should be understood that conductor C2481 may be connected to any one of the vertical bank contacts corresponding to a level accessible to the wipers of the switch 2380 in which more than one group of trunks is provided in the level. When the wipers of the switch come to rest opposite the fifth level of its associated bank contacts, the following circuit is completed for relay R2370: ground, contacts 2331', 2341, wiper 2476, fifth contact of the vertical bank 2480, conductor C2481, lower winding of relay R2370, to battery. Relay R2370 operates and, at contact 2373, removes the shunt around its upper winding permitting the relay to lock up from ground at contact 2352 as soon as the series relay R2360 deenergizes upon termination of the first series of impulses received by the switch 2380. The locking circuit for relay R2370 may be traced as follows: ground, contacts 2352, 2361, 2424, upper winding of relay R2370, to battery. At contact 2371, relay R2370 opens a point in the circuit of wiper 2474; at contact 2372, it opens a point in the circuit of conductor C2394; at contact 2376, relay R2370 opens a point in the self-interrupting circuit for the rotary magnet 2425; and, at contacts 2374 and 2375, it completes a pulsing circuit for relay R2410 in multiple with the rotary magnet 2425.

On the first deenergization of the line relay R2340, responsive to the first pulse of the second digit transmitted by the register sender 3100, a circuit is completed from ground at contact 2331', contacts 2342, 2354, 2365, 2374, winding of relay R2410, to battery, and a branch circuit thereof is completed by way of contact 2375, winding of the rotary magnet 2425, to battery. Relay R2410 and the rotary magnet 2425 energize over this circuit. Upon energizing, relay R2410 completes an obvious circuit for energizing relay R2420 at contact 2413, and, at contact 2411, completes a locking circuit for the upper winding of relay R2370 from ground at contact 2352, which circuit by-passes the previously traced circuit for relay R2370. At contact 2412, relay R2410 opens a point in the circuit of wiper 2473. The rotary magnet 2425 responds each time the circuit of the line relay R2340 is interrupted by the transmission of impulses of the second digit from the register sender 3100 and steps the wipers 2471 to 2475 across the fifth level to the first trunk in the desired group of trunks in the fifth level. Relay R2410, being somewhat slow-to-release, remains energized during the time the circuit thereof and the circuit of the rotary magnet 2425 is interrupted by the line relay R2340. It should be noted that the vertical wiper 2476 will disengage from the fifth contact in the vertical bank 2480 when the rotary magnet 2425 rotates the wipers 2471 to 2475, inclusive, across the fifth level of the associated bank contacts.

In response to the energization of relay R2420, a point in the ineffective self-interrupting circuit of the rotary magnet 2425 is opened at contact 2422. At contact 2421, a point in the circuit of relay R2460 is prepared; at contact 2424, a point in the initial locking circuit for relay R2370 is opened; and, at contact 2423, an energizing circuit is completed for relay R2440.

Attention is called to the fact that the normal post contact 2401 is arranged to be closed on levels accessible to the switch 2380 in which more than one group of trunks may be selected, and, therefore, two digits are required to directively operate the wipers of the switch to the first trunk in the desired group. In response to the energization of relay R2440, at contact 2442, a circuit is prepared for connecting battery by way of the resistance 2454 and the normal post contact 2401 to the conductor C2394. Battery through the resistance 2454 also shunts the relay R2460 over a circuit from battery, resistance 2454, normal post contact 2401, contact 2442, contact 2421, winding of relay R2460, to battery. At contact 2444, relay R2440 completes an energizing circuit for the upper winding of relay R2450, and, at contact 2445, it completes a locking circuit for itself including its lower winding and contact 2333'.

Upon energizing, relay R2450 completes a locking circuit for itself by way of contact 2453, including its lower winding from ground at contact 2353 of the energized release relay R2350. At contact 2452, relay R2450 prepares a circuit for relay R2320. At the end of the series of impulses comprising the second digit, line relay R2340 remains energized and, at contact 2342, opens the circuit of the slow-to-release relay R2410. Relay R2410 restores and, at contact 2412, connects the wiper 2473 through to the winding of the test relay R2310. At contact 2411, relay R2410 opens the locking circuit for the upper winding of relay R2370, and, at contact 2413, it opens the energizing circuit of relay R2420. Relay R2370 restores and, at contact 2376, closes a point in the automatic self-interrupting circuit of the rotary magnet 2425, and, at contact 2372, closes the resistance battery by way of the normal post contact 2401 to conductor C2394. Upon the restoration of relay R2420, the initial energizing circuit for the upper winding of relay R2440 is opened at contact 2423. At contact 2421, the incomplete circuit of relay R2460 is opened, and, at contact 2422, the self-interrupting circuit of the rotary magnet 2425 is completed.

If the first trunk, upon which the wipers 2471 to 2475, inclusive, of call switch 2380 are standing, is busy, battery potential will not be encountered by wiper 2473; therefore, test relay R2310 will not energize at this time. Consequently, the previously traced self-interrupting circuit of the rotary magnet 2425 is completed and the rotary magnet continues to step the wipers 2471 to 2475, inclusive, across the bank contacts to the trunk lines in which the group trunk lines are connected. When an idle trunk line is encountered, battery potential is applied by way of wiper 2473, contacts 2412, 2363, 2321, winding of test relay R2310, to ground at contact 2351, causing the energization of the test relay R2310. The test relay R2310 energizes and completes an energizing circuit for the switch-through relay R2330 in the manner previously described. Line relay R2340, releases relay R2350, and test relay R2310 and relay R2440 all restore to normal.

OPERATION OF THE OUTGOING TRUNK CIRCUIT 500

It should be noted when the outgoing trunk circuit 500 of Figs. 5 and 6, is provided that only four incoming conductors, namely conductors C502, C503, C504 and C505, are necessary and are respectively connected to the wipers 2471, 2472, 2473 and 2475 of the call switch 2380, the wiper 2474 having no function to perform when a connection is extended between the call switch 2380 and the outgoing trunk circuit 500. When the wiper 2473 of the call switch 2380 encountered battery potential on its bank contact to which conductor C505 is connected through the winding of seizure relay R520, the relay energized over this circuit. Upon energizing, relay R520 extends ground forward by way of contacts 521, 655, and conductor C604 to the toll switch train 600. At contact 522, relay R520 extends ground forward over conductor C605 to seize the succeeding switch in the toll switch train 600, and, at contact 524, it prepares a locking circuit for the upper winding of cut-in relay R530.

The outgoing trunk circuit 500 has now prepared the subsequent switches in the toll switch train 600 to receive the impulses corresponding to the digits registered in the register sender 3100, to extend the connection to the called local subscriber at substation T2, by way of his telephone line 610. Assuming that the last switch in the train is a switch which does not automatically connect ringing current to the called subscriber's line after the wipers of the switch have engaged with the called subscriber's line, until the automatic ringing is controlled from equipment at the operator's register sender.

Referring now to the sender control circuit 2600 of Fig. 26, it will be recalled that responsive to the retransmission of the impulses representing all of the digits registered in the register sender 3100, cut-in relay R2640 energized and extended battery by way of resistance and contact 2646 to conductor C2059. This resistance battery is extended by way of conductor C2059, contact 2255, conductor C2394, contacts 2372, 2431, 2443, 2338, wiper 2475, conductor C504 in the cable 501, contact 539, lower winding of the cut-in relay R530, to ground. In other words, responsive to the complete transmission of all the digits registered, the cut-in relay R530 in the outgoing trunk circuit 500 energizes. At contact 537, relay R530 completes a locking circuit for its upper winding. At contact 539, it opens its initial energizing circuit including conductor C504, and, at contact 538, it extends conductor C504 through to contact 564 of the supervisory relay R560. At contacts 532 and 535, relay R530 connects the left-hand windings 506 and 507 of the repeating coil 510 to the talking conductors C502 and C503 respectively, and, at contacts 533 and 536, it disconnects the talking conductors from the impulsing circuit extending to the toll switch train 600 by way of conductors C602 and C603. At contacts 531 and 534, relay R530 connects the right-hand windings 508 and 509 of the repeating coil 510 to the talking conductors C602 and C603 extending to the toll switch train 600. It will be recalled that when the operator link circuit 2100 was controlled by the restoration of the talk key K2225, the connect relay R2210 restored to normal and disconnected the pad control network in the operator circuit while, at the same time, connecting the pad control and line terminating network, comprising resistances 2280 to 2283, inclusive and condenser 2284, to transfer the control of the pad in the ring-down toll line circuit 250 from the operator's position circuit to the link circuit 2100. It will be apparent from the description which is to follow that the pad control and line terminating network in the operating link 2100 will be disconnected from the talking conductors extending to the toll line circuit 250 at the time the talking conductors R2390 and C2391 of the call switch 2380 are connected through to the talking conductors of the ring-down toll line circuit 250. When this condition exists, it is necessary to control the pad control relay R340 in the ring-down toll line circuit 250 from the outgoing trunk circuit 500. To accomplish the above-mentioned result, the following simplex circuit is completed for connecting ground potential to the talking conductors C502 and C503 respectively. This circuit may be traced from ground at contact 521, upper winding of check relay R640, contact 636, winding 506 of the repeating coil 510, contact 532, to conductor C502. The circuit for grounding the other talking conductor C503 may be traced as follows: ground, resistance 568, contact 566, winding 507 of the repeating coil 510, contact 535, to the talking conductor C503.

It may be well to mention at this time that when the ring-down toll line circuit 250 is switched through to a local toll switch train including the outgoing trunk circuit such as outgoing trunk circuit 500, it is advisable to maintain the pad of the toll line circuit 250 in the talking conductors in order to reduce the gain of the circuit.

It should be noted that when cut-in relay R530 connects the windings 508 and 509 of the repeating coil 510 into the circuit, the control relay R540 is connected in series with conductors C602 and C603 over the following circuit: conductor C602, contacts 651, 631, 531, winding 508 of the repeating coil 510, winding of control relay R540, contact 562, winding 509 of the repeating coil 510, contacts 534, 633, 653, conductor C603. Consequently, if battery and ground are encountered on conductors C602 and C603 at the time cut-in relay R530 connects the control relay R540 across the above-mentioned conductors, relay R540 will energize and, at contact 541, disconnects the supervisory relay R560. The supervisory relay R560 is prevented from operating under this condition in order to prevent the operation of the ring relay R650 to transmit ringing generator out over conductors C602 and C603 before the switches in the toll train 600 are in condition to receive the ringing current. When battery and ground are removed from conductors C602 and C603 respectively, relay R540 deenergizes and, at contact 541, completes a circuit for energizing supervisory relay R560 from ground, contacts 524, 537, 541, winding of relay R560, to battery. At contact 562, supervisory relay R560 disconnects the control relay R540 from the talking conductors C602 and C603 and, at contacts 561 and 563, connects the answer relay R610 to the above-mentioned talking conductors. At contact 564, relay R560 connects ground to the conductor C504 over the following circuit: ground, contacts 524, 537, 613, 564, 538, to conductor C504. The grounding of conductor C504 will cause the illumination of the front supervisory lamp L2123 at the operator's position to inform her that the connection is about to be completed but that the called subscriber has not as yet answered. At contact 566, relay R560 disconnects ground through resistance 568 from conductor C503, and, at contacts 565 and 567, prepares a circuit for energizing the ring relay R560 from ground, contacts 567, 635, 641, lower winding of ring relay R650, contact 565, winding 507 of the repeating coil 510, contact 535, to conductor C503. It should also be noted at this time that ground potential is applied at contact 521 to the lower winding of check relay R640, and the upper winding of ring relay R650. This circuit does not operate the relays, due to the resistance 656.

The lower winding of the ring relay R650 is now connected to the positive talking conductor C503 and can be controlled from the operator's position by the operation of ring key K1930 to close its contacts 3, 4 and 6, or, as is contemplated in the present instance, is controlled automatically by the operation of the automatic ring relay R2630 in the sender control circuit 2600. When automatic ring is to be utilized, the key K2070 is left at normal and ground potential is applied to conductor C2052 to cause the operation of the automatic ring relay R2630 in the sender control circuit 2600 after all the digits have been cleared out of the register sender 3100. Under this condition, supervisory relay R2690 of the sender control circuit 2600 restores to normal and prepares a point in the circuit of the automatic ring relay R2630 at contact 2694, and, since cut-in relay R2750 is somewhat slow-to-release after its circuit is opened, at contacts 2694 and 2756, relay R2630 is energized for a short interval of time. At contact 2633, relay R2630 completes the following circuit for operating the ring relay R650 in the outgoing trunk circuit 500: battery, resistance 2655, contact 2633, conductor C2063 extending to contact 2252 (Fig. 22), conductor C2391, contact 2334, wiper 2472, engaging a contact in its bank to which conductor C503 in cable 501 is connected, contact 535 of the outgoing trunk circuit 500, winding 507 of the repeating coil 510, contact 565, lower winding of the ring relay R650, contacts 641, 635, 567, to ground. Ring relay R650 energizes over the above-traced circuit and, at contact 655, removes ground at contact 521 from conductor C604 extending to the toll switch train 600. Removal of ground from conductor C604 initiates automatic ringing in the toll connector switch included in the toll switch train 600, whereby ringing current is transmitted out over the called subscriber's line 610 to ring the subscriber's bell at substation T2. It should be noted that at contacts 651 and 653, ring relay R650 disconnects the answer relay R610 from across the talking conductors C602 and C603, while at the same time projecting ringing generator on conductor C602 at contact 652, and ground on conductor C603 at contact 654. The latter function has no application at the present time and is utilized in cases where it is necessary for the operator at position 1300 to rering a particular called line or to enable rering of PBX lines.

In order to complete the description of the operation of the sender control circuit 2600 under conditions when automatic ringing is utilized, it will be necessary to digress for a moment from the description of the extension of the connection to the subscriber at substation T2. Automatic ring relay R2630, in addition to the application of battery thru resistance 2655 by way of contact 2633 to conductor C2063, at contact 2632 completes a holding circuit for cut-in relay R2750 from ground at contact 2752, contact 2671, 2632, winding of cut-in relay R2750, to battery. This circuit is completed for relay R2750 before the relay has had time to release as a result of the denergization of supervisory relay R2690, and therefore, remains locked up to its own contact 2752. At contact 2631, relay R2630 completes the following circuit for relays R2760 and R2770: ground, contacts 2752, 2631, 2784, 2772, one branch extending to the winding of relay R2760 to battery, and the other branch extending through the lower winding of relay R2770 to battery. Another branch of the above-traced circuit is extended by way of contacts 2784, 2774, 2766, 2745, upper winding of relay R2770, to battery. The windings of relay R2770 are in opposition, and when the circuit is completed through both of its windings, the relay is prevented from operating. Relay R2760, upon operating, at contact 2762 completes a locking circuit for its lower winding from ground at contact 2752, contacts 2747, 2762, lower winding of relay R2760, to battery. Contacts 2763 and 2764 of relay R2760 have no function at the present time, and contact 2765 completes an alternate circuit for the upper winding of relay R2770 as follows: ground, contacts 2752, 2765, 2745, upper winding of relay R2770, to battery. Also, responsive to the energization of relay R2760, the weighted contact 2761 is vibrated for a time interval. When the weighted spring of relay R2760 comes to rest, contact 2761 will be closed, and a circuit is completed from ground at contact 2752, contact 2761, to energize the supervisory relay R2670. At contact 2671, supervisory relay R2670 opens the holding circuit for the cut-in relay R2750, causing the latter relay to slowly restore. When relay R2750 restores and removes the holding ground at contact 2752 to remove the locking circuit for relay R2760 and the circuit for the opposing windings of relay R2770; at contact 2756, cut-in relay R2750 opens the energizing circuit for the automatic ring relay R2630; and, at contact 2753, it completes the circuit for grounding cut-in conductor C2053. Relay R2760 restores and, at contact 2761, opens the circuit for supervisory relay R2670, which relay also restores. The remaining operations of the relays in the sender control circuit 2600 as a result of the deenergization of the cut-in relay R2750 are the same as have been previously described. The above-described cycle of operation, which occurs from the time the automatic ring relay R2630 energizes until the relay is again deenergized as a result of the restoration of cut-in relay R2750, introduces a sufficient time cycle for controlling the period of time which the ring relay R650 in the outgoing trunk circuit is energized. Therefore, when relay R2630 restores to normal, resistance battery is removed from conductor C2063 and, consequently, from the lower winding of the ring relay R650, to cause the latter relay to restore to normal. Ringing current is now transmitted automatically from the toll connector included in the toll switch train 600 to signal the subscriber at substation T2.

It will be recalled that when the sender 3100 had retransmitted all of the digits registered in the digit registers 3100B, the sender control circuit 2600 operated to ground the cut-in conductor C2053. Referring now to the operator link circuit 2100, it will be noted that the grounded cut-in conductor C2053 completes a circuit by way of contact 2253 and the lower winding of cut-in relay R2240, to battery. Relay R2240 operates over the circuit completed through its lower winding, and, at contact 2245, it completes a locking circuit for its upper winding in series with the upper winding of the front release relay R2230. Due to the resistance of the upper winding of the cut-in relay R2240, relay R2230 does not operate at this time, but relay R2240 remains locked up in this circuit.

At contacts 2243 and 2244, cut-in relay R2240 extends the talking conductors from the answer switch 2180 through to conductors C2390 and C2391 of the call switch 2380. At contacts 2241 and 2243, relay R2240 disconnects the pad control and line terminating network of the answer switch 2180 from the ring-down toll line circuit 250; at contact 2246, it extends ground forward over conductor C2393 to maintain the switch-through relay R2330 in the call switch 2380 energized; at contact 2247, it connects the front supervisory lamp L2123 by way of contacts 2168 and 2247 through to conductor C2394 of the call switch 2380; at contact 2241' and contact 2242', it opens the circuit for the lower windings of sender connect relays R2250 and R2260.

It will be recalled that when the sender control circuit 2600 had cleared out, ground was removed from conductor C2049 and, consequently, the locking circuit for the upper winding of the sender #1 connect relay R2250 is opened, whereupon the latter relay restored to normal and disconnected conductors C2064, C2063, C2053, C2059 and C2060 of the sender control circuit 2600 from the operator link 2100 at contacts 2251, 2252, 2253, 2255 and 2258, respectively.

THE CALLED SUBSCRIBER ANSWERS

Referring again to the outgoing trunk circuit 500 (Figs. 5 and 6), it will be recalled that when resistance battery is removed from conductor C503, the ring relay R650 restores to normal and again connects ground at contact 655 to conductor C604, and, at contacts 652 and 654, removes generator and ground respectively from conductors C602 and C603, respectively, and, at contacts 651 and 653, connects conductors C602 and C603 to the windings of the answer relay R610 to battery and ground, respectively.

When the called subscriber at substation T2 answers the call, ringing current, which has been automatically projected from the toll connector in the toll switch train 600 to the called subscriber's line 610, is removed, and the subscriber's line 610 is cut through to conductors C602 and C603 to cause the energization of the answer relay R610 and the control relay R550 in series. Upon energizing, relay R610, at contact 611, removes a line terminating network, comprising resistance 555 and condenser 556, from the line conductors C602 and C603. At contact 612, relay R610 completes a locking circuit for the lower winding of the control relay R550 from ground, contacts 524, 537, 612, lower winding of control relay R550, to battery. At contact 613, relay R610 removes ground potential from conductor C504 to extinguish the front supervisory lamp L2123 associated with the operator's link circuit 2100. When the lamp L2123 is extinguished, the operator at position 1300 is informed that the called subscriber at substation T2 has now answered and the connection between the calling subscriber at distant office 200 and the subscriber at substation T2 is completed and that the subscribers may now converse with each other.

Control relay R550, upon energizing, at contact 551 shunts its upper winding from the circuit including the upper winding of answer relay R610. At contact 552, it completes a locking circuit for its lower winding in multiple with the locking circuit including contact 612 of relay R610. The answer relay R610 supplies transmission battery to the called subscriber at substation T2.

During conversation, it will be noted that the pad control relay R340 in the ring-down toll line circuit 250 (Fig. 3) is maintained actuated from ground supplied to conductors C254 and C255 from the outgoing trunk circuit 500, over a circuit as follows: ground, contact 521, upper winding of check relay R640, contact 636, winding 506 of the repeating coil 510, contact 532, conductor C502, cable 501, wiper 2471, contact 2332, conductor C2390, contacts 2242, 2214, 2131, wiper 2102, conductor C254, upper winding of pad control relay R340, upper winding of the impedence 330, lower winding of check relay R310, to booster battery in which the negative pole is grounded. The circuit for the lower winding of the pad control relay R340 may be traced as follows: ground, contact 567 (Fig. 5), contact 635, contact 641, lower winding of ring relay R650, contact 565, winding 507 of the repeating coil 510, contact 535, conductor C503, cable 501, wiper 2472, contact 2334, conductor C2391, contacts 2244, 2218, 2132, wiper 2103, conductor C255, lower winding of pad control relay R340, lower winding of impedance 330, contact 312, lower winding of the ring-out relay R300, to booster battery in which the negative pole is grounded. Over this simplex circuit pad control relay R340 is maintained energized and, at contact 341, prevents the pad cut-off relay R210 from energizing so that the pad, comprising resistances 215 to 220, inclusive, and condenser 221, is connected in the talking circuit to introduce the necessary circuit loss which tends to balance the artificial line network to maintain the uniform transmission level between the calling and called subscribers.

RING-DOWN SUPERVISION FROM THE CALLING TOLL EXCHANGE 200

As indicated above, the connection has been established between the subscriber connected to the toll switchboard 201 and the subscriber at substation T2 in the central office 100, and the operator at position 1300, who has completed the connection through her operator link circuit 2100, has disconnected her position equipment from the talking conductors extending through the operator link circuit 2100. When this condition exists, the front supervisory lamp L2123 and the rear supervisory lamp L2275, associated with the operator link circuit 2100, are both extinguished, but the busy lamp L2124, individual to the operator link 2100, remains illuminated from ground at contact 2245' of the operated cut-in relay R2240, contacts 2269, 2259, 2163', resistance 2119, busy lamp L2124, to battery. The illuminated condition of this lamp indicates to the operator that the operator link 2100 is busy and that she should not operate her talk key K2225 unless she desires to reconnect her position equipment to the link 2100.

In the event that the calling toll operator at toll switchboard 201 desires to signal the central office toll operator at position 1300 at any time after the connection has been completed, she causes ringing current to be projected over the toll line 251, thereby bringing about a momentary operation of the ring-down relay R245 in the ring-down toll line circuit 250. At contact 246, ring-down relay R245 opens the circuit of signal relay R240. At contact 242, signal relay R240, upon deenergizing, completes a previously traced circuit for energizing the start relay R350. At contact 351, relay R350, upon energizing, completes a circuit for illuminating the rear supervisory lamp L2275 in the link 2100, over a circuit as follows: ground, contact 351, upper winding of relay R350, conductor C256, cable 253, the contact in the bank of the answer switch 2180 engaged by wiper 2104, contacts 2133, 2163, 2271, rear supervisory lamp L2275, to battery.

It should be noted that the start relay R350 does not lock itself energized at this time because the circuit for the lower winding thereof, including contact 352, is opened at contact 361 of the energized seizure relay R360. However, the relay energizes over the circuit completed through the upper winding and remains energized until the operator at position 1300 opeates the talk key associated with the link 2100 to break the series circuit including the upper winding of relay R350 and the rear supervisory lamp L2275. The rear supervisory lamp L2275 is now lighted steadily to attract the attention of the central office toll operator at position 1300.

The operator at position 1300 responds to the illuminated condition of the rear supervisory lamp L2275 by operating the talk key K2225 individual to link 2100. Responsive to the operation of the talk key K2225, a circuit is completed for the upper winding of the connect relay R2210 as follows: ground, contacts 1421, 1465, 1525, upper winding of disconnect relay R1450, conductor C2097, contact 2 of key K2225, contact 2248, upper winding of connect relay R2210, to battery. Connect relay R210 and relay R1450 energize in series over this circuit. At contact 1453, relay R1450 completes a locking circuit for the lower winding of relay R2210 in series with the talk relay R1460 over the following circuit: ground, winding of relay R1460, contacts 1522', 1453, conductor C2077', contact 2213', lower winding of the connect relay R2210, to battery. A branch circuit is also completed from conductor C2077' through contact 2213', contact 4 of the associated talk key K2225, conductor C2571, contact 1669, to the winding of relay R1710, to battery. At contact 1712, relay R1710 completes a locking circuit by way of contact 1513 for the lower winding of relay R1450.

Responsive to the energization of the talk relay R1460, the operator's talking conductors are connected by way of contacts 1462 and 1464, contacts 1521 and 1523, contacts 1611 and 1613, conductors C2090 and C2089, contacts 2216 and 2212, contacts 2132 and 2131, respectively, to the ringdown toll line circuit 250 and the toll trunk 251 extending to the distant toll switchboard 201. A branch of the operator's talking circuit is also connected to the front end of the link 2100, that is, to the call switch 2380, over the following circuit: contacts 1462 and 1464, 1521 and 1523, 1561 and 1563, conductors C2092 and C2091, contacts 2217 and 2213, 2244 and 2242, conductors C2391 and C2390, respectively, extending to the outgoing trunk circuit 500 and the called subscriber at substation T2. It should be understood from the above-traced circuits that the operator at position 1300 may converse with the toll operator at the distant toll office and also with the called subscriber at substation T2.

At contact 2215', relay R2210 completes a circuit from ground at contact 2143, 2136, 2215', conductor C2079, winding of rear connect relay R1630, to battery. At contact 1631, relay R1630, upon energizing, completes a circuit from ground, contact 1631, contact 1851, conductor C2078, contacts 2236, 2214', 2157, upper winding of start relay R2160, to battery. At contact 1637, relay R1630 completes a circuit from ground, contact 1637, conductor C2525, contact 8 of release key K1950, conductor C2526, contact 1846, conductor C2511, rear connect lamp L2001, to battery. The rear connect lamp L2001 illuminates to indicate to the operator that she is connected with the rear end of the link 2100, namely, to the answer switch 2180.

At contact 2211', relay R2210, upon operating, completes a circuit from ground, contact 2245 of the energized cut-in relay R2240, contact 2211', conductor C2081, winding of front connect relay R1620, to battery. Relay R1620 energizes over this circuit and, at contact 1622, completes a circuit for illuminating the front connect lamp L2002 from ground, contact 1622, conductor C2082, front connect lamp L2002, to battery. When the front connect lamp is illuminated, the operator at position 1300 is informed that her talking circuit is also connected to the front end of the link 2100, namely, to the call switch 2380.

Responsive to the operation of the start relay R2160, at contact 2162', it completes a circuit for flashing the busy lamp L2124 to indicate to the operator at position 1300 the particular link circuit upon which she is working. The circuit for flashing the busy lamp L2124 may be traced as follows: the 60IPM conductor (Fig. 17), contact 1755, conductor C2080, contact 2162', resistance 2119, busy lamp L2124, to battery. At contact 2163, relay R2160 opens the previously traced circuit for illuminating the rear supervisory lamp L2275, and, simultaneously therewith, opens the holding circuit for the start relay R350 in the toll line circuit 250 causing the latter relay to restore and to extinguish the rear supervisory lamp L2275. At contact 2162, relay R2160 transfers the circuit for controlling the rear supervisory lamp L2275, by way of conductor C2094, contact 1844, winding of the rear supervisory relay R1720 in the operator's position equipment, to battery. If the operator at the distant toll board should resignal the central office operator, the rear supervisory relay R1720 will operate from ground at contact 351 of relay R350 and, at contact 1721, will momentarily illuminate the rear supervisory lamp L2275, from ground, contact 1721, conductor C2093, contacts 2161, 2271, rear supervisory lamp L2275, to battery. The function of contacts 2166, 2167 and 2168 of the start relay R2160 to control the front supervisory lamp L2123 will be described hereinafter.

When the distant operator at toll switchboard 201 has completed her conversation with the central office toll operator at position 1300, the central office toll operator restores the talk key K2225 to normal to disconnect the position equipment from the link 2100. The apparatus in the operator's position equipment will restore to normal in the manner previously described, and relays R2160 and R2210 in the link circuit will also restore to normal, thus reestablishing the talking connection between the subscriber at the distant office 200 and the local subscriber at substation T2.

SWITCHHOOK SUPERVISION FROM THE LOCAL AUTOMATIC SUBSCRIBER AT SUBSTATION T2

Assuming that the local subscriber at substation T2 desires to attract the attention of the toll operator at the operator position 1300 in the central office 100. The subscriber may do so by momentarily depressing the switchhook at the substation one or more times. Each time the switchhook is depressed, the circuit of the answer relay R610 in the outgoing trunk circuit 500 is momentarily interrupted and, at contact 613, closes the previously traced circuit over conductor C504 and conductor C2394 in the call switch 2380 to flash the front supervisory lamp L2123 individual to the link 2100 over which the previously described connection was established. Each time the switchhook is released, the answer relay R610 reenergizes and opens the circuit for lighting supervisory lamp L2123. The operator may respond to the flashing condition of the front supervisory lamp L2123 by again actuating the talk key K2225 to bring about the operation of the connect relay R2210 and the start relay R2160 in the link circuit 2100. In addition, relays R1460, R1450 and R1630 in the operator's position equipment are reoperated in the manner previously described.

Start relay R2160, upon operating, at contact 2168, opens the above described circuit for flashing the front supervisory lamp L2123 and, at contact 2167, transfers this circuit by way of conductor C2083 through the winding of the front supervisory relay R1310 in the operator's position equpiment. At contact 2166, relay R2160 connects the front supervisory lamp L2123 by way of conductor C2084 to contact 1311 of the front supervisory relay R1310. In other words, the front supervisory relay R1310 may now be directly controlled responsive to the momentary operations of the switchhook by the subscriber at substation T2 to control, at contact 1311, the flashing of the front supervisory lamp L2123. Furthermore, at contacts 2161, 2162 and 2163, relay R2160 places the rear supervisory lamp L2275 under control of the rear supervisory relay R1720 in the operator's position equipment.

The operator at position 1300 may now converse with the called subscriber at substation T2 over the previously traced circuit including conductors C2091 and C2092 and contacts 2213 and 2217 of the operated connect relay R2210, and she may also converse with the subscriber at the distant toll office 200 over the previously traced circuit including conductors C2089 and C2090 and contacts 2212 and 2216 of the operated connect relay R2210. When the three-way connection is established between the subscriber at the distant toll office 200, the subscriber at substation T2, and the operator at position 1300, the front supervisory lamp L2123 and the rear supervisory lamp L2275 are dark, the busy lamp L2124 is flashing at the rate of sixty times per minute, the rear connect and the front connect lamps L2201 and L2002, respectively, are illuminated steadily.

SPLIT FRONT AND REAR

The operator at position 1300 may find it necessary to exclude the calling subscriber at the distant toll office 200 from the connection in order to hold an uninterrupted conversation with the called subscriber at substation T2. This may be accomplished by operating the cut-off key K1960 at her position to the left to close contacts 1, 3 and 4, whereupon a circuit is completed from ground, contact 1 of key K1960, conductor C2503, winding of the split answer relay R1610, to battery. At contacts 1611 and 1613, relay R1610 disconnects the talking conductors C2090 and C2089 extending to the calling subscriber at the distant toll office 200 from the talking conductors extending to the operator's position, and, at contacts 1612 and 1614, connects these conductors by way of contacts 1811 and 1813, 1831 and 1833, 1616 and 1615 of the operated relay R1610, the resistances 1617 and 1618 bridged by condenser 1619, resistances 1567 and 1568, conductors C2519 and C2520, to ground at contacts 3 and 4 of the operated cut-off key K1960. The resistances 1567, 1568, 1617 and 1618, bridged by the condenser 1619, provide the line terminating and pad control network for maintaining the pad control relay R340 in the ring-down toll line circuit 250 energized during the period of time the operator at position 1300 is conversing over conductors C2092 and C2091 with the subscriber at substation T2.

When the cut-off key K1960 is restored to normal, the split answer relay R1610 also restores, reconnecting the calling subscriber at the distant toll office 200 at contacts 1611 and 1613 through the three-way conversational circuit.

If the operator at position 1300 should desire to exclude the called subscriber at substation T2 from the connection in order to hold an uninterrupted conversation with the calling subscriber or the operator at the distant toll office 200, she may accomplish this by operating the cut-off key K1960 to the right to close contacts 2, 5 and 6. At contact 2 of the key K1960, a circuit is closed from ground, conductor C2502, for energizing the split call relay R1560. At contacts 1561 and 1563, the conductors C2092 and C2091, extending to the called subscriber at substation T2, are disconnected from the operator's talking conductors and, at contacts 1562 and 1564, are extended by way of resistances 1569 and 1570 bridged by condenser 1573, resistances 1571 and 1572, contacts 1565 and 1566 of the energized split call relay R1560, conductors C2519 and C2520, to ground at contacts 5 and 6 of the cut-off key K1960. The line terminating network comprising resistances 1569 to 1572, inclusive, bridged by condenser 1573, will control any pad control apparatus which may be provided, and provides a terminating point for the line extending to the called subscriber at substation T2 to prevent the subscriber from getting the impression that the connection has been broken down.

When the operator restores the cut-off key K1960 to normal, the subscriber at substation T2 is reconnected in a three-way conversational circuit with the subscriber at the distant toll office 200 and the operator at position 1300, at contacts 1561 and 1563, upon the restoration of the split call relay R1560.

The operator at position 1300 may now restore the talk key K2225 to disconnect her equipment from the connected link circuit 2100, whereupon relays R2210 and R2160 in the answer switch 2180 restore to normal to reconnect the calling subscriber at the distant toll office 200 with the called subscriber at substation T2. When start relay R2160 restores to normal, the front supervisory lamp L2123 is again placed under control of the answer relay R610 in the outgoing trunk circuit 500, and the rear supervisory lamp L2275 is again placed under control of the start relay R350 in the ring-down toll line circuit 250, and the busy lamp L2124 is lighted steadily from ground at contact 2245'.

MONITORING THE CONNECTION

In order to monitor the connection established through the link 2100, the operator at position 1300 may actuate the link monitor key K2220 to its off-normal position, whereupon the contacts 1, 2 and 3 are respectively engaged. Incident to this operation, monitor relay R1410 is energized over a circuit from ground, contact 3 of the monitor key K2220, conductor C2087, contact 1527, contact 1466, winding of monitor relay R1410, to battery. It should be understood in considering this circuit that the monitor relay R1410 can only be energized through the contact 3 of the monitor key K2220 during the period when the operator at position 1300 is not engaged with a call and, therefore, talk relay R1460 is not energized. Upon operating, the monitor relay R1410, at contacts 1414 and 1416, connects the operator's receiver 1302 to the lower winding 1309' of the monitor repeating coil 1308 over the following circuit: receiver 1302, sleeve of the plug 1303, sleeve of the jack 1304, contact 1416, lower winding 1309' of the repeating coil 1308, contact 1414, tip of the jack 1304, tip of the plug 1303, back to the operator's receiver 1302. The upper winding 1309 of the repeating coil 1308 is bridged across the talking circuit established through the link 2100 over a path which includes contacts 1 and 2 of the monitor key K2220. This circuit may be traced as follows: contact 2218, contact 1 of monitor key K2220, conductor C2085, contacts 1531, 1521, 1461, winding 1309 of the repeating coil 1308, contacts 1463, 1523, conductor C2086, contact 2 of the monitor key K2220, contact 2214. From the above-traced circuit it will be noted that winding 1309 of the monitor repeating coil 1308 is directly bridged across the talking conductors over which the calling and the called subscribers are conversing through the operator's link circuit 2100.

The transmitter 1301 of the operator at position 1300, however, is not operatively associated with the talking circuit extending through the link 2100. Accordingly, the operator at position 1300 can only listen in on the conversation being held over the connection and is prevented from talking over the connection.

When the monitor key K2220 is restored to normal, the contacts 1, 2 and 3 thereof are open, the contacts 1 and 2 disconnecting the monitoring repeating coil 1308 from across the talking conductors of the link, and the contact 3 opening the circuit of the monitor relay R1410, which relay restores to normal and disconnects the operator's receiver 1302 from winding 1309' of the monitoring repeating coil 1308.

Clearing Out the Connection

When the conversation has been completed, the restoration of the receiver by the subscriber at substation T2 results in the previously discussed deenergization of the answer relay R610 in the outgoing trunk circuit 500. The restoration of the answer relay R610 causes the front supervisory lamp L2123 in the operator link 2100 to be steadily illuminated. The steady illuminated condition of the front supervisory lamp L2123 is an indication to the operator at position 1300 that the subscriber at substation T2 has restored the receiver upon the switchhook and has terminated the conversation over the operator link 2100.

When the distant toll subscriber connected to the toll switchboard 200 replaces the receiver upon the switchhook, the distant toll operator will ticket the connection in order to assess the charge for the toll connection, and simultaneously therewith, will bridge ringing current over the toll line 251 to cause the operation of the ring-down relay R245 in the ring-down toll line circuit 250. The series of operations which result responsive to the operation of the ring-down relay R245 has been previously described and results in the illumination of the rear supervisory lamp L2275 individual to the operator link 2100.

The operator at position 1300 has now received disconnect supervision as a result of the illumination of both the front supervisory lamp L2123 and the rear supervisory lamp L2275. However, it may be well to point out at this time that it is not generally necessary for the operator at position 1300 to wait for the disconnect supervision from the distant toll operator on the above-described type of call and may perform the necessary operations to restore the operator link 2100 to normal without waiting for disconnect supervision from the distant toll operator.

In order to release the link 2100, the operator at position 1300 momentarily actuates release key K2201 individual to the link 2100. When this key is moved off normal, ground is applied from the key K2201 to energize the lower winding of the front release relay R2230, and, in multiple therewith, an energizing circuit is completed for the upper winding of the rear release relay R2150. Relay R2230, upon operating, at contact 2231, places a shunt around the upper winding of the cut-in relay R2240 and locks itself to ground at contact 2245. As a result of the shunting circuit placed around the upper winding of the cut-in relay R2240, this relay restores and, at contacts 2242, 2244, 2246 and 2247, disconnects the answer switch 2180 from the call switch 2380 in the operator link 2100.

As a result of the energization of the rear release relay R2150, at contact 2154, it prepares an energizing circuit for the release magnet 2170. At contact 2153, it opens the circuit of relays R2140 and R2190 to prevent operation of these relays in the event that the vertical wiper 2108 should pass over grounded contacts in the vertical bank when the wipers of the switch are restored to normal. At contact 2152, relay R2150 places a shunt around the upper winding of change-over relay R2140, and, at contact 2151, it completes a locking circuit for its lower winding through the vertical off-normal contact 2113 in order to prevent the relay R2150 from restoring to normal prior to the time that the switch has completely restored its wipers to normal. At contact 2157, relay R2150 opens a point in the circuit of start relay R2160.

As a result of the shunt placed around the upper winding of relay R2140, this relay restores to normal and, at contact 2146, completes the energizing circuit for the release magnet 2170.

When the release magnet 2170 is energized, the wipers 2102 to 2108, inclusive, are restored to normal in the well known manner. At contact 2143, relay R2140, upon deenergizing, also opens the energizing circuit of switching relay R2130, causing the latter relay to restore to normal. When the wipers of the answer switch 2180 have restored, the vertical off-normal contact 2113 is open and the rear release relay R2150 will also restore to normal if the release key K2201 is now in a non-operated condition. Front release relay R2230 will also restore to normal when the release key K2201 is opened. The operator link 2100 is now completely restored to normal and is ready to be used in establishing new connections.

Releasing the Call Switch

As has been pointed out above, the release of the cut-in relay R2240 at contact 2246 removes ground from conductor C2393 extending to the call switch 2380. As a result of the removal of ground from conductor C2393, switch-through relay R2330 is deenergized. If relays R2320 and R2450 are energized at this time, they will also restore to normal as a result of the removal of ground from the conductor C2393. At contact 2331', switch-through relay R2330, upon deenergizing, completes an energizing circuit for release magnet 2367 from ground, contacts 2331', 2342, 2355, vertical off-normal contact 2305 (closed as soon as the wipers of the switch have been raised from their normal position), release magnet 2367, to battery. Responsive to the energization of the release magnet 2367, the wipers 2471 to 2476, inclusive, are restored to normal in the well known manner. When the wipers are restored to normal, the vertical off-normal contact 2305 is opened to disconnect the circuit of the release magnet 2367, and vertical off-normal contact 2304 is closed to again prepare the seizure circuit for the upper winding of series relay R2360. At contacts 2331 and 2333, switch-through relay R2330 reconnects the line relay R2340 to the talking conductors C2390 and C2391. At contact 2335, relay R2330 removes ground from wiper 2473, conductor C505 of the cable 501, thereby opening the energizing circuit for the seizure relay R520 in the outgoing trunk circuit 500.

Responsive to the deenergization of seizure relay R520 in the outgoing trunk circuit 500, at contact 522, ground potential is removed from conductor C605 extending to the toll switchboard 600, causing the release of the subsequent switches in the train in a manner somewhat similar to that described hereinbefore. At contact 524, relay R520 removes the locking ground for the upper winding of relay R530 and simultaneously opens the energizing circuit for the supervisory relay R560. At contact 521, relay R520 removes ground potential from conductor C604 extending to the toll switch train 600. Relays R530 and R560 restore, the latter relay disconnecting the windings of the answer relay R610 from the talking conductors C602 and C603 at contacts 561 and 563. The outgoing trunk circuit 500 is now available for the extension of other calls, and the toll switch train 600 is restored to normal in the well known manner responsive to the removal of ground from the conductors C604 and C605.

Releasing the Toll Line Circuit

It will be recalled that when the answer switch 2180 in the link 2100 was restored to normal, relay R2140 deenergized and, at contact 2143, opened the circuit for the switching relay R2130. Relay R2130, upon restoring, at contact 2137, removed ground potential extending by way of wiper 2106, conductor C257 from the winding of the seizure relay R360 in the ring-down toll line circuit 250. Seizure relay R360 restores to normal when ground potential is removed from conductor C257, and, at contact 363, reconnects the line terminating network of the talking conductors C254 and C255 of the ring-down toll line circuit. It should also be noted that when ground potential is removed from conductor C257, conductor C373 terminating the banks of selector switches having access to the ring-down toll line circuit 250, renders this circuit available for use in extending outgoing calls by way of toll line 251 to the distant toll switchboard 201.

Attention is also called to the fact that when the switching relay R2130 in the answer switch 2180 restores to normal, the circuit for maintaining the pad control relay R340 in the toll line circuit 250 is opened at contacts 2131 and 2132. Relay R340, upon restoring, again prepares the circuit for the pad cut-off relay R210. All the equipment used in the completion of the connection from the calling subscriber at the toll switchboard 201 to the subscriber at substation T2 has now been restored to normal and is available for the completion of additional calls.

Releasing the Call Switch 2380 While Holding the Answer Switch 2180

In the above description of the release of the operator link 2100, it was assumed that disconnect supervision was received from both the calling and called ends of the connection. In other words, the front supervisory lamp L2123 was illuminated as a result of the replacing of the receiver upon the switchhook at the substation T2, and the rear supervisory lamp L2275 was illuminated as a result of the toll operator at the distant toll office 200 ringing over the toll line 251.

The operator at position 1300, in handling the various types of calls that may be routed to her switchboard and in providing the service required by the calling and called subscribers, may frequently find it necessary to release the calling or called end of the connection as set up through the link 2100 without releasing the other end of the connection. This operating feature is particularly useful in the handling of delayed calls, wherein the operator may have difficulty in locating either the calling or the called subscriber. Furthermore, the operator at position 1300 may have received an incorrect number of the called subscriber and may find it necessary to reestablish a new connection by way of the call switch 2380 to connect with another subscriber located in the central office 100.

If the operator at position 1300 desires to release the front end of the link, that is, the call switch 2380, and the subsequent switches in the train while holding a connection completed over the rear end of the link, that is, through the answer switch 2180, facilities are provided in the operator's position equipment for accomplishing the above result. For this purpose, it will be assumed that the subscriber at substation T2 has replaced the receiver on the switchhook and has caused the illumination of the front supervisory lamp L2123.

In releasing the link 2100 under the latter conditions, that is, when only the front supervisory lamp L2123 has been steadily illuminated as a result of the disconnection of the called subscriber, the operator at position 1300 will first operate the talk key K2225 to reconnect her position equipment to the link 2100, which results in the operation of certain relays in both the link circuit 2100 and in the operator's position equipment as has been described hereinbefore. In addition, the operator actuates the ring key K1930 to the left to close contacts 1, 2 and 5 of key K1930.

At contact 1 of the ring key K1930 a circuit is completed from ground by way of conductor C2503 for energizing the split answer relay R1610. Relay R1610 energizes, and, at contacts 1611 and 1613, conductors C2090 and C2089 extending to the distant toll operator are disconnected from the operator's headset equipment at position 1300 and are connected by way of contacts 1612 and 1614, 1811 and 1813, 1831 and 1833, conductors C2506 and C2508, to ground at contact 5 and battery at contact 2, respectively, of the operated ring key K1930. As a result of the above-traced circuit for transferring the conductors C2090 and C2089 to the ring key K1980, a circuit is completed for controlling the ring-out relay R300 in the ring-down toll line circuit 250, which may be traced as follows: ground, contact 5 of the operated ring key K1930, conductor C2506, contacts 1833, 1813, 1614, conductor C2089, contacts 2212, 2131, wiper 2102, conductor C254, upper winding of pad control relay R340, upper winding of impedance 330, lower winding of check relay R310, to positive booster battery in which the negative pole is grounded. Simultaneously therewith, the following circuit is completed over the other talking conductor from battery, contact 2 of the operated ring key K1930, conductor C2508, contacts 1831, 1811, 1612, conductor C2090, contacts 2216, 2132, wiper 2103, conductor C255, lower winding of the pad control relay R340, lower winding of impedance 330, contact 312, lower winding of ring-out relay R300, to positive booster battery in which the negative pole is grounded. It should be recalled at this time that the preenergizing circuit for the upper windings of relays R300 and R310 is completed from ground, at contact 362, but the circuit through the upper windings of the two relays is insufficient to cause the relays to operate their associated contacts. The grounding of conductor C254 in the above-traced circuit, in series with the upper winding of the pad control relay R340, the upper winding of the impedance 330, and the lower winding of relay R310, to positive booster battery in which the negative pole is grounded, causes the magnetic flux in the lower winding of the relay R310 to oppose the magnetic flux generated in the upper winding of the relay and magnetize the relay in the opposite direction, but does not generate sufficient flux to cause the relay to operate its associated contacts. The application of negative battery to conductor C255, in series with the lower winding of relay R340, the lower winding of the impedance, and the lower winding of the ring-out relay, to positive booster battery in which the negative pole is grounded, creates a current flow through the lower windings of relay R300 which is considerably greater than the current flow through the winding when ground potential is applied thereto, and thereby generating sufficient flux in the lower winding of the relay in the opposite direction from the flux generated in the upper winding of the relay and which is of sufficient strength to overcome the effect of the flux generated in the upper winding and causes the relay to close its contact 302 and open its contact 301. Furthermore, the current flow over the circuits through the upper and lower windings of the pad control relay R340 is in such a direction that the windings aid each other and generate sufficient flux to cause the relay to operate and open its contact 341. As a result of the energization of pad control relay R340 at contact 341, it prevents the pad cut-off relay R210 from operating to shunt the pad out of the toll line 251. As a result of the energization of ring-out relay R300 to close its contact 302, a circuit is completed by way of contact 241 of the energized signal relay R240 to complete the circuit for energizing ring relay R230. At contacts 232 and 234, relay R230, upon energizing, connects ringing generator and ground to the toll line 251 in order to signal the toll operator at the toll switchboard 201 in the distant office 200.

When the operator at position 1300 restores the ring key K1980 to normal, relays R230 and R300 restore to normal, the former to disconnect ringing current from the toll line 251, and the latter to again prepare the circuit at contact 301 for the start relay R350. As a further result of the restoration of the ring key K1930 to normal, the circuit of the split answer relay R1610 is opened and the relay restores to normal. At contacts 1611 and 1613, relay R1610 reconnects the talking conductors C2090 and C2089 to the transmitter 1301 and the receiver 1302 of the operator's headset circuit.

When the distant operator answers the ringing signal transmitted over the toll line 251, the operator at position 1300 may converse with the distant toll operator and inform her that the local subscriber at substation T2 has released from the connection. If the distant toll operator instructs the operator at position 1300 to release the connection, the operator at position 1300 will first restore the talk key K2225, individual to the link 2100, to normal to disconnect her position equipment from the link circuit 2100, and she will then operate the release key K2201 to cause the release of the link 2100 in the manner previously described.

It may happen, however, that the distant toll operator will instruct the operator at position 1300 to establish a connection with another subscriber, or in the event that the previously set up connection was established as the result of the transmission of a wrong number given by the distant toll operator, the operator at position 1300 may be required to release the connection previously set up over the call switch 2380 of the link 2100 while retaining the connection established over the answer switch 2180 of the link 2100 to the distant toll board.

Assuming now that the operator at position 1300 desires to release the call switch 2380 while retaining the connection established over the answer switch 2180. At this time relays R2130, R2140 and R2240 in the answer switch 2180 are energized. The operator at position 1300 now operates the talk key K2225 to reenter the connection and, as has been previously described, relays R2210 and R2160 in the answer switch 2180 energize together with other relays in the operator's position circuit. Relay R2210, upon operating, transfers the talking conductors extending to the distant toll office from the call switch 2380 to the operator's headset circuit by way of conductors C2089 and C2090, and transfers the conductors C2390 and C2391, extending to the call switch 2380, to conductors C2091 and C2092, extending to the operator's headset circuit. Relay R2160, at contacts 2161, 2162 and 2163 transfers the rear supervisory lamp L2275 from the direct control through the answer switch 2180 to indirect control to the rear supervisory relay R1720 in the operator's position equipment. At contacts 2166, 2167 and 2168, relay R2160 transfers the front supervisory lamp L2123 from direct control of the call switch 2380 to indirect control by way of front supervisory relay R1310 in the operator's position equipment. As a further result of the operation of relay R2160, a circuit is completed over conductor C2080 and contact 2162' for flashing the busy lamp L2124 sixty times per minute indicating to the operator the particular link circuit upon which she is working.

The operator at position 1300, having connected her position equipment to the link 2100 by the operation of the talk key K2225, individual to the link, in order to release the front end of the link, that is, the call switch 2380, operates the release key K1950 to the right to operate contacts 4, 7 and 8 thereon. At contact 8, release key K1950 removes ground from conductor C2526 to extinguish the rear connect lamp L2001 and to prevent the seizure of a sender control circuit. This circuit may be traced as follows: ground, at contact 1637 of rear connect relay R1630, which has been energized responsive to the energization of the connect relay R2210, conductor C2525, contact 8 of key K1950, which contact has now been opened, conductor C2526, extending to Fig. 18, one branch of the circuit extending by way of contact 1846, conductor C2511, to rear connect lamp L2001 and extinguishing the lamp, the other branch of the circuit extending by way of contact 1856, conductor C2048, contacts 1326 and 1336 of the sender alternator (Fig. 13), conductor C2047, contact 4 of the sender control key K1980 in normal position, conductor C2046 extending to Fig. 26, opening the start circuit of start relay R2730 in the sender control circuit 2600. As a result of the opening of this circuit, the rear connect lamp L2001 is extinguished and the sender control circuit 2600 connected to the operator's position by way of the sender alternator is prevented from operating.

At contact 4, release key K1950 completes a circuit from ground by way of conductor C2095, contact 2219, the upper winding of the cut-in relay R2240, contact 2245, to ground, thereby shunting the upper winding of the cut-in relay R2240 to cause the relay to release and open the holding ground at contact 2245. As a further result of the grounding of conductor C2095, the upper winding of the front release relay R2230 is energized, causing the relay to operate. Upon operating, relay R2230, at contact 2231, extends the grounded conductor C2095 by way of contacts 2219, 2231, 2211', conductor C2081, winding of front connect relay R1620, to battery. Relay R1620 energizes over this circuit, and, at contact 1622, extends ground by way of conductor C2082 to illuminate the front connect lamp L2002 in the operator's position equipment. At contact 7 of release key K1950, a circuit is completed from ground, conductor C2502, winding of split call relay R1560, to battery. Relay R1560 energizes over this circuit and, at contacts 1561 and 1563, disconnects the conductors C2092 and C2091, extending to the talking conductors C2391 and C2390, respectively, of the call switch 2380, from the operator's headset circuit. The closing of contacts 1562, 1564, 1565 and 1566 is immaterial at this time because cut-in relay R2240 in the answer switch 2180 restores to normal as a result of the shunting of its upper winding and, at contacts 2242 and 2244, disconnects conductors C2091 and C2092 from conductors C2390 and C2391 of the call switch 2380. As a further result of the restoration of cut-in relay R2240, ground potential is removed from conductor C2393 at contact 2246, causing the call switch 2380 and the subsequent switches in the train to restore to normal in the same manner as has been described hereinbefore. When the operator at position 1300 notes the illuminated condition of the front connect lamp L2002, and that the rear connect lamp L2001 is extinguished, she is informed that the connection through answer switch 2180 is still maintained, but that the connection through the call switch 2380 has been released. It may be well to point out again at this time that, as a further result of the operation of the front release relay R2230, it opens a point in the circuit for the sender connect relays R2250 and R2260, at contacts 2232 and 2233, respectively, in order to prevent the sender control circuit from being connected to the link 2100 during the period of time that the front release relay R2230 is maintained energized. At contact 2236, relay R2230 opens the circuit for energizing the start relay R2160, whereupon relay R2160 restores and, at contact 2163', completes a circuit maintaining a steady illuminated condition upon the busy lamp L2124. At contacts 2169 and 2161', relay R2160 opens a further point in the energizing circuits of the sender connect relays R2250 and R2260.

The operator at position 1300 may now restore the release key K1950 to normal, thereby opening the circuits completed through contacts 4 and 7 and reestablishing the circuit through contact 8. The removal of ground at contact 4 of key K1950 causes the front release relay R2230 to deenergize and reestablish portions of the operating circuits for relays R2250 and R2260, at contacts 2232 and 2233, respectively, and, at contact 2236, it recompletes the energizing circuit for the start relay R2160, which relay, at contact 2162', reconnects the busy lamp L2124 to conductor C2080 in order to reestablish the flashing condition of the busy lamp L2124. Relay R2160, at contacts 2169 and 2161', reestablishes the energizing circuits for sender connect relays R2250 and R2260 over conductors C2049 and C2291.

At contact 7, release key K1950 opens the circuit of the split call relay R1560, which relay, at contacts 1561 and 1563, reconnects conductors C2092 and C2091 to the operator's headset conductors.

When contact 8 of release key K1950 is reclosed, a circuit is completed for reconnecting a sender control circuit to the operator link, which circuit may be traced from ground, contact 1637 of the energized rear connect relay R1630, conductor C2525, contact 8 of release key K1950, conductor C2526, one branch extending by way of contact 1846, conductor C2511 to illuminate the rear connect lamp L2001, and the other branch extending by way of contact 1856, conductor C2048, contacts 1326 and 1336 of the sender alternator (Fig. 13), conductor C2047, contact 4 of the sender control key K1980, conductor C2046, contacts 2621, 2645, 2717, winding of start relay R2730 of the sender control circuit 2600, conductor C2049, contacts 2232, 2169, 2241', lower winding of sender #1 connect relay R2250, contact 2266, to battery. Connect relay R2250 and the start relay R2730 energize in series over this circuit, the former energizing to connect the sender control circuit 2600 to the call switch 2380, and the latter to start the sender control circuit 2600 in the same manner as has been previously described. When the sender control circuit is prepared for further operation and the register sender 3100 has been connected therewith, ground is returned on conductor C2054 to illuminate the sender control #1 lamp L1990 at the operator's position equipment. When this lamp is illuminated, the operator is notified that the equipment is in readiness to receive digits which may be keyed up in the register sender and retransmitted to control the call switch 2380 and subsequent switches in the train to establish a connection with the desired called subscriber.

OPERATION OF THE SENDER ALTERNATOR

As has been pointed out hereinbefore, when the operator at position 1300 has operated her keyset KS1350 to register the digits of the called number in the register sender 3100, she must conclude the registration of the desired number of the digits by operating the sender disconnect key K1390 to indicate to the sender control circuit that no further digits are to be registered in the register sender 3100 and that the apparatus may clear out when all the digits registered therein have been retransmitted. When the key K1390 is depressed at the conclusion of the registration of all the digits to the called number, ground potential is extended by way of conductor C2055 to energize the sender disconnect relay R2710 (Fig. 27). At contact 2711, relay R2710, upon energizing, returns ground potential by way of conductor C2061 to control the sender alternator shown in Fig. 13.

Referring now to Fig. 13, it will be noted that when conductor C2061 is grounded, a circuit is completed by way of contact 1332, one branch extending by way of contact 1324 to the lower winding of relay R1320 and in parallel therewith to the lower winding of relay R1330, and the other branch of the circuit extending by way of contact 1334 to the upper winding of relay R1330. The windings of relay R1330 are in opposition to one another, and since each winding is energized, the relay fails to operate at this time. However, the circuit completed for the lower winding of relay R1320 causes the relay to operate and, at contact 1323, completes a locking circuit for itself in multiple with the lower winding of relay R1330, the initial energizing circuit for the lower windings of relays R1320 and R1330 being opened at contact 1324. It is to be noted, however, that as long as ground potential remains on conductors C2061, relay R1330 cannot operate. Relay R1320, upon operating, at contact 1326, opens the previously traced initial operating circuit for energizing start relay R2730 in the sender control circuit 2600, and, at contact 1325, prepares a circuit for energizing a relay similar to relay R2730 in the sender control circuit 2800.

When the operator at position 1300 releases the sender disconnect key K1390, ground potential is removed from conductor C2061, thereby deenergizing the circuit for the upper winding of relay R1330. The relay now operates over the circuit completed by way of its lower winding, whereupon both relays R1320 and R1330 remain locked up from contact 1323. At contact 1331, relay R1330 prepares a circuit whereby ground may be returned for controlling relays R1320 and R1330 when ground potential is applied to conductor C2061' after the operator has keyed up call digits in the sender connected to the sender control circuit 2800 and has operated the sender disconnect key K1390 to connect ground to conductor C2055, extending also to the sender control circuit 2800. At contact 1333, relay R1330 prepares a circuit for the upper winding of relay R1320, and, at contact 1335, it prepares a circuit for extending ground by way of conductor C2047', contact 5 of the sender control key K1980, conductor C2046', extending to the start relay in the sender control circuit 2800, which relay is similar to the start relay R2730 in the sender control circuit 2600.

As long as the sender #1 connect relay R2250 in the operator link 2100 remains locked up in series with the start relay R2730 in the sender control circuit 2600, the circuit of the sender #2 connect relay R2260 is opened at contact 2257. Consequently, the sender control circuit 2800, which is the second sender control circuit available to the operator at position 1300, cannot be connected to the link 2100, while the sender #1 connect relay is energized. However, it should be noted that if a call is received by the operator at position 1300 over another link circuit similar to link 2100, the sender control circuit 2800 may be connected thereto by the operation of a sender #2 connect relay, individual to the said other link circuit, which relay is similar to the relay R2260 shown in connection with link 2100.

When the operator at position 1300 reoperates the sender disconnect key K1390, after she has registered the desired call digits for another connection extended by way of another link circuit, ground is returned from the sender control circuit 2800 by way of conductor C2061', contacts 1331, 1333, and the upper winding of relay R1320, to battery. When this condition exists, relay R1320 will have a circuit completed through both its windings, and since the windings are in opposition, relay R1320 restores to normal, and, at contact 1323, opens the energizing circuits for the lower windings of relays R1320 and R1330. Before relay R1330 can restore, however, ground is extended by way of contact 1324 of the deenergized relay R1320 to maintain the lower winding of relay R1330 energized. This relay remains in its energized condition until ground potential is removed from conductor C2061', and the relay then restores to normal to reestablish the previously traced circuits for initiating the operation of the sender control circuit 2600.

It should be noted that as long as the sender disconnect key is depressed, ground potential is maintained on conductor C2055, and as long as the sender disconnect relay R2710 remains energized, ground potential is extended by way of contact 2711 thereof back over conductor C2061 to maintain either relay R1320 or relay R1330 energized until the sender disconnect key K1390 has been released. It may happen under certain circumstances that the operator, in depressing the sender disconnect key K1390, will not immediately release the same, whereupon the sender disconnect relay R2710 would deenergize to remove ground potential from conductor C2061 after the sender 3100 and the sender control circuit 2600 has cleared out. In order to prevent either relay R1320 or relay R1330, depending upon which of the two relays is energized at the time, from deenergizing as a result of the removal of ground from conductor C2061 even though the sender disconnect key K1390 is depressed, the following circuit is maintained from the sender disconnect key K1390 while in its depressed condition to maintain either one of the two sender alternator relays R1320 or R1330 energized until key K1390 is restored. This circuit may be traced as follows: ground, key K1390, conductor C2513 (extending to Fig. 17), contact 1858, conductor C2565 (extending to Fig. 13), by way of contacts 1322, 1332, 1334, to the upper winding of relay R1330, if the relay R1320 is operated and the relay R1330 restored as a result of the circuit through both of its windings; or in the event that relay R1330 is operated and relay R1320 is restored as a result of the circuit through both of its windings, the circuit extending through the grounded conductor C2565 by way of contacts 1321, 1331 and 1333, to the upper winding of relay R1320, to battery. From the foregoing, it will be understood that the ground potential maintained by a depressed condition of sender disconnect key K1390 will control sender alternator relays R1320 and R1330 independently of the previously traced circuit including the contact on the sender disconnect relay R2710 of the sender control circuit 2600. It may be well to mention in passing that the ground potential applied to conductor C2513 energizes the upper winding of the dial rear locking relay R1750, but the operation of this relay has no function to perform at the present time except to remove, at contact 1755, the 60IPM pulses transmitted to the busy lamp L2124 in the answer switch 2180 during the short interval of time that relay R1750 remains energized.

CALL FROM DISTANT OFFICE 200 TO THE CAX SUBSCRIBER T3

The operations involved in completing a call received from the distant office 200 for a subscriber in the central office having been described, a description will now be given of a call from a subscriber in the distant office 200 to the CAX subscriber T3. For this purpose it will be assumed that a subscriber in the distant toll office 200 is attempting to establish a connection with the CAX subscriber at substation T3, and that the toll operator at the toll switchboard 201 has received the information from the calling subscriber as to the destination of the call. Referring now to Figs. 1 and 1A, it will be noted that three groups of trunk lines, namely 251, 261 and 271, are shown connecting the toll switchboard 201 with ring down trunk circuits 250, 260 and 270, respectively, at the central office 100. It will also be recalled that the connection described hereinbefore was established over the trunk group including the toll line 251. For the purpose of the latter description it was assumed that the inward operator at the central office 100 had operated her class of service keys K2020 and K2030 to bar CLR calls and TX calls. With the class of service keys at the operator's position conditioned in this manner, only toll calls may be received and answered by the operator as are distributed to her through the common start and level distributor 700 and the position distributor 1101. When the traffic between the distant office 200 and the central office 100 is rather heavy, it may be advisable to divide the toll trunk groups so that all of the operators at the toll switchboard 1200 may receive calls extended over one of the trunk groups; also, it may be advisable to distribute calls received over another trunk group only to the odd positions (positions 1, 3, 5, etc.) of the toll switchboard 1200 and distribute the third group of toll lines to the even positions (positions 2, 4, 6, etc.) of the toll switchboard 1200. More specifically, calls received over the toll line group in which toll line 251 is included are connected through the common start and level distributor 700 to the position distributor 1101, which distributor is arranged to distribute all the calls received therein to all of the positions in the toll switchboard 1200, whereat the toll key K2040 is in its normal position. Toll calls received over the toll group including the toll line 261 control the common start and level distributor 700 and the position distributor 1102, so that calls received in this group of trunks are only distributed to the odd positions of the toll switchboard 1200, which odd positions have their toll key K2040 in its normal position. Furthermore, toll calls received over the toll group including the toll line 271 control common start and level distributor 700 and the position distributor 1103, so that calls received over this group are distributed to the even positions of the toll switchboard 1200 that have their toll keys K2040 in normal position. From the foregoing it will be noted that position distributor 1101 will distribute toll calls to all of the positions in the toll switchboard 1200; that position distributor 1102 will distribute calls only to the odd positions of the toll switchboard; and, that position distributor 1103 will only distribute toll calls to the even positions of the toll switchboard.

In order to explain the operation of the system when a call is received over the toll line group including the toll line 261, it will be assumed that the operator link 2100, the operator position 1300, and the associated equipment are located at position 1, that is, the odd position of the toll switchboard 1200. It will be further assumed that the CLR key K2020 and the TX key K2030 at this position have been operated to bar both CLR and TX calls.

When the toll line 261 (Fig. 2) is seized at the distant toll switchboard 201, ringing current is bridged thereover to operate ring-down toll line circuit 260 in the same manner as has been previously described in connection with the operation of the ring-down toll line circuit 250. As a result of the seizure of the ring-down toll line circuit 260, conductor C268, extending to the common start and level distributor 700, is grounded and completes a circuit by way of contact 703 for the group start relay R730. At contact 731, relay R730 completes a locking circuit for itself to the grounded conductor C268, independently of its initial energizing circuit. At contact 733, relay R730 completes an energizing circuit for the group lock-out relay R700, which relay, at contacts 702 to 707, inclusive, opens the initial energizing circuit of the group start relays R730, R730' for the odd trunk groups, relays R740, R740' for the even trunk groups, relays R760, R760' of the common trunk groups, thereby preventing further toll calls from being received except such toll calls that appear in the odd group, common to relay R730. At contact 732, relay R730 applies ground potential to terminal 8 to operate the odd class of service relay R830. A branch of the above circuit is completed by way of contact 813 to ground conductor C2563, extending to the position distributor 1102 (Fig. 11). The operation of the class of service relay R830 causes ground potential to be applied by way of contact 835 and conductor C2019 to illuminate the call-waiting lamp L2064 at the odd positions of the switchboard that have their keys K2040 at normal. Attention is called to the fact that the call-waiting lamp at all of the odd positions of the switchboard 1200 which have their toll keys K2040 at normal, is also illuminated responsive to the seizure of the ring-down toll line circuit 260.

The operation of the position distributor 1102 is exactly the same as has been previously described in connection with the operation of the position distributor 1101, and, as a result of the grounding of conductor C2563 as mentioned above, and assuming that the odd operator's position #1 is idle, conductor C2534 is also grounded to cause the operation of the marking relay R1230 at position 1 of the toll switchboard 1200.

Since it has been assumed that the operator position 1300 is the odd position in the switchboard 1200 to which the call is to be distributed, it will be further assumed that the operator at position 1300 has inserted her headset plug 1303 into the jack 1304; that she has operated the talk key K2225 of the link 2100; and that the battery feed relay R1420, the all-links busy relay R1440, the position busy relay R1640, the connect relay R2210, the talk relay R1460, the relay R1220 and the relay R1710 have been operated in the manner previously described. Therefore, when the conductor C2534 is grounded from the position distributor 1102, the marking relay R1230 is energized over a circuit including contacts 1212 and 1224. Upon energizing, relay R1230, at contact 1231, extends ground by way of conductor C2535 to the bank contacts in the bank of the answer switch 2180 that terminate toll lines of the common group of toll lines and toll lines of the odd group of toll lines. At contact 1233, relay R1230 completes a circuit which may be traced from the grounded conductor C268 (Fig. 7), contact 731 of the energized group start relay R730, conductor C2539, contact 1233, conductor C2532 to mark the seventh level in the vertical bank of the answer switch 2180 accessible to the vertical wiper 2108 to indicate the particular level in the banks of the answer switch 2180 that the talking conductors C264 and C265 of the calling ring-down toll line circuit 260 are terminated in the bank of the switch. As a further result of the energization of the marking relay R1230, ground potential is extended by way of contact 1234, conductor C2077, contact 1645, lower winding of the start relay R1510, to battery.

As a result of the energization of the start relay R1510, the answer switch 2180 is operated in the manner previously described to cause the switch to raise its wipers 2102 to 2108, inclusive, in a vertical direction, and when the wiper 2108 engages the grounded seventh vertical bank contact, the switch is operated in a rotary direction until the test relay R2120 is operated over a circuit including wipers 2106 and 2107. Accordingly, when the wiper 2106 engages the second bank contact in the seventh level, conductor C267, which conductor has battery potential applied thereto from ring-down toll line circuit 260, completes an energizing circuit for the test relay R2120 by way of wiper 2107 and the grounded conductor C2535 connected to the second bank contact in the seventh level. Further operations of the answer switch 2180 have been described previously, and it will suffice to say that the operator at the toll switchboard 201 may converse with the operator at position 1300 after contacts 2131 and 2132 of the switching relay R2130 in the answer switch have been closed. When the operator at position 1300 has ascertained the number of the desired called subscriber at substation T3 in the CAX2500, she will manipulate her keyset KS1350 to cause the register sender 3100 to retransmit impulses corresponding to the digits registered in the digit registers 3100B and extend the connection by way of the call switch 2380 to the CAX2500. It is to be noted, however, that in this type of connection the operator, after manipulating her keyset KS1350, does not operate the sender disconnect key K1390 to give the indication to the sender control circuit to clear out after all the digits registered in the register sender have been retransmitted. The key K1390 cannot be operated at this time because the operator at position 1300, in extending a call to the CAX, must wait after the connection has been extended to the CAX until dial tone is received by her, indicating that the finder in the finder connector link at the CAX has connected with the CAX trunk circuit 2540 over the trunk line 2503. After dial tone is received by the operator at position 1300, she may then manipulate the keyset KS1350 to register the remaining digits in the register sender and she may then operate the sender disconnect key K1390 to cause the sender control circuit 2600 and the register sender 3100 to clear out after the connection has been extended by way of the connector portion of the finder connector link in the CAX to the subscriber at substation T3.

More specifically, when the register sender 3100 has retransmitted the first digit registered therein, the call switch 2380 will respond in the manner previously described to raise the wipers 2471 to 2476, inclusive, in a vertical direction to the fifth level of its associated bank contacts. Since the fifth contact in the vertical bank 2480 is jumpered to conductor C2481, the call switch 2380 functions as a two-digit switch in the manner previously described. Consequently, the second digit registered in the register sender, when retransmitted, controls the call switch 2380 to rotate its wipers 2471 to 2475, inclusive, across the bank contacts of the fifth level in search of an idle trunkline, such as trunk-line 2505, terminating a CAX trunk circuit, such as CAX trunk circuit 2540.

Assuming that there are five trunk lines such as trunk line 2505 extending to the CAX2500, and assuming further that these five trunk lines are terminated on the first five bank contacts in the fifth level of the call switch 2380. It is necessary, under such conditions, to strap the last trunk of the group by connecting a jumper between the contact 2482 in the bank accessible to wiper 2474, and the contact in the bank to which a conductor similar to conductor C2563 is connected and which is accessible to wiper 2473. Consequently, when the wipers of the switch are rotated across the first five contacts in the fifth level and no battery potential is encountered by wiper 2473 because all of the trunks are busy, a circuit will be completed for energizing busy relay R2320 when the wipers engage the fifth contact in the bank over the following circuit: conductor corresponding to C2563, grounded by the busy CAX circuit similar to trunk circuit 2540, the strap connected between the bank contact to which conductor corresponding to C2563 is connected to bank contact 2482, wiper 2474, contacts 2452, 2371, 2337 and 2323, winding of busy relay R2320, to battery. Relay R2320 energizes over this circuit and, at contact 2322, locks itself to the grounded conductor C2393. At contact 2321, relay R2320 opens the circuit of the test relay R2310 to prevent it from energizing as the wipers of the switch are rotated over the remaining bank contacts of the fifth level. At contact 2325, relay R2320 prepares a circuit for connecting the 60IPM pulsing circuit to conductor C2394. The rotary magnet continues to interrupt the circuit for its winding and rotates the wipers 2471 to 2475, inclusive, to the eleventh rotary step, at which time the cam closes its contacts 2302 and 2303. When the eleventh rotary step contact 2302 closes, a circuit is completed from ground, contact 2351, winding of test relay R2310, eleventh rotary step cam contact 2302, upper winding of series relay R2360, to battery. Relays R2310 and R2360 energize in series. Upon operating, relay R2360, at contact 2366, opens the self-interrupting circuit of the rotary magnet 2425, and relay R2310, upon energizing, closes a circuit from ground at contact 2352, contact 2311, winding of switch-through relay R2330, to battery. At contact 2339, switch-through relay R2330 locks to ground on conductor C2393; at contact 2333' it opens the circuit of relay R2440, which relay now restores to normal; and, at contact 2338, it connects the 60IPM conductor in a circuit to flash the front supervisory lamp at the link circuit 2100. This circuit may be traced as follows: 60IPM conductor, contact 2325, eleventh rotary step cam contact 2303, contacts 2338, 2443, 2431, 2372, conductor C2394, contact 2347, by way of contact 2168 and the front supervisory lamp L2123, to battery, if the start relay R2160 is deenergized, and by way of contact 2167, conductor C2083, winding of front supervisory relay R1310, which relay, at contact 1311, conductor C2084 and contact 2166, completes a circuit for flashing the front supervisory lamp L2123. The flashing condition of the front supervisory lamp L2123 informs the operator at position 1300 that all the trunk lines available extending in connection with the CAX 2500 are busy and that another attempt will have to be made to extend the connection at a later time.

As a further result of the operation of the switch-through relay R2330, line relay R2340 is deenergized, thereby opening the circuit, at contact 2341, of the release relay R2350, which relay, upon restoring, prepares a circuit for the release magnet 2367, at contact 2355.

When the operator operates the release key K1950 to the right, front release relay R2230 is energized and causes relay R2240 to release in turn, and, at contact 2246, removes ground potential from conductor C2393 to cause the release of the switch-through relay R2330. Upon releasing, relay R2330, at contact 2331', completes the energizing circuit for the release magnet 2367, which restores the switch to normal in the usual manner.

In the above description it was assumed that all the trunk lines extending to the CAX2500 were busy, and it will now be assumed that when the call switch 2380 was operated to the fifth level of its associated bank contacts and was rotated in one step to the first contact set in the fifth level, battery was encountered on conductor C2563 indicating that the first trunk is idle and available for use. When battery is encountered by wiper 2373 over conductor C2563, a circuit is completed for the test relay R2310 to terminate the rotary stepping of the wipers 2471 to 2475, inclusive. The remaining operations of the call switch 2380 in completing the connection over a seized trunk line are the same as has been previously described.

As a result of the two digits received by the call switch 2380 from the register sender 3100, the CAX trunk circuit 2540 has been seized by way of conductors C2561 to C2564, inclusive, of the trunk 2505, and as a result thereof, the finder connector link 2501 (schematically shown) in the CAX2500 is automatically operated to find and connect with the trunk line 2503 terminating the CAX trunk circuit 2540. More specifically, the operator at position 1300, being informed that the connection is to be extended to the CAX2500, knows that a two-digit number is all that can be registered in the register sender to extend the connection to the CAX and cause the finder connector link 2501 to search for and connect with the calling CAX trunk circuit 2540.

As has been pointed out, the operator, in extending this type of a call, does not operate the sender disconnect key K1390, which key, when operated, would have caused the sender control circuit 2600 and the register sender 3100 to be dismissed after the digits registered therein had been retransmitted. Consequently, as a result of the seizure of the CAX trunk circuit 2540 over the trunk line 2505, line relay R2550 is energized and, at contact 2551, connects the upper winding of relay R2590 to the trunk line 2503 terminating in the banks of the finder connector link 2501. When the finder portion of the finder connector link 2501 finds the trunk line 2503, dial tone is transmitted through the left-hand windings of the repeating coil 2504, contact 2551, and the upper winding of relay R2590. The tone transmitted over this circuit from the finder portion of the finder connector link 2501 is induced in the lower winding of the relay R2590 and transmitted over the following circuit: ground, lower winding of relay R2590, conductor C2564, trunk line 2505, conductor C2564, bank contact and wiper 2475 of the call switch 2380, contacts 2338, 2443, 2431, 2372, conductor C2394, contact 2255, conductor C2059, extending to the sender control circuit 2600 (Fig. 26), contact 2612, condenser B, conductor C2058, contacts 1523, 1464, extending to the operator's receiver 1302 and returning therefrom to contacts 1462, 1521, 1531, conductor C2057 (extending to Fig. 26), condenser A, contact 2611, to ground. When the operator at position 1300 hears the dial tone induced over the above-traced circuit, she may now operate her keyset KS1350 to register the additional digits necessary to control the connector portion of the finder connector link 2501 in the CAX 2500 to extend the connection to the subscriber at substation T3.

After these digits have been registered in the register sender 3100, the operator may then momentarily operate the sender disconnect key K1390, whereupon the sender control circuit 2600 will be disconnected from the link 2100 after the remaining digits in the register sender 3100 have been retransmitted to control the connector portion of the finder connector link 2501 to extend the connection to the subscriber at substation T3.

After the operator has momentarily operated the sender disconnect key K1390, she may then restore the talk key K2225, individual to the link 2100, to normal to disconnect her equipment from the link 2100 so that she may then handle additional calls.

Since the connection-described above has been extended by the operator at position 1300 to CAX subscriber, the automatic ring control exercised by the automatic ring relay R2630 of the sender control circuit 2600 is not required and may be disconnected by the operation of the automatic ring key K2070. However, failure to operate the automatic ring key K2070 cannot do any harm because the ringing of the called subscriber at substation T3 will automatically take place under control of the connector portion of the finder connector link 2501 in the CAX.

It may be well to mention at this time that the CAX trunk circuit 2540 is arranged to ground the conductor C2564 after all of the digits necessary to extend the connection to the subscriber at substation T3 have been transmitted. The grounding of conductor C2564 completes a circuit for illuminating the front supervisory lamp L2123 to indicate to the operator that the connection has been extended to the called subscriber's line, but that the called subscriber has not answered. When the called subscriber at substation T3 answers the call, the CAX trunk circuit 2540 functions to remove the ground potential from conductor C2564 and thereby opens the circuit to extinguish the front supervisory lamp L2123, indicating to the operator that the called subscriber has answered and that the connection between the calling subscriber at the distant office 200 and the called subscriber at substation T3 is completed, and the subscribers may now converse with each other.

During conversation, it should be understood that the pad control relay in the ring-down toll line circuit 260 is maintained actuated from a simplex ground circuit (not shown) applied to the talking conductors C2561 and C2562 in the CAX trunk circuit 2540, which trunk circuit is similar to the circuit arrangement disclosed in the outgoing trunk circuit 500.

Supervision is given to the operator at position 1300 in the same manner as has been described hereinbefore, and the operator may reenter the connection, monitor the connection, split the connection, release the call switch 2380 while holding the answer switch 2180, release the answer switch 2180 while holding the call switch 2380, or, by merely operating the release key K2201 individual to the link 2100, may release the entire connection in the manner previously described.

CALL FROM SUBSCRIBER T1 IN THE CENTRAL OFFICE 100 TO A SUBSCRIBER IN THE DISTANT OFFICE 200

In order to explain how calls originating in the central office area are extended by an operator at the toll switchboard 1200 to a subscriber at a distant office, it will be assumed that the subscriber at substation T1 located in the central office area, but terminating in automatic switches at an automatic exchange included in the central office area, calls a toll switchboard 1200 at the central office 100 over the CLR trunk circuit 470 and requests that his line be connected to a particular subscriber at the distant manual office 200 reached by way of one of the toll line groups 251, 261, or 271. It will also be assumed that this call has been extended by the subscriber at substation T1 by way of his line 461 through the local switchtrain 460, which switchtrain is under control of the local subscriber's dial, and the CLR trunk 470 has been seized in the manner described in the T. F. Crocker Patent 2,167,710, issued August 1, 1939. It will further be assumed that the operator at position 1300 is the operator who is to handle CLR calls. Consequently, it is necessary for her to operate her class of service keys K2030 and K2040, but to leave the key K2020 at normal. Due to the fact that keys K2030 and K2040 are actuated, both TX calls and toll calls are barred at the distributors and these two types of calls cannot be distributed to the operator position 1300. Accordingly, when the key K2040 is actuated a circuit is completed from ground, contact 3 of the key K2040, conductor C2067 (extending to Fig. 11), and will cause the position distributor relay R1140 to energize whenever the cyclic operation of the distributor 1101 would have allotted a call to the operator at position 1300. If the position 1300 is at an odd position in the toll switchboard 1200, conductor C2067, extending to the position distributor 1102, which distributes calls of the odd trunk group, will also be grounded to prevent the position distributor 1102 from distributing calls to the operator at position 1300. Furthermore, responsive to the operation of the TX key K2030, a circuit is completed from ground, contact 4, conductor C2066 (extending to Fig. 11A), to prevent the position distributor 1105 from distributing calls in the TX trunk group to the operator at position 1300. As a further result of the operation of key K2040, a circuit is completed from ground, contact 1646 of the energized position busy relay R1640, conductor C2051, contact 1 of key K2040, conductor C2068, extending to relay R1210, to battery. Relay R1210 energizes over this circuit and, at contacts 1211 and 1212, opens the circuit for operating the marking relay R1230 of the toll trunk group, and, at contacts 1213 and 1214, opens a circuit of conductors C2549 and C2021 to prevent the position distributors 1101 and 1102 from being controlled to extend a call to the operator at position 1300.

Referring now to the CLR trunk circuit 470 (shown in Fig. 4) responsive to the seizure of the CLR trunk circuit 470, ground potential is applied to conductor C2530 and causes the energization of the CLR group start relay R750 over a circuit including contact 711. At contact 753, relay R750 completes an energizing circuit for the group lockout relay R710, which relay, at contacts 711 to 713, inclusive, prevents the TX and the CLR group start relays from being energized as a result of other TX or CLR calls. However, additional CLR calls may be received and stored on the CLR group start relay R750. At contact 751, relay R750 completes a locking circuit for itself to the grounded conductor C2530 and, at contact 752, grounds the terminal 16. As a result of the grounding of terminal 16, relay R850 of the class of service relays energizes and, at contact 855, grounds conductor C2007 to light the call-waiting lamp L2022 associated with the CLR key K2020, to indicate to the operator that a call is about to be received.

It should also be noted that the call-waiting lamp L2022 is illuminated over a circuit including conductor C2007 extending to the CLR trunk circuit 470. The call-waiting lamp L2022 is illuminated over one circuit under control of the common start and level distributor 700, and over another circuit from the particular calling CLR trunk circuit, the purpose being that, in the event that the operator fails to receive a call after her call-waiting lamp has been illuminated, she will be informed that the position distributor has not functioned properly and that she should take the necessary steps to bring the call into her position by operating her emergency start key in a manner described hereinafter.

In addition, at contact 855, relay R850 completes a circuit by way of contact 967 and conductor C2007' for illuminating the call-waiting lamp at the chief operator's position 2530.

As a further result of the grounding of terminal 16, a circuit is completed by way of contact 815 and conductor C2561 extending to the position distributor 1104, which position distributor distributes CLR trunk calls to the operators' positions. For the purpose of this description, it will be assumed that the operator at position 1300 is to receive the call and that the position distributor relays operate in the manner previously described in connection with the position distributor 1101, and, as a result thereof, ground potential is applied to conductor C2545 extending to contact 1 of key K2020, conductor C2546 extending to contact 1222 (Fig. 12), upper winding of the CLR marking relay R1240, to battery.

Relay R1240 energizes over the above-traced circuit and, at contact 1241, applies ground potential to conductor C2533 to ground the terminals in the bank of the answer switch 2180 accessible to the wiper 2107. At contact 1242, relay R1240 completes a circuit for marking the particular level in the vertical bank accessible to the vertical wiper 2108 in the answer switch 2180, in which level the calling CLR trunk is terminated. This circuit may be traced as follows: grounded conductor C2530 (Fig. 7), contact 751 of the energized CLR group start relay R750, conductor C2531, contact 1242, conductor C2538, extending to the fourth contact in the vertical bank accessible to wiper 2108. As a further result of the energization of relay R1240, ground potential is applied at contact 1243 to conductor C2077, contact 1645 of the position busy relay R1640, the lower winding of the start relay R1510. As a result of the energization of the start relay R1510, the answer switch 2180 is operated in the manner previously described to raise its wipers 2102 to 2108, inclusive, to the fourth level, at which level ground potential is encountered by the vertical wiper 2108 causing the energization of change-over relay R2140 and the stepping relay R2190. Consequently, the answer switch 2180 is then operated to rotate its wipers across the fourth level of its bank contacts, and the wipers 2106 and 2107 encounter the marking potential applied to the contacts in the bank in which conductors C157 and C2533 are connected, whereupon the test relay R2120 will energize in the same manner as has been previously described. Conductors C2533 and C157 terminating in the first contact of the fourth level of the bank associated with the answer switch 2180 are marked with ground and battery potential, respectively, directly from the CLR trunk circuit 470 and marking relay R1240.

When the start relay R2160 in the answer switch operated, it prepared a circuit over which either the sender #1 connect relay R2250 or the sender #2 connect relay R2260 operated to connect up either the sender control circuit 2600 or the sender control circuit 2800 and an associated idle register sender, such as register sender 3100, to the call switch 2380 of the operator link 2100. Furthermore, the operator at position 1300 receives the usual zip-zip tone when the wipers of the answer switch 2180 are moved in a vertical direction to search for the calling CLR trunk. When the answer switch 2180 cuts through by closing contacts 2131 and 2132, the operator at positon 1300 may converse with the subscriber at substation T1.

It will be assumed that the subscriber at substation T1 desires to converse with a subscriber at the distant office 200. Upon ascertaining the number (exchange and subscriber's number) of the wanted subscriber, the operator at position 1300 manipulates the keyset KS1350 in accordance with the trunk group number assigned to the group of trunks over which the operator at position 1300 may extend calls to the distant office 200. For the purpose of this description, it will be assumed that the trunk group over which these calls may be extended is the trunk group including the trunk line 251 and the ring-down trunk circuit 250. It will also be assumed that these trunks are available from the sixth level of the bank contacts accessible to the wipers of the call switch 2380. Accordingly, the operator at position 1300 will manipulate her keyset KS1350 to register the number 61 assigned to the group of trunks over which connections may be extended to the distant office 200. The operator at positon 1300 then operates the sender disconnect key K1390 momentarily, in order to indicate to the sender control circuit 2600 that the sender control circuit and the associated register sender should be dismissed after the digits have been retransmitted by the register sender.

The call switch 2380 responds to the transmission of the digits 61 to raise its wipers 2471 to 2476, inclusive, to the sixth level of its associated bank contacts, and due to the fact that the sixth contact in the vertical bank 2480 is strapped to conductor C2481, the switch does not automatically rotate at this time, but responds to the digit 1 to rotate the wipers in one step to the first bank contact set in the sixth level. If the wiper 2473 fails to find battery potential on its associated first bank contact, the test relay R2310 fails to energize, whereupon the rotary magnet 2425 energizes to automatically step the associated wipers of the call switch 2380 to the second set of bank contacts in the sixth level.

It will be assumed, however, that when the wiper 2473 engages the first contact in the sixth level, battery potential is applied thereto from the winding of the seizure relay R360 in the ring-down toll line circuit 250. This circuit may be traced as follows: ground at contact 2351 (Fig. 23), winding of test relay R2310, contacts 2321, 2363, 2412, wiper 2473, first bank contact in the sixth level, conductor C373 of the cable 252, conductor C373 (Fig. 3), contacts 324, 354, winding of the seizure relay R360, to battery. The test relay R2310 in the call switch 2380 energizes over the above-traced circuit, opening the self-interrupting circuit of the rotary magnet 2425 at contact 2312, and, at contact 2311, completing an energizing circuit for the switch-through relay R2330. The remaining operations of the relays in the call switch 2380 are the same as has been previously described.

Referring now to the ring-down toll line circuit 250 (Figs. 2 and 3). Relay R360, upon energizing, at contact 364, extends the grounded conductor C373 to the conductor C257 to busy the ring-down toll line circuit 250 in the bank contacts accessible to the answer switch 2180. At contact 363, relay R360 disconnects the line terminating circuit from across the talking conductors C254 and C255, and, at contact 362, it completes a circuit for energizing the pad cut-off relay R210. Relay R210 energizes, and, at contacts 211 and 212, shunts out the pad control resistances 215 to 218, inclusive, and, at contact 213, opens the shunt across the talking conductors of the trunk 251.

Referring now to the sender control circuit 2600, it will be recalled that after all of the digits were retransmitted by the register sender 3100, the test relay R2650 was bridged across the conductors C2063 and C2064, these conductors extending by way of contacts 2252 and 2251 to conductors C2391 and C2390, respectively, to the call switch 2380. When test relay R2650 is bridged across the talking conductors C2390 and C2391 as described above, the line relay R2340 of the call switch 2380 has been disconnected as a result of the energization of the switch-through relay R2330, and, since no battery and ground potential are connected to the conductors C371 and C372 of the toll line circuit 250, relay R2650 does not energize, indicating a "dry" loop. Since test relay R2650 failed to energize when the talking conductors including the ring-down toll line circuit were tested, the automatic ring relay R2630 in the sender control circuit energizes and completes the following circuits for controlling the ring-out relay R300 and the check relay R310: ground, contact 2635, conductor C2064, contact 2251, conductor C2390, contact 2332, wiper 2471, engaging the first bank contact in the sixth level of the associated banks, conductor C371 of the cable 252, upper winding of pad control relay R340, upper winding of the impedance 330, lower winding of check relay R310, to booster battery in which the negative pole is grounded. The circuit over the other talking conductor is completed from battery, resistance 2655, contact 2633, conductor C2063, contact 2252, conductor C2391, contact 2334, wiper 2472 engaging the first bank contact in the sixth level of the associated banks, conductor C372, cable 252, lower winding of pad control relay R340, lower winding of impedance 330, contact 312, lower winding of ring-out relay R300, to booster battery in which the negative pole is grounded. It should be noted that when relay R360 energized, it completed a circuit at contact 362 for energizing the upper windings of relays R300 and R310, but the flux generated in the upper windings of these relays is insufficient to cause the relays to actuate their associated contacts. As a result of the above-traced circuit over conductors C371 and C372 through both windings of the pad control relay R340, the relay energizes and, at contact 341, opens the previously traced circuit for the pad cut-off relay R210 to reconnect the pad control network to the toll line 251. The above-traced circuit through the lower winding of the check relay R310 generates a flux in the lower winding of the relay sufficient to overcome the effect of the flux generated in the upper winding, but insufficient to cause the relay to actuate its associated contacts. However, the above-traced circuit for the lower winding of the ring-out relay generates considerable flux in the lower winding of the relay, which flux is sufficient to overcome the effect of the flux generated in the upper winding, and, in addition, is sufficient to cause the relay to close its contact 302. As a result of the closure of contact 302, a circuit is completed for operating the ring relay R230 over an obvious circuit. At contacts 231 and 233, relay R230 disconnects the talking conductors C371 and C372 from the right-hand windings of the repeating coil 202, and, at contacts 232 and 234, completes a circuit for transmitting ringing generator from conductor C235 by induction over the toll line 251. The application of ringing generator to the toll line 251 signals the operator at the toll switchboard 201 in the distant office 200.

It will be recalled that the automatic ring relay R2630 in the sender control circuit 2600 applies battery and ground to conductors C2063 and C2064 in order to operate the ring-out relay R300 only for a short interval of time, and therefore, relay R230 applies ringing current to the toll line 250 for a sufficient period to signal the operator at the toll switchboard 201. Furthermore, it will be recalled that the cut-in relay R2240 in the link 2100 is operated after the digits in the register sender 3100 have been retransmitted. Accordingly, although the circuit of the pad control relay R340 is opened at the same time battery and ground potential are removed from conductors C2063 and C2064 to deenergize the ring-out relay R300, the pad control relay R340 remains energized from ground potential applied through the retard coil RT (Fig. 14), to conductors C2091 and C2090.

When the distant operator at toll switchboard 201 responds, she may converse with the operator at position 1300, who informs the distant operator of the number of the wanted subscriber. The distant operator completes the connection in the usual manner, and when the operator at position 1300 hears the wanted subscriber answer the call, she stamps the toll ticket to indicate the starting time of the conversation between the calling subscriber at substation T1 and the called subscriber located at the distant office 200. The operator at position 1300 now restores her talk key K2225 to normal in order to disconnect her position equipment from the connection established between the calling and called subscribers. The pad control relay R340 now remains energized from a simplex ground circuit applied to the talking conductors C154 and C155 at the CLR talking conductors I154 and C155 at the CLR trunk 470.

If the local subscriber at substation T1 desires to attract the attention of the operator at position 1300, the subscriber may do so by depressing the switchhook momentarily one or more times; each time the switchhook is depressed the CLR trunk circuit 470 is controlled to momentarily apply ground potential to conductor C156 and cause the illumination of the rear supervisory lamp L2275, individual to the operator link 2100. Furthermore, if the distant toll operator desires to attract the attention of the operator at position 1300, she may do so by momentarily applying ringing current to the toll line 251 causing the operation of the ring-down relay R245 in the ring-down toll line circuit 250. This relay, in operating, causes the operation of the start relay R350, and relay R350 completes a circuit from ground, contact 351, upper winding of relay R350, conductor C374, cable 252, first contact in the sixth level engaged by wiper 2475 of the call switch 2380, contacts 2338, 2443, 2431, 2372, conductor C2394, contacts 2247, 2168, front supervisory lamp L2123, to battery. Relay R350 locks up in series with the front supervisory lamp L2123, and the front supervisory lamp L2123 is illuminated to indicate to the operator at position 1300 that the distant toll operator desires to get in touch with her. In order to remove the locked-in supervisory signal, the operator at position 1300 must reoperate the talk key K2225 to thereby reoperate relays R2210 and R2160 in the usual manner, and, at contact 2166 and 2167, relay R2160 transfers the locking circuit of relay R350 from the supervisory lamp L2123 to the winding of front supervisory relay R1310 in the operator's position equipment. The resistance of relay R1310 causes the start relay R350 in the ring-down toll line circuit 250 to restore to normal, whereupon the circuit of relay R1310 is opened and, at contact 1311, it opens the circuit over conductor C2084 and contact 2166 to extinguish the front supervisory lamp L2123. When the distant operator has completed her conversation with the operator at position 1300, the latter operator again restores the talk key K2225 to normal.

When the conversation has been completed, the restoration of the receiver by the subscriber at substation T1 results in the previously discussed illumination of the rear supervisory lamp L2275. Instead of the flashing lamp which resulted when the subscriber momentarily depressed the switchhook, the lamp L2275 is now steadily illuminated, indicating a disconnect signal. The operator at position 1300 may now stamp the toll ticket so that the calling subscriber may be charged for the completed toll call. In order to clear out the calling end of the connection, that is, the answer switch 2180, the operator at position 1300 first operates the talk key K2225 and then momentarily operates the release key K1950 to the left. Relays R2210 and R2160 in the link 2100 operate as usual, connecting the talking conductors C2390 and C2391 extending to the call switch 2380 to the operator's headset circuit by way of contacts 2213 and 2217. As a result of the closure of contact 1 on the release key K1950, a circuit is completed from ground, contact 1, conductor C2096, contact 2212', resistance J, lower winding of rear release relay R2150, a branch of the circuit extending by way of contact 2144 to the upper winding of change-over relay R2140. Relay R2150 energizes over this circuit and, at contact 2154, prepares an operating circuit for the release magnet 2170. As a result of the shunting of the upper winding of relay R2140, this relay now restores to normal and, at contact 2146, completes the operating circuit of the release magnet 2170, whereupon the answer switch 2180 restores to normal in the usual manner. The remaining circuits under control of contacts 2, 3, 5 and 6 of the release key K1950, although momentarily controlled when the key is momentarily operated, have no function to perform at the present time. When contact 1 of key K1950 is opened, ground potential is removed from conductor C2096 resulting in the restoration of the rear release relay R2150.

In order to resignal the toll operator at switchboard 201, the operator at position 1300 now operates the ring key K1930 to the right.

Contact 4 of the ring key K1930, upon closing, completes a circuit from ground, contact 4 of the ring key K1930, conductor C2502, winding of the split-call relay R1560, to battery. Relay R1560 energizes over the above-traced circuit and, at contacts 1561 and 1563, disconnects conductors C2092 and C2091, respectively, from the talking conductors extending to the operator's headset; and, at contacts 1562 and 1564, it connects the conductors C2092 and C2091 to conductors C2509 and C2507, respectively. As a result thereof, the following circuits are completed to control the ring-out relay R300 in the ring-down toll line circuit 250 to cause ringing current to be applied to the toll line 251 extending to the distant toll switchboard 201. The circuits for controlling the ring-out relay may be traced as follows: resistance battery through contact 3 of the ring key K1930, conductor C2509, contact 1562, conductor C2092, contact 2217 of the energized connect relay R2210, contact 2244, conductor C2391, contact 2334, wiper 2472, engaging the first bank contact in the sixth level of its associated bank, conductor C372, included in cable 252, lower winding of the pad control relay R340, lower winding of impedance 330, contact 312, winding of ring-out relay R300, to positive booster battery in which the negative pole is grounded. Simultaneously with the above circuit, another circuit is completed over the other talking conductor from ground at contact 6 of the ring key K1930, conductor C2507, contact 1564, conductor C2091, contact 2213 of the energized connect relay R2210, contact 2242, conductor C2390, contact 2332, wiper 2471 and the engaged first contact of the sixth level in the associated bank, conductor C371 included in cable 252, upper winding of pad control relay R340, upper winding of impedance 330, lower winding of the check relay R310, to positive booster battery in which the negative pole is grounded. As a result of the above-traced circuit for the lower winding of the ring-out relay R300 and the lower winding of the check relay R310, these relays and the pad control relay R340 are controlled in the manner described hereinbefore, that is, relay R340 remains energized, relay R310 does not energize sufficiently to control its associated contacts, but relay R300 does energize and, at contact 302, completes the previously traced circuit for energizing the relay R230, whereupon, at its contacts 232 and 234, a ringing circuit is completed for transmitting ringing current over the toll line 251 to signal the operator at toll switchboard 201.

The operator at position 1300 may now restore the ring key K1930 to normal, thereby causing the restoration of the ring-out relay R300 and the ring relay R230 in the toll line circuit 250, and restoring the split-call relay R1560 to reconnect conductors C2091 and C2092 to the operator's headset circuit at contacts 1561 and 1563. If the ringing current transmitted to signal the operator at the toll switchboard 201 is merely considered to be a disconnect signal, then the operator at position 1300 may momentarily operate the release key K2201 to cause the restoration of the call switch 2380 and the remaining energized relays included in the link 2100 in the manner previously described, or, if the ringing current transmitted to signal the distant operator at toll switchboard 201 is considered to be a recall signal, then the operator at position 1300 may wait until the operator at the distant office responds.

If the above-described connection established between subscriber T1 and a subscriber located at the distant office toll switchboard 201 was a person-to-person call and the desired party at the distant office is not available at the time the call was extended, the operator at position 1300 may inform the party that answered the call to instruct the particular wanted party to call a certain numbered TX operator in the central office 100 when he returns. After this information has been transmitted to the answering party at the distant toll switchboard 201, the operator at position 1300 may operate the release key K2201 to restore the equipment to normal after she has informed the calling substation T1 that he will be recalled when the wanted distant office subscriber is available. The operator at position 1300 has, in the meantime, made out a toll ticket, which ticket contains the number of the calling subscriber at substation T1 and the name and telephone number of the wanted party at the distant toll office 200. The operator at position 1300 gives this toll ticket to a TX operator who has the duty of recalling the subscriber at substation T1 when the wanted party at the distant office 200 calls her in accordance with the instructions referred to above.

When the wanted party at the distant toll office 200 returns and makes the above described call, the toll operator at the toll switchboard 201 extends the connection over trunk line 251 and controls the ring-down trunk circuit 250 in the usual manner. The call received on the ring-down toll line circuit 250 will be distributed by means of the common start and level distributor 700 and the position distributor 1101 to an operator at the switchboard 1200 who has her class of service keys operated so that toll calls may be received by way of her link circuits.

When the operator at the toll switchboard 1200 receives the toll call responsive to the operation of the answer switch at her position, she will be informed by the calling subscriber that a certain numbered TX operator has instructed the calling subscriber to make the call. Assuming for the moment that the operator at position 1300 is the operator who has received the call referred to above and that the answer switch 2180 has connected with the calling ring-down trunk circuit 250 in the usual manner. Since the operator at position 1300 has been informed by the calling subscriber of the number of the particular TX operator who has the toll ticket indicating the number of the calling subscriber, she operates her keyset KS1350 in accordance with that number. Consequently, the register sender equipment controls the call switch 2380 in the manner previously described to raise its wipers 2471 to 2476, inclusive, to the particular level indicated by the first digit and to rotate its wipers 2471 to 2475, inclusive, across the contacts of the level in search of an idle trunk line extending to TX trunk circuit similar to TX trunk circuit 400. It will be assumed that the first level accessible to the wipers 2471 to 2476, inclusive, of the call switch 2380 terminate trunk lines extending to the TX trunk circuits, and it will further be assumed that when the wipers 2471 to 2475, inclusive, rotate across the bank contacts in the first level, wiper 2473 encounters the bank contact to which conductor C486 is connected and which conductor has battery applied thereto from the winding of the seizure relay R420 in the TX trunk circuit 400 (Fig. 4). When battery potential is encountered by the wiper 2473, the test relay R2310 energizes in the manner previously described to terminate the rotary action of the switch and also to complete an energizing circuit for the switch-through relay R2330, which relay energizes and cuts through the talking conductors C2390 and C2391 to the TX trunk circuit 400. As a further result of the operation of switch-through relay R2330, relays R2340, R2350 and R2310 restore to normal. Since the wipers of the switch 2380 have been raised to the first level, the normal post-contact 2402 is closed and a circuit is completed from ground, contact 2441, normal post contact 2402, contacts 2336, 2272, lower winding of the rear supervisory relay R2270, to battery. Relay R2270 energizes over this circuit sufficiently to open its contact 2271, but not sufficiently to open its contact 2272. Contact 2273, however, does not close at this time to ground conductor C2394.

When the wiper 2473 of the call switch 2380 encountered battery potential through the winding of the seizure relay R420 in the TX trunk circuit 400, relay R420 energized and, at contact 42, completed a locking circuit for itself from ground at contact 2335 (Fig. 23), contacts 2363, 2412, wiper 2473 and its associated bank contact to which conductor C486 is connected, cable 490, conductor C486 (Fig. 4), contact 424, winding of the seizure relay R420, to battery. At contact 422, relay R420 removes ground potential from conductor C484 extending to the bank of the answer switch of the TX operator's link circuits. At contact 421, relay R420 connects battery potential through the upper winding of answer relay R410 and contact 432, to conductor C483 extending to the bank contacts accessible to the answer switch at the TX operator's position to mark the TX trunk circuit 400 in the banks thereof. At contact 423, relay R420 completes the following start circuit: ground, contacts 423, 434, conductor C2073, extending to the common start and level distributor 700 (Fig. 7), contact 713, winding of TX group start relay R720 to battery. Relay R720 energizes over this circuit and, at contact 721, locks itself to the grounded conductor C2073. At contact 723, relay R720 completes an energizing circuit for the group lock-out relay R710, which relay energizes to block out additional calls which may be received to control the CLR group start relays and other TX group start relays. At contact 722, relay R720 grounds terminal 1, whereupon TX relay R860 energizes and, at contact 865, extends ground potential by way of contact 977 to conductor C2014' to illuminate the call-waiting lamp at the chief operator's position 2530, and extends ground potential by way of conductor C2014 to illuminate the call-waiting lamp at the TX operator's position. As a result of the ground potential being applied to terminal 1, a circuit is completed by way of contact 816, conductor C2542, extending to the position distributor 1105, which distributor will distribute the call to an idle TX operator's position.

It has been assumed in the foregoing description that the operator at position 1300 was the operator at the central office 100 who received the call which the subscriber at the distant toll office 200 has extended in order to be connected with a certain numbered TX operator. It was further assumed that the operator at position 1300 had operated her link 2100 to extend the call by way of the call switch 2380 and the TX trunk circuit 400 and, as a result thereof, the common start and level distributor 700 was operated, and that a starting ground potential was applied to conductor C2542 in the TX position distributor 1105. In order to complete the description of this connection it will now be necessary to assume that the TX operator is the operator at position 1300 and since this position is now termed a TX position, the class of service keys K2020 and K2040 will be operated to bar CLR calls and toll calls, but because the TX key K2030 is at normal, the position will accept only TX calls. It will also be assumed that the operator at the TX position has operated her talk key K2225 and is, therefore, in a position to receive TX calls.

When the TX operator's position is idle and ready to receive calls, relay R1640 is energized and, at contact 1646, ground potential is applied by way of conductor C2051, contact 2 of the TX key K2030, conductor C2069, to contact 1227 of relay R1220 (which relay is energized from ground at contact 1 of the talk key K2225), conductor C2070, extending to the position distributor 1105, contact 1171, lower winding of the position distributor relay R1175, to battery. Relay R1175, at contact 1175', extends the grounded conductor C2542 to conductor C2071, contact 1 of the TX key K2030, conductor C2072, contact 1221, the upper winding of the TX marking relay R1250, to battery. As a result of the grounding of conductor C2014 responsive to the energization of the class of service relay R860, the call-waiting lamp L2023 is illuminated to indicate to the operator at the TX position that a call is waiting to be answered.

As a result of the energization of the TX relay R1250, ground potential is applied, at contact 1253, to conductor C2077, thereby completing a circuit through contact 1645 for the lower winding of the start relay R1510. In addition, at contact 1251, ground potential is applied to conductor C2076 to ground the first three contacts in the second level of the banks accessible to wiper 2107 in the banks of the answer switch 2180. At contact 1252, relay R1250 completes the following circuit: grounded conductor C2073 (Fig. 7), contact 721, conductor C2074, contact 1252, conductor C2075, terminating in the second vertical contact accessible to the vertical wiper 2108 of the answer switch 2180.

As a result of the above-mentioned operation of the start relay R1510, the answer switch 2180 is operated in the manner previously described to raise its wipers 2102 to 2108, inclusive, in a vertical direction until ground potential applied to conductor C2075 is engaged by the vertical wiper 2108, thereby terminating the vertical movement of the wipers of the switch and initiating rotary movement of the wipers of the switch. The wipers 2102 to 2107, inclusive, rotate across the second level of its associated bank contacts in search of the calling TX trunk circuit 400. When the wipers 2106 and 2107 engage the first contact in the second level of its associated bank, a circuit is completed for energizing the test relay R2120 in the answer switch 2180 over the following circuit: grounded conductor C2076, wiper 2107, winding of test relay R2120, contact 2138, wiper 2106, conductor C483, contact 432 (Fig. 4), contact 421, upper winding of answer relay R410, to battery. The remaining operations of the answer switch 2180 are the same as has been described hereinbefore, and it will suffice to say that switching relay R2130 subsequently energizes and closes the talking conductors at contacts 2131 and 2132 through to the operator's headset.

As a result of the previously traced circuit including relay R2120 and the upper winding of answer relay R410, relay R410 energizes and, at contact 412, locks itself to the grounded conductor C483 independently of the contact 432. At contact 414, relay R410 removes ground potential from conductor C485 and connects conductor C485 by way of contact 413 to the winding of relay R440. At contact 411, relay R410 removes the pad control and line terminating network of the TX trunk circuit 400 from across the talking conductors C481 and C482, which pad control network has maintained the pad control relay R340 in the ring-down toll line circuit 250 energized, and the relay now remains energized under control of the simplex ground applied through the retard coil RT (Fig. 14) of the operator's headset circuit. At contact 415, relay R410 completes an energizing circuit for relay R430, which relay, upon operating, locks itself by way of contacts 435 and 423 independently of ground at contact 415. At contact 431, relay R430 opens another point in the simplex ground circuit for the talking conductors C481 and C482. At contact 432, it opens the initial start circuit for relay R410. At contact 433, it places a shunt around the lower winding of relay R410. At contact 434, it removes ground potential from conductor C2073 permitting the TX group start relay R720 to restore to normal. And, at contact 436, it opens the initial energizing circuit of relay R420.

As a result of the above described deenergization of the TX group start relay R720, the group lock-out relay R710 is deenergized to again complete the starting circuits to the TX group start relays and the CLR group start relays. Furthermore, at contact 722, relay R720 removes ground potential from terminal 1 thereby causing the TX class of service relay R860 to restore, and the removal of ground from conductor C2542 through the position distributor 1105 opens the circuit of the TX marking relay R1250. In addition, the restoration of TX relay R860 removes ground potential from conductors C2014 and C2014' thereby extinguishing the call-waiting lamp at the TX operator's position and at the chief operator's position. As a result of the deenergization of the TX marking relay R1250, ground potential is removed at contact 1253 from the conductor C2077 extending to the common start relay R1510 in the position equipment. Furthermore, relay R1250, upon restoring, removes the marking potential from conductors C2075 and C2076 extending to the vertical bank accessible to the vertical wiper 2108 of the answer switch 2180 and from the bank contact accessible to wiper 2107 of the answer switch 2180.

The operator at the TX position of the switchboard 1200 may now converse with the subscriber at the distant toll office 200 by way of the talking conductors of her headset circuit, the talking conductors of the answer switch 2180, of the link 2100 at the TX operator's position, the TX trunk circuit 400, the call switch and the answer switch of the link at the inward operator's position, that is, the operator who had received the call originally from the distant toll office subscriber, the ring-down trunk circuit 250, the toll trunk 251, the distant toll switchboard 201, to the subscriber in the distant office 200 that has called the particular TX operator in accordance with the original instructions given by a CLR operator.

It should be understood that the inward operator who received the toll call from the distant office 200 has disconnected from the connection by restoring the talk key, similar to talk key K2225, at her position to normal and has no further function to perform other than to release her associated link circuit after the conversation has been terminated. It should also be understood that the equipment furnished at a CLR position, an inward position and a TX position of the toll switchboard 1200 are exactly the same, and, in order to cut down the number of drawings in the disclosure, the link circuit 2100 comprising the answer switch 2180 and the call switch 2380 and the operator's position equipment have been utilized in describing what happens in each of the three different types of positions as the call passes through.

The TX operator ascertains the name and telephone number of the subscriber at the distant toll office and checks the toll ticket originally made out by the CLR operator that extended the call but was unable to complete it to determine the number of the subscriber at substation T1 who desires to get in touch with the subscriber at the distant toll office 200. The TX operator now operates her keyset KS1350 in accordance with the number of the subscriber at substation T1, followed by the momentary operation of the sender disconnect key K1390, whereupon the sender control circuit 2600 and the register sender 3100 function in the manner previously described to control the call switch 2380 individual to the answer switch 2180, the outgoing trunk circuit 500, and the toll switchtrain 600, to extend the connection to the subscriber at substation T1. Automatic ringing takes place under control of the automatic ring relay R2630 in the sender control circuit 2600 in the manner previously described, and when the subscriber at substation T1 answers, the answer relay R610 in the outgoing trunk circuit 500 responds and removes ground potential from conductor C504 thereby causing the front supervisory lamp L2123 associated with the link 2100 to be extinguished. When the front supervisory lamp L2123 is extinguished, the operator at the TX position is informed that the subscriber at substation T1 has responded to the call and that she may now restore the talk key K2225 to normal to disconnect her position equipment from the talking conductors over which the calling subscriber at the distant toll office 200 and the subscriber at substation T1 may now converse.

From the foregoing it will be apparent that the conenction now established between the calling subscriber at the distant toll office and the subscriber at substation T1 in the central office 100 includes the toll switchboard 201 in the distant toll office 200, the ring-down trunk circuit 250 in the central office 100, the operator link circuit, similar to operator link circuit 2100, at the inward operator's position, the TX trunk circuit 400, the link circuit 2100 at the TX operator's position, the outgoing trunk circuit 500, and the toll switchtrain 600 in the central office 100. In order to give supervision to the TX operator when the distant toll operator at switchboard 201 either rings for or desires to recall the TX operator, it is desirable to give this supervision only to the TX operator and without disturbing the operator at the inward position.

It will be recalled that when the inward operator received the call by way of her answer switch and extended it to the TX operator by way of the call switch and the TX trunk circuit 400, a circuit was completed as a result of the operation of the call switch, similar to call switch 2380, for energizing the rear supervisory relay R2270 at the inward operator's position. This relay energized only sufficiently to open its contact 2271, but did not energize sufficiently to open its contact 2272 or close its contact 2273. When the operator at the distant toll board 201 applies ringing current to the toll line 251 in order to recall the TX operator to the connection, the ring-down relay R245 in the ring-down toll line circuit 250 energizes and causes the release of the control relay R240. At contact 242, relay R240 completes an energizing circuit for the lower winding of start relay R350. Relay R350 energizes, and at contact 351, applies ground potential through its upper winding to conductor C256, wiper 2104 of the answer switch 2180 at the inward operator's position, contacts 2133, 2163, upper winding of relay R2270, rear supervisory lamp L2275, to battery. Relay R2270 energizes completely over the above-traced circuit, but the rear supervisory lamp L2275 is not illuminated due to the high resistance of the upper winding of relay R350 and the upper winding of relay R2270. When ringing current is removed from the toll line 251, ring-down relay R245 deenergizes, relay R240 energizes, and the start relay R350 restores and, at contact 351, removes ground potential from conductor C256. As a result of the removal of ground potential from conductor C256, the rear supervisory relay R2270 at the inward operator's position restores to its partially operated position, that is, with contact 2271 open, contact 2272 closed, and contact 2273 open.

As a result of the above-described momentary operation of the rear supervisory relay R2270 in the inward operator's position, ground potential through resistance 2276 and contact 2273 is applied to conductor C2394 of the call switch 2380 at the inward operator's position. As a result of the ground potential applied to conductor C2394, a circuit is completed by way of contacts 2372, 2431, 2443, 2338, wiper 2475, associated contact in its bank to which conductor C485 is connected, cable 490, extending to the TX trunk circuit 400 (Fig. 4), conductor C485, contact 413, winding of supervisory relay R440, to battery. Relay R440 energizes over this circuit and, at contact 441, completes a circuit from ground, contact 441, winding of the lock-in supervisory relay R450, conductor C484 included in cable 405, conductor C484 terminating in the first contact in the second level engaged by wiper 2104 of the answer switch 2180 at the TX operator's position, contacts 2133, 2163, 2271, rear supervisory lamp L2275 at the TX operator's position, to battery. Relay R450 energizes over the above-traced circuit and, at contact 451, completes a locking circuit for itself in series with the rear supervisory lamp L2275 at the TX operator's position. When the rear supervisory relay R2270 at the inward operator's position restores to its partially operated position, ground potential is removed from conductor C2394 at contact 2273, thereby causing the release of the supervisory relay R440 in the TX trunk circuit 400. Relay R440 now restores to normal, and, at contact 441, opens the initial energizing circuit of the lock-in supervisory relay R450, but this relay remains locked up in series with the rear supervisory lamp L2275 at the TX operator's position.

It should be kept in mind that the above description includes two separate link circuits and two separate and distinct rear supervisory relays, one being located at the inward operator's position, and the other being located at the TX operator's position of the switchboard 1200. It will also be apparent from the above description that the rear supervisory lamp L2275, located at the inward operator's position, is not illuminated and the operator at that position is unaware of the fact that the distant toll operator at toll switchboard 201 desires to get in touch with the TX operator. The rear supervisory relay R2270 merely acts as a repeater to repeat the supervisory signal from the inward operator's position to the TX operator's position, and the lock-in supervisory relay R450 locks in the supervisory signal to maintain the rear supervisory lamp L2275 at the TX operator's position illuminated until the TX operator operates the talk key K2225 at her position to connect her headset circuit to the talking conductors extending to the distant toll board 201.

When the operator at the TX position operates her talk key K2225, relays R2210 and R2160 in the link 2100 operate in the manner previously described and transfer the circuit for illuminating the rear supervisory lamp L2275 by way of contact 2162, conductor C2094, contact 1844, rear supervisory relay R1720, to battery. When rear supervisory relay R1720 is placed in the circuit including the lock-in supervisory relay R450 of the TX trunk circuit 400, the latter relay restores to normal to remove its locking ground potential at contact 451. It may be pointed out, however, that if the supervisory relay R440 is again energized, ground potential is applied through the locking supervisory relay R450, conductor C484, wiper 2104 of the answer switch 2180, contacts 2133, 2162, conductor C2094, contact 1844, winding of rear supervisory relay R1720, to battery. Relay R1720 energizes and, at contact 1721, applies ground potential to conductor C2093, contact 2161, contact 2271, rear supervisory lamp L2275, to battery. More specifically, when the lock-in supervisory relay R450 energizes and completes a circuit for the rear supervisory lamp L2275, the lock-in relay R450 will maintain the rear supervisory lamp L2275 illuminated as long as the operator at the TX position is not connected to the link 2100. However, the moment that the operator at the TX position is connected to the link circuit, the supervisory signal for controlling the rear supervisory lamp L2275 is under control of a relay included in the operator's position equipment. Under the latter conditions, the lock-in supervisory relay R450 will not remain locked up in series.

Referring again to the rear supervisory relay R2270 at the inward operator's position, it was pointed out above that when this relay was operated fully and closed its contact 2273, ground potential was applied to conductor C2394 through resistance 2276. When conductor C2394 was grounded, the supervisory relay R440 in the TX trunk circuit 400 energized. It will also be noted that a circuit is completed from ground through resistance 2276, contacts 2273, 2247, 2168, through the front supervisory lamp L2123 at the inward operator's position. However, due to the resistance 2276 and the resistance of the lamp L2123, the latter does not illuminate at this time to signal the operator at the inward position.

It will be recalled that the subscriber at substation T1, although being the called subscriber in the above-described connection, was the original calling subscriber who attempted to establish the connection with a designated party at a particular substation in the distant office 200. It will also be recalled that the TX operator has a toll ticket upon which she indicates the starting time of the conversation and the terminating time of the conversation, and since the subscriber at substation T1 is the subscriber that is to be charged for the connection, the terminating time of the conversation is determined by the steady illumination of the front supervisory lamp L2123 at the TX operator's position. More specifically, when the subscriber at substation T1 restores his receiver upon the switchhook, the relay R618 in the outgoing trunk circuit 500 restores to normal and, at contact 613, applies ground potential to conductor C504 extending by way of cable 501 to a contact in the bank of the call switch 2380 engaged by wiper 2475. Since the call switch referred to is a call switch at the TX operator's position, the ground potential applied to wiper 2475 is extended by way of contacts 2338, 2443, 2431, 2372, conductor C2394, contacts 2247, 2168, front supervisory lamp L2123, to battery. The front supervisory lamp L2123 is illuminated steadily when the subscriber at substation T1 hangs up his receiver indicating to the TX operator that the conversation has been terminated and that she may now release the established connection. When the front supervisory lamp L2123 is illuminated, the operator marks the terminating time of the conversation on the toll ticket and then operates her release key K2201 momentarily to thereby cause the release of the answer switch 2180 and the call switch 2380. As a result of the restoration of the call switch 2380 to normal, the outgoing trunk circuit 500 and the toll switchtrain 600 are restored to normal in the manner previously described. As a result of the restoration of the answer switch 2180 to normal, ground potential is removed from wiper 2106 and its associated bank contact to which conductor C483 is connected, thereby causing the release of the answer relay R410 in the TX trunk circuit 400. The TX operator may now handle additional calls by merely operating a talk key, such as talk key K2225.

As a result of the restoration of the answer relay R410 in the TX trunk circuit 400, a circuit is closed from ground, contact 414, conductor C485, cable 490, conductor C485, terminating in a bank contact engaged by wiper 2475 of the call switch, similar to call switch 2380, located at the inward operator's position. The application of ground potential to wiper 2475 completes a circuit by way of contacts 2338, 2443, 2431, 2372, conductor C2394, contacts 2247, 2168, front supervisory lamp L2123, to battery. The front supervisory lamp L2123, individual to the link circuit at the inward operator's position, is illuminated over the above-traced circuit and is an indication to the inward operator that the connection established between the subscriber at the distant toll office 200 and the operator at the TX position of the switchboard 1200 has now been terminated and that she may release the link circuit at her position over which this connection has been completed. The inward operator may release her link circuit by merely operating the release key, such as key K2201, individual to the link circuit over which the circuit was established, thereby causing the operation of the rear release relay R2150 and the front release relay R2230. As a result of the energization of these relays, the answer switch 2180 and the call switch 2380 at the inward operator's position restore to normal in the same manner as has been described hereinbefore. When the answer switch 2180 restores to normal, ground potential is removed from wiper 2106 and the conductor C251 engaged by the wiper and, as a result thereof, the seizure relay R360 in the ring-down toll line circuit 250 restores to normal. As a result of the restoration of relay R360, the ring-down toll line circuit 250 is restored to normal in a manner previously described. It should be understood, however, that when the calling subscriber at the distant toll office 200 hangs up his receiver, the toll operator at the toll switchboard 201 will disconnect from the toll line 251.

OVERRIDE OF BUSY

In the connection just released as described above, it will be recalled that it included an operator's link circuit at an inward position, which operator answers the call from the distant toll subscriber, and it also included a link circuit at a TX operator's position. In other words, the conversational circuit between the calling toll subscriber in the distant office 200 and the called subscriber at the substation T1 of the central office 100 included two link circuits—one at the inward operator's position and the other at the TX operator's position.

When the traffic through the inward operator's position is rather heavy, it is considered objectionable to tie up a link circuit at her position as well as a link circuit at the TX operator's position. In order to avoid tying up two link circuits in a conversation circuit established between two subscribers as above described, facilities are provided at the TX operator's position whereby she may establish direct connection with the ring-down toll line circuit 250 at a time when that circuit is marked busy as a result of the fact that the inward operator has answered a call received thereover.

In order to describe the operation under these circumstances, it will be assumed that the subscriber at the distant toll board has initiated the connection; that the toll operator at the toll switchboard 201 has transmitted ringing current over the trunk line 251; that the ring-down toll line circuit 250 has caused an answer switch 2180 at an inward operator's position to be connected with the ring-down toll line circuit 250; that the operator at the inward position has operated the associated call switch, such as call switch 2380, to extend the connection by way of the TX trunk circuit 400; that the answer switch 2180 at the TX operator's position has responded and connected with the TX trunk circuit; and that the TX operator has answered and is in communication with the operator at the inward position and the subscriber at the distant exchange 200. The operations of the individual circuits in extending the connection as described above are the same as has been described hereinbefore.

If the operator at the inward position had disconnected from the connection established through her link circuit to the TX operator at another position, the TX operator may ascertain the identity of the particular ring-down toll line circuit which is being utilized in the established connection between the distant toll board and the TX operator. With the talk key, associated with the link at the TX operator's position over which the connection from the TX trunk has been received, in actuated condition, the check key K1940 is actuated to the left to close contacts 1, 3 and 4 of the key. When contact 4 of the key K1940 is closed, ground potential is applied to conductor C2503, thereby energizing the split answer relay R1610, which relay, at contacts 1611 and 1613, disconnects the talking conductors C2090 and C2089 from the operator's telephone circuit and, at contacts 1612 and 1614, connects these conductors through to conductors C2508 and C2506, respectively. Two circuits are completed through contacts 1 and 3 of the check key K1940 over each of the talking conductors C2090 and C2089 to control the check relay R310 in the calling ring-down toll line circuit 250. One of these circuits may be traced as follows: resistance battery, contact 3 of the check key K1940, conductor C2506, extending to Fig. 15, contacts 1833, 1813, 1614, conductor C2089, contacts 2212, 2131, wiper 2102 and its associated engaged bank contact, conductor C481 extending through the TX trunk circuit 400, cable 490, extending to the banks of the call switch similar to call switch 2380 at the inward operator's position, conductor C481 terminating in a bank contact engaged by wiper 2471 of the call switch at the inward operator's position, contact 2332, conductor C2390, contacts 2242, 2214, 2131, wiper 2102 of the answer switch 2180 at the inward operator's position engaging an associated bank contact to which conductor C254 is connected, and extending to the ring-down toll line circuit 250, upper winding of the pad control relay R340, upper winding of impedance 330, lower winding of the check relay R310, to booster battery in which the negative pole is grounded. The other circuit may be traced from ground, contact 2 of the out-of-order key K1975, contact 1 of the check key K1940, conductor C2508, extending to Fig. 15, contacts 1831, 1811, 1612, conductor C2090, contacts 2216, 2132, wiper 2103 of the answer switch 2180 at the TX operator's position and its associated bank contact to which conductor C482 is connected, cable 405, extending to the TX trunk circuit 400, conductor C482, cable 490, extending to the banks of the call switch similar to call switch 2380 at the inward operator's position, conductor C482 terminating in a bank contact engaged by wiper 2472, contact 2334, conductor C2391, contacts 2244, 2218, 2132, wiper 2103 of the answer switch 2180 in the inward operator's position, engaging a bank contact associated therewith to which conductor C255 is connected, conductor C255 extending to the ring-down toll line circuit 250, lower winding of the pad control relay R340, lower winding of impedance 330, contact 312, lower winding of ring-out relay R300, to booster battery in which the negative pole is grounded.

When these circuits are completed over the two talking conductors through the windings of relays R340, R310 and R300, pad control relay R340 remains energized, but due to the fact that negative battery is connected to conductor C254 through the lower winding of check relay R310, and ground potential is connected to talking conductor C255 through the lower winding of relay R300, relay R310 energized and actuated its contacts 311 to 314, inclusive, whereas relay R300, although energized in the opposite direction from the circuit completed through its upper winding, is not sufficiently magnetized to cause its contact 302 to close. At contact 313, relay R310, upon energizing, completes an obvious circuit for illuminating the line checking lamp L315, and, at contact 314, an obvious illuminating circuit is completed for the group checking lamp L316. At contact 312, relay R310 opens the circuit through the lower winding of relay R300, and at contact 311, prepares a circuit for the upper winding of relay R320. However, this circuit is ineffective at this time due to the fact that the talking conductor C255 is grounded.

The checking lamps referred to above are lamps which appear on a panel in front of each operator's position at the toll switchboard 1200, and the corresponding lamps of all operators' positions are multiple together. Therefore, when the group checking lamp is illuminated on the lamp panel before the TX operator, she will be informed of the group number of the group of trunks in which the particular calling trunk is located; and by the illuminated condition of the line checking lamp in the lamp panel, she is informed of the particular ring-down toll line in the indicated group of toll lines. Accordingly, the TX operator, by momentarily operating the check key K1940, can ascertain the particular number of the ring-down toll line circuit over which a connection has been received from a distant exchange. Having ascertained the number of the calling ring-down toll line circuit 250, the operator may now restore her check key K1940 to normal, thereby releasing the check relay R310 in the toll line circuit 250 and restoring the split answer relay R1610 to reconnect the talking conductors C2090 and C2089 to her headset circuit.

In passing, it may be well to mention that in the event that other line or group checking lamps are illuminated at the time the check key K1940 is actuated, the operator at the TX position may flash the key K1940 to cause the particular group of line checking lamps to flash accordingly.

The TX operator at position 1300, instead of controlling the call switch 2380 in the manner previously described, now selects another idle link circuit in the manner to be described hereinafter. When the TX operator has ascertained the name and telephone number of the calling subscriber, she refers to her toll ticket to determine the number of the subscriber that originally desired to get in touch with the now calling-subscriber at the distant toll office 200. After she has found the ticket and has determined the number of the local subscriber at substation T1, she momentarily operates the non-locking dial rear key K1970 and then operates a talk key individual to an idle link circuit at her position.

In order to describe the operations which now take place, it will be assumed that the TX operator has momentarily operated the dial rear key K1970, that the link 2100 is the circuit selected, and that the talk key K2225 has been actuated.

Figure 17:
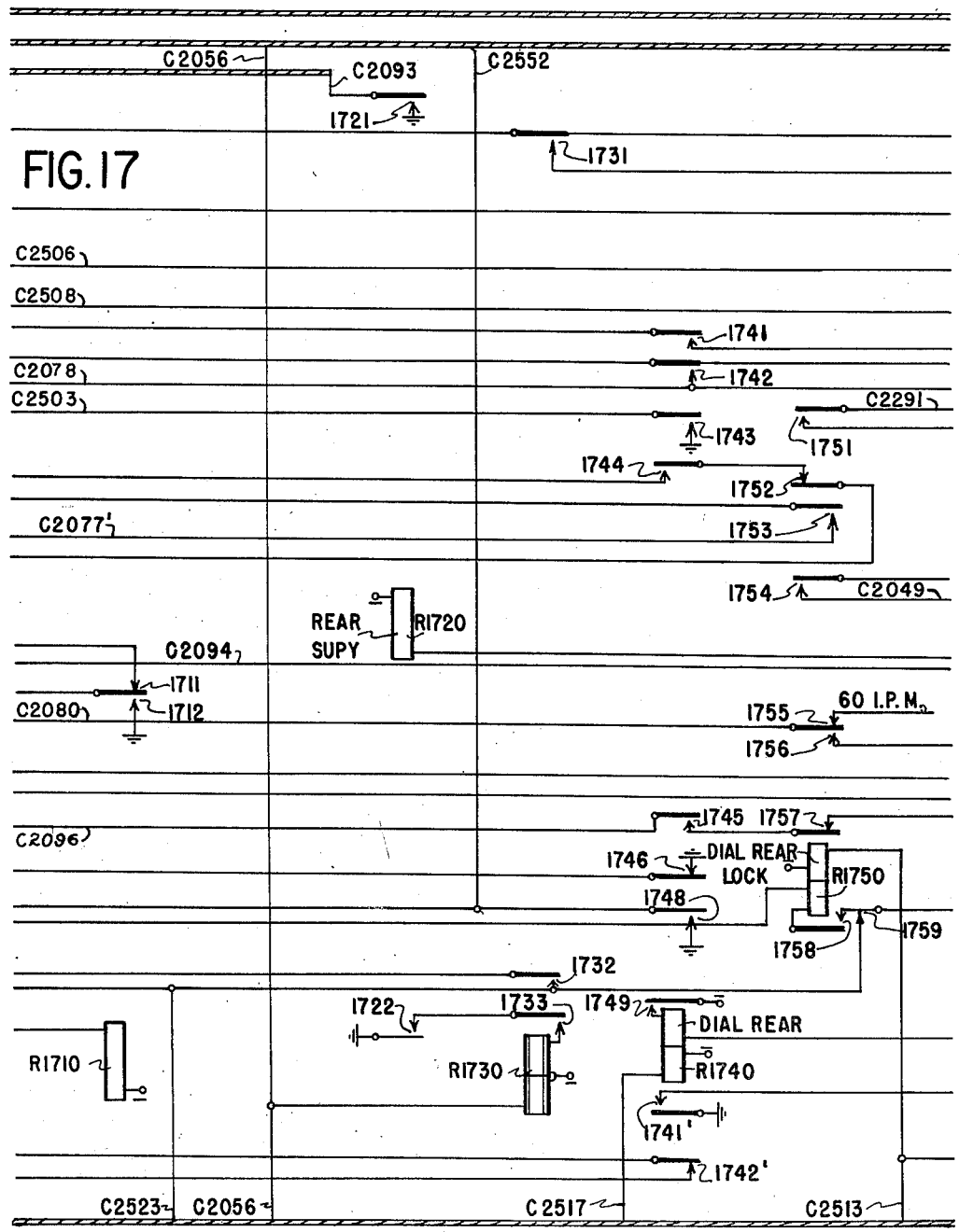
Figure 19:
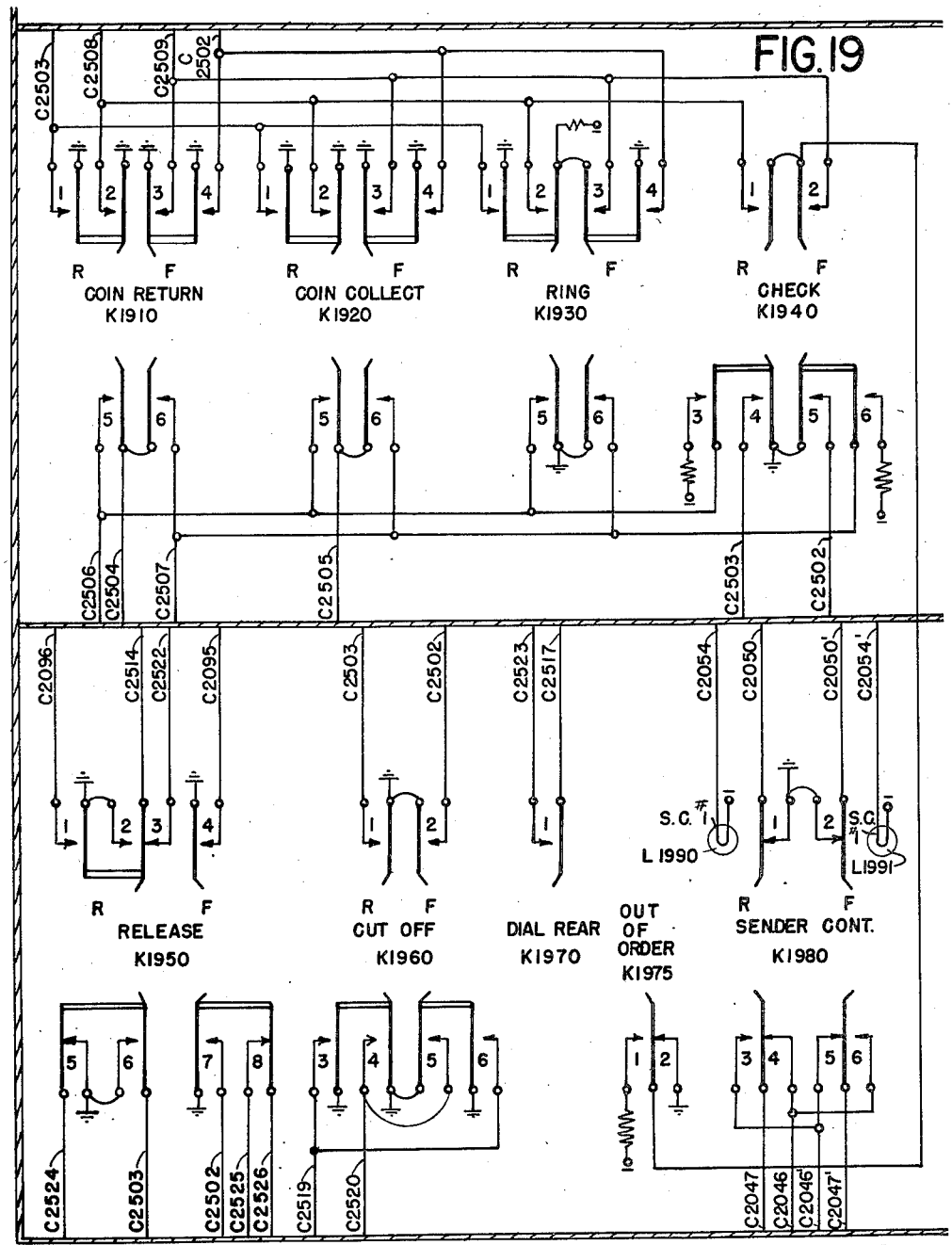
Figure 21A:
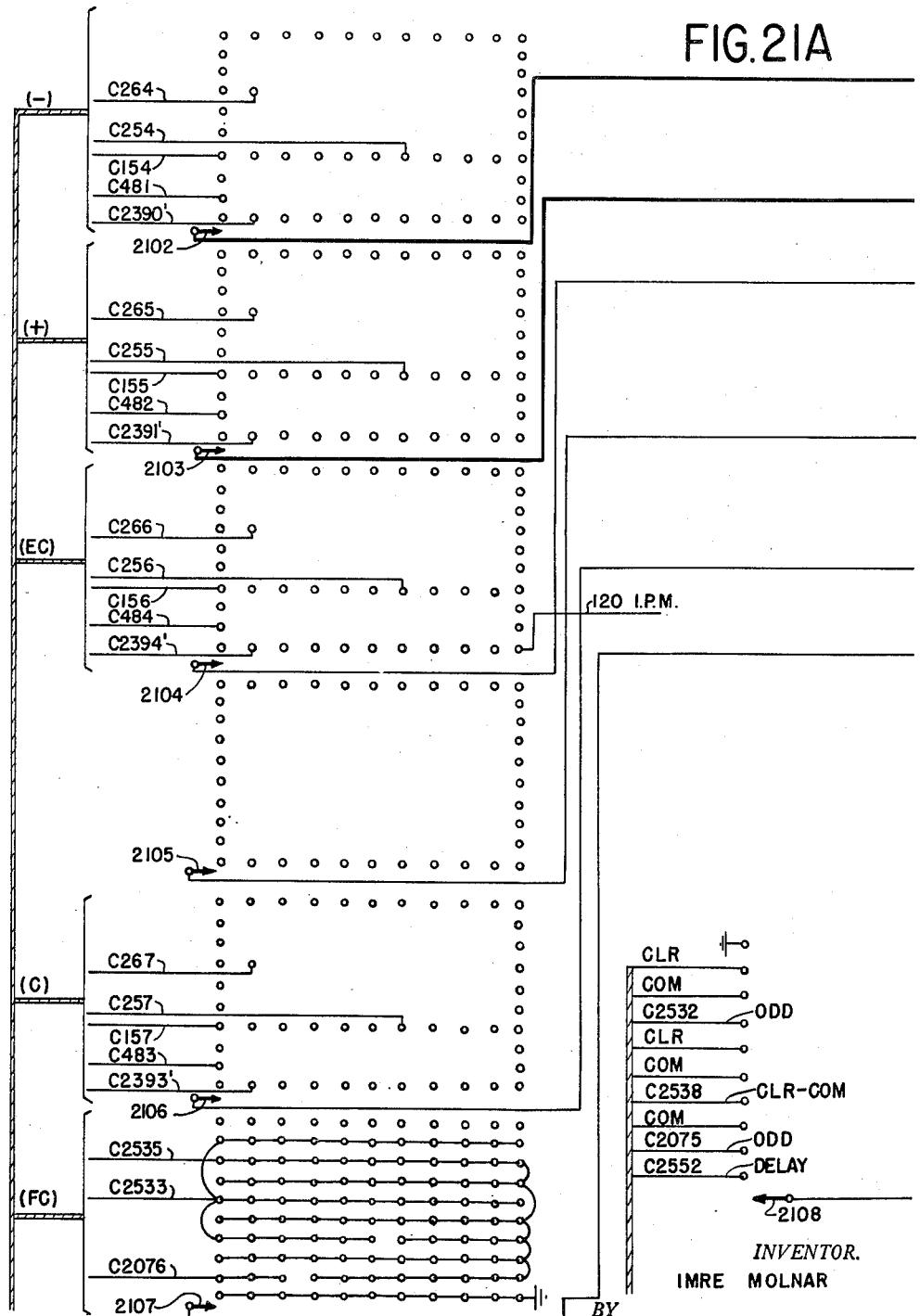

The TX operator at position 1300, upon operating the dial rear key K1970 momentarily, completes a circuit from ground, contact 5 of release key K1950, conductor C2524, extending to Fig. 16, contacts 1668, 1635, conductor C2523, extending to Fig. 19, contact 1 of the dial rear key K1970, conductor C2517, extending to Fig. 17, lower winding of the dial rear relay R1740, to battery. Relay R1740 energizes over the above-traced circuit and completes a locking circuit for its upper winding which may be traced from ground, contact 5 of the release key K1950, conductor C2524, contacts 1668, 1635, 1759, 1821, upper winding of dial rear relay R1740, contact 1749, to battery. Since the dial rear relay R1740 has now locked over a circuit including its upper winding, the dial rear key K1970 may now be restored to normal. At contact 1742', relay R1740 opens the shunt around the lower winding of the rear connect relay R1630; at contact 1741', it completes an energizing circuit for the dial rear slave relay R1840; at contact 1748, it prepares an energizing circuit for the upper winding of start relay R1510, a branch of this circuit extending by way of conductor C2552 to apply ground potential to the first contact in the vertical bank of the answer switch 2180 accessible to wiper 2108; at contact 1744, it prepares a circuit for relay R1650; at contact 1743, it completes an energizing circuit for the split-answer relay R1610; at contact 1742, it prepares a circuit for grounding conductor C2078; and, at contact 1741, it prepares a circuit for shunting down the tone relay R1530.

Figure 18:
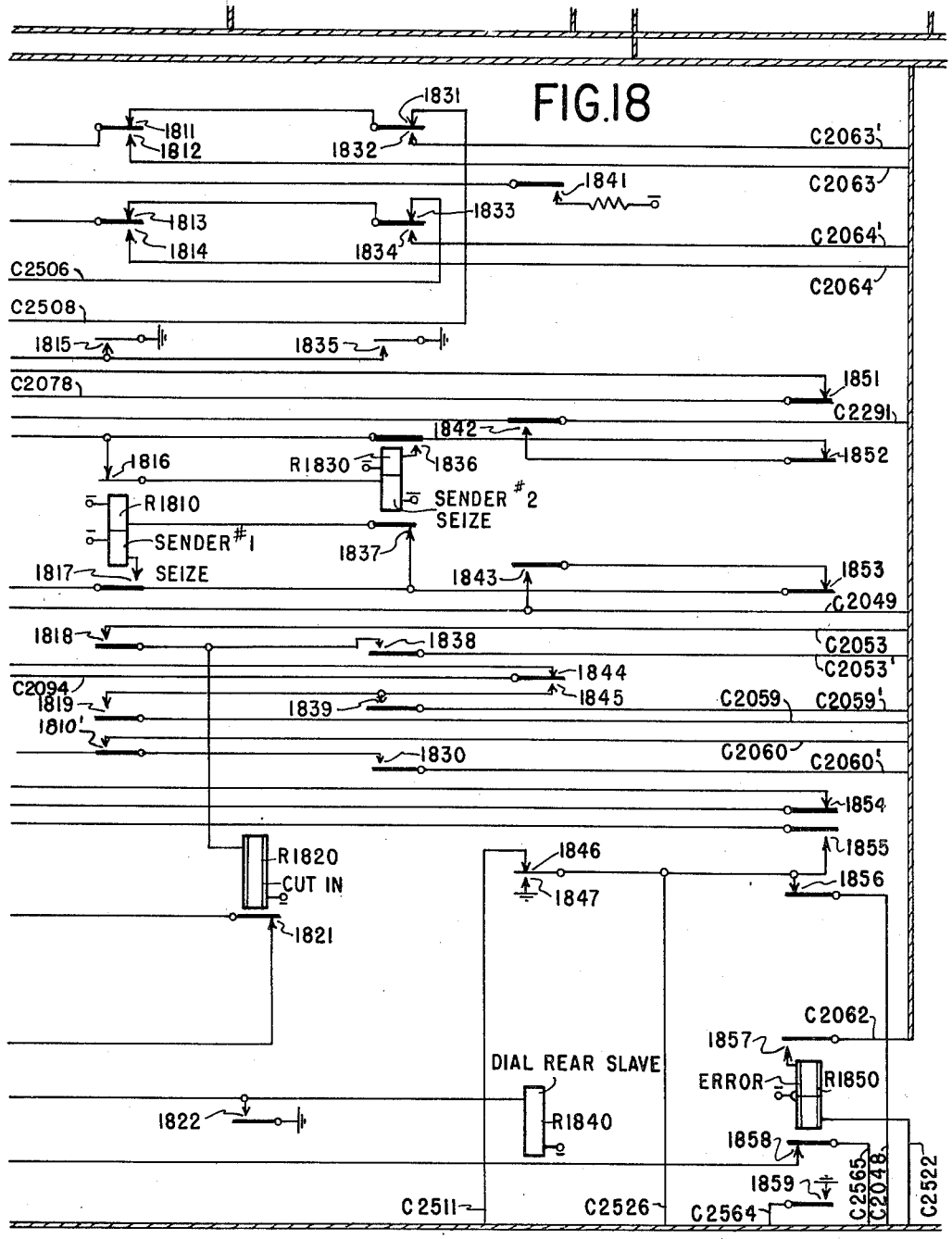

As a result of the energization of the dial rear slave relay R1840, at contact 1847, it completes a circuit from ground, contact 1856, conductor C2048 (extending to Fig. 13), contacts 1326 and 1336 of the sender alternator, conductor C2047 (extending to Fig. 19), contact 4 of the sender control key K1980, conductor C2046 extending to the sender control circuit 2600, contacts 2621, 2645, 2717, winding of the start relay R2730 in the sender control circuit 2600, conductor C2049, extending to Fig. 18, contacts 1843, 1853, 1837, upper winding of the sender #1 seizing relay R1810, to battery. The start relay R2730 in the sender control circuit 2600 is energized in series with the sender #1 seizing relay R1810.

It should be understood at this time that if the sender alternator relays R1320 and R1330 had been energized, the ground potential applied to conductor C2048, instead of being connected through contacts 1326 and 1336 to conductor C2047 to control the sender control circuit 2600, would have been applied by way of contacts 1325 and 1335, conductor C2047', extending to Fig. 19, contact 5 of the sender control key K1980, conductor C2046', extending to the sender control circuit 2800 (Fig. 28), through the start relay, similar to start relay R2730 in the sender control circuit 2600, and returning by way of conductor C2291, extending to Fig. 18, contacts 1842, 1852, 1816, lower winding of the sender #2 seizing relay R1830.

From the above-described circuits it will be apparent that if the sender alternator relays R1320 and R1330 are at normal, the sender control circuit 2600 will be utilized and the sender #1 seizing relay R1810 will be energized, and that if the sender alternator relays R1320 and R1330 are energized, the sender control circuit 2800 will be utilized and the sender #2 seizing relay R1830 will be energized.

For the purpose of describing the present call, it will be assumed that the sender control circuit 2600 will be utilized in this connection and that relay R1810 is energized. At contact 1845 of relay R1840 and contact 1819 of relay R1810, the conductor C2059 extending from the sender control circuit 2600 is extended by way of conductor C2094 to contact 2162 in the link circuit for a purpose which will be apparent from the subsequent description.

As a result of the energization of the sender #1 seizing relay R1810, contacts 1812 and 1814 are closed to extend the talking conductors C2090 and C2089 through to the sender control circuit 2600. It will be recalled at this time that at contacts 1611 and 1613, split-answer relay R1610, upon operating, disconnects the talking conductors C2090 and C2089 from the operator's headset circuit and transfers the conductors, at contacts 1612 and 1614, to conductors C2063 and C2064 by way of contacts 1812 and 1814, to the sender control circuit 2600. At contact 1815, relay R1810 prepares a circuit for starting the answer switch 2180 of the link 2100. At contact 1816, it disconnects the sender #2 seizing relay R1830 to prevent the sender control circuit 2800 from being connected to the operator's position equipment at this time. At contact 1817, it completes an energizing circuit for its low-resistance lower winding. At contact 1818, it prepares a circuit for the cut-in relay R1820, which circuit will be subsequently controlled over conductor C2053 from the sender control circuit 2600. And, at contact 1810', relay R1810 prepares a circuit for controlling the busy lamp L2124 in the answer switch 2180.

The position equipment at the operator's position 1300 is now prepared to control an answer switch, such as answer switch 2180, and the operator at position 1300 now actuates a talk key, such as key K2225, of an idle link circuit at her position. It will be assumed that the TX operator at position 1300 actuates the talk key K2225, and as a result thereof, at contact 1 of key K2225, a circuit is closed from ground, conductor C2064, contact 1417, contact 1445 of the energized relay R1440, contacts 1854, 1634, 1621, one branch of the circuit extending by way of the winding of the position busy relay R1640, to battery, and the other branch of the circuit extending by way of conductor C2515 to the winding of relay R1220. The operation of relay R1220 at this time has no function to perform because it will be recalled that the answer switch 2180 has been marked by ground potential applied to conductor C2552, thereby preventing the switch from raising its wipers beyond the first level. Relay R1640, upon energizing over the above-traced circuit, at contact 1643, completes a locking circuit for itself independent of contact 1445 on the all-links busy relay R1440, which relay will subsequently restore to normal. At contact 1642, relay R1640, upon energizing, prepares a circuit over conductor C2077' for maintaining the connect relay R2210 energized. At contact 1644, relay R1640 completes the energizing circuit for the upper winding of start relay R1510. The closing of contact 1645 has no function to perform at this time.

As a result of the closing of contact 3 of the key K2225, the following circuit is completed for energizing the connect relay R2210: ground, contact 1421 of the energized battery feed relay R1420, contact 1465, conductor C6003, contact 1525, conductor C2521, contact 3 of the key K2225, contacts 2139', 2249, upper winding of connect relay K2210, to battery. Relay R2210 energizes and, at contact 2213', completes a locking circuit for its lower winding in series with the talk relay R1460 from ground, winding of talk relay R1460, contact 1522', contact 1642, conductor C2077', contact 2213', lower winding of connect relay R2210, to battery. The ground potential applied to conductor C2077' is extended by way of contact 2213', contact 4 of key K2225, conductor C2571, contact 1669, winding of relay R1710, to battery.

As a result of the energization of the start relay R1510, a circuit is completed from ground at contact 1512, lower winding of the tone relay R1530, contacts 1632, 1742, conductors C2078, contacts 2236, 2214', 2157, the upper winding of start relay R2160, to battery. It should be noted at this time that the lower winding of the tone relay R1530 is shunted at this time from ground at contact 1815 of the energized #1 seizing relay R1810, contact 1741, to the winding of the tone relay R1530. This ground potential is also extended by way of contact 1632 to energize the upper winding of the start relay R2160. At contact 1513, relay R1510 completes an energizing circuit for the relay R1450, which circuit may be traced from ground, contacts 1712, 1513, lower winding of relay R1450, to battery.

Relay R1450 energizes over the above-traced circuit and, at contact 1455, completes a locking circuit for its lower winding independent of the initial energizing circuit including contact 1513. At contact 1454, relay R1450 completes an energizing circuit for relay R1650, which circuit may be traced from ground, contacts 1454, 1663, 1752, 1744, winding of relay R1650, to battery. At contact 1453, relay R1450 applies ground potential to conductor C2077' in multiple with the ground potential applied thereto through contact 1642.

Upon the energization of relay R1650 over the above-traced circuit, at contact 1654, it closes a multiple path for the locking circuit of the upper winding of dial rear relay R1740. The remaining contacts on relay R1650 have no function to perform at this time.

As a result of the energization of the start relay R2160 in the answer switch 2180, the vertical magnet is operated in the manner previously described to raise the wipers 2102 to 2108, inclusive, in a vertical direction. When the vertical wiper 2108 encounters ground potential on the first contact of the vertical bank, the vertical movement of the wipers is terminated and the rotary action is initiated to cause the wipers 2102 to 2107, inclusive, to be rotated across the associated bank contacts of the first level.

If the first level of the bank contacts accessible to the wipers 2102 to 2104 and 2106, the answer switch 2180 has access to delayed call selectors, such as the delayed call selector 2510. The delayed call selector 2510 is the same as the call switch 2380 (Figs. 23 and 24), and corresponding relays, wipers and conductors have been identically designated insofar as it is necessary to describe the operation of the circuit, except that the designation relating to corresponding parts in the delayed call selector have been primed. It should be noted, however, that conductor C2392 is not required when the call switch 2380 is used as a delayed call selector. Accordingly, when reference is made to any apparatus of the delayed call selector 2510, the circuits may be traced as shown in the call switch 2380 (Figs. 23 and 24), but to maintain a clear line of distinction, the designations will be primed to indicate that the corresponding parts referred to are included in the delayed call selector.

It will be assumed that the delayed call selector terminating in the first set of bank contacts in the first level accessible to wipers 2102 to 2107, inclusive, is busy and the wipers have rotated to the second set of bank contacts in the first level. Assuming that the delayed call selector 2510, terminating in the second set of bank contacts is idle, the following circuit is completed for energizing the test relay R2120 in the answer switch 2180: from ground connected to the bank contacts in the first level accessible to wiper 2107, wiper 2107, winding of test relay R2120, contact 2138, wiper 2106, conductor C2393' extending to the delayed call selector 2510 by way of cable 2511, vertical off-normal contact 2304', upper winding of the series relay R2360', to battery.

The series relay R2360' in the delayed call selector operates and prepares the selector for further operation in the manner previously described in connection with the call switch 2380 (Figs. 23 and 24); and the test relay R2120 in the answer switch 2180 operates in the manner previously described to terminate the rotary movement of the answer switch. The remaining operations of the answer switch 2180 are exactly the same as has been described hereinbefore. As a result of the operation of the test relay R2120, ground potential is applied, at contact 2122, by way of contact 2215', to the conductor C2079, causing the operation of the rear connect relay R1630 in the operator's position equipment.

As a result of the operation of the rear connect relay R1630, the circuit of the position busy relay R1640 and the relay R1220 is opened at contact 1634, and, at contact 1631, ground potential is applied by way of contact 1742 to conductor C2078 in order to maintain the start relay R2160 in the answer switch 2180 energized.

As a result of the restoration of the position busy relay R1640, ground potential is applied on conductor C2065 at contact 1647 in order to maintain the position equipment busy at the position distributor 1105. At contact 1645, relay R1640 opens a point in the circuit for the lower winding of start relay R1510 to disconnect relay R1510 from under control of the TX marking relay R1250 associated with the operator's position equipment. At contact 1644, relay R1640 opens the circuit for the upper winding of the start relay R1510, thereby causing the relay to deenergize. At contact 1641, relay R1640 prepares a further holding circuit for the lower winding of the connect relay R2210 in the answer switch 2180. The deenergization of relay R1220 at the same time relay R1640 deenergized has no function to perform at this time inasmuch as the position distributor 1105 has been ineffective as a result of the operation of the dial rear key K1970.

The start relay R1510 deenergizes as a result of the opening of the circuit for its upper winding and, at contact 1513, opens the initial energizing circuit for relay R1450, and, at contact 1512, it removes ground from the lower winding of the tone relay R1530. It should be understood that the tone relays R1530, R1540 and R1550 have not been energized to transmit the zip-zip tone signal to the operator inasmuch as she has initiated the operation of the answer switch 2180 to connect with a delayed call selector.

Since the answer switch 2180 has been operated to connect with the delayed call selector 2510, start relay R2160 has completed a circuit at contact 2162' for flashing the link busy lamp L2124. The circuit for flashing the lamp L2124 may be traced from the 60IPM conductor (Fig. 17), contact 1755, conductor C2080, contact 2162', resistance 2119, busy lamp L2124, to battery. The lamp is flashed over this circuit to indicate to the operator that the answer switch 2180 has operated to connect with the delayed call selector and to notify the operator that she is working on the link indicated by the flashing lamp. When a register sender has been connected to the sender control circuit, relay R2720 is energized and, at contact 2727, extends ground by way of contact 2674, conductor C2054, extending to Fig. 19, the sender control lamp L1990, to battery, thereby illuminating the lamp L1990 to indicate to the operator that the sender control circuit and an associated idle register sender are in readiness to receive digits which the operator may now key up on the keyset KS1350.

As has been pointed out previously, the operator, in setting up the connection, desires to connect with the busy ring-down toll line circuit 250. Therefore, the automatic ringing circuit, under control of the sender control circuit 2600, must be disconnected so that battery and ground potential will not be connected to the talking conductors of the ring-down toll line circuit 250 after the register sender has cleared out the registered digits. Therefore, the operator now operates the automatic ring key K2070 to remove ground potential from conductor C2052, thereby preventing the operation of the automatic ring relay R2630 in the sender control circuit 2600. The TX operator may now operate the keyset KS1350 to register digits in the register sender associated with the sender control circuit 2600 of the number of the ring-down toll line circuit 250, which number has been ascertained by the TX operator in the manner previously described. After the operator has operated the keys at keyset KS1350 to register the number of the ring-down toll line circuit 250, she then operated the sender disconnect key K1390 to indicate to the sender control circuit that the register sender associated with the sender control circuit and the sender control circuit may be dismissed after the digits registered in the register sender have been retransmitted to control the delayed call selector 2510.

As a further result of the operation of sender disconnect key K1390 ground potential is applied by way of conductor C2513 extending to Fig. 17, the upper winding of dial rear locking relay R1750, to battery. At contact 1758, relay R1750, upon energizing, completes a locking circuit for its lower winding in series with the upper winding of the dial rear relay R1740 from the grounded conductor C2524, contacts 1668, 1636, 1667, lower winding of relay R1750, contacts 1758, 1821, upper winding of relay R1740, contact 1749, to battery. Relays R1750 and R1740 remain energized over this locking circuit and, at contact 1752, relay R1750 opens the energizing circuit of relay R1650 causing the latter relay to restore to normal. At contact 1753, relay R1750 closes the multiple path in the circuit for maintaining relay R2210 energized; at contact 1754, it completes a multiple locking circuit for the lower winding of sender 1 seize relay R1810; at contact 1755, it removes the 60IPM conductor from the circuit for flashing the busy lamp L2124; and, at contact 1756, it extends the circuit of the busy lamp L2124 by way of contact 1810', conductor C2060, to ground at contact 2673 in the sender control circuit, thereby to steadily illuminate the busy lamp L2124.

The digits registered in the register sender by the TX operator are now retransmitted to directively control the delayed call selector 2510 in a vertical and a rotary direction to connect with the busy ring-down toll line circuit 250. The loop circuit for controlling the line relay of the delayed call selector may be traced as follows: ground, lower winding of the line relay R2340' in the delayed call selector 2510, contact 2333', conductor C2391', cable 2511, second bank contact in the first level of the answer switch 2180 engaged by wiper 2103, contact 2132, contact 2216, conductor C2090, contacts 1612, 1812, conductor C2063, contact 2634, conductor C2041, contact 2913 of the sender finder 2900, conductor C2036 extending to the impulse sender 3100A, impulsing contact 3252 of the pulse generating relays in the impulse sender 3100A, conductor C2035, contact 2812, conductor C2400, contact 2649, conductor C2864, extending to Fig. 18, contacts 1814, 1614, conductor C2089, contacts 2212, 2131, wiper 2102 connected with the second bank contact in the first level, conductor C2390', cable 2511, conductor C2890' extending to the contact 2331' and the upper winding of the line relay R2340', to battery in the delayed call selector 2510. The line relay R2340' in the delayed call selector 2510 responds to the impulses transmitted by the impulse generator in the register sender 3100A in the manner previously described to cause the wipers 2471' to 2475' of the delayed call selector to be raised to a level corresponding to the value of the impulses transmitted and to rotate over the selected level in the manner previously described to a contact in the level corresponding to the value of the digit registered.

When the operator decided to make the above described delayed call, she operated the direct key K2085, thereby causing the operation of the override busy relay R2660 in the sender control circuit 2600. As a result of the operation of relay R2660, a circuit was prepared, at contact 2662, for applying ground potential to conductor C2059 when the cut-in relay R2750 operated. When ground potential is applied to conductor C2059, it is extended by way of contacts 1819, 1845, conductor C2094, contacts 2162, 2133, wiper 2104 engaging the second bank contact in the first level of the answer switch 2180, conductor C2394', cable 2511, conductor C2394' extending to the delayed call selector 2510, contacts 2372', 2431', contact 2421' of relay R2420', which relay is energized during the rotary motion of the delayed call selector 2510, winding of relay R2460', to battery. As a result of the energization of relay R2460', ground potential, at contact 2461', is extended to the winding of relay R2430', to battery. Relay R2430' energizes and, at contact 2431', opens the initial energizing circuit of relay R2460' and, at contact 2432', locks itself to the grounded conductor C2394'. Relay R2460' deenergizes and, at contact 2461', opens the initial energizing circuit of relay R2430'. As a further result of the energization of relay R2430', it completes a circuit, at contact 2434', for energizing the switch-throw relay R2330', thereby disconnecting the operating circuit of the rotary magnet 2425'.

From the foregoing description it will be understood that when the last digit controlling the rotary movement of the delayed call selector 2510 has been received, the test circuit, for testing whether or not the engaged bank contacts are busy or idle, is open and the switch-through relay is immediately operated to extend the connection through to the contacts engaged by the wipers 2471' to 2475' of the delayed call selector 2510.

It will be assumed that the wipers 2471' to 2475' of the delayed call selector 2510 have been operated to the sixth level of its associated bank contacts and have thereby connected with conductors C371 to C374, inclusive, extending to the ring-down toll line circuit 250. It should be understood that the wiper 2474' has no function to perform at this time because there is no conductor extending to the ring-down toll line circuit 250 connected to the bank contact accessible to wiper 2474'.

In order to maintain the switch-through relay

R2330' in the delayed call selector 2510 energized and also to maintain the seizure relay R360 in the ring-down toll line circuit 250 energized, it should be noted that when the answer switch 2180 switched through and relay R2130 was energized, ground potential is extended by way of contacts 2143, 2137, wiper 2106 engaging the second bank contact in the first level, conductor C2393', cable 2511, conductor C2393' extending to the delayed call selector 2510, contact 2339' of the switch-through relay, winding of the switch-through relay R2330', to battery. The switch-through relay in the delayed call selector 2510 is thereby held under control of the answer switch 2180. At contact 2335', switch-through relay R2330' extends ground forward by way of contacts 2363', 2412', wiper 2473', conductor C373 extending by way of cable 252, contacts 324, 354, winding of the seizure relay R360, to battery. The seizure relay R360 is now maintained energized from ground extended forward by way of switch-through relay of the delayed call selector 2510 and also from grounded conductor C257 extended by way of the answer switch, similar to answer switch 2180, located in a link circuit at the inward operator's position.

It should be appreciated that in the event that the operator at the inward operator's position should release the answer switch at her position from the ring-down toll line circuit 250, the seizure relay R360 in the ring-down toll line circuit will not release to disconnect the ring-down toll line circuit from the delayed call selector 2510, which selector is under control of an operator at a TX operator's position.

Referring now to the sender control circuit 2600, it will be recalled that after all the digits registered in the register sender 3100 have been transmitted and the register sender is ready to clear out, the cut-in- relay R2640 in the sender control circuit is energized and ground potential is applied to conductor C2053 in the usual manner. The application of ground potential to conductor C2053 is extended by way of contact 1818 of relay R1810 causing the energization of the cut-in relay R1820. At contact 1822, relay R1820 places a holding ground on the dial rear slave relay R1840 to maintain in that relay energized and, at contact 1821, it opens a locking circuit for the dial rear locking relay R1750 and the dial rear relay R1740. Relays R1740 and R1750 restore to normal. Relay R1750, upon deenergizing, at contact 1751, opens a point in the incompleted circuit for the winding of relay R1830. At contact 1752, it again prepares a circuit for relay R1650; at contact 1753, it opens a point in the multiple holding circuit for the connect relay R2210; at contact 1754, it opens a multiple circuit for the lower winding of sender 1 seizure relay R1810; at contact 1756, it disconnects the ground potential from the sender busy lamp L2124; and, at contact 1755, it reconnects the 60IPM conductor to the busy lamp L2124 to cause the lamp to again give a flashing signal. The closing of contact 1757, upon the restoration of relay R1750, has no function to perform at this time, and at contact 1758, relay R1750 opens the point in the locking circuit for its lower winding.

As a result of the restoration of the dial rear relay R1740, at contact 1741, it opens the shunting circuit for the tone relay R1530; at contact 1742, it opens a point in the multiple circuit for maintaining the start relay R2160 energized; at contact 1743, it opens the energizing circuit for the split answer relay R1610, which relay now restores to normal; at contact 1748, it removes the marking ground potential from conductor C2552, which conductor has marked the first level in the vertical bank contact accessible to wiper 2108 of the answer switch 2180; at contact 1749, it opens a point in the locking circuit for its upper winding; at contact 1741', it opens a point in the energizing circuit of relay R1840; and, at contact 1742', it places a shunt around the lower winding of the rear connect relay R1630 to render that relay slow in releasing.

When the register sender 3100 and the sender control circuit 2600 eventually clear out, ground potential is removed from conductors C2053 and C2049 extending to Fig. 18. When ground potential is removed from conductor C2049, the locking circuit for the lower winding of the sender 1 seizing relay R1810 is opened and the relay deenergizes. The removal of ground potential from conductor C2053 opens the circuit of the cut-in relay R1820 causing that relay to slowly release. As a result of the deenergization of the sender 1 seizing relay R1810, the connection by way of conductors C2063 and C2064 extending to the sender control circuit 2600 is opened at contacts 1812 and 1814. At contacts 1818, 1819 and 1810', conductors C2053, C2059 and C2060 extending to the sender control circuit are disconnected from the operator's position equipment. As a result of the deenergization of relay R1820, the holding circuit for the dial rear slave relay R1840 is opened at contact 1822, thereby restoring the relay to normal. At contact 1847, relay R1840 removes ground potential from conductor C2048, thereby removing the initial starting ground from the sender control circuit. At contact 1844, relay R1840 connects the rear supervisory relay R1720 to conductor C2094 so that, in the event that the operator at the distant toll board should desire to recall the TX operator, the relay R1720 can be operated to illuminate the rear supervisory lamp L2270.

The TX operator at position 1300 is now in communication with the subscriber at the distant toll office 200 by way of the answer switch 2180, the delayed call selector 2510 and the ring-down toll l'ne circuit 250. Therefore, the link circuit at the inward operator's position, the TX trunk circuit 400 and the answer switch, similar to answer switch 2180 at the TX operator's position, over which circuits the TX operator received the call from the answering inward operator's position, may now be released. In order to release this connection, the TX operator operates the release key K2201, individual to the answer switch at her position, over which the call was received. As a result of the operation of the release key, the answer switch is restored to normal, and as a result thereof, the front supervisory lamp, individual to the link circuit at the inward operator's pos'tion. is illuminated, thereby indicating to the operator at the inward position that the TX operator has released the connection. Consequently, the inward operator may now operate the release key such as key K2201, individual to the link circuit at her position over which the connection had previously been established. The restoration of the answer switch, such as answer switch 2180 at the inward operator's position, removes ground from the conductor C257 extending to the seizure relay R360 in the ring-down toll line circuit 250. However, as has been pointed out hereinbefore, the seizure relay R360 in the ring-down toll line circuit 250 does not deenergize at this time because it is maintained energized from the delayed call selector 2510 under control of the TX operator. The connection between the subscriber at the distant toll office and the TX operator now includes the distant toll board 201, the ring-down toll line circuit 250, the delayed call selector 2510 and the answer switch 2180 at the TX operator's position, instead of the ring-down toll line circuit 250, a link circuit comprising an answer switch and a call switch at the inward operator's position, the TX trunk circuit 400 and an answer switch at the TX operator's position.

Since the TX operator has now established a connection with the distant calling subscriber independently of the inward operator's position, the TX operator may now control the call switch 2380, the outgoing trunk circuit 500 and the toll switchtrain 600 to extend the connection to the original calling subscriber at substation T1. In order to extend this connection it will be necessary to associate the second sender control circuit 2800 individual to the TX operator's position and an idle register sender, similar to register sender 3100, to the link circuit 2100.

It will be recalled that at the time the sender 1 seizing relay R1810 was energized the circuit therefor was extended over conductor C2049 to the sender control circuit 2600. It is to be noted that when the answer switch 2180 is operated and relay R2160 energized, the sender 1 connect relay R2250 in the link circuit 2100 was connected by way of its lower winding in multiple with relay R1810 over conductor C2049. It is to be noted, however, that due to the resistance of the upper and lower windings of relay R1810, the lower winding of relay R2250 does not receive sufficient current to cause this relay to energize in multiple with relay R1810. Consequently, the sender control circuit 2600 was connected to the TX operator's position equipment by way of conductors C2063, C2064, C2049, C2053, C2059 and C2060. It will also be recalled that when the TX operator completed registering the digits representing the ring-down toll line circuit 250 in the register sender associated with the sender control circuit 2600, she operated the sender disconnect key K1390 to indicate that the sender control circuit 2600 and its associated register sender should clear out after all the digits registered in the register sender have been retransmitted. As a further result of the operation of the sender disconnect key K1390, the sender alternator relays R1320 and R1330 are actuated in the manner previously described herein, and, at contacts 1325 and 1335, complete a circuit for connecting the sender control circuit 2800 to the link 2100. This circuit may be traced as follows: from ground, contact 1847 on the energized dial rear slave relay R1840, contact 1856, to conductor C2048, or if the rear connect relay R1630 is energized, from ground at contact 1637, conductor C2525 extending to contact 8 of the release key K1950, conductor C2526 extending to Fig. 18, in multiple with the ground at contact 1847, contact 1856, conductor C2048, contacts 1325 and 1335 of the energized sender alternator relays, conductor C2047', extending to Fig. 19, contact 5 of the sender control key K1980, conductor C2046', extending to the sender control circuit 2800 through contacts such as contacts 2621, 2645, 2717, start relay R2730, to conductor C2291 in the sender control circuit 2800 extending to Fig. 22, contacts 2233, 2161', 2242', 2257, lower winding of the sender #2 connect relay R2260. The multiple circuit of conductor C2291, extending to Fig. 18, and the lower winding of the sender 2 seizing relay R1830 is opened at contact 1816 of the energized sender 1 seizing relay R1810. The sender #2 connect relay R2260 energizes over the above-traced circuit and, at contacts 2261, 2262, 2263, 2265 and 2268, connects conductors C2064', C2063', C2053', C2059' and C2060' of the sender control circuit 2800 to the link circuit 2100. At contact 2264, relay R2260 places ground potential on conductor C2393, thereby causing the operation of the series relay R2360 in the call switch 2380 associated with the link 2100. At contact 2266, relay R2260 opens a point in the incomplete energizing circuit of the sender 1 connect relay R2250, and at contact 2267, relay R2260 completes a locking circuit for its upper winding by way of contact 2233 and the grounded conductor C2291. It should be noted that the latter circuit is in multiple with the circuit for the lower winding of the sender 2 connect relay R2260 in order to prevent the energization of the sender 2 seizing relay R1830 in the operator's position equipment in the event that the sender #1 seizing relay R1810 is subsequently deenergized.

Responsive to the seizure of the sender control circuit 2800, the sender finder 2900 is operated in the usual manner to associate an idle register sender, such as register sender 3100, with the sender control circuit 2800. When this occurs, the conductor C2054' is grounded and completes a circuit for illuminating the sender control #2 lamp L1991 associated with the sender control key K1980 to indicate to the operator at the TX position that the second sender control circuit 2800 and an associated idle register sender have been connected to the call switch 2380.

The TX operator will now restore the automatic ring key K2070 to normal in order to permit the sender control circuit to control the automatic ringing at the proper time. After restoring the automatic ring key K2070 to normal, the TX operator at position 1300 manipulates her keyset KS1350 in the usual manner to register the digits of the original calling subscriber at substation T1. After these digits have been registered in the register sender associated with the sender control circuit 2800, the operator momentarily operates the sender disconnect key K1390 to indicate to the sender control circuit 2800 and its associated register sender that the sender control circuit and the register sender may be dismissed after all of the digits registered in the register sender are retransmitted.

The line relay R2340 of the call switch 2380 is controlled by the first digit registered in the register sender to raise the wipers 2471 to 2476, inclusive, to the fourth level of its associated bank contacts, and thereafter the wipers are rotated over the banks of the fourth level in search of an idle outgoing trunk circuit, similar to the outgoing trunk circuit 500. Assuming that the idle outgoing trunk circuit 500 is seized when the wipers of the call switch 2380 engage the bank contacts to which conductors C502 to C505, inclusive, are connected. The switch-through relay R2330 in the call switch 2380 is operated as a result thereof and extends the talking conductors C2390 and C2391 through to conductors C502 and C503 to the outgoing trunk circuit 500. Further impulses transmitted by the register sender associated with the sender control circuit 2800 are transmitted over conductors C2390 and C2391, conductors C502 and C503, conductors C602 and C603 to the toll switchtrain 600, thereby to cause the switches in the toll switchtrain to extend the connection to the line of the subscriber at substation T1. Ringing of the called subscriber at substation T1 is controlled by the operation of the ringing relay R650 in the outgoing trunk circuit 500 in the same manner as has been described hereinbefore. The front supervisory lamp L2123 in the operator link 2100 is illuminated when the call switch 2380 has extended the connection to the outgoing trunk circuit 500.

When the subscriber at substation T1 answers, the answer relay R610 in the outgoing trunk circuit 500 is energized and, at contact 613, removes ground potential from the conductor C504, thereby extinguishing the front supervisory lamp L2123 to indicate to the operator at the TX operator's position 1300 that the original calling subscriber has answered the call.

It should be remember, however, that the cut-in relay R2240 is energized over conductor C2053' when the sender control circuit 2800 is in the process of clearing out and that just prior to the complete restoration of the sender control circuit 2800 to normal, the ground potential applied to conductor C2291 is removed, thereby causing the release of the sender #2 connect relay R2260, which relay, upon restoring, disconnects the sender control circuit 2800 from the operator link circuit 2100.

The TX operator at position 1300 may now inform the subscriber at substation T1 that she has obtained the particular subscriber at the distant toll office 200 who the subscriber at substation T1 desired to be connected with. In order to disconnect her equipment from the connection, the TX operator restores the talk key K2225 to normal and marks the toll ticket to indicate the starting time of the conversation between the subscriber at substation T1 and the subscriber at the distant toll office 200. If the operator at the distant toll switchboard desires to signal the TX operator, she may ring down over the ring-down toll line circuit 250 in the manner previously described to cause the rear supervisory lamp L2275 to be illuminated, and if the subscriber at substation T1 desires to signal the TX operator at position 1300, momentary operation of the switchhook at substation T1 will cause the front supervisory lamp L2123 to be flashed. Reconnection by the TX operator at position 1300 to the talking conductors of the link 2100 may be accomplished in the same manner as has been described hereinbefore.

When the conversation between the subscribers has been terminated and the subscriber at substation T1 restores his receiver upon the switchhook, the front supervisory lamp L2123 is illuminated steadily to indicate to the operator at position 1300 that the conversation between the two subscribers has been terminated. The operator now marks the terminating time upon the toll ticket in order that a charge may be computed for the cost of the call, and she then operates the release key K2201 individual to the link 2100, and as a result thereof, the rear release relay R2150 and the front release relay R2230 are energized in a manner previously described to cause the restoration of the answer switch 2180 and the call switch 2380 in the usual manner. As a result of the restoration of the answer switch 2180, ground potential is removed from conductor C2393' extending to the delayed call selector 2510, thereby causing the release of the switch-through relay R2330' in the delayed call selector. The restoration of the switch-through relay in the delayed call selector 2510 causes the operation of the release magnet 2367', and the wipers 2471' to 2475' of the delayed call selector are restored to normal in the usual manner. As a result of the restoration of the delayed call selector 2510 to normal, ground potential is removed from conductor C373 extending to the ring-down toll line circuit 250, thereby causing the restoration of the seizure relay R360 to normal.

The call switch 2380 of the link 2100 is restored to normal responsive to the release of the cut-in relay R2240, which relay, at contact 2246, removes ground potential from conductor C2393 thereby releasing the switch-through relay R2330 in the call switch 2380. The call switch 2380, the subsequent outgoing trunk circuit 500 and the toll switchtrain 600 all restore to normal in the same manner as has been described hereinbefore. The link circuit 2100 at the TX operator's position has now been completely released and may be utilized by the TX operator to receive additional calls at her position.

ABANDONMENT OF A DELAYED CALL

Under some circumstances it may be necessary for the TX operator at position 1300 to abandon a delayed call after she has operated the dial rear key and a talk key of the idle link circuit.

It will be recalled that when the operator at the TX operator's position operated the dial rear key K1970 relays R1740 and R1840 in the operator's position equipment were operated and an idle sender control circuit had been connected to the operator's position equipment as a result of the operation of the sender #1 seizing relay R1810. It will also be recalled that the answer switch 2180 was operated as a result of the actuation of the talk key K2225 to raise its wipers to the first level and connect with an idle delayed call selector. It will also be recalled that when the answer switch 2180 connected with the delayed call selector 2510, the rear connect relay R1630 in the operator's position equipment was energized, causing the restoration of position busy relay R1640 and relay R1220. If, at this time, the TX operator is required to handle some other call, she may cause the release of the answer switch 2180 and the dismissal of the sender control circuit connected to the operator's position equipment by merely restoring the talk key K2225 to normal.

When the talk key K2225 is restored to normal in order to abandon a partially completed delayed call connection, contact 4 of the talk key K2225 is opened thereby removing ground potential from conductor C2571 and causing the release of relay R1710 in the operator's position equipment. At contact 1711, relay R1710, upon restoring, completes a circuit from ground, contact 1633 of the energized rear connect relay R1630, contact 1651 of the energized relay R1650, contact 1711, lower winding of relay R1660, to battery. Relay R1660 energizes and, at contact 1664, completes a multiple circuit for its lower winding; at contact 1662, it completes a circuit for its upper winding from ground at contact 1454; and, at contact 1663, it opens the energizing circuit for relay R1650. At contact 1665, relay R1660 completes a circuit from ground, conductor C2096, contact 2212' of the energized connect relay R2210, resistance J, lower winding of rear release relay R2150, to battery, and ground potential is extended by way of contact 2144 of the energized change-over relay through its upper winding to ground, thereby short-circuiting the upper winding of the relay and causing it to deenergize.

As a result of the deenergization of change-over relay R2140, a circuit is completed from ground, contact 2146, contact 2154 of the rear release relay R2150, winding of the release magnet 2170, to battery. The release magnet, upon energizing, causes the wipers 2102 to 2108, inclusive, of the answer switch 2180 to restore to normal in the usual manner.

At contact 1668, relay R1660 disconnects the grounded conductor C2524 from the locking circuit for the upper winding of the dial rear relay R1740, this circuit having previously been completed from ground on conductor C2524, contact 1668, contact 1654 of the previously energized relay R1650, contacts 1759, 1821, upper winding of dial rear relay R1740, contact 1749, to battery. Relay R1740 restores to normal and, at contact 1741' opens the energizing circuit for the dial rear slave relay R1840, which relay also restores to normal. At contact 1843, relay R1840, upon restoring, opens the circuit of the sender 1 seized relay R1810, which circuit has previously been completed over conductor C2049 extending to the sender control circuit 2600. As a further result of the opening of contact 1843, the sender start relay R2730 in the sender control circuit 2600 restores to normal. The restoration of the start relay R2730 causes the sender control circuit 2600 and the associated sender finder 2900 and the register sender, such as register sender 3100, to clear out in the usual manner.

As a further result of the restoration of the talk key K2225, to normal, at contact 2 thereof the circuit for the upper winding of relay R1450 is opened. Relay R1450 thereupon restores and, at contact 1454, removes ground potential from the upper winding of relay R1660. However, this relay remains energized over a circuit including its lower winding until relay R1630 restores to normal. The locking circuit for the lower winding of connect relay R2210 extending by way of conductor C2077' is opened at contact 1453 as a result of the deenergization of relay R1450; it is opened at contact 1642 as a result of the deenergization of the position busy relay R1640; and it is opened at contact 1753 because the dial rear locking relay R1750 has not been energized since it has been assumed that the operator at the TX operator's position has not as yet operated the sender disconnect key K1390. Relay R2210, upon restoring, at contact 2215', opens the circuit for extending ground by way of conductor C2079 to the upper winding of the rear connect relay R1630. This relay now restores to normal and, at contact 1633, opens the circuit for the lower winding of relay R1660. Upon deenergizing, relay R1660, at contact 1665, removes ground potential from conductor C2096, thereby opening the circuit for the lower winding of the rear release relay R2150. Upon deenergizing, relay R2150, at contact 2157, again prepares a circuit for the upper winding of the link start relay R2160. The answer switch 2180 has now been completely restored to normal and the sender control circuit which has been connected to the operator's position equipment has been dismissed and the operator at the TX operator's position may now operate a talk key associated with an idle link circuit in order to handle some other call.

CALL ORIGINATED BY THE TX OPERATOR

Referring now to Figs. 1 and 1A, it will be assumed that the subscriber T3 at the CAX2500 has attempted to establish a connection with the local subscriber T2 and has accordingly operated the finder connector link at the CAX2500 and extended a call by way of the two-way CAX trunk circuit 2540, which call is received by an operator at the toll switchboard 1200 who has her class of service keys actuated so that her position will receive CAX and CLR trunk calls. It will also be assumed that the operator at the toll switchboard 1200 has actuated the call switch 2380 individual to the answer switch 2180, which has connected with the two-way trunk CAX circuit 2540 and has attempted to extend the call by way of the outgoing trunk circuit 500 and the toll switchtrain 600 to the subscriber at substation T2. It will also be assumed that due to the fact that the connection between the subscriber T3 and the subscriber T2 could not be completed at the time it was extended by the operator, she has made out a toll ticket containing the information regarding the call and has asked the subscriber at substation T3 whether or not she should subsequently attempt to complete the desired connection.

Assuming that the subscriber at substation T3 desires to have the operator at the toll switchboard 1200 complete this connection and the operator has informed the subscriber at substation T3 that she will call him back when she has finally established a connection to the desired subscriber at substation T2. The connection between the subscriber T3 and the operator at the toll switchboard 1200 is thereupon released to normal. The operator at switchboard 1200 who has made out the above referred to toll ticket now passes this ticket to an operator at a TX operator's position, who at convenient intervals attempts to establish the connection indicated upon the toll ticket.

When the operator at a TX operator's position attempts to establish the connection between the subscriber T3 and subscriber T2, she first extends the connection to the subscriber at substation T3 by way of her answer switch, but does not dial the last digit of the called subscriber's number until she has obtained the connection with the wanted subscriber at substation T2. In other words, the finder connector link at the CAX is designed so that the wipers of the connector portion of the link may be connected to the line of the subscriber at substation T3, but that ringing current will not be projected over the line until a further digit selecting the proper ringing frequency is transmitted to the connector portion of the finder connector link. In this way the TX operator busies the line of the subscriber at substation T3 to prevent other connections from being established to that subscriber's line during the time that the TX operator attempts to connect with the desired subscriber at substation T2.

When the TX operator does establish the connection with the subscriber at substation T2, she may now transmit the last digit to the finder connector link at the CAX2500, whereupon ringing current is transmitted over the line of the subscriber at substation T3, and when the subscriber answers, the connection between the calling and called subscriber is completed.

The operation of the equipment to establish the above type of call will now be described in detail.

The TX operator first momentarily operates the dial rear key K1970, whereupon a circuit is completed from ground, contact 5 of the release key K1950, conductor C2524 extending to Fig. 16, contacts 1668, 1635, conductor C2523 extending to Fig. 19, contact 1 of the dial rear key K1970, conductor C2517 extending to Fig. 17, lower winding of dial rear relay R1740, to battery. Relay R1740 energizes over the above-traced circuit and completes a locking circuit for its upper winding which may be traced from ground, contact 5 of the release key K1950, conductor C2524, contacts 1668, 1635, 1759, 1821, upper winding of dial rear relay R1740, contact 1749, to battery. The dial rear relay R1740 immediately locks up over a circuit including its upper winding as soon as the circuit is completed through its lower winding; therefore, the momentary actuation of the dial rear key K1970 is sufficient to lock up the dial rear relay R1740. At contact 1742', relay R1740 opens the shunt around the lower winding of the rear connect relay R1630; at contact 1741', it completes an energizing circuit for the dial rear slave relay R1840; at contact 1748 it prepares an energizing circuit for the upper winding of start relay R1510, a branch of this circuit extending by way of conductor C2552 to apply ground potential to the first contact in the vertical banks of the answer switches, such as answer switch 2180; at contact 1744 it prepares a circuit for relay R1650; at contact 1743 it completes an energizing circuit for the split answer relay R1610; at contact 1742, it prepares a circuit for grounding conductor C2078; and at contact 1741, it prepares a circuit for shunting the lower winding of the tone relay R1530.

As a result of the energization of the dial rear slave relay R1840 at contact 1847, it completes a circuit from ground, contact 1856, conductor C2048, extending to Fig. 13, contacts 1326 and 1336 of the sender alternator, conductor C2047, extending to Fig. 19, contact 4 of key K1980, conductor C2046 to the sender control circuit 2600, contacts 2621, 2645, 2717, winding of start relay R2730 in the sender control circuit 2600, conductor C2049, extending to Fig. 18, contacts 1843, 1853, 1837, upper winding of the sender 1 seizing relay R1810, to battery. The start relay R2730 in the sender control circuit 2600 is energized in series with the sender 1 seizing relay R1810.

As a result of the energization of the sender 1 seizing relay R1810, contacts 1812 and 1814 are closed to extend conductors C2090 and C2089 by way of contacts 1612 and 1614 of the energized split answer relay R1610 through to the sender control circuit 2600 by way of conductors C2063 and C2064. At contacts 1815, relay R1810 prepares a circuit for starting the answer switch 2180 of the link 2100. At contact 1816, it disconnects the sender 2 seizing relay R1830 to prevent the sender control circuit 2800 from being connected to the operator's position equipment at this time. At contact 1817 it completes an energizing circuit for its low-resistance lower winding. At contact 1818 it prepares a circuit for the cut-in relay R1820, which circuit will be subsequently controlled over conductor C2053 from the sender control circuit 2600. And at contact 1810', relay R1810 prepares a circuit for controlling the busy lamp L2124 in the answer switch 2180.

The position equipment at the TX operator's position is now prepared to control an answer switch, such as answer switch 2180, and the operator at position 1300 now actuates a talk key associated with an idle link circuit. It will be assumed that the TX operator actuates the talk key K2225 individual to the link 2100 and as a result thereof, a circuit is closed from ground at contact 1 of the key K2225, conductor C2064, contact 1417, contact 1445 of the energized relay R1440, contacts 1854, 1634, 1621, one branch of the circuit extending by way of the winding of the position busy relay R1640, to battery, and the other branch of the circuit extending by way of conductor C2515 to the winding of relay R1220. Relay R1220 has no function to perform at this time because the answer switch 2180 has been marked by ground potential applied to conductor C2552 terminating in the first contact of the vertical bank accessible to its wiper 2108, thereby preventing the answer switch 2180 from raising its wipers beyond the first level of the switch. Relay R1640, upon energizing, at contact 1643 completes a locking circuit for itself independent of contact 1445 and the all-links busy relay R1440. At contact 1642, relay R1640 prepares a circuit over conductor C2077' for maintaining the connect relay R2210 energized. At contact 1644, relay R1640 completes the energizing circuit for the upper winding of start relay R1510.

As a result of the closing of contact 3 of the key K2225, the following circuit is completed for energizing the connect relay R2210; ground, contact 1421 of the energized battery feed relay R1420, contacts 1465, 1525, conductor C2521, contact 3 of the key K2225, contacts 2139', 2249, upper winding of connect relay R2210, to battery, Relay R2210 energizes and at contact 2213' completes a locking circuit for its lower winding in series with the talk relay R1460 over a circuit from ground, winding of talk relay R1460, contact 1522', contact 1642, conductor C2077', contact 2213', lower winding of connect relay R2210, to battery. The ground potential applied to conductor C2077' is extended by way of contact 2213', contact 4 of the key K2225, conductor C2571, contact 1669, winding of relay R1710, to battery. At contact 2214', relay R2210, upon energizing, completes a circuit for the upper winding of start relay R2160 from ground at contact 1815 of the energized relay R1810, contacts 1741, 1632, 1742, conductor C2078, contacts 2236, 2214', 2157, upper winding of start relay R2160, to battery.

As a result of the energization of the start relay R1510, at contact 1512 it applies ground potential to the lower winding of relay R1530, but this winding of the relay is shunted by the ground potential applied thereto from contact 1815 and is thereby prevented from operating at this time. At contact 1513, relay R1510 completes an energizing circuit for relay R1450, which circuit may be traced from ground, contacts 1712, 1513, lower winding of relay R1450, to battery.

Relay R1450 energizes over the above-traced circuit and at contact 1455 completes an alternative circuit for its lower winding independent of the initial energizing circuit including contact 1513. At contact 1454, relay R1450 completes an energizing circuit for relay R1650, which circuit may be traced from ground, contacts 1454, 1663, 1752, 1744, winding of relay R1650, to battery. At contact 1453, relay R1450 applies ground potential to conductor C2077' in multiple with the ground potential applied thereto through contact 1642.

Upon the energization of relay R1650 over the above-traced circuit, at contact 1654 it closes a multiple path for the locking circuit of the upper winding of dial rear relay R1740, but the remaining contacts on the relay have no function to perform at the present time.

As a result of the energization of the start relay R2160 in the answer switch 2180, the vertical magnet 2114 is operated in the manner previously described to raise the wipers 2102 to 2108, inclusive, in a vertical direction. When the vertical wiper 2108 encounters ground potential on the first contact of the vertical bank, the vertical movement of the wipers is terminated and the rotary action is initiated under control of the rotary magnet 2116 to cause the wipers 2102 to 2107, inclusive, to be rotated across the associated bank contacts of the first level.

In the first level of the bank contacts accessible to wipers 2102 to 2104 and 2106, the answer switch 2180 has access to delayed call selectors, such as delayed call selector 2510. The delayed call selector 2510 is the same as the call switch 2380 (Figs. 23 and 24) and corresponding relays, wipers and conductors have been identically designated insofar as it is necessary to describe the operation of the circuit, except that the designation relating to corresponding parts in the delayed call selector have been primed. It should be noted, however, that conductor C2392 is not required when the circuit of the call switch 2380 is used as a delayed call selector. Accordingly, when reference is made to any apparatus of the delayed call selector 2510, the circuits may be traced as shown in the call switch 2380 (Figs. 23 and 24), but to maintain a clear line of distinction the designations will be primed to indicate that the corresponding parts referred to are included in the delayed call selector 2510.

It will be assumed that the delayed call selector terminating in the first set of bank contacts in the first level accessible to wipers 2102 to 2107, inclusive, is busy and the wipers have rotated to the second set of bank contacts in the first level. Assuming that the delayed call selector 2510 terminating in the second set of bank contacts is idle, the following circuit is completed for energizing the test relay R2120 in the answer switch 2180 from ground, connected to the bank contacts in the first level accessible to wiper 2107, wiper 2107, winding of test relay R2120, contact 2138, wiper 2106, conductor C2393', extending to the delayed call selector 2510 by way of cable 2511, conductor C2393', contact 2304', upper winding of the series relay R2360', to battery. The series relay R2360' in the delayed call selector operates and prepares the selector for further operation in a manner previously described in connection with the operation of the call switch 2380 (Figs. 23 and 24); and the test relay R2120 in the answer switch 2180 operates in the manner previously described to terminate the rotary movement in the answer switch 2180. The remaining operations of the answer switch 2180 are exactly the same as has been described hereinbefore. As a result of the energization of test relay R2120, ground potential is applied at contact 2122 by way of contact 2215' to conductor C2079 causing the operation of the rear connect relay R1630 in the operator's position equipment.

As a result of the operation of the rear connect relay R1630, the circuit of the position busy relay R1640 and the relay R1220 is opened at contact 1634, and at contact 1631 ground potential is applied by way of contact 1742 to conductor C2078 in order to maintain the start relay R2160 in the answer switch 2180 energized.

As a result of the restoration of the position busy relay R1640, ground potential is applied to conductor C2065 at contact 1647 in order to maintain the position equipment busy at the position distributor 1105. At contact 1645, relay R1640 opens a point in the circuit for the lower winding of start relay R1510 to disconnect relay R1510 from under control of the TX marking relay R1250 associated with the operator's position equipment. At contact 1644, relay R1640 opens the circuit for the upper winding of start relay R1510, thereby causing the relay to restore to normal. At contact 1641, relay R1640 prepares a further holding circuit for the lower winding of connect relay R2210 in the answer switch 2180. The deenergization of relay R1220 at the same time relay R1640 deenergized has no function to perform at this time inasmuch as the position distributor 1105 has been ineffective as a result of the operation of the dial rear key K1970.

The start relay R1510 deenergizes when the circuit of its upper winding is opened and at contact 1513, it opens the initial energizing circuit for relay R1450; and at contact 1512 it removes ground from the lower winding of tone relay R1530. It should be understood that the tone relays R1530, R1540 and R1550 have not been energized to transmit the zip-zip tone signal to the operator inasmuch as she has initiated the operation of the answer switch 2180 to connect with a delayed call selector.

Since the answer switch 2180 has been operated to connect with the delayed call selector 2510, start relay R2160 has completed a circuit at contact 2162' for flashing the link busy lamp L2124. The circuit for flashing the lamp L2124 may be traced from the 60IPM conductor (Fig. 17), contact 1755, conductor C2080, contact 2162', resistance 2119, busy lamp L2124, to battery. The lamp is flashed over this circuit to indicate to the operator that the answer switch 2180 has been operated to connect with the delayed call selector, and also as an indication that she is working on the particular link indicated by the flashing lamp.

When a register sender has been connected to the sender control circuit 2600, relay R2720 is energized and, at contact 2727, extends ground by way of contact 2674, conductor C2054, extending to Fig. 19, to sender control lamp L1990, to battery, thereby illuminating the lamp L1990 to indicate to the operator that the sender control circuit 2600 and an associated idle register sender, such as register sender 3100, are in readiness to receive digits which the operator may now key up on the keyset KS1350.

As has been pointed out previously, the TX operator ascertains the number of the calling subscriber from her toll ticket, and since this call is to be extended to a calling subscriber at substation T3 in the CAX 2500, she keys up sufficient digits on her keyset KS1350 to cause the automatic switches to extend the connection to the CAX 2500 and then waits for dial tone in the manner previously described before keying up all but the last digit required to signal the original calling subscriber at substation T3. Accordingly, it will be assumed that the operator at position 1300 has operated her keyset KS1350 to register sufficient digits in the register sender 3100 to extend the connection by way of the delayed call selector 2510 and the CAX trunk circuit 2540 to the banks of the finder connector link 2501 in the CAX 2500. It is to be noted, however, that the operator does not operate her sender disconnect key K1390 at this time.

The register sender now transmits impulses in the manner previously described to control the line relay R2340' in the delayed call selector 2510 to cause it to raise its wipers in a vertical direction to the fifth level of its associated bank contact. In response to the second series of impulses transmitted by the register sender 3100, the delayed call selector rotates its wipers across the fifth level of its associated bank contact in search of an idle trunk line, such as trunk line 2505, terminating a CAX trunk circuit, such as CAX trunk circuit 2540.

Assuming that there are five trunk lines, such as trunk line 2505, extending to the CAX 2500, and assuming further that these five trunk lines are terminated in the last five bank contacts in the fifth level of the delayed call selector 2510. Accordingly, the second digit transmitted to the delayed call selector 2510 is the digit six and the wipers 2471' to 2475', inclusive, are rotated to the sixth bank contact to engage the first trunk in the fifth level extending to the CAX. If the first trunk in the group is busy, the wipers 2471' to 2475' are automatically rotated to engage succeeding trunk lines until an idle one is engaged.

It should be noted that since the call being described is being extended to a CAX, further digits are required to be transmitted from the register sender. Therefore, the normal post contact 2401' in the delayed call selector 2510 is closed when the wipers of the switch are raised to the fifth level. Consequently, when battery potential is applied by way of resistance 2454', normal post contact 2401', contacts 2442', 2431', 2372', conductor C2394' connected to the second bank contact in the first level of the answer switch 2180, wiper 2104, contacts 2133, 2162, conductor C2094, contacts 1845, 1819, conductor C2059, contact 2647, blocked-send relay R2680, contact 2754, to ground, relay R2680 in the sender control circuit 2600 operates over this circuit to prevent the register sender 3100 from retransmitting any registered digits during the period of time that the delayed call selector 2510 is rotating its wipers across the associated bank contacts.

When battery potential is encountered by wiper 2473' of the delayed call selector, the test relay R2310' is energized in the manner previously described to terminate the rotary movement of the switch and to operate the switch-through relay R2330' to extend the connection through to the CAX trunk circuit 2540.

As a result of the seizure of the CAX trunk circuit 2540, the finder connector link circuit 2501 (schematically shown) in the CAX 2500 is automatically operated to find and connect with the trunk line 2503 terminating the CAX trunk circuit 2540. When the finder portion of the finder connector link 2501 finds the trunk line 2503, dial tone is transmitted in the manner previously described to the TX operator at position 1300. When the TX operator hears the dial tone, she operates her keyset KS1350 to register two additional digits in the register sender 3100 and then momentarily operates the sender disconnect key K1390. After the remaining two digits have been retransmitted by the register sender 3100 to control the connector portion of the finder connector link 2501 in the CAX to connect with the line extending to the subscriber at substation T3, the sender control circuit 2600 will be disconnected from the link 2100 in the manner previously described.

Since automatic ringing is not desired in the present type of connection, the operator actuates the automatic ring key K2070 in order to prevent the automatic ring relay R2630 in the sender control circuit from functioning upon the clearing out of the register sender of the digits registered therein.

It should be understood that the type of connector referred to which is located at the CAX is a connector which will respond in a vertical direction to select a particular level in response to a first digit and will rotate its wipers to engage the bank contact to which the wanted subscriber's line is connected in response to a second digit, and is operated in response to a third digit to select the particular type of ringing current which is to be transmitted out over the called line to signal the called subscriber.

From the foregoing it will be understood that the connector in the present call has been operated to engage the line of substation T3, but that the final digit required to select the particular ringing frequency for signalling the particular subscriber has not as yet been transmitted.

The above-described momentary operation of the sender disconnect key K1390, in addition to preparing the sender control circuit 2600 to clear out when the remaining digits registered therein have been retransmitted, also completes a circuit by way of conductor C2513 for energizing the dial rear locking relay R1750 in the manner previously described. At contact 1758, relay R1750, upon energizing, completes a locking circuit for its lower winding in series with the upper winding of the dial rear relay R1740 from the grounded conductor C2524, contacts 1668, 1636, 1667, lower winding of relay R1750, contacts 1758, 1821, upper winding of relay R1740, contact 1749, to battery. Relays R1750 and R1740 remain energized over this locking circuit, and at contact 1752, relay R1750 opens the energizing circuit of relay R1650 causing the latter relay to restore to normal. At contact 1753, relay R1750 closes a multiple path in the circuit for maintaining relay R2210 energized; at contact 1754, it completes a multiple locking circuit for the lower winding of sender 1 seizing relay R1810; at contact 1755, it removes the 60IPM conductor from the circuit for flashing the busy lamp L2124; and at contact 1756, it extends the circuit of the busy lamp L2124 by way of contact 1810', conductor C2060, to ground at contact 2673 in the sender control circuit, thereby to steadily illuminate the busy lamp L2124.

As a further result of the momentary grounding of conductor C2055 by the sender disconnect key K1390, the sender alternator relays R1320 and R1330 function in the manner previously described to associate the sender control circuit 2800 with the link 2100 due to the operation of the sender #2 connect relay R2260 in the link circuit in series with the start relay in the sender control circuit 2800, similar to start relay R2730 in the sender control circuit 2600. Accordingly, it will be understood that the sender control circuit and an associated idle register sender are connected to the operator's position equipment through the contacts of relay R1810, and the sender control circuit 2800 is connected to the link circuit through the contacts of relay R2260. When the second sender control circuit is associated with the operator link circuit 2100, the sender control lamp L1991 is illuminated, whereupon the TX operator at position 1300 may again manipulate the keyset KS1350 to register the number of the called subscriber at substation T2.

After the sender control circuit 2600 and the associated idle register sender has cleared out, the cut-in relay R2640 in the sender control circuit is energized and ground potential is applied to conductor C2053 in the usual manner. The application of ground potential to conductor C2053 is extended by way of contact 1818 of relay R1810 causing the energization of the cut-in relay R1820. At contact 1822, relay R1820 places the holding ground on the dial rear slave relay R1840 to maintain that relay energized; and at contact 1821, it opens a locking circuit for the dial rear locking relay R1750 and the dial rear relay R1740. Relays R1740 and R1750 restore to normal.

Relay R1750, upon deenergizing, at contact 1751 opens a point in the incomplete circuit for the winding of relay R1830; at contact 1752, it again prepares a circuit for relay R1650; at contact 1753, it opens a point in the multiple holding circuit for the connect relay R2210; at contact 1754, it opens a multiple circuit for the lower winding of sender 1 seizing relay R1810; at contact 1756, it disconnects the ground potential from the sender busy lamp L2124; and at contact 1755, it reconnects the 60IPM conductor to the busy lamp L2124 to cause the lamp to again give a flashing signal. The closing of contact 1757 upon the restoration of relay R1750 has no function to perform at this time, and at contact 1758, relay R1750 opens the point in the locking circuit for its lower winding.

As a result of the restoration of the dial rear relay R1740, at contact 1741 it opens the shunting circuit for the tone relay R1530; at contact 1742, it opens a point in the multiple circuit for maintaining the start relay R2160 energized; at contact 1743, it opens the energizing circuit for the split answer relay R1610, which relay now restores to normal; at contact 1748, it removes a marking ground potential from conductor C2552; at contact 1749, it opens a point in the locking circuit for its upper winding; at contact 1741', it opens a point in the energizing circuit of relay R1840; and at contact 1742', it places a shunt around the lower winding of the rear connect relay R1630 to render that relay slow-to-release.

When the register sender 3100 and the sender control circuit 2600 eventually clear out, ground potential is removed from conductors C2053 and C2049, extending to Fig. 18. When the ground potential is removed from conductor C2049, the locking circuit for the lower winding of the sender 1 seizing relay R1810 is opened and the relay deenergizes. Removal of ground potential from conductor C2053 opens the circuit of the cut-in relay R1820 causing that relay to slowly release. As a result of the deenergization of the sender 1 seizing relay R1810, the connection, by way of conductors C2063 and C2064 extending to the sender control circuit 2600, is opened at contacts 1812 and 1814. At contacts 1818, 1819 and 1810', conductors C2053, C2059 and C2060, extending to the sender control circuit 2600, are disconnected from the operator's position equipment. As a result of the deenergization of relay R1820, the holding circuit for the dial rear slave relay R1840 is opened at contact 1822, thereby restoring the relay to normal. At contact 1847, relay R1840 removes ground potential from conductor C2048, thereby removing the initial starting ground from the sender control circuit. At contact 1844, relay R1840 connects the rear supervisory relay R1720 to conductor C2094, so that in the event that the subscriber at substation T3 in the distant CAX should desire to recall the TX operator after the connection is established, the relay R1720 can be operated to illuminate the rear supervisory lamp L2275.

It should be understood that since the sender control circuit 2800 is now associated with the front end of the link 2100, that is, to the call switch 2380, as has been pointed out above, the TX operator may proceed to manipulate her keyset KS1350 to register the digits of the wanted subscriber at substation T2 during the time that the sender control circuit 2600 and its associated register sender are transmitting impulses over the rear end of the link 2100, that is, over the answer switch 2180. It should also be appreciated that although the call being described in the present instance is to the subscriber at substation T2, the operator at the TX position of the switchboard 1200 could key up any other series of digits to extend the call by way of the call switch 2380 to the local subscriber at substation T1, or by way of trunk circuits 250, 260 or 270 to a subscriber in the distant office 200.

It will be assumed, however, that the TX operator has the automatic ring key K2070 operated to remove ground potential from conductor C2052, thereby to prevent the automatic ring relay, similar to relay R2630, in the sender control circuit 2800 from functioning after the digits registered in the register sender associated with the sender control circuit 2800 have been retransmitted. Accordingly, it will be necessary for the operator at the TX position of the switchboard 1200 to ring the called subscriber at substation T2 after a connection has been established to that subscriber's line.

Assuming further that the operator has manipulated her keyset KS1350 to register the digits of the subscriber at substation T2 and has again operated the sender disconnect key K1390 in the usual manner. The register sender, similar to register sender 3100, associated with the sender control circuit 2800 now functions in the manner previously described to control the wipers of the call switch 2380 to raise its wipers 2471 to 2476, inclusive, in a vertical direction to the fourth level of its associated bank contacts. Since the fourth bank contact accessible to the vertical wiper 2476 has been strapped to conductor C2481, the wipers of the call switch 2380 are automatically rotated over the bank contacts in the fourth level in search of an idle outgoing trunk line extending to an outgoing circuit, similar to outgoing trunk circuit 500. When the wiper 2473 engages a bank contact in its associated bank to which battery potential has been applied by way of conductor C505 through the winding of the seizure relay R520 in the outgoing trunk circuit 500, the test relay R2310 energizes to terminate the rotary movement of the wipers and to cause the switch-through relay R2330 to switch the connection through to the outgoing trunk circuit 500 in the manner previously described.

Referring now to the outgoing trunk circuit 500 (Figs. 5 and 6), it should be noted that if a subsequent switch in the toll switchtrain 600 individual to the outgoing trunk circuit 500 is busy, ground potential will be returned on conductor C605 through contact 523 on the seizure relay R520 through the upper winding of the seizure relay R520 to conductor C505. A branch of the circuit is extended through the lower winding of relay R520 to battery, but the relay does not energize sufficiently to open its contact 523 nor to close its contacts 521 and 524. In other words, the outgoing trunk circuit 500 under the above-mentioned condition will be busy to the call switch 2380 when the wiper 2473 engages a bank contact to which conductor C505 is connected. It is also possible to busy the outgoing trunk circuit 500 to the call switch 2380 by operating the busy key K570 individual to the trunk circuit 500, whereupon ground potential is applied by way of the upper winding of relay R520 to conductor C505, and a branch of the circuit is extended by way of the lower winding of the seizure relay R520 to battery; but the relay does not energize sufficiently to open its contact 523 nor to close its contacts 521 and 524.

From the foregoing explanation it will be understood that if a subsequent circuit in the chain of circuits extending to the outgoing trunk circuit 500 is busy for some reason or other and ground potential has been applied to conductor C605, the call switch 2380 cannot be connected to the outgoing trunk circuit 500. Assuming further that the outgoing trunk circuit 500 was idle at the time that the call switch 2380 engaged the bank contacts to which outgoing trunk circuit 500 is connected, the subsequent digits registered in the register sender associated with the sender control circuit 2800 will be transmitted by way of the call switch 2380 and the outgoing trunk circuit 500 to the toll switchtrain 600, which toll switchtrain is controlled in the well known manner to extend the connection to the terminals of the line 610 extending to the subscriber at substation T2. It will be recalled, however, that because the automatic ring key K2070 was actuated, the automatic ring relay in the sender control circuit 2800 is prevented from operating after all the registered digits have been retransmitted, and therefore, the toll switchtrain 600 is not controlled to ring the subscriber at substation T2 at this time.

After all of the digits registered in the register sender associated with the sender control circuit 2800 have been retransmitted and the sender control circuit 2800 has cleared out, ground potential is removed from conductor C2054' thereby causing the illuminated sender control #2 lamp L1991 to be extinguished. Furthermore, after all of the digits have been transmitted to extend the connection to the subscriber at substation T2, the cut-in relay R530 in the outgoing trunk circuit 500 is energized causing ground potential to be applied to conductor C504 by way of wiper 2475 of the call switch 2380, contacts 2338, 2443, 2431, 2372, conductor C2394, contact 2247 of relay R2240, which relay energized when the sender control circuit 2800 cleared out, contact 2167, conductor C2083, extending to Fig. 13, winding of the front supervisory relay R1310, to battery. The front supervisory relay R1310 energizes over this circuit and at contact 1311 extends ground by way of conductor C2084, extending to Fig. 21, contact 2166, front supervisory lamp L2123, to battery, thereby illuminating the front supervisory lamp L2123. When the front supervisory lamp L2123 is illuminated and the sender control #2 lamp L1991 is extinguished, the operator is informed that the connection has been extended to the subscriber at substation T2 and that she may now operate the ring key K1930 to the right to initiate the ringing signal for the subscriber at substation T2. When the ring key K1930 is momentarily actuated to the right, the ring relay R650 in the outgoing trunk circuit 500 is controlled in the manner previously described to remove ground potential from conductor C604 extending to the toll switchtrain 600, whereupon ringing is automatically initiated in the toll switchtrain 600 in the usual manner.

When the called subscriber at substation T2 responds by removing his receiver from the switchhook, ringing is automatically terminated and the answer relay R610 in the outgoing trunk circuit 500 is subsequently energized to remove ground potential from conductor C504 thereby extinguishing the front supervisory lamp L2123. When the lamp L2123 is extinguished, the TX operator is thereupon notified that the called subscriber at substation T2 has responded and the operator may converse with the subscriber at substation T2 and inform him that she has a call for him.

It will be recalled that the TX operator has extended a connection over the answer switch 2180 and the delayed call selector 2510 to the line terminals of the CAX subscriber at substation T3, but that the subscriber has not as yet been signalled. In order to reconnect an idle sender to the actuated answer switch 2180 so that the TX operator may operate her keyset to cause the sender to retransmit the final digit to the CAX, the TX operator must first momentarily actuate the direct key K2085. As a result of the momentary actuation of key K2085, ground potential is extended by way of conductor C2056, extending to Fig. 17, to the lower winding of relay R1730, to battery. Relay R1730 energizes over this circuit and at contact 1733 completes a locking circuit for its upper winding under control of contact 1722 of the energized rear supervisory relay R1720 to maintain relay R1730 energized after the restoration of the direct key K2085. At contact 1732, relay R1730 prepares a locking circuit for the upper winding of the dial rear relay R1740, which locking circuit would otherwise be opened at contact 1635 of the now energized rear connect relay R1630.

In order to signal the subscriber at substation T3, the TX operator must again momentarily operate the dial rear key K1970. The momentary operation of the key K1970 completes a circuit from ground at contact 5 of the release key K1950, conductor C2524 extending to Fig. 16, contacts 1668, 1732, conductor C2523 extending to Fig. 19, contact 1 of the dial rear key K1970, conductor C2517 extending to Fig. 17, lower winding of dial rear relay R1740, to battery. Relay R1740 energizes over this circuit and at contact 1749 completes, a locking circuit for its upper winding, which circuit may be traced from the grounded conductor C2524, contacts 1668, 1732, 1759, 1821, upper winding of dial rear relay R1740, contact 1749, to battery. Relay R1740 remains locked up over this circuit independently of the initial energizing circuit including the momentarily closed contact 1 of the dial rear key K1970.

The subsequent operations of the relays in the operator's position equipment are the same as has been described hereinbefore, resulting in the connection of a sender control circuit and an idle register sender to the operator's position equipment by way of the contacts of either the sender 1 seizing relay R1810 or the sender 2 seizing relay R1830. The particular seizing relay to be operated is determined by the position of the sender alternator relays R1320 and R1330 as has been described hereinbefore.

Assuming that the sender control circuit 2600 and an associated idle register sender, such as register sender 3100, have been connected to the operator's position equipment as a result of the energization of the sender 1 seizing relay R1810, the sender control lamp L1990 is illuminated and the operator may key up the final digit for selecting the ringing current to be transmitted to the CAX subscriber at substation T3. After the operator has manipulated her keyset KS1350 to register the final digit for signalling the subscriber at substation T3, she again operates the sender disconnect key K1390 to dismiss the sender control circuit 2600 and an associated register sender after the final digit has been retransmitted.

The register sender and sender control circuit 2600 function in the usual manner and the final digit is retransmitted to the connector portion of the finder connector link 2501 in the CAX 2500 to cause the connector portion of the link to transmit ringing current over the line 2502 to signal the subscriber at substation T3.

When the sender control circuit 2600 clears out and relay R1840 in the operator's position equipment restores to normal, ground potential, maintained on conductor C2394' during the period of time that the connection is maintained to the CAX 2500, is returned by way of conductor C2394', wiper 2104 of the answer switch 2180, contacts 2133, 2162, conductor C2094, extending to Fig. 15, contact 1844 of the now deenergized dial rear slave relay R1840, winding of the rear supervisory relay R1720, to battery. The rear supervisory relay R1720 is energized as soon as the sender control circuit 2600 has cleared out and at contact 1721 extends ground by way of conductor C2093, extending to Fig. 21, contact 2161, contact 2271, rear supervisory lamp L2275, to battery. Accordingly, the rear supervisory lamp L2275 is illuminated as soon as the sender control circuit 2600 clears out.

As a further result of the deenergization of dial rear slave relay R1840, at contact 1846 a circuit is completed from ground at contact 1637 of the energized rear connect relay R1630, conductor C2525, contact 8 of release key K1950, conductor C2526, contact 1846, conductor C2511, extending to Fig. 20, rear connect lamp L2001, to battery. The rear connect lamp L2001 is illuminated over this circuit to indicate to the operator that the sender control circuit has cleared out.

When the subscriber at substation T3 responds to the ringing current transmitted by the finder connector link 2501, ground potential is removed from conductor C2394' thereby causing the deenergization of rear supervisory relay R1720. At contact 1721, rear supervisory relay R1720, upon deenergizing, opens the above-traced circuit for illuminating the rear supervisory lamp L2275. When the lamp is extinguished, the TX operator is informed that the subscriber at substation T3 has responded. The operator now informs the subscriber at substation T2 that she has completed a connection to the CAX subscriber at substation T3, which subscriber was originally called by the subscriber at substation T2. The TX operator may now restore the talk key K2225 to normal thereby completing the connection between the subscribers and disconnecting her position equipment from the link 2100, and she now marks the starting time of the conversation between the calling and called subscribers.

When the conversation between the calling and called subscribers has terminated and the subscriber at substation T2 restores his receiver on the switchhook, the front supervisory lamp L2123 is illuminated to indicate to the TX operator that the conversation has been terminated. The TX operator now marks the terminating time of the conversation between the calling and called subscriber upon the toll ticket and may now release the link 2100 by merely operating the release key K2201. It is the general practice in a connection of this type for the operator to release the connection when the originating subscriber, that is, the subscriber who is to be charged for the connection, has terminated the call, and the operator need not wait for disconnect supervision to be received on the rear supervisory lamp L2275 before she breaks down the connection.

DISCONNECTING THE TOLL LINE PAD

When the ring-down toll line circuit 250 is in use and an answer switch, such as answer switch 2180, at the operator link 2100 is connected thereto, the pad control relay R340 is maintained energized from ground potential applied to the talking conductors C254 and C255 through the retard coil RT (Fig. 14) of the operator's position equipment 1300, or if the talk key K2225 is at normal from ground potential applied to one of the talking conductors through resistances 2280 and 2281 and to the other talking conductor through resistances 2282 and 2283 in the link 2100. When the connection is extended through the link 2100 by way of the call switch 2380 to an outgoing trunk circuit, such as outgoing trunk circuit 500 (Figs. 5 and 6), the pad control relay R340 is maintained energized from ground potential applied to the talking conductors C254 and C255 from the outgoing trunk circuit 500 (Figs. 5 and 6). Ground potential is applied to one of the talking conductors over the following circuit: ground, contact 521, upper winding of relay R640, contact 636, winding 506 of the repeating coil 510, contact 532, to conductor C502; and ground potential is applied to the other talking conductor over the following circuit: ground, resistance 568, contact 566, winding 507 of the repeating coil 510, contact 535, to conductor C503. After the supervisory relay R560 has energized, however, the ground potential applied to conductor C503 for maintaining the pad control relay R340 energized, is extended from ground, contacts 567, 635, 641, lower winding of relay R650, contact 565, winding 507 of the repeating coil 510, contact 535, to the talking conductor C503.

From the foregoing description it will be noted that the pad control relay R340 is maintained energized from successive stages in the setting up of the connection between the ring-down toll line circuit and a subsequent switching stage, and therefore, the pad cut-off relay R210 cannot be energized. However, in the event that the extension of a connection is made by way of a call switch to another ring-down toll line circuit similar to ring-down toll line circuit 250, the pad control relay R340 will not energize.

Assuming that the answer switch 2180 is connected to the ring-down toll line circuit 250 by way of conductors C254 to C257, inclusive, and, assuming further that the call switch 2380 is connected by way of its wipers 2471, 2472, 2473, and 2475, to conductors C371, C372, C373 and C374, respectively, of ring-down toll line circuit similar to ring-down toll line circuit 250, it will be noted that the following simplex circuit is completed between the two interconnected ring-down toll line circuits. This circuit may be traced from positive booster battery in which the negative pole is grounded, lower winding of relay R300, contact 312, lower winding of impedance 330, lower winding of relay R340, conductor C255, wiper 2103 of the answer switch 2180, contact 2132, contact 2218, 2244, conductor C2391, contact 2334, wiper 2472, conductor C372 extending to the ring-down toll line circuit similar to the ring-down toll line circuit 250. The circuit in the second ring-down toll line circuit is completed by way of the windings of the relays in precisely the same manner as the above-described circuit is completed through the winding of relay R300 to positive booster battery in which the negative pole is grounded. The circuit for the other talking conductor is completed from positive booster battery in which the negative pole is grounded through the lower winding of relay R310, the upper winding of impedance 330, upper winding of pad control relay R340, conductor C254, wiper 2102 of the answer switch 2180, contacts 2131, 2214, 2242, conductor C2390, contact 2332, wiper 2471 connected to conductor C371, extending to a ring-down toll line circuit similar to the ring-down toll line circuit 250. The remaining circuit is extended through the windings of the relays in the second toll line circuit over a circuit precisely the same as has been described in connection with the toll line circuit 250 to positive booster battery in which the negative pole is grounded. It will be noted from the above-described circuit that a simplex circuit is completed through the windings of the pad control relay R340 in series with relays R310 and R300 in the ring-down toll line circuit 250 to the corresponding component parts in the second ring-down toll line circuit selected by the call switch 2380 to positive booster battery in which the negative pole is grounded. Since this simplex circuit is connected from battery to battery, the pad control relay R340 does not energize and, at contact 341, completes an energizing circuit from ground at contact 362, for the slow-to-operate pad cut-off relay R210. The pad cut-off relay R210 energizes and at contacts 211 and 212 shunts out the resistances 215 to 218, inclusive, and at contact 213 disconnects resistances 219 and 220 and the condenser 221 from across the conductors of the trunk 251. The above traced circuit is also completed in the second ring-down toll line circuit to remove the pad network from the talking conductors of the toll line trunk extending to a distant toll center.

As a result of the removal of the pad networks from the two ring-down toll line circuits, the definite loss previously introduced to the toll line by the connection of the pad to the toll line is removed, whereby the transmission level over the inter-connected toll lines is increased.

In the event the operator at the operator's position should reconnect her equipment to the interconnected ring-down toll line circuits, the pad control relays, such as relay R340 will again be energized from ground potential applied to the two conductors of the talking circuit through the retard coil RT (Fig. 14).

GUARDING A DEFECTIVE TOLL LINE

In order to describe the method of guarding a defective toll line and preventing it from being seized will now be described. For this purpose it will be assumed that in the course of setting up a conection the operator at position 1300 has operated the call switch 2380 to the sixth level of its associated bank contacts and has connected with the ring-down toll line circuit 250 by way of conductors C371 to C374, inclusive. In the event that the ring-down toll line circuit 250 is found to be defective for any reason, the operator at position 1300 may cause this toll line to be guarded against further seizure and cause the test-desk operator to be signalled. In order to accomplish this, the operator first actuates the checking key K1940 to the right and then actuates the out-of-order key K1975 to the left. As a result of the closure of contact 5 of the check key K1940, a circuit is completed from ground, contact 5, conductor C2502 extending to Fig. 15, winding of the split call relay R1560, to battery. Relay R1560 energizes and at contacts 1562 and 1564 connects conductors C2092 and C2091 to conductors C2509 and C2507, respectively. Conductor C2509 is grounded from contact 2 of the out-of-order key K1975 (before key K1975 has been actuated), contact 2 of check key K1940, to conductor C2509. Battery potential is applied to conductor C2507 through contact 6 of check key K1940.

The ground potential applied to conductor C2509 is extended by way of contact 1562, conductor C2092, contact 2217 of the now energized relay R2210, contact 2244, conductor C2391, contact 2334, wiper 2472 connected to conductor C372 extending to the ring-down toll line circuit 250, lower winding of pad control relay R340, lower winding of impedance 330, contact 312, lower winding of relay R300, to booster battery in which the negative pole is grounded. The battery potential applied to conductor C2507 is extended by way of contact 1564, conductor C2091, contacts 2213, 2242, conductor C2390, contact 2332, wiper 2471 connected to conductor C371 extending to the ring-down toll line circuit 250, upper winding of pad control relay R340, upper winding of impedance 330, lower winding of check relay R310, to positive booster battery in which the negative pole is grounded.

In response to the completion of the above traced circuit, the check relay R310 energizes in a manner previously described, but relay R300, although energized, does not energize sufficiently to actuate its contacts 301 and 302. As a result of the energization of the check relay R310, contact 311 is closed to prepare a circuit for the upper winding of the out-of-order relay R320; at contact 312, the circuit for the lower winding of the ring-out relay R300 is opened; and at contacts 313 and 314, relay R310 completes a circuit for illuminating the line and the group checking lamps L315 and L316, respectively, before the operator on a lamp panel. The illumination of the checking lamps indicates to the operator the number of the particular group of trunks and the number of the particular trunk in the group which is defective.

As a result of the operation of the out-of-order key K1975, ground potential is removed from conductor C2509 and battery potential is connected thereto through contact 1 of the key K1975. The substitution of battery for ground to conductor C2509 is extended over the above-traced circuit through contact 311 of the energized check relay R310 to the upper winding of the out-of-order relay R320.

Relay R320 energizes over the above-traced circuit and at contact 322 completes a locking circuit for its upper winding from ground, the out-of-order key K370 located on the test panel at the test-desk operator's position, contact 322, contact 334, lower winding of relay R320, to battery. A parallel circuit is also completed to illuminate the lamp L359 on the test panel at the test-desk operator's position to indicate the particular trunk that is out of order. At contact 323, relay R320 applies ground potential to conductor C373 to busy the ring-down toll line circuit in the banks of the call switches, such as call switch 2380, having access thereto. At contact 324, relay R320 opens the circuit of the seizure relay R360. At contact 321, it opens the circuit of the start relay R350 to prevent seizure of this circuit if a distant toll operator should ring-down on the toll line individual to the ring-down toll line circuit 250; and at contacts 325 and 326, relay R320 applies an out-of-order tone to the talking conductors of the ring-down toll line circuit 250 to notify the operator at the distant toll office 200 that the toll line 251 is defective.

The operator at position 1300 may now disconnect the call switch 2380 from the toll line circuit 250 and also restore her check key K1940 and the out-of-order key K1975 to normal. The check relay R310 and the pad control relay R340, the latter relay having been energized as usual, both restore to normal, but relay R320 remains locked up from ground at the out-of-order key K370 located at the test panel. When the toll line 251 and its associated ring-down toll line circuit 250 have been repaired, the out-of-order relay R320 may be restored to normal by actuating the out-of-order key K370 at the test panel, whereupon lamp L359 is extinguished.

CHECKING THE NUMBER OF THE OUTGOING TRUNK CIRCUIT 500

In order to describe the method of checking the particular number of the outgoing trunk circuit over which a connection has been extended, it will be assumed that the operator at position 1300 has controlled the call switch 2380 to connect its wipers 2471, 2472, 2473 and 2475 to conductors C502, C503, C505 and C504, respectively, extending to the outgoing trunk circuit 500. It will also be assumed that relays R520, R530 and R560 in the outgoing trunk circuit 500 are energized.

To ascertain the number of the outgoing trunk circuit 500, the operator at position 1300 may now actuate her check key K1940 to the right. As a result thereof, relay R1560 is energized in a manner previously described, ground potential is connected to conductor C2509, and battery potential is connected to conductor C2507. The ground potential connected to conductor C2509 is extended by way of contact 1562, conductor C2092, contacts 2217, 2244, conductor C2391, contact 2334, wiper 2472, conductor C503, contact 535, winding 507 of the repeating coil 510, contact 565, winding of relay R650, contacts 641, 635 and 567, to ground. This circuit has no function to perform at this time since it merely shunts the winding of relay R650. The battery potential connected to conductor C2507 as a result of the operation of key K1940 is extended by way of contact 1564, conductor C2091, contacts 2213, 2242, conductor C2390, contact 2332, wiper 2471, conductor C502, contact 532, winding 506 of the repeating coil 510, contact 636, upper winding of check relay R640, contact 521, to ground. Relay R640 energizes over the above-traced circuit and at contacts 642 and 643 completes circuits for illuminating the line lamp L644 and the group lamp L645 of the checking lamps located on the checking panel before the operator at position 1300. From the illuminated condition of the line and the group lamps, the operator at position 1300 can ascertain the group number and the particular line number in the group to determine the particular outgoing trunk over which the connection has been extended.

When the operator restores the checking key K1940 to normal, the checking relay R640 deenergizes and extinguishes the lamps L644 and L645, and the split call relay R1560 restores to normal to reconnect conductors C2091 and C2092 to the operator's headset circuit.

ERROR IN DIALLING

If the operator at position 1300, in handling a call involving the link 2100, the sender control circuit 2600 and the register sender 3100, and the sender control circuit is connected to the call switch 2380 through contacts on the energized sender 1 connect relay R2250, discovers that she has committed an error in the manipulation of the keyset KS1350 to register a desired number, but has not as yet operated the sender disconnect key K1390, she may actuate the error key K1391 of her keyset.

In response to the actuation of key K1391, ground potential is extended by way of conductor C2514, extending to Fig. 19, contact 3 of the release key K1950, conductor C2522, extending to Fig. 18, lower winding of error relay R1850, to battery. Relay R1850 energizes over this circuit and at contact 1857 connects its upper winding to conductor C2062, extending to Fig. 26, contact 2713 of the sender control circuit 2600, contact 2751, to ground. The upper winding of relay R1850 is energized over the above-traced circuit to maintain the relay locked up to the sender control circuit 2600 after the error key K1391 has been restored to normal. Upon energizing, relay R1850 extends ground by way of contact 1859, conductor C2564, extending to Fig. 13, to the lower winding of sender alternator relay R1320 and to both windings of sender alternator relay R1330. The sender alternator relays R1320 and R1330 function in the manner previously described to prepare the seizure of the second sender control circuit 2800 when ground potential is removed from conductor C2564. At contact 1856, relay R1850 removes ground potential from conductor C2048 extending by way of contacts 1326 and 1336 to conductor C2047, contact 4 of the sender control key K1980, conductor C2046, extending to the start relay R2730 in the sender control circuit 2600. At contact 1851, relay R1850 opens the start circuit extended by way of conductor C2078, contacts 2236, 2214', 2157, to the upper winding of start relay R2160 in the answer switch 2180.

Referring now to the sender control circuit 2600, when ground potential is removed from conductor C2046 as a result of the energization of the error relay R1850, start relay R2730 restores to normal and in addition, the ground potential formerly applied through the start relay is removed from conductor C2049 extending to Fig. 22 thereby opening the locking circuit for the sender 1 connect relay R2250, which relay also restores. As a result of the deenergization of the start relay R2730 in the sender control circuit 2600, relays R2690, R2750 and R2720 restore to normal in the order named. When relay R2750 restores to normal, it removes ground potential at contact 2755 from conductor C2044 whereupon the sender finder connect relay R2910 restores to normal disconnecting the circuits completed through its contacts 2911 to 2919, inclusive. As a result of the restoration of relay R2910, the start relay R3270 in the impulse sender 3100A also restores to normal. At contact 3275, relay R3270, upon restoring to normal, removes ground potential from the holding conductor C2033 extending to the digit registers 3100B. As a result of the removal of ground potential from conductor C2033, all A, B, C and D digit relays which have not previously been restored will now restore to normal. At contact 3274, relay R3270 removes the holding ground potential from the impulse counting relays of the counting network. At contact 3273, relay R3270 opens the circuit for the impulse generating relays R3230, R3240 and R3250 and consequently, these relays no longer cyclically operate to control the transmission of impulses by way of contact 3252. At contact 3272, relay R3270 removes the holding ground for the digit space relays R3190 and R3200. And at contact 3271, it removes the holding ground from the transfer relay R3260 and conductor C2030 extendnig to the digit registers 3100B.

It will be noted from the above description that as a result of the deenergization of the start relay R2730 in the sender control circuit 2600, the sender control circuit 2600, the sender finder 2900 and the register sender 3100 immediately clear out.

Referring now to Fig. 22, it will be noted that when ground potential is removed from conductor C2049 as above described, relay R2250 deenergizes and at contact 2254 removes ground potential from conductor C2393; and simultaneously therewith, at contacts 2251 and 2252 a loop circuit over conductors C2390 and C2391 is opened. If the line relay R2340 is bridged across conductors C2390 and C2391, it will now restore to normal and at contact 2341 open the circuit of release relay R2350, which also restores to normal; as a result of the restoration of both relays R2340 and R2350, an energizing circuit is completed for the release magnet 2367 to thereby restore the wipers of the call switch 2380 to normal in the well known manner. It is to be noted, however, that if the line relay R2340 is not bridged across the conductors C2390 and C2391 because the switch-through relay R2330 has been energized, the ground potential removed from conductor C2393 opens the circuit of the switch-through relay R2330, which relay, upon restoring to normal, at contact 2331' completes an energizing circuit for the release magnet 2367 to restore the wipers of the switch 2380 to normal.

Referring again to the sender control circuit 2600, it will be noted that when the cut-in relay R2750 restored to normal, at contact 2751 it removed ground potential from conductor C2062 thereby opening the locking circuit for the upper winding of the error relay R1850 in the operator's position equipment. Relay R1850 will restore to normal at this time unless the operator has not restored her error key K1391 to normal. Assuming, however, that the error key has been restored to normal and the circuit for the lower winding of relay R1850 is open, the relay restored to normal and at contact 1859 removes ground potential from conductor C2564 thereby permitting relay R1330 of the sender alternator relays to be locked energized in multiple with the lower winding of relay R1320 from ground at contact 1323. Consequently, the sender alternator relays then function to prepare the second sender control circuit 2800 for subsequent use by the operator at position 1300. As a further result of the restoration of relay R1850, contact 1856 is closed to extend the grounded conductor C2526 by way of conductor C2048, contacts 1325 and 1335 of the sender alternator relays, conductor C2047' extending to the sender control key K1980, contact 5 of the key K1980, conductor C2046' extending to the sender control circuit 2800 through the start relay, similar to start relay R2730, in the sender control circuit 2800, conductor C2291 (Fig. 22), contacts 2233, 2161', 2242', 2251, lower winding of the sender #2 connect relay R2260. As a result of the above traced circuit, the sender #2 connect relay R2260 energizes to connect the sender control circuit 2800 to the call switch 2380. As a further result of the seizure of the sender control circuit 2800, the sender control #2 lamp L1991 is illuminated to indicate to the operator at position 1300 that she may now manipulate the keys at keyset KS1350 to register the correct number in the register sender associated with the sender control circuit 2800.

In the above description it has been assumed that the sender control circuit 2600 was connected to the call switch 2380 when the operator made an error in the manipulation of her keyset KS1350. It will now be assumed that the sender control circuit 2600 has been connected to the operator's position equipment and the answer switch 2180 due to the fact that the operator at position 1300 has previously operated the dial rear key to extend a connection by way of a delayed call selector and subsequent switches in the switch-train. It will also be assumed that the operator at position 1300 has manipulated her keyset KS1350 and has discovered that she has made an error in registering the digits before she has operated the sender disconnect key K1390.

When the operator discovers that she has made an error in dialling, she then operates the error key K1391 to cause the operation of the error relay R1850. Before discussing the operations which occur as a result of the energization of the error relay R1850, it is to be noted that the following relays in the operator's position equipment are energized at this time: battery feed relay R1420, disconnect relay R1450, talk relay R1460, split answer relay R1610, rear connect relay R1630, relay R1650, relay R1710, dial rear relay R1740, sender 1 seizing relay R1810, dial rear slave relay R1840 and error relay R1850.

As a result of the energization of the relay R1850, at contact 1857 it completes the previously described locking circuit for its upper winding to maintain the relay energized as long as the sender control circuit 2600 is connected to the position equipment even though the initial energizing circuit is opened by the restoration of the error key K1391. At contact 1859, ground potential is applied to conductor C2564 to control the sender alternator relays R1320 and R1330 in the manner previously described. At contact 1856, ground potential is removed from conductor C2048 in order to restore the start relay R2730 in the sender control circuit 2600 in the manner previously described, and also to open the circuit of the sender 1 seizing relay R1810, which relay is in series with the circuit of the start relay R2730.

The start relay R2730 restores to normal when its circuit is opened and causes the sender control circuit 2600, the sender finder 2900 and the associated register sender to restore to normal in the manner previously described.

At contact 1855, relay R1850, upon energizing, extends the grounded conductor C2526 by way of contacts 1855, 1757, 1745, conductor C2096, contact 2212' of the answer switch 2180, resistance J, one branch extending by way of the lower winding of the rear release relay R2150 to battery, and the other branch of the circuit extending by way of contact 2144, the upper winding of relay R2140, to ground. When ground potential shunts the upper winding of relay R2140, the relay restores to normal. As a result of the energization of the rear release relay R2150, a circuit is completed at contact 2154 from ground, contacts 2146, 2154, winding of the release magnet 2170, to battery. The release magnet energizes over the above-traced circuit and causes the wipers of the answer switch 2180 to be restored to normal in the usual manner. At contact 2152, relay R2150 completes a locking for itself by way of vertical off-normal contact 2113, contact 2151, lower winding of rear release relay R2150, to battery. The locking circuit for the lower winding of relay R2150 is maintained until the wipers of the switch 2180 restore to normal and open the circuit at the vertical off-normal contact 2113.

After the sender control circuit 2600 clears out in the manner previously described, ground potential is removed from conductor C2062 thereby opening the locking circuit for relay R1850, which relay now restores to normal.

As a result of the restoration of the answer switch 2180 to normal, the circuit of rear connect relay R1630 is opened at contact 2122 in the answer switch 2180. At contact 1855, relay R1850, upon restoring to normal, removes ground potential from conductor C2096 thereby permitting the release relay R2150 to restore unless the wipers of the switch have not been restored to normal to open the vertical off-normal springs 2113. At contact 1859, relay R1850, upon restoring, removes ground potential from conductor C2564, whereupon the sender alternator relays R1320 and R1330 function to prepare the second sender control circuit 2800 for use. At contact 1856 it again connects ground potential to conductor C2048 thereby completing a circuit for the start relay in the sender control circuit 2800, similar to start relay R2730, in series with conductor C2291 extending to Fig. 18, contact 1842 of the energized dial rear slave relay R1840, contact 1852, contact 1816, lower winding of the sender #2 seizing relay R1830. The sender control circuit 2800 and the sender #2 seizing relay R1830 are energized over the above-traced circuit. Relay R1830, upon energizing, at its contacts connects the sender control circuit 2800 to the operator's position equipment, and at contact 1835 completes a circuit from ground, contact 1741, one branch extending to the lower winding of the tone relay R1530 to prevent energization of that relay, and the other branch extending by way of contact 1632 of the now deenergized rear connect relay R1630, contact 1742, conductor C2078 extending to Fig. 21, contacts 2236, 2214', 2157 of the now deenergized rear release relay R2150, upper winding of start relay R2160, to battery. As a further result of the seizure of the sender control circuit 2800, the sender control #2 lamp L1991 is illuminated to indicate to the operator at position 1300 that a second sender control circuit is available, and she may now manipulate the keyset KS1350 to register the correct digit in the register sender equipment associated with the sender control circuit 2800.

It will now be assumed that the operator at position 1300 has operated her dial rear key K1970; that the sender control circuit 2600 and an associated register sender has been associated with the operator's position equipment through the sender 1 seizing relay R1810; that the answer switch 2180 has been operated to find and connect with a delayed call selector, such as delayed call selector 2510; that the operator has manipulated her keys in the keyset KS1350 to register the number of the called man in the register sender 3100; and that the disconnect key K1390 has been operated to indicate to the sender controller that it may disconnect itself from the operator's position equipment when all of the digits have been retransmitted by the register sender 3100. It will further be assumed that simultaneously therewith, the operator has associated the second sender control circuit 2800 with the call switch 2380 and during the process of operating her keyset KS1350 has discovered that she has made an error in the keying up of the digits before she has actuated the sender disconnect key K1390. When this condition exists, the operator at position 1300 may operate the error key K1391 in the usual manner to cause the operation of the error relay R1850. Relay R1850 locks itself in the usual manner by way of conductor C2062 extending to the sender control circuit 2800, which conductor is grounded. The relays in the operator's position equipment operated at this time are the same as has been previously mentioned with the exception that the dial rear locking relay R1750 is now also energized.

At contact 1856, relay R1850, upon energizing, removes ground potential from conductor C2048 thereby opening the circuit of the start relay in the sender control circuit 2800, similar to start relay R2730, and also opening the circuit of the sender #2 connect relay R2260 in the link 2100. This operation is the same as has been performed previously. At contact 1855, however, the ground potential previously extended by way of conductor C2096 to energize the rear release relay R2150 is ineffective at this time because the dial rear locking relay R1750 has opened the circuit at contact 1757. At contacts 1852 and 1853, relay R1850, upon energizing, opens the initial energizing circuits for either the sender #1 seizing relay R1810 or the sender #2 seizing relay R1830, depending upon which of the two relays are energized. However, the opening of contacts 1852 and 1853 is of no consequence at this time because relay R1810 (which is the relay that has connected the sender control circuit 2600 to the operator's position equipment) is locked up over a circuit including contact 1754 of the energized dial rear locking relay R1750 and conductor C2049 extending to the sender control circuit 2600.

The deenergization of the sender #2 connect relay R2260 disconnects the sender control circuit 2800 from the call switch 2380 in the usual manner and causes the call switch 2380 to restore to normal as previously described. As a result of the deenergization of the start relay in the sender control circuit 2800, the sender control circuit and its associated register sender restore to normal in the manner previously described. After the sender control circuit clears out, ground potential is removed from conductor C2062 and the error relay R1850 restores to normal. In this connection it is to be noted that when the relay R1850 restores at contact 1859, it removes ground potential from conductor C2564 thereby causing the sender alternator relays to restore to normal and at contacts 1326 and 1336 prepare a circuit for seizing the sender control circuit 2600. However, since the sender control circuit 2600 is now in use in transmitting impulses by way of the answer switch 2180, it cannot be seized at this time. Accordingly, the sender #1 lamp L1990 will not be illuminated until the sender control circuit 2600 has cleared out and a new circuit completed for the start relay R2730 to connect the sender control circuit 2600 to the call switch 2380.

ELEVENTH ROTARY POSITION OF THE ANSWER SWITCH 2180

Referring now to the answer switch 2180 (Figs. 21 and 21A), it will be noted that each level of the bank contacts accessible to the wipers 2102 to 2107, inclusive, is provided with eleven bank contacts instead of the usual ten bank contacts. The answer switch 2180 is arranged so that the eleventh bank contact in the banks accessible thereto may be used to terminate an additional trunk per level. Consequently, if the calling trunk is terminated on the eleventh set of bank contacts in a particular level, the answer switch 2180 in searching for the calling trunk will raise its wipers to the level in which the calling trunk is located and will rotate its wipers across the bank contact in search of the calling trunk line. When the wipers 2102 to 2107, inclusive, engage the eleventh bank contact set, the eleventh rotary stepping cam contacts 2110 and 2111 are closed. As the answer switch 2180 rotates its wipers across the bank contacts in search of the calling trunk line in the eleventh rotary position, the relays R2140, R2160 and R2210 are energized and relay R2190 interacts with the rotary magnet 2116 in the manner previously described. When the wipers 2102 to 2107, inclusive, engage the eleventh bank contact, a circuit is completed from ground, contacts 2121, 2134, eleventh rotary cam contact 2111, normal post contact 2112 (which contact is only open on the first level), resistance J, lower winding of rear release relay R2150, to battery. A branch of the above-traced circuit is also completed by way of contact 2144 for shunting the upper winding of relay R2140. Simultaneously with the engagement of the eleventh set of bank contacts in the level, battery potential is applied to wiper 2106 from the calling trunk line circuit, and ground potential is encountered by the wiper 2107 thereby completing an energizing circuit for the test relay R2120. Relay R2120 is a fast operating relay and at contact 2121 immediately opens the previously traced circuit for the rear release relay R2150. The energizing circuit for relay R2120 occurs so quickly after the eleventh rotary step of the wipers of the switch 2180 has been taken, that the circuit for the lower winding of the rear release relay R1250 is opened before the slow operating relay R2150 has time to operate and before the relay R2140 has time to restore. As a further result of the energization of relay R2120, the circuit of the rotary magnet 2116 is opened at contact 2121; the circuit of the switch-through relay R2130 is completed at contact 2122; and at contact 2122, ground potential is also applied by way of contact 2215' and conductor C2079 to energize the rear connect relay R1630 in the operator's position equipment, which relay, upon energizing, causes a sender control circuit to be connected to the call switch 2380 by way of the sender #1 connect relay R2250 or the sender #2 connect relay R2260.

Relay R2130, upon energizing, opens the circuit of the test relay R2120 at contact 2138, and at contact 2136 completes a locking circuit for itself from ground at contact 2143, the latter ground potential also being applied to conductor C2079 to maintain the rear connect relay R1630 energized after relay R2120 restores to normal. The remaining operations of the answer switch 2180 are the same as has been described hereinbefore to finally connect the operator with the calling trunk circuit to which the answer switch 2180 is now connected.

From the foregoing description it should be understood that in the event that the wipers of the answer switch 2180 have rotated to the eleventh bank contact set in a level and no calling trunk line is encountered in the eleventh position, the above-traced circuit for energizing the lower winding of the rear release relay R2150 and the shunting circuit for the change-over relay R2140 will not be opened at contact 2121, due to the fact that no circuit is completed for the test relay R2120. Therefore, the slow-to-operate rear release relay R2150 subsequently energizes and at contact 2151 locks itself over a circuit which may be traced from ground, contact 2152, vertical off-normal contact 2113, contact 2151, lower winding of relay R2150, to battery. At contact 2157, relay R2150, upon energizing, opens the circuit of the start relay R2160. At contact 2154, relay R2150 prepares a circuit for the release magnet 2170.

As a result of the shunting of the upper winding of the change-over relay R2140, the relay restores to normal and at contact 2146 completes the energizing circuit for the release magnet 2170, whereupon the wipers of the switch are restored to normal in the usual manner. As a result of the restoration of the wipers in a rotary direction, the cam contact 2111 is opened to terminate the initial energizing circuit for the lower winding of relay R2150. As a result of the restoration of the wipers of the switch in a vertical direction, the vertical off-normal contact 2113 is opened thereby opening the locking circuit for the relay R2150, thereby causing the latter relay to restore to normal and reconnect the start relay R2160 to the starting conductor C2078.

If a call is still waiting to be answered, ground potential is still maintained on conductor C2078, and the start relay R2160 will reoperate to start the answer switch 2180 in the manner previously described to cause the wipers of the switch to be raised in a vertical direction in search of the level marked by the calling trunk and to be rotated across the bank contacts in the marked level in search of the calling trunk lines.

It is to be noted that during the time that the answer switch 2180 is properly functioning, the start relay R2160 is energized and at contact 2162' completes a flashing circuit for the busy lamp L2124. This flashing circuit may be traced from the 60IPM conductor (Fig. 17), contact 1755, conductor C2080, extending to Fig. 21, contact 2162', resistance 2119, busy lamp L2124, to battery. From the above-traced circuit it will be appreciated that the lamp L2124 flashes during the period of time the start relay R2160 is maintained energized, but that in the event that the relay deenergizes as a result of the energization of the rear release relay R2150, a steady lamp is then maintained over a circuit which may be traced from ground, contacts 2147, 2269, 2259, 2163', resistance 2119, busy lamp L2124, to battery. Consequently, if the answer switch 2180 repeatedly passes over the calling trunk, the operator at position 1300 will be aware of the trouble due to the peculiar flashing condition followed by a steady illuminated condition of the busy lamp L2124 and the failure of the proper lamps at the position circuit to be illuminated.

It will be recalled that in the first level accessible to the answer switch 2180, trunk lines extending to delayed call selectors are accessible to the operator at position 1300 by operating the dial rear key K1970. When the dial rear key is actuated, the answer switch 2180 raises its wipers to the first level and then rotates the wipers across the level in search of an idle delayed call selector. When there are no idle delayed call selectors available, the wipers of the switch will be rotated across the bank contacts to the eleventh set of bank contacts. It is to be noted, however, that in the eleventh set of bank contacts on the first level, no trunk line extending to a delayed call selector is provided. Consequently, when the wipers of the switch engage the eleventh set of bank contacts on the first level, the test relay R2120 has not encountered battery potential by way of its wiper 2106. However, ground potential is encountered by wiper 2107 in the eleventh bank contact in the first level, completing a circuit for the test relay R2120 by way of the eleventh rotary step cam contact 2110, the normal post contact 2109 (closed only on the first level), resistance 2118, to battery. Relay R2120 energizes and at contact 2121 opens the circuit of the rotary magnet 2116.

It should be noted at this time that the normal post contact 2112 is also opened thereby preventing the previously traced circuit for the rear release relay R2150 from being completed at this time. As a result of the energization of the test relay R2120, the switching relay R2130 is energized and locks up over the circuit previously traced. Relay R2130, upon energizing, at contact 2133 prepares a circuit for flashing the rear supervisory lamp L2275.

After the register sender has transmitted the digits registered therein by the operator at position 1300, the dial rear slave relay R1840 subsequently deenergizes in the manner previously described, and at contact 1844 completes the following circuit for the rear supervisory relay R1720: 120IPM conductor (Fig. 21A) connected to the eleventh bank contact in the first level, wiper 2104, contacts 2133, 2162, conductor C2094 extending to Fig. 15, contact 1844, winding of the rear supervisory relay R1720, to battery. This circuit momentarily operates the rear supervisory relay R1720 120 times per minute, and at its contact 1721, ground potential is extended by way of conductor C2093, contacts 2161, 2271, rear supervisory lamp L2275, to battery, for flashing the rear supervisory lamp 120 times per minute. When the operator at position 1300 receives the flashing rear supervisory lamp signal, she is notified that the trunk lines extending to delayed call selectors are not available and that she must release the connection and make a further attempt to complete the connection at a later time.

BLOCKED SENDER

Referring now to the sender control circuit 2600 (Figs. 26 and 27), it will be recalled that battery potential is returned on conductor C2059 to operate the blocked send relay R2680 in the event that the call switch 2380 requires a time interval exceeding the normal interdigital pause between two successive digits to find and connect with an idle trunk line. When the blocked sender relay R2680 is energized, the register sender stops retransmitting digits during the period of time that relay R2680 remains energized.

In order to complete the description of the operation of the sender control circuit 2600, it will be assumed that battery potential is returned on conductor C2059, either as a result of additional searching time required by the call switch 2380, or as a result of a busy CAX trunk line. Accordingly, relay R2680 has energized from ground at contact 2754. It should be noted at this time, that relays R2730, R2690, R2750 and R2720 are energized at this time, and relay R2710 may or may not be operated, depending upon whether or not the operator has operated the sender disconnect key K1390.

As a result of the energization of relay R2680, at contact 2682 a circuit is prepared for its lower winding in series with the cut-in relay R2640, and at contact 2681 the following circuit is completed: ground, contacts 2752, 2681, 2784, one branch extending by way of contacts 2774, 2766, 2745 to the upper winding of relay R2770, the other branch extending by way of contact 2772 to the upper winding of the delayed send timer relay R2760 in parallel with the lower winding of relay R2770. The windings of relay R2770 are in opposition, and when the circuit is completed through both of its windings, the relay is prevented from operating. Relay R2760 energizes over the above-traced circuit and, at contact 2762, completes a locking circuit for its lower winding, which circuit may be traced from ground at contact 2752, contacts 2747, 2762, lower winding of the relay R2760, to battery. The ground potential for locking the lower winding is also extended by way of contact 2783 and conductor C2039 to cause the operation of the stop send relay R3220 in the register sender 3100. As a result of the energization of the stop send relay R3220 in the register sender 3100, additional impulses are prevented from being retransmitted by the register sender 3100. At contact 2763, relay R2760 prepares a circuit for the upper winding of relay R2740. At contact 2765, it completes a circuit for energizing the upper winding of relay R2770, while at the same time at contact 2766, opening the initially traced energizing circuit for the upper winding of relay R2770. As a further result of the energization of relay R2760, the weighted spring contact 2761 is vibrated for a time interval. When the vibrations of the weighted spring diminish and finally come to rest, contact 2761 will be closed and a circuit is completed from ground, contacts 2752, 2761, winding of relay R2670, to battery. Relay R2670 energizes over the above-traced circuit and, at contact 2672, connects the 120IPM conductor by way of contacts 2692 and 2672 to conductor C2060 to cause the link busy lamp L2124 to be changed from a steady lamp to flashing lamp to indicate to the operator that the sender is blocked. At contact 2675, relay R2670 also connects the 120IPM conductor to conductor C2054, thereby causing the sender #1 control lamp L1990 in the position equipment to be changed from a steady lamp to a flashing lamp.

The operator at position 1300, upon receiving the flashing signal of both the sender control lamp and the link busy lamp, may release the end of the link that she is working on in the manner previously described. The sender control circuit will accordingly be restored to normal and the operator at position 1300 may set up the connection on a new sender control circuit.

If the blocked sending condition is relieved after a short time interval, that is, the relay R2680 restores to normal due to the fact that battery potential is removed from conducor C2059 before the operator has released the end of the link she is working on, the sender will resume sending the digits stored therein due to the fact that ground potential is removed from conductor C2039.

It will now be assumed that the operator has not released the connection and that relay R2680 restores to normal. As a result of the restoration of relay R2680, the initial energizing circuit for the upper winding of relay R2760 and the circuit for the lower winding of relay R2770 is opened at contact 2681. When the circuit for the lower winding of relay R2770 is opened, the previously traced circuit for the upper winding thereof causes the relay to energize, and at contact 2771, it completes a circuit for the upper winding of relay R2780. This circuit may be traced from ground, contacts 2752, 2747, 2762, 2783, contact 2771, upper winding of relay R2780, to battery. At contact 2781, relay R2780, upon energizing, completes a locking circuit for its upper winding to the grounded conductor C2039. As a further result of the energization of relay R2770, at contact 2772, it opens its initial energizing circuit for the lower winding and, at contact 2775, it prepares the circuit for connecting the 60IPM conductor C2683 to the lower winding of relay R2780.

As a result of the energization of relay R2780 at contact 2782, ground potential is applied to conductor C2039 directly from contact 2752, and at contact 2786, it prepares a circuit for connecting the 60IPM conductor to the lower winding of relay R2780, which circuit is effective after relay R2770 restores to normal. At contact 2785, relay R2780 completes a circuit for the upper winding of relay R2740 from the 60IPM conductor C2683. On the first 60IPM pulse, the following circuit for the upper winding of relay R2740 is completed: 60IPM conductor C2683, contacts 2693, 2763, 2785, 2742, upper winding of relay R2740, to battery. Relay R2740 energizes over the above-traced circuit and, at contact 2741 locks itself to ground at contact 2752. At contact 2746, relay R2740 transfers the 60IPM conductor C2683 to the holding winding of relay R2760. At contact 2744, relay R2740 completes a holding circuit for the upper winding of relay R2770, which circuit may be traced from ground, contacts 2752, 2744, upper winding of relay R2770, to battery.

At the end of the first 60IPM pulse received over conductor C2683, the holding circuit for the lower winding of relay R2760 is opened. Relay R2760 now restores to normal and, at contact 2764, connects the 60IPM conductor C2683 to the lower winding of relay R2740. It should be noted at this time that if the vibrating contact 2761 had not diminished in vibration and closed the contact at the time the vibration ceased, relay R2670 would not have energized to complete the above mentioned supervisory signals for flashing the link busy lamp and the sender #1 control lamp, thereby the blocksending alarm condition would not have been received by the operator at position 1300.

When the second 60IPM pulse is received over conductor C2683, a circuit is completed by way of contacts 2764 and 2743 for the lower winding of relay R2740. Since the windings of the relay R2740 are in opposition, the circuit completed through the lower winding causes the relay to restore to normal. As a result of the restoration of relay R2740, at contact 2744 the holding circuit for the upper winding of relay R2770 is disconnected from direct ground, and simultaneously therewith, at contact 2745, it connects the upper winding of relay R2770 to the 60IPM conductor C2683. Since the second 60IPM pulse is still maintained on conductor C2683, a circuit is completed from ground, contacts 2693, 2773, 2766, 2745, upper winding of relay R2770, to battery. When the second 60IPM pulse is terminated, relay R2770 restores to normal. Upon restoring, relay R2770 prepares a circuit at contact 2776 for controlling the lower winding of relay R2780 from the 60IPM conductor C2683.

When the third 60IPM pulse is received over conductor C2683, a circuit is completed for energizing the lower winding of relay R2780 as follows: contacts 2693, 2786, 2776, lower winding of relay R2780, to battery. Since the windings of relay R2780 are in opposition to one another, the circuit now completed through the lower winding of the relay causes it to restore to normal. At contact 2781, relay R2780, upon restoring to normal, opens the locking circuit for its upper winding; at contact 2782, it removes the direct ground potential from conductor C2039; at contact 2784, it again prepares the previously traced circuits for relays R2760 and R2770; and at contact 2786, it disconnects the 60IPM conductor C2683 from its lower winding.

As a result of the removal of ground potential from conductor C2039, the stop send relay R3220 in the register sender 3100 is restored to normal to permit the register sender to continue the retransmission of the registered digits.

Under some conditions a connection may be extended over the link circuit to a distant exchange which is equipped to cause a flashing busy condition to be returned to the conductor C2059, thereby causing the blocked send relay R2680 to be energized 30, 60 or 120 times per minute, depending upon the type of flashing circuit provided. When this condition exists, the first time the relay R2680 energized, the above-traced circuits for energizing relays R2760 and R2770 are closed. However, it will be recalled that relay R2770 does not energize at this time because its windings are in opposition. Relay R2760 functions as has been previously described and connects ground potential to the conductor C2039 to stop the sender from retransmitting further digits.

When relay R2680 restores at the end of the first pulse received over conductor C2059, relay R2770 energizes because the initially traced circuit for energizing the lower winding is opened at contact 2681 of the blocked send relay R2680. Relay R2760, however, remains locked to ground at contact 2752. As a result of the energization of relay R2770, at contact 2777 it prepares a holding circuit to maintain relay R2680 energized in the event that a subsequent flashing signal is received over conductor C2059. At contacts 2771 and 2775, relay R2770 completes energizing circuits for both of the windings of relay R2780, one circuit being completed from the grounded conductor C2039, and the other circuit being completed from the 60IPM conductor C2683. Relay R2780 does not energize until the ground pulse is removed from the 60IPM conductor C2683.

As soon as the ground pulse is removed from conductor C2683, relay R2780 energizes and, at contact 2782, connects direct ground potential to conductor C2039. At contact 2785 it connects the 60IPM conductor C2683 to the upper winding of relay R2740, and at contact 2786, it prepares a circuit for connecting the 60IPM conductor to its lower winding.

On the first 60IPM pulse received over conductor C2683, relay R2740 energizes over its upper winding and locks itself to ground at contact 2752, and at contact 2744 completes a holding circuit for the upper winding of relay R2770.

At the end of the first 60IPM pulse received over conductor C2683, relay R2760 restores to normal, thereby preventing the vibrating spring from closing its contact 2761 to cause relay R2670 to send the alarm signal to the operator.

When the second flash busy pulse is received over conductor C2059, relay R2680 again energizes and, at contact 2682, completes the following circuit: ground, winding of relay R2640, contact 2777, lower winding of relay R2680, contact 2682, resistance 2655, to battery. Relay R2680 remains locked up over this circuit in series with the winding of relay R2640, and relay R2640 energizes.

As a result of the energization of relay R2640, relay R2650 is bridged across the conductors C2063 and C2064; at contact 2643, it prepares a circuit for grounding conductor C2053; at contact 2644, it completes a holding circuit for the start relay R2730; at contact 2641, it opens the circuit of relay R2690; and at contact 2647, it disconnects the upper winding of relay R2680 from conductor C2059.

When the second 60IPM pulse is received over conductor C2683, a circuit is completed for the lower winding of relay R2740. Since the windings of relay R2740 are in opposition to one another, the circuit through the lower winding causes the relay to restore to normal. At contacts 2744 and 2745, relay R2740, upon restoring, disconnects the upper winding of relay R2770 from direct ground and connects it to the 60IPM conductor C2683. At the end of the 60IPM pulse, relay R2770 now restores to normal. As a result of the restoration of relay R2770, at contact 2777, it opens the holding circuit for relay R2680 in series with the winding of relay R2640. At contact 2776, relay R2770 again connects the 60IPM conductor to the lower winding of relay R2780.

As a result of the opening of the circuit of relay R2690 as described above, the relay restores to normal and, at contact 2691, opens the circuit of relay R2750, and, at contact 2692, it disconnects the 120IPM conductor to prevent any supervision from being given to the operator.

As a result of the restoration of relay R2750, ground potential is removed from conductor C2039 at contact 2752. At contact 2755, the circuit of relay R2720 is opened and ground potential is simultaneously removed from conductor C2044 to disconnect the register sender from the sender control circuit 2600. At contact 2753, a circuit is completed before the restoration of the slow-to-release relay R2640 from ground, contacts 2728, 2715, 2643, 2653, 2753, conductor C2053, extending to Fig. 22, lower winding of the cut-in relay R2240, to battery. Relay R2240 energizes over this circuit and locks itself in series with the upper winding of the front release relay R2230. The energization of relay R2240, at contacts 2241' and 2242', disconnects the sender #1 and #2 connect relays R2250 and R2260, respectively, from the answer switch 2380. The sender control circuit 2600 now restores to normal in the usual manner.

From the foregoing explanation it will be understood that regardless of the number of digits still registered in the register sender 3100, the disconnection of the register sender from the sender control circuit 2600, as a result of the removal of ground from conductor C2044, will automatically cause the register sender to clear out the remaining digits registered therein.

The operator at position 1300 will subsequently receive a flashing signal on the front supervisory lamp L2123, and upon noting the flashing condition of the lamp will operate the release key K2201 to cause the release of the link circuit 2100 in the manner previously described, or she may operate the talk key K2225 to connect her common position keys to the link 2100 and then operate the release key K1950 to the right, whereupon the call switch 2380 and the cut-in relay R2240 will restore to normal in the manner previously described. When the release key K1950 is restored to normal, an idle sender control circuit will be connected to the call switch 2380 in the usual manner and the operator will make a further attempt to extend the connection to the wanted subscriber.

NIGHT SERVICE

In order to take care of night service, the equipment disclosed is arranged so that an operator may take care of positions on either or both sides of the position which she is attending. For the purpose of this description, however, it will be assumed that the operator during night service is attending the first position of the switchboard 1200, that is, the odd position of the switchboard. She may also, when attending the odd position, answer calls which may be received on the adjacent or even position of the switchboard.

It should be understood that the circuits are so arranged that the incoming trunks which may be answered through the link circuits at the odd positions will ordinarily be answered by the operator attending that position. However, such incoming trunk circuits which do not appear in the banks of the links associated with the odd position referred to above will be answered at the second or even position of the switchboard by the operator attending the first or odd position of the switchboard. It should further be understood that the operator at the odd position of the switchboard will answer all calls appearing at the odd position as long as idle link circuits are available, and that she will ordinarily answer only calls appearing at the second or even position which cannot be answered at the odd position. However, the circuits are so arranged that in the event that all of the link circuits at the odd position of the switchboard are busy, the operator attending that position may reach over to the even position of the switchboard and accept calls at the even position over trunk lines which are also accessible to the link circuits at the even position of the switchboard. It should be understood that the operator attending the odd position of the switchboard will plug her headset in the jack at the odd position and can answer calls through her headset which may be received at link circuits at either the odd or the even position of the switchboard. Furthermore, the operator's keyset at the odd position of the switchboard may be utilized to control the extension of connections through links individual to either the odd or even position of the switchboard, but that the individual position keys at the odd and even positions must be actuated to control the links individual to the corresponding position.

Assuming that the operator at position 1300 (Figs. 12 to 20, inclusive) is attending the first or odd position of the switchboard and desires to prepare her position so that she may answer calls received on links either at her position or at the adjacent even position. The operator first inserts the plug 1303 of the headset, comprising transmitter 1301 and receiver 1302, into the jack 1304 at the odd position. She then actuates a position group key, similar to position group key K2090, at the adjacent or even position of the switchboard. Responsive to the insertion of the plug 1303 into the jack 1304, the battery feed relay R1420 is energized and prepares the circuits previously described in the position equipment. As a result of the actuation of key K2090 at the even position, ground potential is extended by way of conductor C2516 extending to Fig. 15, to energize the transfer relay R1520, and in multiple therewith, extending to Fig. 13 to energize the transfer relay R1340.

Both of the above-mentioned relays are located at the even position of the switchboard. Accordingly, at contacts 1521, 1523, 1525, 1527 and 1522', relay R1520 disconnects certain of the operator's equipment from the position equipment, and at contacts 1522, 1524, 1526, 1528 and 1523', transfers the position equipment at the even operator's position by way of cable 5000 to the odd position of the switchboard. Transfer relay R1340 at the even operator's position, upon operating, at contacts 1341 to 1346, inclusive, multiples the keyset KS1350 at the even operator's position by way of conductors C5006 to C5011, inclusive, and cable 5000 to the odd position. Referring now to the odd position of the switchboard, and assuming that the odd position is the equipment shown in Figs. 12 to 20, inclusive, the above-referred to conductors and cable 5000 has been designated at the odd position as cable 6000, and the corresponding conductors are prefixed with the digit "6" instead of the digit "5." Accordingly, conductors C5001 to C5011, inclusive, appear at the odd position of the switchboard as conductors C6001 to C6011, inclusive.

For the purpose of describing connections being brought into the odd and even positions of the switchboard, it will be assumed that the operator at the odd position of the switchboard has operated the TX key K2030 of the class of service keys in order to bar that type of service from being received at the odd position, whereas both CLR and both common and odd toll calls will be permitted access to the odd position of the switchboard. It will further be assumed that at the even position of the switchboard, both the CLR key K2020 and the TX key K2030 will be actuated to bar the corresponding type of service, but the toll key K2040 is left normal so that toll calls over the even group of trunk lines may be accepted at the even position of the switchboard. The operator attending the odd position of the switchboard may now operate a talk key associated with an idle link circuit. It will be assumed that the talk key K2225 associated with the link 2100 at the odd position of the switchboard has been actuated, and, therefore, relay R2210 in the link 2100 is energized, and relays R1420, R1440, R1450, R1460, R1640, R1710 and R1220 of the operator's position equipment are energized.

Figure 8:
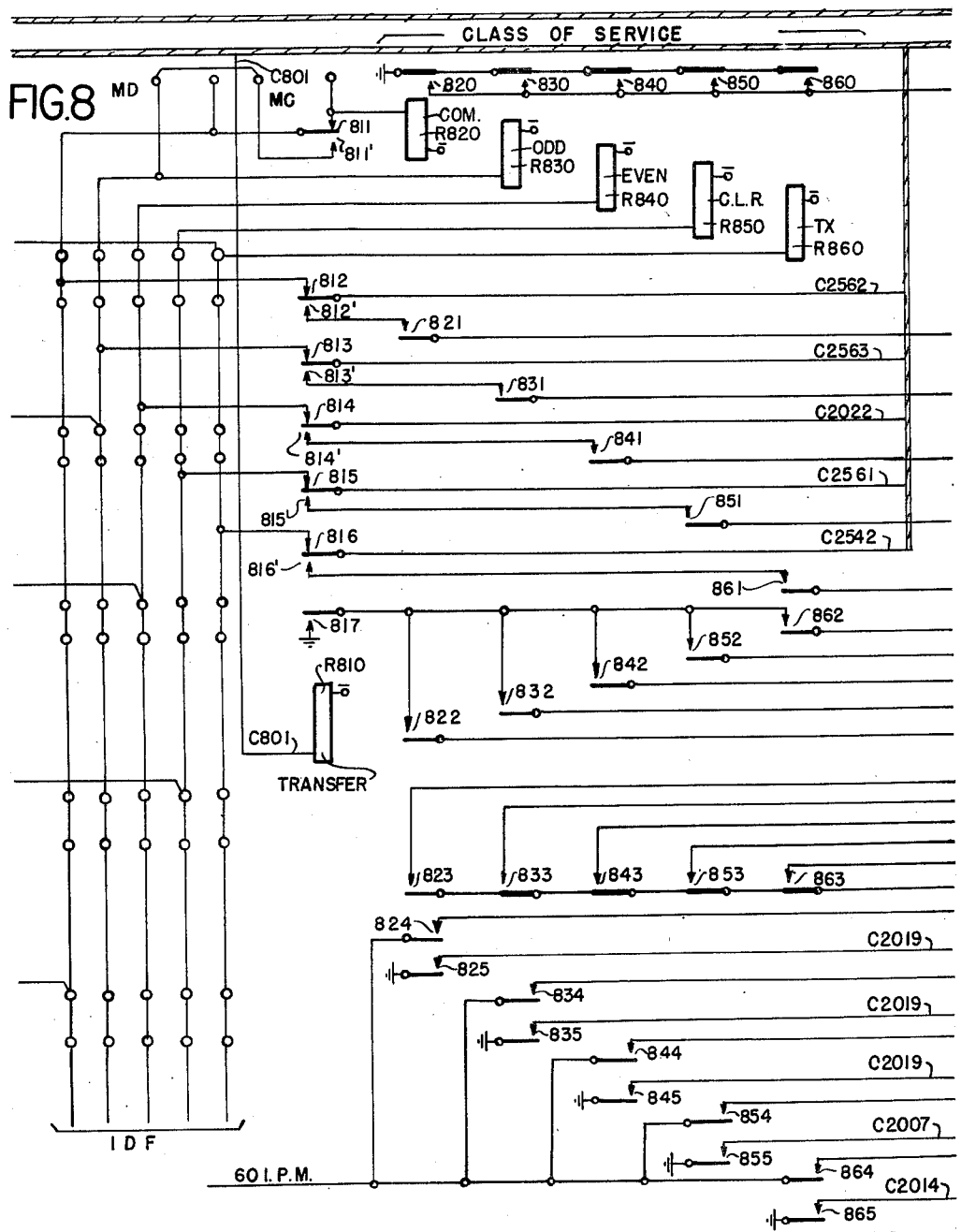
Figure 9:
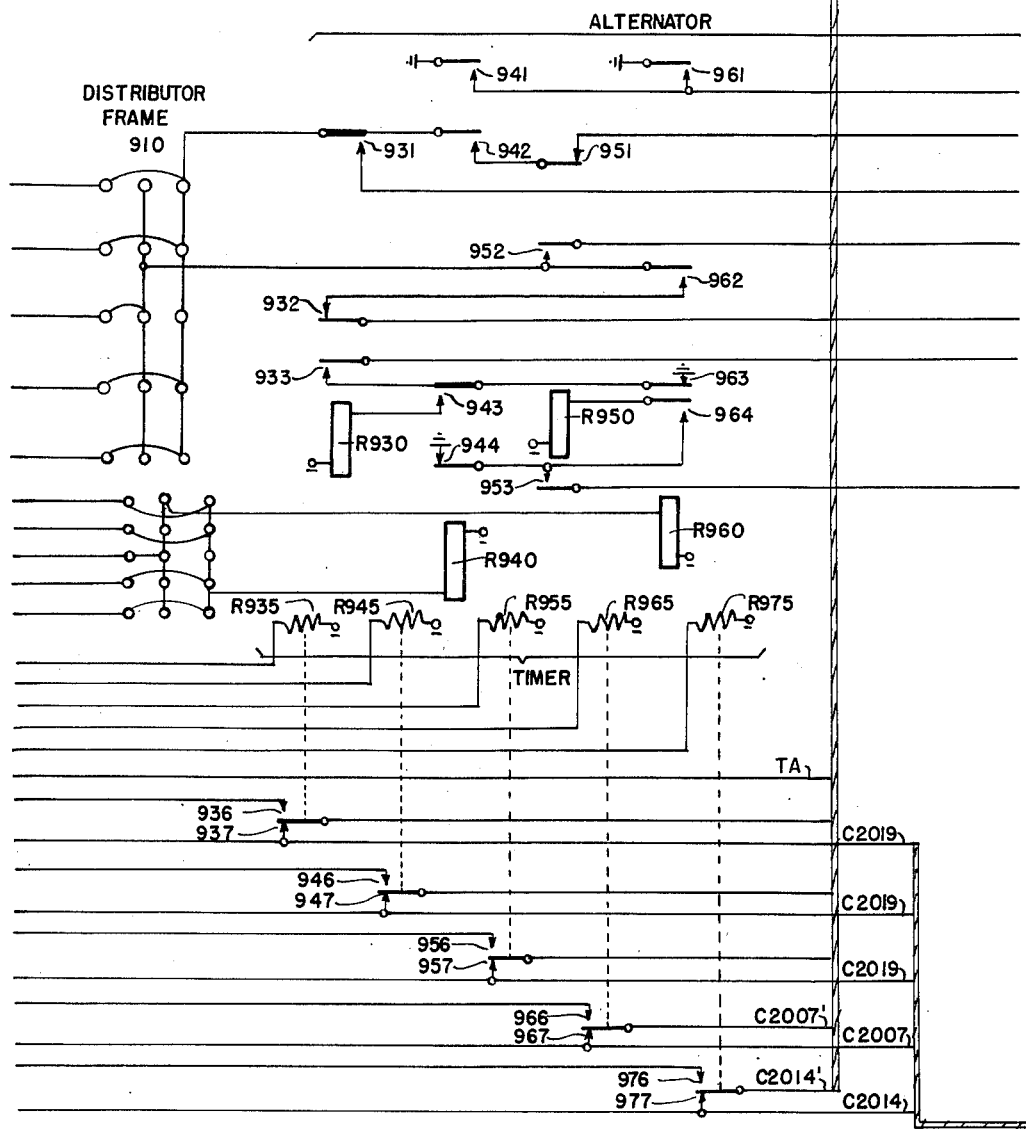
Figure 10:
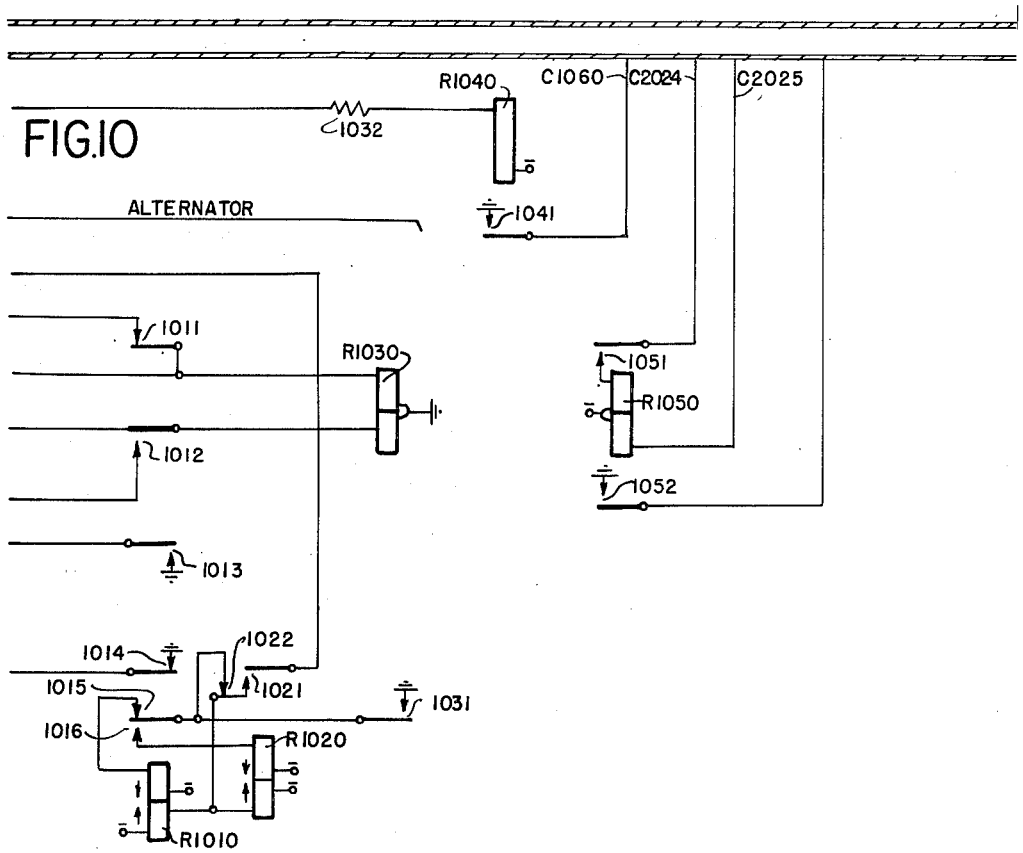

Before describing the acceptance of a call, it is to be noted that the chief operator at position 2530 has actuated a key to cause the energization of the transfer relay R810 (Fig. 8). Relay R810, upon energizing, at contacts 812 to 816, inclusive, disconnects conductors C2562, C2563, C2022, C2561 and C2542 from control of the common start and level distributor 700, and at contacts 812' to 816', connects these conductors through contacts 821, 831, 841, 851 and 861 of operated class of service relays through to the distributing frame 910, for a purpose to be described hereinafter. At contact 817, relay R810 prepares a grounding circuit for controlling the alternator equipment (Figs. 9 and 10). At contact 811, relay R810 disconnects the class of service relay R820 from the common start and level distributor 700. At contact 811', relay R810 transfers the starting control of the common relays R760, R760', etc., by way of terminals MC and MD to the odd class of service relay R830. From the foregoing it will be understood that when the common start and level distributor relays are energized to ground terminal 18, the common class of service relay R820 will not energize, but a circuit will be completed for energizing the odd class of service relay R830.

In order to describe the operation of the alternator (Figs. 9 and 10), it will be assumed that any one or more of the class of service relays R830, R850 or R860 is energized, and therefore a circuit is completed from ground at contact 817 through either one or more of the contacts 832, 852 or 862, distributing frame 910, winding of relay R940, to battery. Relay R940, upon energizing, at contact 943 completes an energizing circuit for relay R930 from ground at contact 963. At contact 942, relay R940 extends ground from the upper winding of relay R1030, contacts 1011, 951, 942, to the right-hand terminals of the distributing frame 910, to which terminals contacts 821, 831, 851 and 861 of the class of service relays are multipled. At contact 944, relay R940 opens a point in the circuit for energizing relay R950, thereby preventing relay R950 from energizing in the event that a call has been received and the even class of service relay R840 is energized and has completed a circuit for relay R960.

It will now be assumed that a call has been received on the ring-down toll line circuit 250, resulting in the grounding of the conductor C2536 extending to the common start and level distributor 700, contact 707, winding of the common start relay R760, to battery. Relay R760 energizes, performing the same functions as described hereinbefore, and at contact 762 places a ground on terminal 18, whereupon a circuit is completed by way of contact 811', terminal MC jumpered to terminal MD, winding of the odd class of service relay R830, to battery. Relay R830 energizes and closes its contacts 831 to 835, inclusive. At contact 832, relay R830 completes the previously traced circuit for energizing relay R940, and at contact 835 it completes the circuit for illuminating the call waiting lamp L2064 at the odd operator's position. As a result of the closing of contact 831, ground potential is extended by way of contact 813' to conductor C2563 extending to the position distributor 1102, which distributor has been operated to distribute the present call to the odd position of the switchboard. Accordingly, the ground potential connected to conductor C2563 is extended through the distributor 1102 to conductor C2534 extending to Fig. 12, contact 1212, contact 1224, upper winding of the marking relay R1230, to battery. In this circuit the relay R1030 in the alternator and the relay R1230 at the switchboard both energize. Relay R1230, upon energizing, at contact 1234 places ground potential on conductor C2077 to cause the energization of the start relay R1510 in the usual manner. At contact 1231, relay R1230 extends ground potential by way of conductor C2535 to ground the contacts in the bank accessible to wiper 2107 of the answer switch 2180 at the odd position of the switchboard. At contact 1232, relay R1230 extends the grounded conductor C2537 (grounded responsive to the energization of the common start relay R760) to the conductor C2538 extending to Fig. 21, which conductor marks the particular level in the bank associated with the answer switch 2180 in which the calling trunk can be found.

As a result of the energization of the start relay R1510, the answer switch 2180 is actuated in the manner previously described to connect with the calling trunk line.

As a result of the previously described energization of relay R1030 in the alternator (Fig. 10), a circuit is completed at contact 1031 for energizing the upper winding of the differential relay R1010 by way of contact 1015; a branch of the circuit is completed by way of contact 1022 for energizing the lower winding of relay R1010 and the lower winding of relay R1020. Relay R1010, being a differential relay, does not operate at this time, but relay R1020 does energize and at contact 1021 completes a locking circuit for its lower winding from ground at contact 941. The lower winding of relay R1010 is now energized from ground at contact 941, and the upper winding is energized from ground at contact 1031.

When the answer switch 2180 finds and connects with the calling trunk line, relay R2120 in the answer switch energizes in the usual manner and at contact 2122 causes the energization of the rear connect relay R1630. At contact 1634, relay R1630 opens the energizing circuit of the position busy relay R1640 and relay R1220. Relay R1220, upon deenergizing, at contact 1224 disconnects battery potential from conductor C2534, thereupon opening the energizing circuit for the alternator relay R1030, which relay now restores to normal. At contact 1031, relay R1030, upon restoring to normal, opens the energizing circuit for the upper winding of relay R1010, thereby causing relay R1010 to be energized over the circuit traced for its lower winding.

When the answer switch 2180 finds the calling toll line circuit, ground potential is removed from conductor C2536 to permit the common start and level distributor relay R760 to restore to normal if another call has not been received to maintain relay R760 energized. It will be assumed, however, that before the common start relay R760 was energized with the previously described call, a call was also received and caused the operation of the CLR common start and level distributor relay R750. Consequently, terminal 16 is grounded and the CLR class of service relay R850 is energized. At contact 852, relay R850 maintains ground potential by way of the distributing frame 910 on the winding of relay R940 of the alternator.

From the foregoing it will be understood that after the call originally received has been answered and the class of service relay R830 restored to normal, relay R940 is prevented from deenergizing because of the energized condition of the CLR class of service relay R850.

If the operator at the odd position of the switchboard has disposed of the first call received on the link 2100 and has disconnected therefrom, she may actuate a talk key of another link at her position, whereupon the above-described operations again take place, causing the operation of the alternator relay R1030. The circuit for energizing the relay R1030 is now completed by way of contact 931 of the energized relay R930, due to the fact that relay R1010 has, in the meantime, energized and opened the initially traced circuit for energizing relay R1030 at contact 1011. At contact 1031, relay R1030, upon energizing, now completes a circuit by way of contact 1031 for the upper winding of relay R1020. When the circuit is completed through its upper winding, relay R1020, being differentially wound and locked up over its lower winding, now deenergizes and, at contact 1022, completes a circuit for the lower winding of relay R1010, and in multiple therewith, a circuit for the lower winding of relay R1020. Relay R1010 remains energized, but relay R1020 is prevented from operating because a circuit is completed for both its upper and lower windings simultaneously.

After the operator at the odd position of the switchboard has disposed of the call now received on the second link at her position, relay R1030 restores to normal and, at contact 1031, opens the circuit for the upper and lower windings of relay R1020 and the circuit for the lower winding of relay R1010. Relay R1010 now restores to normal, and the relays are in the position disclosed in the drawings.

Figure 7:
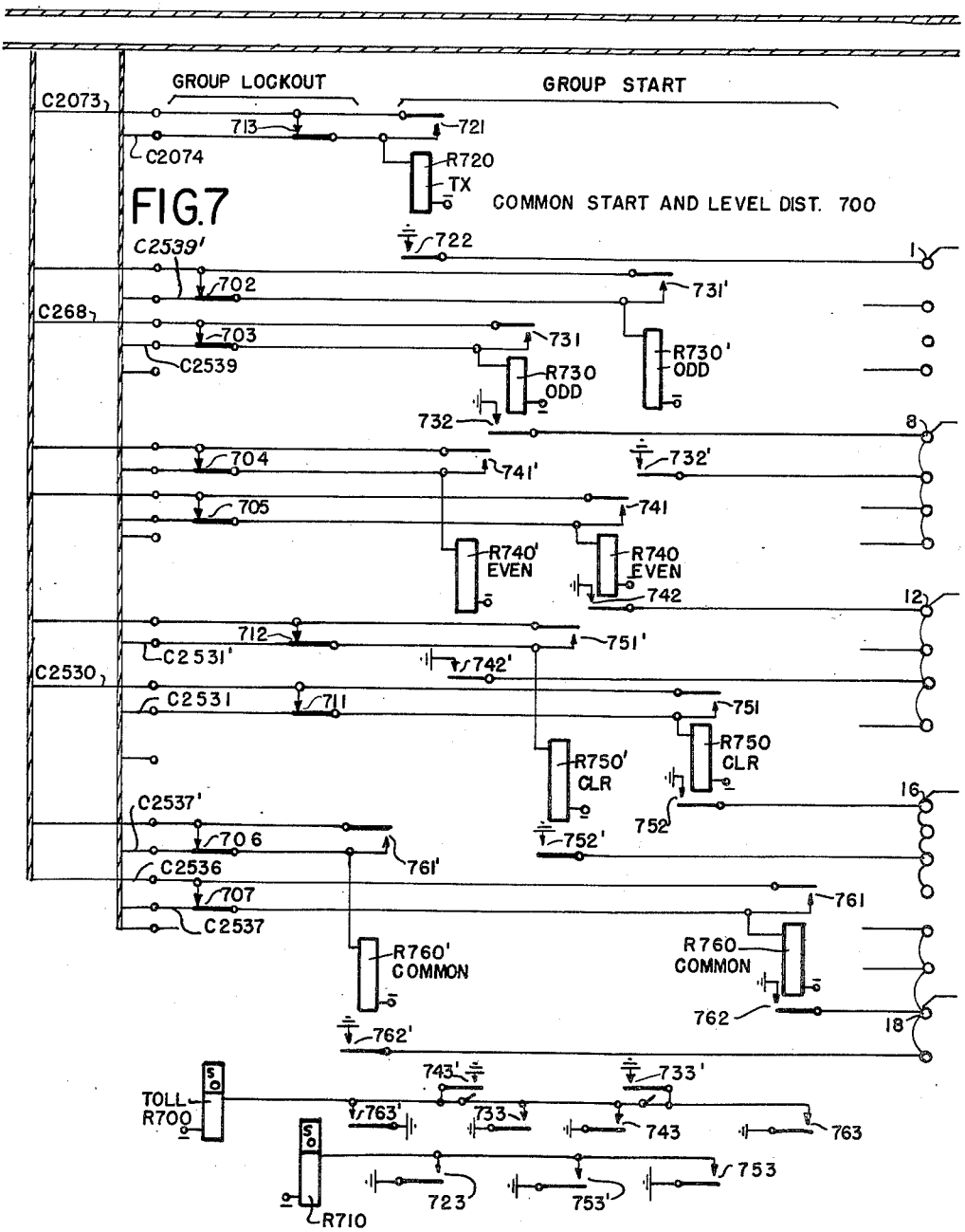

It will now be assumed that a call is received which may only be answered at the even position of the switchboard. Referring now to Fig. 7, it will be assumed, therefore, that relay R740 has energized and, at contact 742, has placed ground potential on terminal 12, whereupon the even class of service relay R840 is energized and, at contact 842, completes an energizing circuit from ground at contact 817 for energizing the alternator relay R960. Relay R960, upon energizing, at contact 964 completes an energizing circuit for relay R950. Relay R950, upon energizing, at contact 953 locks itself to ground at contact 1014, and at contact 952, connects the lower winding of relay R1030 to the center terminals of the distributing frame 910. At contact 951, relay R950 opens the circuit for the upper winding of relay R1030 to prevent calls received over other groups from interfering with the operation of relay R1030 while a call in the even group is being handled. As a further result of the energization of relay R840, at contact 845 it completes a circuit for grounding conductor C2019 extending to the call waiting lamp, similar to lamp L2064, at the even position of the switchboard.

When the operator at the odd position of the switchboard notices the illuminated condition of the call waiting lamp at the even position of the switchboard, as well as the illuminated condition of the call waiting lamp L2064 at the odd position of the switchboard, at a time when there are no talk keys at either position actuated, she generally actuates an idle talk key at the odd position of the switchboard inasmuch as the majority of the calls are received at that position. However, this has no effect at this time because the call being discussed is one that only can be answered at an even position of the switchboard. If the operator has operated the idle talk key at the odd position and has not caused a connection to be established with the calling trunk, she then restores the talk key at the odd position and reaches over to actuate a talk key at the even position of the switchboard.

As a result of the actuation of the talk key associated with an idle link at the even position of the switchboard, the answer switch is actuated in the usual manner to find and connect with the calling trunk line in the even group of trunk lines.

Since the transfer relay R1520 and the transfer relay R1340 at the even position of the switchboard have been actuated, the zip-zip tone, which is transmitted through the operation of the tone relays R1530, R1540 and R1550, is transmitted by way of contacts 1532, 1522, conductor C5001, through cable 5000, and is received through cable 6000 at the odd position of the switchboard through conductor C6001, contacts 1531, 1521, through the operator's headset circuit at the odd position of the switchboard and returns by way of contact 1523, conductor C6002, through the cable 6000, extending to the even position of the switchboard through cable 5000, terminating at the even position of the switchboard, conductor C5002, contact 1524, to ground at contact 1533. When the answer switch 2180 at the even position has actuated and connected with the trunk line, a sender control circuit and an associated idle register sender is connected to the call switch at the even position of the switchboard in the usual manner. The operator at the odd position of the switchboard may now converse with the subscriber or calling toll operator connected to the toll line which has been found by the answer switch at the even position of the switchboard by way of conductors C6001 and C6002 extending to the even position of the switchboard by way of cable 6000 and connected to the even position by way of cable 5000 and conductors C5001 and C5002, contacts 1522 and 1524, extending to the talking conductors of the link circuit at the even position.

When the operator at the odd position of the switchboard ascertains the number of the wanted subscriber, she may manipulate the keys at her keyset KS1350 at the odd position to control the sender control circuit and register sender equipment associated therewith at the even position of the switchboard, due to the fact that the keys at the keyset KS1350 at the odd position are multipled by way of conductors C6006 to C6011, inclusive, to the conductors C5006 to C5011, inclusive, at the even position of the switchboard.

From the foregoing it will be understood that the manipulation of the keys at the odd position of the switchboard will control the sender control circuit and the register sender connected to the even position of the switchboard. The call will automatically be extended in the usual manner, and after the connection is established, the talk key associated with the operated link at the even position of the switchboard may be restored to normal. Any supervision in connection with the call extended over the even position of the switchboard will be received thereat, and if it is necessary to actuate any position common keys to split the call or perform any other special functions, the operator at the odd position of the switchboard must actuate the position common keys located at the even position of the switchboard.

ALTERNATING BETWEEN TWO ADJACENT POSITIONS

In the foregoing description of the operation of the alternators (Figs. 9 and 10), it was assumed that a call was received which was required to be answered at the odd position of the switchboard and a further call was received to be answered at the even position of the switchboard. It will now be assumed that calls are simultaneously received to be answered at both the odd and the even positions of the switchboard. For this purpose it will be assumed that the class of service relays R830 and R840 are energized. Accordingly, relays R940 and R960 in the alternator will be energized over the previously traced circuits therefor. If the alternator relays R1010 and R1020 are assumed to be in the position disclosed in the drawings, the first call to be received will be the call that is to be answered at the odd position of the switchboard. The reason for this is that the energization of relay R940 completes a circuit for the upper winding of relay R1030. As a result of the energization of relay R1030, relays R1010 and R1020 are controlled in the manner previously described to prepare the circuits for subsequently accepting the call, which control the energization of the even class of service relay R840.

It is to be noted under the foregoing conditions that relay R930 is not energized because the initial energizing circuit therefor is opened at contact 963. When the call has been received at the odd position of the switchboard and is answered, the circuit for the upper winding of relay R1030 is opened in the manner previously described to cause the relays R1010 and R1020 to be locked up over a circuit completed from ground, contacts 961, 1021, lower winding of relay R1010, a branch of the circuit completed for the lower winding of relay R1020.

With relays R1010 and R1020 energized, a circuit is now completed, as a result of the call received to be distributed to the even switchboard, for the lower winding of relay R1030 by way of contacts 962, 932, 1012, the lower winding of relay R1030, to ground. Relay R1030, upon energizing, at contact 1031, causes relay R1020 to be deenergized, relay R1010, however, remaining energized over a circuit including its lower winding.

After the call has been answered at the even position of the switchboard, the circuit for the lower winding of relay R1030 is opened and the relay restores to normal, thereby permitting relay R1010 also to deenergize. Relays R1010 and R1020 are now at normal, and if relay R940 is still energized, the subsequent call will be received at the odd position of the switchboard. However, if relay R940 is deenergized because no calls are waiting to be answered at the odd position of the switchboard, but relay R960 is energized because a call is waiting to be distributed to the even position of the switchboard, relay R950 will be energized over a circuit including contacts 964 and 944. As a result of the energization of relay R950, a locking circuit is completed by way of contact 953 from ground at contact 1014 of the alternator relay R1010. As a result of the energization of relay R950, a circuit is completed at contact 952 for energizing the lower winding of relay R1030, and when a call is received at the odd position of the switchboard, relay R1030 again deenergizes, the relays R1010 and R1020 cyclically operating as a result of the momentary energization of relay R1030 in the same manner as has been previously described.

EMERGENCY PROVISIONS

In the event that there are insufficient operators staffing the switchboard 1200 to handle the number of calls being received, the equipment is arranged to give an indication to the chief operator at the chief operator's position 2530 that additional operators' positions should be placed in service.

Referring to Figs. 8 and 9, it will be noted that when the class of service relays are energized, circuits are closed by way of contacts 823, 833, 843, 853 and 863 to control the bi-metallic relays R935, R945, R955, R965 and R975, respectively. Accordingly, whenever one or more of the class of service relays are energized, the conductor TA is grounded at the chief operator's position, and an energizing circuit is completed for one of the timer relays. When this condition exists for a predetermined length of time, the timer relays will eventually actuate their respective contacts. The time interval allowed to permit energization of the timer relays is adequate to permit a call to be received and answered by an operator. In the event that the call is tied up for a long period of time, the timer relay, for example relay R975, is actuated and, at contact 976, completes a circuit whereby the 60IPM conductor is extended by way of contact 864 of the energized class of service relay R860, contact 976 of the now completely energized timer relay to conductor C2014', whereby a lamp at the chief operator's position is flashed to indicate that the calls are not being allotted within the time limit ordinarily required.

In order to give the chief operator an alarm if the answer switch at the operator's position should fail to find and connect with a calling trunk line at a time when the finder start circuit has been completed through the position distributor, the alarm relay R1050 has been provided. Referring now to Fig. 11, it will be noted that ordinarily the circuit for controlling the answer switches of the operators' link circuits is completed through contact 1113 of the alarm relay R1110. It is to be noted, however, that relay R1110 is periodically energized by pulses being transmitted over the TPI conductor and, at contact 1113, opens the circuit for controlling the starting of the answer switches, the circuit now being completed through the lower winding of relay R1110. As long as the circuit is maintained through the lower winding, the relay remains operated. If the circuit through the lower winding of relay R1110 is maintained for a period of time exceeding the normal time required for the answer switch to respond, relay R1110 energizes and, at contact 1113, opens the initial starting circuit completed by way of conductor C2562 for starting the answer switches of the links at the various positions. As long as its circuit is maintained through the lower winding of the relay R1110, the relay remains energized after the preliminary energizing pulse has been removed from the TPI conductor. If the circuit through conductor C2562 and the lower winding of relay R1110 is opened before a pulse is received on the TP2 conductor, no alarm will be given. However, if the relay is energized at the time the TP2 conductor is grounded, a circuit is completed by way of contact 1112 and conductor C2025, extending to Fig. 10, lower winding of relay R1050, to battery. Relay R1050, upon energizing, at contact 1051 locks itself by way of conductor C2024 extending to Fig. 11, contact 1101, to ground. As a further result of the energization of relay R1050, a circuit is completed at contact 1052 for signalling the chief operator at position 2530 to indicate that a non-standard condition exists. The chief operator will now instruct an operator at one of the positions at the switchboard 1200 to operate her emergency start key.

It should be understood that in the event that a chief operator's position is not provided, the circuit completed at contact 1052 as a result of the energization of relay R1050 could control the illumination of an emergency lamp located at each of the operator's positions of the switchboard. When the lamp is illuminated, the operators at the various positions of the switchboard will be instructed to operate their emergency start key in order to cause the answer switch of a selected link to automatically search for and connect with a calling trunk line without waiting for the position distributors to allot the call to the various positions.

A further condition under which the operators at the various positions of the switchboard may be required to operate their emergency start keys may occur in the event that the position distributor fails, for some reason or other, to distribute calls to the various positions. In the latter event, the call waiting lamp at the operator's position may be illuminated for an abnormally long period of time when the operator has an idle talk key actuated to receive a call. When this condition exists, the operator may be instructed to operate her emergency start key to cause the answer switch of the selected idle link to automatically search for and connect with a calling trunk line.

Referring now to Fig. 20, it will be noted that by actuating the emergency start key K2055 to the left, a circuit is completed from ground, contact of the key K2055, conductor C2527, extending to Fig. 12, the lower windings of relays R1230, R1240 and R1250, to battery. The marking relays all energize when the emergency start key is actuated to connect the marking conductors through to the banks of the answer switch 2180 individual to the link 2100. As a further result of the energization of the marking relays R1230, R1240 and R1250, the position start conductor C2077 is grounded to cause the energization of the start relay R1510 in the position equipment. The remaining operations of the circuits are the same as has been previously described.

It is to be understood, however, that regardless of what class of service the operator is conditioned to receive by virtue of the operation of the class of service keys K2020, K2030 and K2040, the answer switch 2180 will automatically find and connect with a calling trunk line in the lowest marked level in the vertical bank engaged by wiper 2108. Accordingly, if the operator's position class of service keys have been actuated to bar CLR and TX calls, under emergency conditions the answer switch 2180 may find and connect with either CLR or TX or toll calls, depending upon which class of service has a calling trunk line on the lowest levels of the bank contacts accessible to the answer switch 2180.

What is claimed is:

1. In a telephone system, an automatic switch having a bank of bank contacts, said bank comprising a plurality of sections each comprising a plurality of corresponding levels of bank contacts and a level bank contact for corresponding levels in said sections, a plurality of groups of trunk lines of different character, each of said trunk groups divided into a plurality of trunk subgroups, the trunk lines of each trunk sub-group terminating in only a particular corresponding level in each of said sections and a corresponding level in each section terminating only one trunk sub-group or a corresponding level in each section terminating a plurality of trunk subgroups from different trunk groups, means responsive to a trunk call on any one of said trunk lines from any one of said trunk groups for individually marking the bank contact of said calling trunk line in its corresponding level in one of said sections, for group marking all of the bank contacts corresponding to all of the trunk lines in the group containing said calling trunk line in another of said sections, and for marking a particular one of said level bank contacts corresponding to the particular level and sub-group said calling trunk line terminates in, means responsive to a second trunk call on any one of said trunk lines in any one of said trunk groups for only individually marking the bank contacts of said second calling trunk line in its corresponding level in said one section, said marking means operative in response to said first trunk call to prevent the group and level markings of said second trunk call in said bank.

2. In a telephone system, an automatic switch having a bank of bank contacts, said bank comprising a plurality of sections each comprising a plurality of corresponding levels of bank contacts and a level bank contact for corresponding levels in said sections, a plurality of groups of trunk lines of different character, each of said trunk groups divided into a plurality of trunk subgroups, the trunk lines of each trunk sub-group terminating in only a particular corresponding level in each of said sections and a corresponding level in each section terminating only one trunk sub-group or a corresponding level in each section terminating a plurality of trunk sub-groups from different trunk groups, means responsive to a trunk call on any one of said trunk lines from any one of said trunk groups for individually marking the bank contact of said calling trunk line in its corresponding level in one of said sections, for group marking all of the bank contacts corresponding to all of the trunk lines in the group containing said calling trunk line in another of said sections, and for marking a particular one of said level bank contacts corresponding to the particular level and sub-group said calling trunk line terminates in, means responsive to a second trunk call on any one of said trunk lines in any one of said trunk groups for only individually marking the bank contacts of said second calling trunk line in its corresponding level in said one section, said marking means operative in response to said first trunk call to prevent the group and level markings of said second trunk call in said bank, and means responsive to any trunk call from any trunk group for operating said switch to said marked level and then over the bank contacts of corresponding levels in said sections to find said individual and group markings.

3. In a telephone system, an automatic switch having a bank of bank contacts, said bank comprising a plurality of sections each comprising a plurality of corresponding levels of bank contacts and a level bank contact for corresponding levels in said sections, a plurality of groups of trunk lines of different character, each of said trunk groups divided into a plurality of trunk sub-groups, the trunk lines of each trunk sub-group terminating in only a particular corresponding level in each of said sections and a corresponding level in each section terminating only one trunk sub-group or a corresponding level in each section terminating a plurality of trunk sub-groups from different trunk groups, means responsive to a trunk call on any one of said trunk lines from any one of said trunk groups for individually marking the bank contact of said calling trunk line in its corresponding level in one of said sections, for group marking all of the bank contacts corresponding to all of the trunk lines in the group containing said calling trunk line in another of said sections, and for marking a particular one of said level bank contacts corresponding to the particular level and sub-group said calling trunk line terminates in, means responsive to a second trunk call on any one of said trunk lines in any one of said trunk groups for only individually marking the bank contacts of said second calling trunk line in its corresponding level in said one section, said marking means operative in response to said first trunk call to prevent the group and level markings of said second trunk call in said bank, means responsive to any trunk call from any trunk group for operating said switch to said marked level and then over the bank contacts of corresponding levels in said sections to find said individual and group markings, and means for stopping said switch on the bank contacts of said first trunk line in accordance with said markings in case said second trunk call is from a different sub-group of trunk lines, for stopping said switch on the bank contacts of said first trunk line in accordance with said markings in case both said trunk calls are from the same trunk sub-group and said first trunk line appears as first choice in said bank, and for stopping said switch on the bank contacts of said second trunk line in accordance with said markings in case both said calls are from the same trunk sub-group and said second trunk line appears as first choice and said first trunk line appears as second choice in said bank.

4. In a telephone system, an automatic switch having a bank of bank contacts, said bank comprising a plurality of sections each comprising a plurality of corresponding levels of bank contacts and a level bank contact for corresponding levels in said sections, a plurality of groups of trunk lines of different character, each of said trunk groups divided into a plurality of trunk sub-groups, the trunk lines of each trunk sub-group terminating in only a particular corresponding level in each of said sections and a corresponding level in each section terminating only one trunk sub-group or a corresponding level in each section terminating a plurality of trunk sub-groups from different trunk groups, means responsive to a trunk call on any one of said trunk lines from any one of said trunk groups for individually marking the bank contact of said calling trunk line in its corresponding level in one of said sections, for group marking all of the bank contacts corresponding to all of the trunk lines in the group containing said calling trunk line in another of said sections, and for marking a particular one of said level bank contacts corresponding to the particular level and sub-group said calling trunk line terminates in, means responsive to a second trunk call on any one of said trunk lines in any one of said trunk groups for only individually marking the bank contacts of said second calling trunk line in its corresponding level in said one section, said marking means operative in response to said first trunk call to prevent the group and level markings of said second trunk call in said bank, means responsive to a trunk call for operating said switch, means for stopping said switch opposite the marked level in accordance with said level marking and for thereafter operating said switch over the bank contacts of this level, a test relay in said switch successively bridged across corresponding successive bank contacts in the said sections having said group and individual markings in response to the last operation of said switch, and means for operating said relay to stop said switch in response to bridging said relay across bank contacts having an individual marking and a group marking.

5. In a telephone system, an automatic switch having a bank of bank contacts divided into a plurality of levels, a plurality of groups of trunk lines, each of said groups of trunk lines divided into a plurality of sub-groups, each sub-group of trunk lines terminating in a particular bank level and each level terminating only one sub-group of trunk lines or a plurality of sub-groups from different groups of trunk lines, and means responsive to a call on any one of said trunk lines from any one of said groups for marking all of the trunk lines in all of the sub-groups of said calling group of trunk lines in said bank, for individually marking said calling trunk line in said bank, and for marking the particular level corresponding to the sub-group in said bank terminating said calling trunk line.

6. In a telephone system, an automatic switch having a bank of bank contacts divided into a plurality of levels, a plurality of groups of trunk lines, each of said groups of trunk lines divided into a plurality of sub-groups, each sub-group of trunk lines terminating in a particular bank level and each level terminating only one sub-group of trunk lines or a plurality of sub-groups from different groups of trunk lines, and means responsive to a call on any one of said trunk lines from any one of said groups for operating said switch to find the level and sub-group terminating said calling trunk line and for thereafter operating said switch over said level to connect with the bank contacts terminating said calling trunk line.

7. In a telephone system, an automatic switch having a bank of bank contacts divided into a plurality of levels, a plurality of groups of trunk lines, each of said groups of trunk lines divided into a plurality of sub-groups, each sub-group of trunk lines terminating in a particular bank level and each level terminating only one sub-group of trunk lines or a plurality of sub-groups from different groups of trunk lines, means responsive to a call on any one of said trunk lines from any one of said groups for marking all of the trunk lines in all of the sub-groups of said calling group of trunk lines in said bank, for individually marking said calling trunk line in said bank, and for marking the particular level corresponding to the sub-group in said bank terminating said calling trunk line, and means responsive to said call for operating said switch to find said marked level in accordance with said sub-group marking, and means responsive to said switch finding said marked level for operating said switch over the bank contacts in said level to find and connect with the bank contacts terminating said calling trunk in accordance with said group and individual markings.

8. In a telephone system, an automatic switch having a bank of bank contacts divided into a plurality of levels, a plurality of groups of trunk lines, each of said group of trunk lines divided into a plurality of sub-groups, each sub-group of trunk lines terminating in a particular bank level and each level terminating only one sub-group of trunk lines or a plurality of sub-groups from different groups of trunk lines, the trunk lines of different trunk groups terminating a plurality of sub-groups in any one level being indiscriminately interspersed with respect to each other, and means responsive to a call on any one of said trunk lines from any one of said groups for operating said switch to find the level and sub-group terminating said calling trunk line and for thereafter operating said switch over said level to connect with the bank contacts terminating said calling trunk line.

9. In a telephone system, an automatic switch having a bank, a plurality of groups of trunk lines, each of said groups terminating in said bank in a plurality of sub-groups, means responsive to a call on any one of said trunk lines from any one of said groups for marking all the trunk lines in said bank corresponding to said one trunk line group, for individually marking said one trunk line in said bank, and for marking the sub-group in said bank terminating said calling trunk line, means responsive to said call for operating said switch to hunt for a sub-group marking, means in said switch for stopping said switch in response to encountering said sub-group marking, means for thereafter operating said switch to hunt for said calling trunk line in said sub-group, and means for stopping said switch in response to said switch simultaneously encountering said individual and group markings to connect with said calling trunk line.

10. In a telephone system, an automatic switch having a bank, a plurality of groups of trunk lines, each of said groups terminating in said bank in a plurality of sub-groups, means responsive to a call on any one of said trunk lines from any one of said groups for marking all the trunk lines in said bank corresponding to said one trunk line group, for individually marking said one trunk line in said bank, and for marking the sub-group in said bank terminating said calling trunk line, means responsive to said call for operating said switch to hunt for a sub-group marking, means in said switch for stopping said switch in response to encountering said sub-group marking, means for thereafter operating said switch to hunt for said calling trunk line in said sub-group, a test relay and a pair of test wipers in said switch, and means for operating said test relay in response to the first of said test wipers encountering said individual marking and the second of said test wipers encountering said group marking to stop further operation of switch and to connect with said calling trunk line.

11. In a telephone system, an automatic switch having a bank of bank contacts divided into sub-groups, a plurality of groups of trunk lines, each of said trunk groups divided into trunk sub-groups, the trunk lines of each trunk sub-group terminating in a corresponding bank contact sub-group, means responsive to a trunk call on any one of said trunk lines for marking said bank with three separate markings, the first of said markings being a group marking corresponding to the particular trunk group said calling trunk line is in, the second of said markings being a sub-group marking corresponding to the particular trunk sub-group said calling trunk line is in, and the third of said markings being an individual marking for individuality marking said calling trunk line, means responsive to a second trunk call on any one of said trunk lines from another one of said trunk groups for only individually marking said second calling trunk line in said bank, said marking means operative in response to said first trunk call to prevent the group and sub-grouping markings of said second trunk call in said bank, means responsive to a trunk call from any one of said trunk lines for operating said switch, and means responsive to said markings to cause said switch to find the trunk line of said first call in accordance with said group, sub-group and individual markings while ignoring the individual marking of said second trunk call.

12. In a telephone system, an automatic switch having a bank of bank contacts divided into levels, a plurality of groups of trunk lines of different character, each of said groups divided into a plurality of sub-groups, each sub-group of trunk lines terminating in a particular bank level and each level terminating only one sub-group or a plurality of sub-groups from different groups of trunk lines, means responsive to a trunk call on any one of said trunk lines from any one of said groups for group marking all of the trunk lines in all of the sub-groups of said calling group of trunk lines in said bank, for marking the particular level corresponding to the sub-group in said bank terminating said calling trunk line, and for individually marking said calling trunk line in said bank, means responsive to a second trunk call on any one of said trunk lines from any one of said groups of trunk lines for only individually marking said second calling trunk line in said bank there being means provided for preventing the group and level markings in accordance with said second trunk call, means responsive to a call on any one of said trunk lines from any one of said groups for operating said switch, and means responsive to said markings to cause said switch to find said marked level and to connect with said first calling trunk line in accordance with said group and individual markings.

13. In a telephone system, an automatic switch having a bank, a plurality of groups of trunk lines, each of said groups terminating in said bank in a plurality of sub-groups, means responsive to a call on any one of said trunk lines from any one of said groups for marking all of the trunk lines in said bank corresponding to said one trunk line group, for individually marking said one trunk line in said bank, and for marking the sub-group in said bank terminating said one trunk line, means responsive to said call for operating said switch to find said sub-group terminating said calling trunk line in accordance with said sub-group marking, and means responsive to finding said sub-group for operating said switch to find and connect with said one trunk line in accordance with said individual and group markings.

14. In a telephone system, an automatic switch having a bank, a plurality of groups of trunk lines, each of said groups terminating in said bank in a plurality of sub-groups, means responsive to a call on any one of said trunk lines from any one of said groups for marking all of the trunk lines in said bank in said one group, for individually marking said one trunk line in said bank, and for marking the sub-group in said bank terminating said one trunk line, means responsive to said call for operating said switch, and means responsive to said markings to cause said switch to find said group and sub-group and to connect with said one trunk line in accordance with said group, sub-group, and individual markings.

15. In a telephone system, an automatic switch having a bank, a plurality of groups of trunk lines terminating in corresponding groups in said bank, means responsive to a trunk call on any one of said trunk lines for marking said bank with three separate markings, the first of said markings corresponding to the particular group said one trunk line is in, the second of said markings being individual to said one trunk line and the third marking being common to all said trunk lines, means responsive to said call for operating said switch, and means responsive to said markings to cause said switch to find the said particular marked group and to connect with said one trunk line in accordance with said individual and common markings.

16. In a telephone system, an automatic switch having a bank, a plurality of groups of trunk lines terminating in corresponding groups in said bank, means responsive to a call on any one of said trunk lines for marking the particular group in the bank said one trunk line is in, for individually marking said one trunk line in said bank, and for marking all of said trunk lines in said bank with a common marking, means responsive to said call for operating said switch, and means responsive to said markings to cause said switch to find said particular marked group and to find said one trunk line in accordance with said individual and common marking.

17. In a telephone system, a plurality of operators' positions, a plurality of groups of trunk lines of different character terminating in all said operators' positions, each of said trunk groups divided into a plurality of trunk sub-groups and arranged in corresponding sub-groups in said operators' positions, and means responsive to a trunk call in any one of said trunk groups for marking such trunk call with three separate markings, the first of said markings being an individual marking for individually marking said calling trunk line in all of said operators' positions, the second of said markings being a sub-group marking for marking in only an idle one of said operators' positions the position sub-group corresponding to the trunk sub-group terminating said calling trunk line, and the third of said markings being a group marking for marking in only said idle operator's position all of the trunk lines in all of the position sub-groups corresponding to all the trunk sub-groups of the trunk group terminating said calling line.

18. In a telephone system, a plurality of operators' positions, a plurality of groups of trunk lines of different character, each of said trunk groups divided into a plurality of trunk sub-groups, said groups of trunk lines terminating in all of said operators' positions, the trunk lines terminating in said positions being divided into sub-divisions corresponding to said trunk sub-groups and each sub-division terminating only one trunk sub-group or a plurality of trunk sub-groups from different trunk groups, means responsive to a trunk call by a trunk line in any one of said trunk groups for individually marking said calling trunk line in all of said operators' positions, and means responsive to said trunk call for group marking all of the trunk lines of said calling trunk group in all the corresponding sub-divisions in only an idle one of said operators' positions and for marking only the particular sub-division terminating said calling trunk line in only said idle operator's position.

19. In a telephone system, a plurality of operators' toll positions, a plurality of groups of toll trunk lines of different character terminating in all of said operators' positions, means responsive to a trunk call by a trunk line in one of said trunk groups for individually marking said calling trunk line in all of said positions, and means at an idle one of said operators' positions operated in response to said trunk call for group marking all of said trunk lines of only said calling trunk group at only said idle operator's position.

20. In a telephone system, a plurality of operators' toll positions, a group of trunk lines terminating in all of said operators' positions, means responsive to a trunk call by a trunk line in said group for individually marking said calling trunk line in all of said positions, and means at an idle one of said operators' positions operated in response to said trunk call for group marking all of said trunk lines at only said idle operator's position.

21. In a telephone system, a plurality of operators' toll positions, a group of trunk lines terminating in all of said operators' positions, means responsive to a trunk call by a trunk line in said group for individually marking said calling trunk line in all of said positions, means at an idle one of said operators' positions operated in response to said trunk call for group marking all of said trunk lines at only said idle operator's position, and means for preventing group marking of said trunk call at all the remaining operators' positions.

22. In a telephone system, a plurality of operators' positions, a group of trunk lines divided into a common sub-group, an odd sub-group, and an even sub-group of trunk lines, the trunk lines of said common sub-group terminating in all of said plurality of operators' positions, the trunk lines of said odd sub-group terminating in only each alternate odd operator's position, and the trunk lines of said even sub-group terminating in only the remaining even operators' positions, and means for distributing trunk calls by trunk lines from said common sub-group to any idle one of said operators' positions, for distributing trunk calls by trunk lines from said odd sub-group to only idle ones of said odd operators' positions, and for distributing trunk calls by trunk lines from said even sub-group to only idle ones of said even operators' positions.

23. In a telephone system, a plurality of operators' positions, a group of trunk lines divided into a common sub-group, an odd sub-group, and an even sub-group of trunk lines, the trunk lines of said common sub-group terminating in all of said plurality of operators' positions, the trunk lines of said odd sub-group terminating in only each alternate odd operators' positions, and the trunk lines of said even sub-group terminating in only the remaining even operators' positions, means for distributing trunk calls from trunk lines in said trunk group to idle ones of said operators' positions, and means dependent upon the sub-group each trunk call originates in for determining which ones of said idle operators' positions such trunk calls are distributed to.

24. In a telephone system, a plurality of operators' positions, a group of trunk lines divided into a common sub-group, an odd sub-group, and an even sub-group of trunk lines, the trunk lines of said common sub-group terminating in all of said plurality of operators' positions, the trunk lines of said odd sub-group terminating in only the alternate odd operators' positions, and the trunk lines of the even sub-group terminating in only the remaining even operators' positions, a common position distributor for selecting any idle one of said operators' positions, an odd position distributor for selecting any idle one of said odd operators' positions, and an even position distributor for selecting any idle one of said even operators' positions, means responsive to a trunk call by a trunk line in said common sub-group for routing said call to any one of said operators' positions selected by said common distributor, means responsive to a trunk call by a trunk line in said odd sub-group for routing said call to any one of said odd operators' positions selected by said odd distributor, and means responsive to a trunk call by a trunk line in said even sub-group for routing said call to any one of said even operators' positions selected by said even distributor.

25. In a telephone system, a plurality of operators' positions, means at each position for marking such positions idle and selectable for use only when the operators at such positions are ready to receive trunk calls, a group of trunk lines divided into a common sub-group, an odd sub-group, and an even sub-group of trunk lines, the common sub-group trunk lines terminating in all of said plurality of operators' positions, the odd sub-group trunk lines terminating in only each of the odd operators' positions, and the even sub-group trunk lines terminating in only each of the even operators' positions, means for distributing trunk calls from trunk lines in said trunk group to idle ones of said operators' positions, and means dependent upon the sub-group each trunk call originates in for determining which ones of said idle operators' positions such trunk calls are distributed to.

26. In a telephone system, a plurality of operators' positions, means at each position for marking such positions idle and selectable for use only when the operators at such positions are ready to receive trunk calls, a group of trunk lines divided into a common sub-group, an odd sub-group, and an even sub-group of trunk lines, the common sub-group trunk lines terminating in all of said plurality of operators' positions, the odd sub-group trunk lines terminating in only each of the odd operators' positions, and the even sub-group trunk lines terminating in only each of the even operators' positions, means for distributing trunk calls from trunk lines in said trunk group to idle ones of said operators' positions, means dependent upon the sub-group each trunk call originates in for determining which ones of said idle operators' positions such trunk calls are distributed to, said distributing means being capable of simultaneously distributing a trunk call from each of said sub-groups to three different idle ones of said operators' positions to enable the three operators thereat to simultaneously and independently answer such trunk calls from the three sub-groups.

27. In a telephone system, a plurality of groups of trunk lines, the trunk lines of each group being different in character, a plurality of operators' positions, means for selectively conditioning each position to handle trunk calls from all said trunk groups or for selectively conditioning each position to handle trunk calls from only a limited number of trunk groups, a position distributor individual to each trunk group, means in said distributors operative in accordance with said selective means for routing trunk calls from their respective trunk groups to an idle one of said operators' positions which is selectively conditioned to handle trunk calls from such trunk groups, means responsive to trunk calls by trunk lines in a plurality of said trunk groups for routing each said trunk call over its individual distributor to an idle operator's position conditioned to handle such trunk calls, means in each of said idle positions to which said trunk calls have been routed for respectively marking only the calling trunk lines in their respective operators' positions, and means responsive to said last means for causing each of said trunk calls to be answered in said respective positions independently of each other to thereby simultaneously complete a plurality of trunk connections at a plurality of said operators' positions.

28. In a telephone system, a plurality of groups of trunk lines, the trunk lines of each group being different in character, a plurality of operators' positions, means for selectively conditioning each position to handle trunk calls from all said trunk groups or for selectively conditioning each position to handle trunk calls from only a limited number of trunk groups, a position distributor individual to each trunk group, means in said distributors operative in accordance with said selective means for routing trunk calls from their respective trunk groups to an idle one of said operators' positions which is selectively conditioned to handle trunk calls from such trunk groups, means responsive to trunk calls by trunk lines in a plurality of said trunk groups for routing each said trunk call over its individual distributor to an idle operator's position conditioned to handle such trunk calls, and means in each of said idle positions to which said trunk calls have been routed for respectively answering only the calling trunk lines in their respective positions independently of each other to thereby permit the simultaneous completion of a plurality of trunk connections at a plurality of said operators' positions.

29. In a telephone system, a plurality of groups of trunk lines, the trunk lines of each group being different in character, a plurality of operators' positions, means for selectively conditioning each position to handle trunk calls from all said trunk groups or for selectively conditioning each position to handle trunk calls from only a limited number of trunk groups, a position distributor individual to each trunk group, means in said distributors operative in accordance with said selective means for routing trunk calls from their respective trunk groups to an idle one of said operators' positions which is selectively conditioned to handle trunk calls from such trunk groups, means responsive to trunk calls by trunk lines in a plurality of said trunk groups for routing each said trunk call over its individual distributor to an idle operator's position conditioned to handle such trunk calls, means responsive to a first trunk call from any trunk group for locking out a subsequent trunk call from its respective group to prevent the routing of the said subsequent trunk call to an idle operator's position until a connection has been completed at the operator's position with the trunk line of said first trunk call, and means in each of said idle positions to which said trunk calls have been routed for respectively answering only the calling trunk lines in their respective positions independently of each other to thereby permit the simultaneous completion of a plurality of trunk connections at a plurality of said operators' positions.

30. In a telephone system, a plurality of groups of trunk lines, the trunk lines of each group being different in character, a plurality of operators' positions, means for selectively conditioning each position to handle trunk calls from all said trunk groups or for selectively conditioning each position to handle trunk calls from only a limited number of said trunk groups, a channel individual to each trunk group for routing calls from their respective trunk groups to an idle one of said operators' positions which is selectively conditioned to handle trunk calls from such trunk groups, and means responsive to trunk calls by trunk lines in a plurality of said trunk groups for routing each said trunk call over its respective channel to an idle operators' position conditioned to handle such trunk calls to thereby permit a plurality of simultaneous routings over said respective channels to simultaneously complete a plurality of trunk connections at a plurality of operators' positions.

31. In a telephone system, a plurality of groups of trunk lines, the trunk lines of each group being different in character, a plurality of operators' positions, means for selectively conditioning each position to handle trunk calls from all said trunk groups or for selectively conditioning each position to handle trunk calls from only a limited number of said trunk groups, a position distributor individual to each trunk group, means in said distributors operative in accordance with said selective means for routing trunk calls from their respective trunk groups to an idle one of said operators' positions which is selectively conditioned to handle trunk calls from such trunk groups, and means responsive to a trunk call by a trunk line in each of said trunk groups for independently routing each said trunk call over its individual distributor to an idle operator's position conditioned to handle such trunk calls.

32. In a telephone system, a plurality of groups of trunk lines, the trunk lines of each group being different in character, a plurality of operators' positions, means at each position for marking such positions idle and selectable for use only when the operators at such positions are ready to receive trunk calls, means for selectively conditioning each position to handle trunk calls from all said trunk groups or for selectively conditioning each position to handle trunk calls from only a limited number of trunk groups, a position distributor individual to each trunk group, means in each said distributor for selecting only a marked idle one of said positions in accordance with said selective conditioning means, means responsive to trunk calls by trunk lines in a plurality of said trunk groups for routing each said trunk call over its individual distributor to an idle operator's position conditioned to handle such trunk calls, and means in each of said idle positions to which said trunk calls have been routed for respectively answering only the calling trunk lines in their respective positions independently of each other.

33. In a telephone system, a plurality of operators' positions, a first group of trunk lines of one character, a second group of trunk lines of a different character, a first channel for routing calls from said first group of trunk lines to any idle one of said operators' positions, a second channel for routing calls from said second group of trunk lines to any idle one of said operators' positions, and means responsive to substantially simultaneous calls from a trunk line in each of said groups for simultaneously routing said calls over their respective channels to different idle operators' positions.

34. In a telephone system, a plurality of operators' positions, a first group of trunk lines of one character, a second group of trunk lines of a different character, a first channel for routing calls from said first group of trunk lines to any one of said idle operators' positions, a second channel for routing calls from said second group of trunk lines to any one of said idle operators' positions, means responsive to simultaneous calls from a trunk line in each of said groups for routing both said calls over their respective channels to the first idle one of said operators' positions, and means operative in response to the automatic selection of one of said trunk calls at said first operator's position for automatically routing the other of said calls over its corresponding channel to the next idle operator's position.

35. In a telephone system, a plurality of operators' positions, a first group of trunk lines of one character, a second group of trunk lines of a different character, a first channel for routing calls from said first group of trunk lines to any one of said idle operators' positions, a second channel for routing calls from said second group of trunk lines to any one of said idle operators' positions, means responsive to simultaneous calls from a trunk line in each of said groups for routing both said calls over their respective channels to the first idle one of said operators' positions, means responsive to said routings for operatively connecting the operator at said first position to answer one of said routed calls, and means responsive to said connection for automatically rerouting the other of said calls over its corresponding channel to another idle operator's position.

36. In a telephone system, a plurality of operators' positions, a first group of trunk lines of one character, a second group of trunk lines of a different character, means responsive to simultaneous calls from a trunk line in each of said groups for marking said trunk lines in only the first idle one of said operators' positions, means responsive to said markings for operatively connecting the operator at said idle position to answer one of said trunk calls in accordance with one of said markings, and means responsive to said connection for erasing the markings of said other trunk call at said first position and for marking said other trunk line in only another idle operator's position.

37. In a telephone system, a plurality of operators' positions, a plurality of sender control circuits associated with said operators' positions, a plurality of senders common to said operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuit controlled thereby for interconnecting said sender control circuits with said senders, said connect relays divided into groups, each group being individual to a control relay and there being as many connect relays in each group as there are senders arranged to be connected to the corresponding sender control circuit, a circuit including contacts on said sender relays completed in response to the energization of one of said control relays for operating a particular one of said connect relays in its corresponding group to connect the corresponding sender control circuit to the sender corresponding to the operated connect relay, and circuit means for preventing the operation of more than one of said connect relays in any one of said groups at a given time.

38. In a telephone system, a plurality of operators' positions, a plurality of sender control circuits associated with said operators' positions, a plurality of senders common to said operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuits controlled thereby for interconnecting said sender control circuits with said senders, there being as many connect relays for each sender control circuit as there are senders arranged to be connected thereto, and a circuit including contacts on said sender relays completed responsive to the energization of one of said control relays for operating a particular one of said connect relays corresponding to an idle one of said senders to connect said one sender to the sender control circuit corresponding to the said one energized control relay.

39. In a telephone system, a plurality of operators' positions, a plurality of sender control circuits associated with said operators' positions, a plurality of senders common to said operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuits controlled thereby for interconnecting said sender control circuits with said senders, there being as many connect relays for each sender control circuit as there are senders arranged to be connected thereto, a circuit including contacts on said sender relays completed responsive to the energization of one of said control relays for operating a particular one of said connect relays corresponding to an idle one of said senders to connect said one sender to the sender control circuit corresponding to the said one energized control relay, and circuit means for preventing more than one of said control relays being energized at any given time.

40. In a telephone system, a plurality of operators' positions, a plurality of sender control circuits associated with said operators' positions, a plurality of senders common to said operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuits controlled thereby for interconnecting said sender control circuits with said senders, there being as many connect relays for each sender control circuit as there are senders arranged to be connected thereto, a circuit including contacts on said sender relays completed responsive to the energization of one of said control relays for operating a particular one of said connect relays corresponding to an idle one of said senders to connect said one sender to the sender control circuit corresponding to the said one energized control relay, and means for locking each energized connect relay in operated position independently of its original energizing circuit.

41. In a telephone system, a plurality of operators' positions, a plurality of sender control circuits associated with said operators' positions, a plurality of senders common to said operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuits controlled thereby for interconnecting said sender control circuits with said senders, there being as many connect relays for each sender control circuit as there are senders arranged to be connected thereto, a circuit including contacts on said sender relays completed responsive to the energization of one of said control relays for operating a particular one of said connect relays corresponding to an idle one of said senders to connect said one sender to the sender control circuit corresponding to the said one energized control relay, circuit means for preventing more than one of said control relays being energized at any given time, and means for locking each energized connect relay in operated position independently of its original energizing circuit.

42. In a telephone system, an operator's position, a first and a second sender control circuit associated with said position, means whereby the operator at said position alternately uses said sender control circuits, a plurality of senders common to said sender control circuits and to other sender control circuits at other operators' positions, a sender relay individual to each sender, means for energizing each sender relay when its corresponding sender is busy, a control relay individual to each sender control circuit, means for energizing each control relay when its corresponding sender control circuit is taken into use, a plurality of connect relays and circuits controlled thereby for interconnecting said sender control circuits with said senders, there being as many connect relays for each sender control circuit as there are senders arranged to be connected thereto, circuits controlled by said sender relays for causing idle ones of said senders to be preselected in a first order of access, other circuits controlled by said sender relays for causing idle ones of said senders to be preselected in an order of access in reverse to said first order of access, means responsive to the energization of the control relay individual to said first sender control circuit for operating a particular one of said connect relays to connect said first sender control circuit to the first idle one of said senders as determined by said first order of access circuits, and means responsive to the energization of the control relay individual to said second sender control circuit for operating a particular one of said connect relays to connect said second sender control circuit to the first idle one of said senders as determined by said reverse order of access circuits.

43. In a telephone system, a plurality of operators' positions, a plurality of sender control circuits associated with said operators' positions, a plurality of senders common to said operators' positions and said sender control circuits, means for preselecting idle ones of said senders in a first order of access, means for preselecting idle ones of said senders in an order of access in reverse to said first order of access, means responsive to a first of said sender control circuits being taken into use to connect said first sender control circuit with a first idle one of said senders as determined by said first order of access means, and means responsive to a second of said sender control circuits being taken into use to connect said second sender control circuit with a first idle one of said senders as determined by said reverse order of access means.

44. In a telephone system, a plurality of operators' positions, a plurality of sender control circuits associated with said operators' positions, a plurality of senders common to said operators' positions and said sender control circuits, a plurality of connect relays and circuits controlled thereby for interconnecting said sender control circuits with said senders, said connect relays divided into groups, each group being individual to a sender control circuit, and there being as many connect relays in each group as there are senders arranged to be connected to the corresponding sender control circuit, means for preselecting a connect relay in each of said groups in accordance with the idle condition of said senders, and means responsive to an operator taking one of said sender control circuits into use for operating only the preselected connect relay in the group corresponding to said one sender control circuit.

45. In a telephone system, a line, an operator's position, a link circuit at said position, automatic switches, sender control means initiated under control of the operator at said position and including a sender associated with said link for transmitting signals to control the operation of said switches to extend a call from said link to said line, a relay, means associated with said sender control means operative after said sender has transmitted its last switch control signal for bridging said relay across the conductors of said extended connection, said relay inoperative in case said call has been completely extended to said line, mean for operating said relay in case said call has not been completely extended to said line and for releasing said relay when the call has been completely extended, signalling means for applying ringing current to said line, means associated with said sender control means automatically operative in case said relay fails to operate or operative after the release of said relay for automatically operating said signalling means to ring said line, and means whereby the operator may retire from the connection after initiating the operation of said sender control means without interfering with the automatic operation of said sender control means and sender and the automatic ring control operation.

46. In a telephone system, a toll operator's position conditioned for completing delayed toll calls between calling and called lines, a link having a rear branch and a front branch associated with said position, a non-locking dial rear key at said operator's position, a set of digit keys at said operator's position for keeping up the digits corresponding to the telephone number of telephone lines required in desired toll connections, a link key in said link, a first sender, a second sender, means responsive to the momentary operation of said dial rear key and the operation of said link key for connecting said first sender to the rear branch of said link, means responsive to the operator at said position keying up the digits of a calling line on said key set for causing said first sender to receive and to transmit the digits of said calling number to said rear branch of said link to extend a connection from said link toward the calling line, a disconnect key in said key set operated by the operator after keying up the calling line digits, means responsive to the operation of said disconnect key for automatically connecting said second sender to the front branch of said link and to said key set, and means responsive to the operator at said position keying up the digits of the called line desired in this toll connection on said key set for causing said second sender to receive and to transmit the digits of said called number to the front of said link to extend the connection from said link toward the called line.

47. In a telephone system, a toll operator's position conditioned for completing delayed toll calls between calling and called lines, a link associated with said operator's position, a dial rear key at said operator's position, a set of digit keys at said operator's position for keying up the digits corresponding to the telephone number of telephone lines required in desired connections, a link key in said link, a first sender, a second sender, means responsive to the momentary operation of said dial rear key and the operation of said link key for connecting said first sender to said link, means responsive to the operator at said position keying up the digits of a calling line on said key set for causing said first sender to receive and to transmit the digits of said calling number to said link to extend a connection from said link to said calling line, a disconnect key in said key set operated by said operator after keying up said digits, and means responsive to the operation of said disconnect key for automatically conditioning said second sender to receive and to transmit subsequent digits keyed on said key set for extending the connection from said link toward a called line.

48. In a telephone system, a toll operator's position conditioned for completing delayed toll calls between calling and called lines, a plurality of links at said operator's position, each link including an answer switch, a link key in each link, a non-locking dial rear key at said position, a delayed call switch, means responsive to the operator at said position operating her dial rear key and a link key in one of said links for automatically operating the answer switch in said one link to find and connect with said delayed call switch, and means operative in response to the restoration of said link key in case the operator abandons this call for automatically releasing said answer switch thereby rendering said one link non-busy and selectable for use on other toll calls.

49. In a telephone system, a toll operator's position conditioned for completing delayed toll calls between calling and called lines, a dial rear key and a direct key at said operator's position, a link circuit having a rear branch and a front branch at said operator's position, means whereby the operator at said position has only partially completed a call from the rear branch of said link circuit to a calling line and then has completed the extension of said call from the front branch of said link to the called line desired in this toll call, a sender, and means responsive to the joint actuation of said direct key and the subsequent actuation of said dial rear key for connecting said sender to said rear branch of said link to enable said operator to complete said partially established call to the calling line.

50. In a telephone system, a plurality of operators' positions, a pair of sender control circuits individual to each of said positions, an alternator at each of said positions for preselecting an idle one of said sender control circuits for use at such positions, a plurality of links at each of said positions, means for seizing an idle one of said links at one of said positions, and means in said seized link responsive to its seizure for immediately connecting with the preselected sender control circuit associated with said one position.

51. In a telephone system, a first and a second operator's position, an incoming toll line terminating at both said positions, link circuits at each of said operators' positions, an answer switch and a call switch individual to each of said links, means whereby the answer switch in a first one of said links at said first operator's position is operated in response to an incoming call on said toll line to extend the toll line to said first operator's position, means responsive to the connection of said answer switch with said toll line for marking said toll line busy, means including the call switch of said first one link at said first operator's position and an answer switch in a first one of said links at said second operator's position for interconnecting said first and second positions, means including another answer switch in another link at said second operator's position for over-riding the busy marking on said toll line and for connecting said second operator's position to said toll line, and means for thereafter releasing said first links at both said first and second operator's positions from said connection.

52. In a telephone system, a first and a second operator's position, an incoming toll line terminating at both said positions, link circuits at each of said operators' positions, an answer switch and a call switch individual to each of said links, means whereby the answer switch in a first one of said links at said first operator's position is operated in response to an incoming call on said toll line to extend the toll line to said first operator's position, means including the call switch of said first one link at said first operator's position and an answer switch in a first one of said links at said second operator's position for interconnecting said first and second positions, means including another answer switch in another link at said second operator's position for connecting said second operator's position to said incoming toll line regardless of its busy connection with said first one link at said first operator's position, and means for thereafter releasing said first links at both said first and second operator's positions from said connection.

53. In a telephone system, a first operator's position, a second operator's position, means including a link circuit at said first operator's position for answering an incoming trunk call, a set of digit keys at said second operator's position, means at said second operator's position for operatively connecting said set of digit keys at said terminal to energize said other winding in opposition to said first winding with sufficient magnetic flux to overcome said first magnetic bias to operate said relay.

66. In a telephone system, an automatic switch for extending calls, an outgoing trunk individual to said switch but separated therefrom, a relay in said trunk having two windings, a first circuit including both said windings in series for marking said trunk idle, a busy key in said switch, means including said busy key for marking said trunk busy over a second circuit including one of said windings of said relay, a busy key in said trunk, and means including said last busy key for marking said trunk busy over a third circuit including said one winding of said relay.

67. In a telephone system, an automatic switch for extending calls, an outgoing trunk individual to said switch but separated therefrom, a relay in said trunk having two windings, a first circuit including both said windings in series for marking said trunk idle, a busy key in said switch, means including said busy key for marking said trunk busy over a second circuit including one of said windings of said relay, a busy key in said trunk, means including said last busy key for marking said trunk busy over a third circuit including said one winding of said relay, means for seizing said trunk line, and means for operating said relay over said first circuit in response to said seizure to open said second circuit.

IMRE MOLNAR.

second operator's position to said link circuit at said first operator's position, and means responsive to the operation of the digit keys at said second operator's position for transmitting series of digit impulses corresponding to the keys actuated through the said link circuit and said first operator's position to extend said trunk call.

54. In a telephone system, a plurality of groups of trunk lines of different character, a plurality of operators' positions terminating said groups of trunk lines, a calling waiting lamp at each of said operators' positions for each of said different trunk groups, a start relay for each of said different groups of trunk lines, means responsive to a trunk call by a trunk line in any one of said groups for operating its corresponding start relay, means responsive to the operation of said start relay for operating the calling waiting lamp corresponding to the trunk group said calling trunk line is in at all of said positions, and means in said calling trunk line for operating said corresponding call waiting lamp at all of said positions independently of said operated start relay.

55. In a telephone system, a plurality of groups of trunk lines of different character, a plurality of operators' positions terminating said groups of trunk lines, a call waiting lamp at each of said operators' positions for each of said different trunk groups, and means responsive to a trunk call by a trunk line in any one of said trunk groups for operating the call waiting lamp corresponding to the trunk group said calling line is in at all of said operators' positions over two separate and independent circuits.

56. In a telephone system, an automatic finder switch having a bank of terminals and wipers for engaging said terminals, a group of trunk lines terminating in said terminals of said switch, means responsive to a trunk call by a trunk line in said group for marking the terminals in said switch corresponding to said calling trunk line, means responsive to said trunk call for operating the wipers of said switch in a hunting movement over the terminals of said trunk group in search of said marked trunk line terminals, means for stopping said wipers in response to said wipers engaging said marked terminals to thereby connect with said calling trunk line, and means for stopping said wipers on the terminals of the last trunk line of said group and for releasing said switch in case said wipers fail to engage said marked terminals of said calling trunk line.

57. In a telephone system, an automatic finder switch having a bank of terminals and wipers for engaging said terminals, a group of trunk lines terminating in said terminals of said switch, means responsive to a trunk call by a trunk line in said group for marking the terminals in said switch corresponding to said calling trunk line, means responsive to said trunk call for operating the wipers of said switch in a hunting movement over the terminals of said trunk group in search of said marked trunk line terminals, and means for stopping said wipers on the terminals of the last trunk line of said group and for releasing said switch in case said wipers fail to find said marked terminals of said calling trunk line.

58. In a telephone system, an automatic switch having a bank of terminals and wipers for engaging said terminals, a group of trunk lines terminating in said terminals of said switch, means responsive to a trunk call by the trunk line terminating in the last terminal in said switch for marking said last terminal, means responsive to said trunk call for operating the wipers of said switch in a hunting movement over the terminals of said trunk group in search of said marked trunk line terminal, a test relay in said switch operated in response to said wipers engaging said marked terminals for stopping said switch wipers and for connecting with said calling trunk line, a slow-to-operate relay in said switch controlled by said test relay, means for operating said slow-to-operate relay in case said test relay fails to operate, and means for releasing said switch in response to the operation of said slow-to-operate relay.

59. In a telephone system, a trunk including first and second branches normally connected together, each branch of said trunk including two line conductors, a trunk circuit associated with both branches of said trunk and including a ring relay and an order relay and a check relay and a pad control relay, a first operating circuit for said ring relay including one of the line conductors of the second branch of said trunk and said pad control relay, a second operating circuit for said order relay including the one line conductor of the second branch of said trunk and said pad control relay, a third operating circuit for said check relay including the other line conductor of the second branch of said trunk and said pad control relay, a fourth operating circuit for said pad control relay including both said line conductors of the second branch and said ring and check relays, a source of ringing voltage, said ring relay being operative to disconnect the first and second branches of said trunk and to connect said source of ringing voltage to the line conductors of the first branch of said trunk, a source of out-of-order voltage, said order relay being operative to connect said source of out-of-order voltage to both branches of said trunk, an identity signal associated with said trunk, said check relay being operative to cause operation of said identity signal and to interrupt said first operating circuit and to complete said second operating circuit in the event it is prepared, a pad network individual to said trunk for controlling the transmission level over said line conductors, said pad control relay being operative over said first, second, third, and fourth operating circuits to cause the inclusion of said pad network in said line conductors, an operator position, automatic switching apparatus associated with said operator position and having access to the second branch of said trunk, means for causing said switching apparatus to seize the second branch of said trunk, thereby to complete a connection between said operator position and said trunk, a device at said operator position selectively operative to complete by way of said switching apparatus said first operating circuit or to prepare by way of said switching apparatus said second operating circuit and to complete by way of said switching apparatus said third operating circuit, means for completing said fourth operating circuit, and means for preventing the operation of said ring and check relays over said fourth operating circuit.

60. In a telephone system, a trunk line including two line conductors, a source of ringing current, a ring relay operative to cause connection of said source to said line conductors, a trunk identity signal individual to said trunk line, a check relay operative to control said signal, a pad network individual to said trunk line for controlling the transmission level over said conductors, a pad control relay operative to effectively include said pad network in said line con-